(12) United States Patent
Karabinis

(10) Patent No.: US 11,075,740 B2
(45) Date of Patent: Jul. 27, 2021

(54) SYSTEMS/METHODS OF COMMUNICATIONS USING A PLURALITY OF COOPERATIVE DEVICES

(71) Applicant: ENK Wireless, Inc., Cary, NC (US)

(72) Inventor: Peter D. Karabinis, Cary, NC (US)

(73) Assignee: ENK Wireless, Inc., Cary, NC (US)

( * ) Notice: Subject to any disclaimer, the term of this patent is extended or adjusted under 35 U.S.C. 154(b) by 0 days.

(21) Appl. No.: 16/847,113

(22) Filed: Apr. 13, 2020

(65) Prior Publication Data

US 2020/0244430 A1 Jul. 30, 2020

Related U.S. Application Data

(63) Continuation-in-part of application No. 16/675,427, filed on Nov. 6, 2019, which is a continuation-in-part of application No. 16/388,091, filed on Apr. 18, 2019, now Pat. No. 10,681,716, which is a continuation-in-part of application No. 16/250,532, filed on Jan. 17, 2019, now Pat. No. 10,804,998.

(60) Provisional application No. 62/667,949, filed on May 7, 2018, provisional application No. 62/670,377, filed on May 11, 2018, provisional application No.
(Continued)

(51) Int. Cl.
| | |
|---|---|
| *H04L 1/02* | (2006.01) |
| *H04L 5/04* | (2006.01) |
| *H04L 5/00* | (2006.01) |
| *H04W 4/44* | (2018.01) |
| *H04L 27/26* | (2006.01) |
| *H04W 8/24* | (2009.01) |

(52) U.S. Cl.
CPC .............. *H04L 5/04* (2013.01); *H04L 5/0055* (2013.01); *H04L 27/2636* (2013.01); *H04W 4/44* (2018.02); *H04W 8/24* (2013.01)

(58) Field of Classification Search
CPC ..... H04L 1/0618; H04L 1/06; H04L 27/2647; H04L 5/0007; H04L 5/0055; H04L 5/04; H04L 1/1896; H04W 4/40; H04W 4/46; H04W 74/002; H04W 8/24; H04B 5/0037
USPC .................................................. 375/267, 260
See application file for complete search history.

(56) References Cited

U.S. PATENT DOCUMENTS

| | | | |
|---|---|---|---|
| 4,631,734 | A | 12/1986 | Foschini |
| 5,420,794 | A | 5/1995 | James |
(Continued)

OTHER PUBLICATIONS

"5G Radio Access" Ericsson White Paper, Ericsson AB (10 pages) (Apr. 2016).
(Continued)

*Primary Examiner* — Khai Tran
(74) *Attorney, Agent, or Firm* — Myers Bigel, P.A.

(57) ABSTRACT

Systems/methods comprising a plurality of devices that cooperate with one another, particularly when in proximity to one another, are disclosed. According to some embodiments, first information is relayed from a first device to a second device and second information is relayed from the second device to the first device. The second device may transmit a signal, comprising the first information, to a destination device; and the first device may transmit a signal, comprising the second information, to the destination device. A plethora of embodiments are disclosed including a new carrier aggregation system/method that capitalizes on resources that may be provided by a plurality of devices that cooperate with one another.

33 Claims, 30 Drawing Sheets

Related U.S. Application Data

62/683,235, filed on Jun. 11, 2018, provisional application No. 62/702,106, filed on Jul. 23, 2018.

(56) References Cited

U.S. PATENT DOCUMENTS

| | | | |
|---|---|---|---|
| 5,491,689 | A | 2/1996 | Maher et al. |
| 6,097,771 | A | 8/2000 | Foschini |
| 6,317,466 | B1 | 11/2001 | Foschini et al. |
| 6,614,387 | B1 | 9/2003 | Deadman |
| 6,763,073 | B2 | 7/2004 | Foschini et al. |
| 6,888,809 | B1 | 5/2005 | Foschini et al. |
| 6,973,843 | B2 | 12/2005 | Shyy et al. |
| 7,006,795 | B2 | 2/2006 | Foschini et al. |
| 7,050,510 | B2 | 5/2006 | Foschini et al. |
| 7,116,722 | B2 | 10/2006 | Foschini et al. |
| 7,155,229 | B2 | 12/2006 | Dent |
| 7,203,490 | B2 | 4/2007 | Karabinis et al. |
| 7,444,170 | B2 | 10/2008 | Karabinis |
| 7,831,201 | B2 | 11/2010 | Karabinis |
| 7,848,774 | B2 | 12/2010 | Park |
| 8,108,004 | B2 | 1/2012 | Karabinis |
| 8,170,474 | B2 | 5/2012 | Karabinis et al. |
| 8,340,592 | B2 | 12/2012 | Karabinis |
| 8,670,493 | B2 | 3/2014 | Karabinis |
| 8,891,645 | B2 | 11/2014 | Karabinis |
| 9,185,553 | B2 | 11/2015 | Karabinis |
| 9,232,406 | B2 | 1/2016 | Karabinis |
| 9,374,746 | B1 | 6/2016 | Karabinis |
| 9,806,790 | B2 | 10/2017 | Karabinis |
| 10,332,403 | B2 | 6/2019 | Saigusa |
| 10,334,515 | B2 | 6/2019 | Karabinis |
| 10,595,267 | B2 | 3/2020 | Karabinis |
| 2004/0264592 | A1 | 12/2004 | Sibecas et al. |
| 2007/0047678 | A1 | 3/2007 | Sibecas et al. |
| 2008/0076349 | A1 | 3/2008 | Hwang et al. |
| 2008/0170533 | A1 | 7/2008 | Cyzs et al. |
| 2009/0190926 | A1 | 7/2009 | Charlet et al. |
| 2009/0224983 | A1 | 9/2009 | Laroia et al. |
| 2010/0067605 | A1 | 3/2010 | Joengren |
| 2010/0128651 | A1 | 5/2010 | Yim et al. |
| 2010/0135445 | A1 | 6/2010 | Sari |
| 2010/0142418 | A1 | 6/2010 | Nishioka et al. |
| 2012/0040607 | A1* | 2/2012 | Yang .................. H04W 40/22 455/9 |
| 2012/0170619 | A1 | 7/2012 | Chang et al. |
| 2012/0275378 | A1 | 11/2012 | Lee |
| 2014/0029485 | A1 | 1/2014 | Bowman et al. |
| 2016/0113023 | A1* | 4/2016 | Zhou .................... H04W 76/30 370/329 |
| 2016/0241486 | A1 | 8/2016 | Jiao |
| 2017/0338978 | A1 | 11/2017 | Monsen |
| 2017/0346852 | A1* | 11/2017 | Chhabra ............ H04L 63/1466 |
| 2018/0015922 | A1 | 1/2018 | McNew |
| 2018/0084466 | A1* | 3/2018 | Zeller ............ H04W 36/00837 |
| 2018/0139622 | A1 | 5/2018 | Cornforth et al. |
| 2018/0215380 | A1 | 8/2018 | Devi |
| 2018/0242250 | A1* | 8/2018 | Huang ............. H04W 52/0229 |
| 2018/0293539 | A1* | 10/2018 | Tubb .................. G06Q 10/0833 |
| 2018/0365679 | A1 | 12/2018 | Nuzum et al. |
| 2019/0068259 | A1 | 2/2019 | Liu et al. |
| 2019/0141487 | A1* | 5/2019 | Jiang ....................... H04W 4/08 |
| 2019/0253972 | A1* | 8/2019 | Park ...................... H04W 84/12 |
| 2019/0341993 | A1 | 11/2019 | Karabinis |
| 2019/0342901 | A1 | 11/2019 | Karabinis |
| 2020/0033849 | A1 | 1/2020 | Yiu et al. |
| 2020/0045579 | A1* | 2/2020 | Xu ........................ H04L 1/0026 |
| 2020/0074857 | A1 | 3/2020 | Karabinis |

OTHER PUBLICATIONS

Foschini et al. "On Limits of Wireless Communications in a Fading Environment when Using Multiple Antennas" Wireless Personal Communications 6:311-335 (1998).

Foschini, Gerard J. "Layered Space-Time Architecture for Wireless Communication in a Fading Environment When Using Multi-Element Antennas" Bell Labs Technical Journal 1(2):41-59 (1996).

Golden et al. "V-BLAST: A High Capacity Space-Time Architecture for the Rich-Scattering Wireless Channel" Bell Laboratories (18 pages) (1998).

Karabinis, Peter D. "Maximum-Power and Amplitude-Equalizing Algorithms for Phase Control in Space Diversity Combining" The Bell System Technical Journal 62(1):63-89 (Jan. 1983).

Sharma et al. "A Review on Bell Labs Layered Space Time Architecture (V-BLAST)" International Journal for Advance Research in Engineering and Technology 2(IV):147-154 (Apr. 2014).

Wolniansky et al. "V-BLAST: An Architecture for Realizing Very High Data Rates Over the Rich-Scattering Wireless Channel" 1998 URSI International Symposium on Signals, Systems, and Electronics. Conference Proceedings (Cat. No. 98EX167) (6 pages) (1998).

Zacarias et al. "BLAST Architectures" 5-72.333 Postgraduate Course in Radio Communications (6 pages) (2004).

\* cited by examiner

SYSTEMS/METHODS OF COMMUNICATIONS USING A PLURALITY OF COOPERATIVE DEVICES

CLAIM FOR PRIORITY

The present application claims the benefit of priority as a Continuation-In-Part application of U.S. application Ser. No. 16/675,427, filed Nov. 6, 2019, which itself is a Continuation-In-Part application of U.S. application Ser. No. 16/388,091, filed Apr. 18, 2019, issued as U.S. Pat. No. 10,681,716, which itself is a Continuation-In-Part of U.S. application Ser. No. 16/250,532, filed Jan. 17, 2019, issued as U.S. Pat. No. 10,804,998, which claims priority to U.S. Provisional Application No. 62/667,949, filed May 7, 2018, entitled Systems/Methods of Altitude Limiting; to U.S. Provisional Application No. 62/670,377, filed May 11, 2018, entitled Systems/Methods of Providing Power Wirelessly; to U.S. Provisional Application No. 62/683,235, filed Jun. 11, 2018, entitled Systems/Methods of Disabling and/or Enabling Smartphone Functions; and to U.S. Provisional Application No. 62/702,106, filed Jul. 23, 2018, entitled Systems/Methods of Increasing Wireless Capacity by Using Multiple Polarizations, all of which are incorporated herein by reference in their entireties as if set forth fully herein.

TECHNICAL FIELD

The present application relates to systems/methods that increase wireless communications throughput via a new multi-device carrier aggregation approach, and further relates to transmissions/receptions using co-frequency/co-channel techniques and/or multiple polarizations. The present application also relates to systems/methods of providing power wirelessly, controlling of wireless devices and providing vehicular safety.

BACKGROUND

It is expected that wireless devices will continue to proliferate with increasing connectivity therebetween. Accordingly, wireless traffic is expected to increase as we have indeed entered an era of a substantially wirelessly interconnected society. In light of this, it may be beneficial to effectively use signal/physical space that supports wireless communications. Mobile/cellular communications channels, however, are subject to many propagation anomalies that cause such channels to deviate substantially from that of free space, and thus may be vulnerable to interference.

It is also recognized that having to plug a device into a wall outlet in order to provide power to the device is often restrictive, inconvenient and/or cumbersome.

Moreover, a recent concern has arisen in light of a proliferation of flying objects such as drones. Allowing flying objects to undergo unrestricted trajectories is dangerous, particularly in densely populated areas.

Vehicular safety has been increasing steadily by incorporating technology into vehicles that either warns drivers of impending dangers or acts to prevent an occurrence such as a collision or other unpleasant situation. However, a need to further improve safety exists.

SUMMARY

Increasing Wireless Capacity by Using Multiple Polarizations and/or Multi-Device Carrier Aggregation ("MDCA")

Embodiments of inventive concepts relating dual polarization transmission and/or reception in a cellular environment are provided. According to some embodiments, a communications method is provided comprising: forming (e.g., generating) by a transmitter a first signal comprising a first function of first and/or second data that the transmitter is to convey to a receiver; forming (e.g., generating) by the transmitter a second signal comprising a second function of said first and/or second data that the transmitter is to convey to the receiver; and transmitting by the transmitter said first and second signals over respective first and second polarizations; wherein, in some embodiments, said transmitting by the transmitter said first and second signals over respective first and second polarizations, occurs substantially concurrently in time over said respective first and second polarizations and, further, occurs substantially co-frequency over said respective first and second polarizations; and wherein said first data comprises a statistical independence relative to said second data.

According to other embodiments, said first and/or second function comprises a coefficient of a channel that relates to said first polarization, a coefficient of a channel that relates to said second polarization, a coefficient of a channel that relates to an interference/leakage from the first polarization to the second polarization and/or a coefficient of a channel that relates to an interference/leakage from the second polarization to the first polarization.

According to further embodiments, said first and second polarizations comprise respective first and second linearly polarized antennas that comprise a spatial quadrature with one another.

According to additional embodiments, said forming by a transmitter a first signal, forming by the transmitter a second signal and said transmitting are performed by a mobile device that comprises a smartphone.

Yet, in other embodiments, said transmitting comprises: transmitting by the mobile device over a time-varying, frequency-selective fading channel.

In yet further embodiments of inventive concepts, said first function comprises a relationship of $\chi'=(\chi+\xi y)$, and said second function comprises a relationship of $y'=y$; wherein $\chi'$ comprises said first signal that is transmitted by the transmitter over said first polarization; $y'$ comprises said second signal that is transmitted by the transmitter over said second polarization; $\chi$ comprises said first data; and $y$ comprises said second data; wherein $\xi$ may be: $\xi=-\beta_{HV}/\alpha C_{VV}$ or $\xi=-\beta_{HH}/\alpha_{VH}$; wherein $\alpha_{VV}$ and $\beta_{HV}$ respectively comprise a co-polarization coefficient (i.e., a "V" into "V" transmission; which may be desired) associated with said first ("V") polarization and a cross-polarization interference coefficient (i.e., a "H" into "V" transmission or leakage/interference; which may not be desired) associated with said second ("H") polarization; and wherein $\beta_{HH}$ and $\alpha_{VH}$ respectively comprise a co-polarization coefficient (i.e., a "H" into "H" transmission; which may be desired) associated with said second ("H") polarization and a cross-polarization interference coefficient (i.e., a "V" into "H" transmission or leakage/interference; which may not be desired) associated with said first polarization.

In some embodiments of inventive concepts, said first function comprises a relationship of $\chi'=[(\chi/\alpha_{VV})+\xi y]$, and said second function comprises a relationship of $y'=y$; wherein $\chi'$ comprises said first signal that is transmitted by the transmitter over said first polarization; $y'$ comprises said second signal that is transmitted by the transmitter over said second polarization; $\chi$ comprises said first data; and $y$ comprises said second data; wherein $\xi$ may be: $\xi=-\beta_{HV}/\alpha_{VV}$ or $\xi=-\beta_{HH}/\alpha_{VH}$; wherein $\alpha_{VV}$ and $\beta_{HV}$ respectively comprise a co-polarization coefficient associated with said first polarization and a cross-polarization interference coefficient associated with said second polarization; and wherein $\beta_{HH}$, and $\alpha_{VH}$ respectively comprise a co-polarization coefficient associated with said second polarization and a cross-polarization interference coefficient associated with said first polarization.

In accordance with other embodiments, said first function comprises a relationship of $\chi'=\chi$, and said second function comprises a relationship of $y'=y+\xi\chi$; wherein $\chi'$ comprises said first signal that is transmitted by the transmitter over said first polarization; y' comprises said second signal that is transmitted by the transmitter over said second polarization; $\chi$ comprises said first data; and y comprises said second data; wherein $\xi$ may be set to: $\xi=-\alpha_{VV}/\beta_{HV}$ or $\xi=-\alpha_{VH}/\beta_{HH}$; wherein $\alpha_{VV}$, and $\beta_{HV}$ respectively comprise a co-polarization coefficient associated with said first polarization and a cross-polarization interference coefficient associated with said second polarization; and wherein $\beta_{HH}$, and $\alpha_{VH}$ respectively comprise a co-polarization coefficient associated with said second polarization and a cross-polarization interference coefficient associated with said first polarization.

In other embodiments, said first function comprises a relationship of $\chi'=\chi$; and said second function comprises a relationship of $y'=[(y/\beta_{HH})+\xi\chi]$; wherein $\chi'$ comprises said first signal that is transmitted by the transmitter over said first polarization; y' comprises said second signal that is transmitted by the transmitter over said second polarization; $\chi$ comprises said first data; and y comprises said second data; wherein $\xi$ may be set to: $\xi=-\alpha_{VV}/\beta_{HV}$ or, alternatively, $\xi$ may be set to: $\xi=-\alpha_{VH}/\beta_{HH}$; wherein $\alpha_{VV}$, and $\beta_{HV}$ respectively comprise a co-polarization coefficient associated with said first polarization and a cross-polarization interference coefficient associated with said second polarization; and wherein $\beta_{HH}$, and $\alpha_{VH}$ respectively comprise a co-polarization coefficient associated with said second polarization and a cross-polarization interference coefficient associated with said first polarization.

In some embodiments, said first function comprises a first linear functional relationship of $\chi'=(\chi+\xi y)$, and said second function comprises a second linear functional relationship of $y'=y+\lambda\chi$; wherein $\chi'$ comprises said first signal that is transmitted by the transmitter over said first polarization; y' comprises said second signal that is transmitted by the transmitter over said second polarization; $\chi$ comprises said first data; and y comprises said second data; wherein the quantities $\xi$ and $\lambda$ may be: $\xi=-\beta_{HV}/\alpha_{VV}$ and $\lambda=-\alpha_{VH}/\beta_{HH}$; wherein $\alpha_{VV}$, and $\beta_{HV}$ respectively comprise a co-polarization coefficient associated with said first polarization and a cross-polarization interference coefficient associated with said second polarization; and wherein $\beta_{HH}$, and $\alpha_{VH}$ respectively comprise a co-polarization coefficient associated with said second polarization and a cross-polarization interference coefficient associated with said first polarization.

In accordance with other embodiments, said first function comprises a relationship of $\chi'=\chi[\beta_{HH}/(\alpha_{VV}\beta_{HH}-\beta_{HV}\alpha_{VH}]$, and wherein said second function comprises a relationship of $y'=y[\alpha_{VV}/(\beta_{HH}\alpha_{VV}-\beta_{HV}\alpha_{VH})]$; wherein $\chi'$ comprises said first signal that is transmitted by the transmitter over said first polarization; y' comprises said second signal that is transmitted by the transmitter over said second polarization; $\chi$ comprises said first data; and y comprises said second data; wherein $\alpha_{VV}$, and $\beta_{HV}$ respectively comprise a co-polarization coefficient associated with said first polarization and a cross-polarization interference coefficient associated with said second polarization; and wherein $\beta_{HH}$, and $\alpha_{VH}$ respectively comprise a co-polarization coefficient associated with said second polarization and a cross-polarization interference coefficient associated with said first polarization.

In accordance with yet additional embodiments, said first function comprises a relationship of $\chi'=(\chi+\xi y)$, and wherein said second function comprises a relationship of $y'=y+\lambda\chi$; wherein $\chi'$ comprises said first signal that is transmitted by the transmitter over said first polarization; y' comprises said second signal that is transmitted by the transmitter over said second polarization; $\chi$ comprises said first data; and y comprises said second data; wherein a value of $\xi$ may be set to: $\xi=-\beta_{HH}/\alpha_{VH}$ and a value of $\lambda$ may be set to: $\lambda=-\alpha_{VV}/\beta_{HV}$; wherein $\alpha_{VV}$, and $\beta_{HV}$ respectively comprise a co-polarization coefficient associated with said first polarization and a cross-polarization interference coefficient associated with said second polarization; and wherein $\beta_{HH}$, and $\alpha_{VH}$ respectively comprise a co-polarization coefficient associated with said second polarization and a cross-polarization interference coefficient associated with said first polarization.

Yet, in accordance with more embodiments, said first function comprises a relationship of $\chi'=\chi[\beta_{HV}/(\alpha_{VH}\beta_{HV}\alpha_{VH})]$, wherein said second function comprises a relationship of $y'=y[\alpha_{VH}/(\alpha_{VH}\beta_{HV}-\beta_{HH}\alpha_{VV})]$; wherein $\chi'$ comprises said first signal that is transmitted by the transmitter over said first polarization; y' comprises said second signal that is transmitted by the transmitter over said second polarization; $\chi$ comprises said first data; and y comprises said second data; wherein $\alpha_{VV}$, and $\beta_{HV}$ respectively comprise a co-polarization coefficient associated with said first polarization and a cross-polarization interference coefficient associated with said second polarization; and wherein in such embodiments, $\beta_{HH}$, and $\alpha_{VH}$ respectively comprise a co-polarization coefficient associated with said second polarization and a cross-polarization interference coefficient associated with said first polarization.

In accordance with additional embodiments, a communications method is presented comprising: receiving by at least one slave device first and second data transmitted by a master device and intended for a destination device; transmitting the first and second data to the destination device using a composite transmitter comprising a first transmitter and a second transmitter. The transmitting the first and second data includes generating by the first transmitter a first signal comprising a first function of said first and/or second data that is to be conveyed to the destination device and generating by the first transmitter a second signal comprising a second function of said first and/or second data; and transmitting by the first transmitter said first and second signals over respective first and second polarizations of the first transmitter. Moreover, the method includes generating by the second transmitter a third signal comprising a third function of said first and/or second data and generating by the second transmitter a fourth signal comprising a fourth function of said first and/or second data; and transmitting by the second transmitter said third and fourth signals over respective first and second polarizations of the second transmitter; wherein said first, second, third and fourth signals are transmitted substantially concurrently in time with one another and substantially co-frequency with one another; and wherein said first data comprises a statistical independence relative to said second data.

In some embodiments, said at least one slave device comprises said first transmitter; wherein said first function comprises a relationship of $\chi'=\chi$; wherein $\chi'$ comprises said first signal, $\chi$ comprises said first data that is to be conveyed to the destination device; and wherein said second function comprises a relationship of y'=y; wherein y' comprises said second signal, and y comprises said second data that is to be conveyed to the destination device.

In further embodiments, $\chi'$ comprises a division by $\Phi$ prior to being transmitted by said first transmitter; and wherein y' comprises a division by $\Psi$ prior to being transmitted by said first transmitter; wherein $\Phi$ comprises a first function of channel coefficients; and wherein $\Psi$ comprises a second function of channel coefficients.

According to additional embodiments, said first function of channel coefficients comprises a relationship $[a_{VV}-(a_{VH}/v_{VH})\cdot b_{VV}]$; wherein said second function of channel coefficients comprises a relationship $[a_{HH}-(a_{HV}/b_{HV})\cdot b_{HH}]$; wherein $a_{VV}$, $a_{HH}$, $b_{VV}$ and $b_{HH}$ respectively comprise a co-polarization coefficient associated with said first polarization of said first transmitter, a co-polarization coefficient associated with said second polarization of said first transmitter, a co-polarization coefficient associated with said first polarization of said second transmitter and a co-polarization coefficient associated with said second polarization of said second transmitter; and wherein $a_{VH}$, $a_{HV}$, $b_{VH}$ and $b_{HV}$ respectively comprise a cross-polarization interference coefficient associated with said first polarization of said first transmitter, a cross-polarization interference coefficient associated with said second polarization of said first transmitter, a cross-polarization interference coefficient associated with said first polarization of said second transmitter and a cross-polarization interference coefficient associated with said second polarization of said second transmitter.

In some embodiments, said at least one slave device comprises a first slave device and a second slave device; wherein the first slave device comprises said first transmitter and wherein the second slave device comprises said second transmitter; wherein said first function comprises a relationship of $\chi'=\chi$; wherein $\chi'$ comprises said first signal, $\chi$ comprises said first data that is to be conveyed to the destination device; wherein said second function comprises a relationship of y'=y; wherein y' comprises said second signal, and y comprises said second data that is to be conveyed to the destination device; wherein said third function comprises a relationship of $\chi''=\xi\chi$; wherein $\chi''$ comprises said third signal; wherein said fourth function comprises a relationship of y''=$\lambda$y and wherein y'' comprises said fourth signal; wherein $\lambda=-(a_{HV}/b_{HV})$ and $\xi=-(a_{VH}/b_{VH})$; wherein $a_{HV}$, and $b_{HV}$ respectively comprise a cross-polarization interference coefficient associated with said second polarization of said first transmitter and a cross-polarization interference coefficient associated with said second polarization of said second transmitter; and wherein $b_{VH}$, and $a_{VH}$ respectively comprise a cross-polarization interference coefficient associated with said first polarization of said second transmitter and a cross-polarization interference coefficient associated with said first polarization of said first transmitter.

In yet other embodiments, $\chi'$ comprises a division by $\Phi$ prior to being transmitted by said first transmitter; and wherein y' comprises a division by $\Psi$ prior to being transmitted by said first transmitter; wherein $\chi''$ comprises a division by $\Phi$ prior to being transmitted by said second transmitter; and wherein y'' comprises a division by $\Psi$ prior to being transmitted by said second transmitter; wherein $\Phi$ comprises a first function of channel coefficients; and wherein $\Psi$ comprises a second function of channel coefficients.

According to additional embodiments, said first function of channel coefficients comprises a relationship $[a_{VV}-(a_{VH}/b_{VH})\cdot b_{VV}]$; and wherein said second function of channel coefficients comprises a relationship $[a_{HH}-(a_{HV}/b_{HV})\cdot b_{HH}]$; wherein $a_{VV}$, $a_{HH}$, $b_{VV}$ and $b_{HH}$ respectively comprise a co-polarization coefficient associated with said first polarization of said first transmitter, a co-polarization coefficient associated with said second polarization of said first transmitter, a co-polarization coefficient associated with said first polarization of said second transmitter and a co-polarization coefficient associated with said second polarization of said second transmitter; and wherein $a_{VH}$, $a_{HV}$, $b_{VH}$ and $b_{HV}$ respectively comprise a cross-polarization interference coefficient associated with said first polarization of said first transmitter, a cross-polarization interference coefficient associated with said second polarization of said first transmitter, a cross-polarization interference coefficient associated with said first polarization of said second transmitter and, finally, a cross-polarization interference coefficient associated with said second polarization of said second transmitter.

In further embodiments, said at least one slave device comprises said first transmitter; wherein said first function comprises a relationship of $\chi'=\chi$; wherein $\chi'$ comprises said first signal; wherein $\chi$ comprises said first data transmitted by the master device and intended for the destination device; wherein said second function comprises a relationship of y'=y; wherein y' comprises said second signal; wherein y comprises said second data transmitted by the master device and intended for the destination device; wherein the master device comprises said second transmitter; said third function comprises a relationship of $\chi''=\xi\chi$; wherein $\chi''$ comprises said third signal; and wherein said fourth function comprises a relationship of y''=$\lambda$y; wherein y'' comprises said fourth signal; wherein $\lambda=-(a_{HV}/b_{HV})$ and $\xi=-(a_{VH}/b_{VH})$; wherein $a_{HV}$, and $b_{HV}$ respectively comprise a cross-polarization interference coefficient associated with said second polarization of said first transmitter and a cross-polarization interference coefficient associated with said second polarization of said second transmitter; and wherein $b_{VH}$, and $a_{VH}$ respectively comprise a cross-polarization interference coefficient associated with said first polarization of said second transmitter and a cross-polarization interference coefficient associated with said first polarization of said first transmitter.

In some embodiments, $\chi'$ comprises a division by $\Phi$ prior to being transmitted by said first transmitter; and wherein y' comprises a division by $\Psi$ prior to being transmitted by said first transmitter; wherein $\chi''$ comprises a division by $\Phi$ prior to being transmitted by said second transmitter; and wherein y'' comprises a division by $\Psi$ prior to being transmitted by said second transmitter; wherein $\Phi$ comprises a first function of channel coefficients; and wherein $\Psi$ comprises a second function of channel coefficients.

In other embodiments, said first function of channel coefficients comprises a relationship $[a_{VV}-(a_{VH}/b_{VH})\cdot b_{VV}]$; and wherein said second function of channel coefficients comprises a relationship $[a_{HH}-(a_{HV}/b_{HV})\cdot b_{HH}]$; wherein $a_{VV}$, $a_{HH}$, $b_{VV}$ and $b_{HH}$ respectively comprise a co-polarization coefficient associated with said first polarization of said first transmitter, a co-polarization coefficient associated with said second polarization of said first transmitter, a co-polarization coefficient associated with said first polarization of said second transmitter and a co-polarization coefficient associated with said second polarization of said second transmitter; and wherein $a_{VH}$, $a_{HV}$, $b_{VH}$ and $b_{HV}$ respectively comprise a cross-polarization interference coefficient associated with said first polarization of said first transmitter, a cross-polarization interference coefficient associated with said second polarization of said first transmitter, a cross-polarization interference coefficient associated with said first polarization of said second transmitter and a cross-polarization interference coefficient associated with said second polarization of said second transmitter.

In further embodiments, said at least one slave device is proximate to the master device and physically distinct from the master device and wherein said at least one slave device, the master device and the destination device communicate with one another wirelessly.

According to additional embodiments, the master device and the at least one slave device communicate therebetween wirelessly by using single polarization transmissions and wherein the at least one slave device and the destination device communicate therebetween wirelessly by using dual polarization transmissions that are substantially concurrent in time and co-frequency therebetween.

Yet in some embodiments, the master device further communicates directly with the destination device wirelessly using dual polarization transmissions that are substantially concurrent in time and co-frequency therebetween.

In yet other embodiments, said at least one slave device is proximate to the master device and physically connected from the master device and wherein said at least one slave device, the master device and the destination device communicate with one another.

Still, in further embodiments, the master device and the at least one slave device communicate therebetween and wherein the at least one slave device and the destination device communicate therebetween wirelessly by using dual polarization transmissions that are concurrent in time and co-frequency therebetween.

Still, in accordance with additional embodiments, the master device further communicates directly with the destination device wirelessly using dual polarization transmissions that are concurrent in time and co-frequency therebetween.

According to yet other embodiments, said at least one slave device comprises functionality of a smartphone.

In some embodiments, said receiving by at least one slave device first and second data transmitted by a master device and intended for a destination device comprises: regenerating by said at least one slave device said first and second data transmitted by the master device and intended for the destination device.

In other embodiments, said composite transmitter comprises a transmitter of a first smartphone and a transmitter of a second smartphone that is physically distinct and at a distance from the first smartphone; wherein said first transmitter comprises the transmitter of the first smartphone; and wherein said second transmitter comprises the transmitter of the second smartphone.

In further embodiments, said at least one slave device comprises the first smartphone and wherein said master device comprises the second smartphone.

In additional embodiments, said at least one slave device comprises the first smartphone and further comprises the second smartphone.

In yet other embodiments, said receiving by at least one slave device comprises a time interval $t_1 \leq t \leq t_2$ and wherein said conveying the first and second data comprises a time interval $t_3 \leq t \leq t_4$ wherein $t_3 > t_1$.

Further to the above, in accordance with additional embodiments a method is provided comprising: wirelessly communicating by a master device with at least one slave device that is proximate to the master device; wirelessly soliciting by the master device from the at least one slave device a processing capability; wirelessly receiving an acknowledgement by the master device from the at least one slave device that the at least one slave device can provide said processing capability; and receiving said processing capability by the master device from the at least one slave device.

In some embodiments, said wirelessly soliciting by the master device from the at least one slave device a processing capability comprises: soliciting by the master device that the at least one slave device wirelessly receive data from the master device, that the at least one slave device regenerate the data, reformat the data and retransmit the data over first and second polarizations thereof.

In other embodiments, said wirelessly soliciting by the master device from the at least one slave device a processing capability comprises: soliciting by the master device from the at least one slave device a reception of power at the master device from the at least one slave device and/or an audio/video be provided.

In yet additional embodiments, a method is provided comprising: receiving by a receiver of a cellular system a first signal X and a second signal Y, over a channel comprising time-varying, dispersive, multipath-fading characteristics; wherein the receiving includes receiving by the receiver of the cellular system the first signal X and the second signal Y concurrently in time therebetween and co-frequency with one another, over respective first and second polarizations of the receiver; and processing the first signal X and the second signal Y using a plurality of coefficients, $\alpha_{VV}$, $\alpha_{VH}$, $\beta_{HH}$ and $\beta_{HV}$ associated with the channel, so as to reduce a dependence of X on Y and/or a dependence of Y on X; $\alpha_{VV}$ denotes a co-polarization coefficient gain associated with a vertical-to-vertical channel path; coefficient $\beta_{HH}$ denotes a co-polarization gain associated with a horizontal-to-horizontal channel path; and wherein $\alpha_{VH}$ and $\beta_{HV}$ respectively denote cross-polarization interference coefficients associated with a vertical-to-horizontal and horizontal-to-vertical channel path.

In some embodiments, said processing comprises: multiplying the first signal X by $(1/\alpha_{VV})$ in order to derive first data $\chi$; multiplying said first data $\chi$ with $\alpha_{VH}$ and forming $\alpha_{VH}\chi$; subtracting $\alpha_{VH}\chi$ from said second signal Y; and multiplying an output of said subtracting operation by $\alpha_{VV}/(\alpha_{VV}\beta_{HH}-\alpha_{VH}\beta_{HV})$ to derive second data y; wherein said first data $\chi$ comprises a statistical independence to said second data y.

In some embodiments, said first data $\chi$ comprises multiplying a regenerated version of said first data $\chi$.

In other embodiments, said processing comprises: using $\chi=X$ as first data, responsive to a pre-processing that has been performed by a transmitter; forming $(\alpha_{VH}/\alpha_{VV})\chi$; subtracting $(\alpha_{VH}/\alpha_{VV})\chi$ from said second signal Y; and dividing an output of said subtracting operation by $(\beta_{HH}-\xi\alpha_{VH})$ to derive second data y; wherein $\xi$ may be set to: $\xi=-\beta_{HV}/\alpha_{VV}$; and wherein said first data $\chi$ comprises a statistical independence to said second data y.

In further embodiments, said forming $(\alpha_{VH}/\alpha_{VV})\chi$ comprises using a regenerated version of said first data $\chi$.

In accordance with additional embodiments, said processing comprises: multiplying the first signal X by $(1/\beta_{HV})$ in order to derive second data y; multiplying said second data y with $\beta_{HH}$ and forming $\beta_{HH}y$; subtracting $\beta_{HH}y$ from said second signal Y; and multiplying an output of said subtracting operation by $\beta_{HV}/(\alpha_{VH}\beta_{HV}-\alpha_{VV}\beta_{HH})$ to derive first data $\chi$; wherein said first data $\chi$ comprises a statistical independence to said second data y.

In yet other embodiments, said multiplying said second data y comprises multiplying a regenerated version of said second data y.

According to yet further embodiments a method is provided comprising: receiving by a receiver of a cellular system a first signal X and a second signal Y, over a channel comprising time-varying, dispersive, multipath-fading characteristics; wherein the receiving includes receiving by the receiver of the cellular system the first signal X and the second signal Y concurrently in time therebetween and co-frequency with one another, over respective first and second polarizations of the receiver; and processing the first signal X and the second signal Y using a plurality of coefficients, $a_{VV}$, $a_{HH}$, $a_{VH}$, $b_{HH}$, $b_{VV}$, $b_{VH}$ and $b_{HV}$ associated with a first and second channel, so as to modify an amplitude and/or magnitude of X and/or Y; wherein $a_{VV}$ and $a_{HH}$ respectively denote co-polarization coefficient gains associated with a vertical-to-vertical and horizontal-to-horizontal channel path of the first channel; wherein coefficients $a_{VH}$, and $a_{HV}$ respectively denote first and second cross-polarization interference gains associated with a vertical-to-horizontal and horizontal-to-vertical channel path of the first channel; wherein $b_{VV}$, and $b_{HH}$ respectively denote first and second co-polarization coefficient gains associated with a vertical-to-vertical and horizontal-to-horizontal channel path of the second channel; and wherein coefficients $b_{VH}$, and $b_{HV}$ respectively denote cross-polarization interference gains associated with a vertical-to-horizontal and horizontal-to-vertical channel path of the second channel.

In some embodiments, said processing comprises: multiplying the first signal X by an inverse of $[a_{VV}-(a_{VH}/b_{VH})\cdot b_{VV}]$ in order to derive first data $\chi$; multiplying the second signal Y by an inverse of $[a_{HH}-(a_{HV}/b_{HV})\cdot b_{HH}]$ in order to derive second data y; and wherein said first data $\chi$ comprises a statistical independence to said second data y.

According to yet additional embodiments a system is provided comprising a transmitter and a processor that controls the system to perform operations comprising: forming by the transmitter a first signal comprising a first function of first and/or second data that the transmitter is to convey to a receiver; forming by the transmitter a second signal comprising a second function of said first and/or second data that the transmitter is to convey to the receiver; and transmitting by the transmitter said first and second signals over respective first and second polarizations; wherein said transmitting by the transmitter said first and second signals over respective first and second polarizations, occurs substantially concurrently in time therebetween over said respective first and second polarizations and further occurs substantially co-frequency over said respective first and second polarizations; and wherein said first data comprises a statistical independence relative to said second data.

In some embodiments, said first and/or second function comprises a coefficient of a channel that relates to said first polarization, a coefficient of a channel that relates to said second polarization, a coefficient of a channel that relates to an interference/leakage from the first polarization to the second polarization and/or a coefficient of a channel that relates to an interference/leakage from the second polarization to the first polarization.

In other embodiments, said first and second polarizations comprise respective first and second linearly polarized antennas that comprise a spatial quadrature with one another. For example, the transmitter Tx may comprise first and second linearly polarized antennas that create/generate/perform the first and second polarizations, respectively.

In further embodiments, said forming by a transmitter a first signal, forming by the transmitter a second signal and said transmitting are performed by a mobile device that comprises a smartphone.

In additional embodiments, said transmitting comprises: transmitting by the mobile device over a time-varying, frequency-selective fading channel.

In yet other embodiments, said first function comprises of $\chi'=(\chi+\xi y)$, and said second function comprises of $y'=y$; wherein $\chi'$ comprises said first signal that is transmitted by the transmitter over said first polarization; y' comprises said second signal that is transmitted by the transmitter over said second polarization; $\chi$ comprises said first data; and y comprises said second data; wherein $\xi=-\beta_{HV}/\alpha_{VV}$ or $\xi=-\beta_{HH}/\alpha_{VH}$; wherein coefficients $\alpha_{VV}$, and $\beta_{HV}$ respectively comprise a co-polarization coefficient that is associated with said first polarization and a cross-polarization interference coefficient that is associated with said second polarization; and wherein $\beta_{HH}$, and $\alpha_{VH}$ respectively comprise a co-polarization coefficient associated with said second polarization and a cross-polarization interference coefficient associated with said first polarization.

Yet in accordance with further embodiments, said first function comprises a relationship of $\chi'=[(\chi/\alpha_{VV})+\xi y]$, and said second function comprises a relationship of $y'=y$; wherein $\chi'$ comprises said first signal that is transmitted by the transmitter over said first polarization; y' comprises said second signal that is transmitted by the transmitter over said second polarization; $\chi$ comprises said first data; and y comprises said second data; wherein $\xi=-\beta_{HV}/\alpha_{VV}$ or $\xi=-\beta_{H}/\alpha_{VH}$; wherein coefficients $\alpha_{VV}$, and $\beta_{HV}$ respectively comprise a co-polarization coefficient that is associated with said first polarization and a cross-polarization interference coefficient that is associated with said second polarization; and wherein $\beta_{HH}$, and $\alpha_{VH}$ respectively comprise a co-polarization coefficient associated with said second polarization and a cross-polarization interference coefficient associated with said first polarization.

Still, according to additional embodiments, said first function comprises a relationship of $\chi'=\chi$, and said second function comprises a relationship of $y'=y+\xi\chi$; wherein $\chi'$ comprises said first signal that is transmitted by the transmitter over said first polarization; y' comprises said second signal that is transmitted by the transmitter over said second polarization; $\chi$ comprises said first data; and y comprises said second data; wherein the parameter $\xi$ may be set according to: $\xi=-\alpha_{VV}/\beta_{HV}$ or $\xi=-\alpha_{VH}/\beta_{HH}$; wherein $\alpha_{VV}$, and $\beta_{HV}$ respectively comprise a co-polarization coefficient associated with said first polarization and a cross-polarization interference coefficient associated with said second polarization; and wherein $\beta_{HH}$, and $\alpha_{VH}$ respectively comprise a co-polarization coefficient associated with said second polarization and a cross-polarization interference coefficient associated with said first polarization.

In some embodiments, said first function comprises a relationship of $\chi'=\chi$; and said second function comprises a relationship of $y'=[(y/\beta_{HH})+\xi\chi]$; wherein $\chi'$ comprises said first signal that is transmitted by the transmitter over said first polarization; y' comprises said second signal that is transmitted by the transmitter over said second polarization; $\chi$ comprises said first data; and y comprises said second data; wherein a value of the parameter may be set in accordance with: $\xi=-\alpha_{VV}/\beta_{HV}$ or $\xi=-\alpha_{VH}/\beta_{HH}$; wherein $\alpha_{VV}$, and $\beta_{HV}$ respectively comprise a co-polarization coefficient associated with said first polarization and a cross-polarization interference coefficient associated with said second polarization; and wherein $\beta_{HH}$, and $\alpha_{VH}$ respectively comprise a co-polarization coefficient associated with said second polarization and a cross-polarization interference coefficient associated with said first polarization.

In accordance with yet additional embodiments, said first function comprises a relationship of $\chi'=(\chi+\xi y)$, and wherein said second function comprises a relationship of $y'=y+\lambda\chi$; wherein $\chi'$ comprises said first signal that is transmitted by the transmitter over said first polarization; $y'$ comprises said second signal that is transmitted by the transmitter over said second polarization; $\chi$ comprises said first data; and y comprises said second data; wherein $\xi=-\beta_{HV}/\alpha_{VV}$ and $\lambda=-\alpha_{VH}/\beta_{HH}$; wherein coefficients $\alpha_{VV}$, and $\beta_{HV}$ respectively comprise a co-polarization coefficient associated with said first polarization and a cross-polarization interference coefficient associated with said second polarization; and wherein $\beta_{HH}$, and $\alpha_{VH}$ respectively comprise a co-polarization coefficient associated with said second polarization and a cross-polarization interference coefficient associated with said first polarization.

In accordance with some further embodiments, said first function comprises a relationship of $\chi'=\chi[\beta_{HH}/(\alpha_{VV}\beta_{HH}-\beta_{HV}\alpha_{VH})]$, and wherein said second function comprises a relationship of $y'=y[\alpha_{VV}/(\beta_{HH}\alpha_{VV}-\beta_{HV}\alpha_{VH})]$; wherein $\chi'$ comprises said first signal that is transmitted by the transmitter over said first polarization; $y'$ comprises said second signal that is transmitted by the transmitter over said second polarization; $\chi$ comprises said first data; and y comprises said second data; wherein $\alpha_{VV}$, and $\beta_{HV}$ respectively comprise a co-polarization coefficient associated with said first polarization and a cross-polarization interference coefficient associated with said second polarization; and wherein $\beta_{HH}$, and $\alpha_{VH}$ respectively comprise a co-polarization coefficient associated with said second polarization and a cross-polarization interference coefficient associated with said first polarization.

In other embodiments, said first function comprises $\chi'=(\chi+\xi y)$, and said second function comprises $y'=y+\lambda\chi$; wherein $\chi'$ comprises said first signal that is transmitted by the transmitter over said first polarization; $y'$ comprises said second signal that is transmitted by the transmitter over said second polarization; $\chi$ comprises said first data; and y comprises said second data; wherein parameter values of $\xi$ and $\lambda$ may be set in accordance with: $\xi=-\beta_{HH}/\alpha_{VH}$ and $\lambda=-\alpha_{VV}/\beta_{HV}$; wherein coefficients $\alpha_{VV}$, and $\beta_{HV}$ respectively comprise a co-polarization coefficient that is associated with said first polarization and a cross-polarization interference coefficient associated with said second polarization; and wherein $\beta_{HH}$, and $\alpha_{VH}$ respectively comprise a co-polarization coefficient associated with said second polarization and a cross-polarization interference coefficient associated with said first polarization.

In accordance with yet additional embodiments, said first function comprises a relationship of $\chi'=\chi[\beta_{HV}/(\alpha_{VH}-\beta_{HV}\alpha_{VH})]$, and wherein said second function comprises a relationship of $y'=y[\alpha_{VH}/(\alpha_{VH}\beta_{HV}-\beta_{HH}\alpha_{VV})]$; wherein $\chi'$ comprises said first signal that is transmitted by the transmitter over said first polarization; $y'$ comprises said second signal that is transmitted by the transmitter over said second polarization; $\chi$ comprises said first data; and y comprises said second data; wherein $\alpha_{VV}$, and $\beta_{HV}$ respectively comprise a co-polarization coefficient associated with said first polarization and a cross-polarization interference coefficient associated with said second polarization; and wherein $\beta_{HH}$, and $\alpha_{VH}$ respectively comprise a co-polarization coefficient associated with said second polarization and a cross-polarization interference coefficient associated with said first polarization.

Yet, further embodiments of inventive concepts may be provided. In accordance with some, a system is provided comprising a master device, at least one slave device, a composite transmitter and a processor that controls the system to perform operations comprising: receiving by the at least one slave device first and second data from the master device; wherein the master device desires/intends to convey to a destination device the first and second data; transmitting the first and second data to the destination device using the composite transmitter comprising a first transmitter and a second transmitter. The transmitting the first and second data includes generating by the first transmitter a first signal comprising a first function of said first and/or second data that is to be conveyed to the destination device and generating by the first transmitter a second signal comprising a second function of said first and/or second data; and transmitting by the first transmitter said first and second signals over respective first and second polarizations of the first transmitter. Moreover, the operations include generating by the second transmitter a third signal comprising a third function of said first and/or second data and generating by the second transmitter a fourth signal comprising a fourth function of said first and/or second data; and transmitting by the second transmitter said third and fourth signals over respective first and second polarizations of the second transmitter; wherein said first, second, third and fourth signals are transmitted substantially concurrently in time with one another and substantially co-frequency with one another; and wherein said first data comprises a statistical independence relative to said second data.

In still additional embodiments, said at least one slave device comprises said first transmitter; wherein said first function comprises a relationship of $\chi'=\chi$; wherein $\chi'$ comprises said first signal, $\chi$ comprises said first data that is to be conveyed to the destination device; and wherein said second function comprises a relationship of $y'=y$; wherein $y'$ comprises said second signal, and y comprises said second data that is to be conveyed to the destination device.

In yet other embodiments, $\chi'$ comprises a division by $\Phi$ prior to being transmitted by said first transmitter; and wherein $y'$ comprises a division by $\Psi$ prior to being transmitted by said first transmitter; wherein $\Phi$ comprises a first function of channel coefficients; and wherein $\Psi$ comprises a second function of channel coefficients.

In some embodiments, said first function of channel coefficients comprises a relationship $[a_{VV}-(a_{VH}/b_{VH})\cdot_{VV}]$; and said second function of channel coefficients comprises a relationship $[a_{HH}-(a_{HV}/b_{HV})\cdot b_{HH}]$; wherein $a_{VV}$, $a_{HH}$, $b_{VV}$ and $b_{HH}$ respectively comprise a co-polarization coefficient associated with said first polarization of said first transmitter, a co-polarization coefficient associated with said second polarization of said first transmitter, a co-polarization coefficient associated with said first polarization of said second transmitter and a co-polarization coefficient associated with said second polarization of said second transmitter; and wherein $a_{VH}$, $a_{HV}$, $b_{VH}$ and $b_{HV}$ respectively comprise a cross-polarization interference coefficient associated with said first polarization of said first transmitter, a cross-polarization interference coefficient associated with said second polarization of said first transmitter, a cross-polarization interference coefficient associated with said first polarization of said second transmitter and a cross-polarization interference coefficient associated with said second polarization of said second transmitter.

In other embodiments, said at least one slave device comprises a first slave device and a second slave device; wherein the first slave device comprises said first transmitter and wherein the second slave device comprises said second transmitter; wherein said first function comprises a relationship of $\chi'=\chi$; wherein $\chi'$ comprises said first signal, $\chi$ comprises said first data that is to be conveyed to the destination device; wherein said second function comprises a relationship of y'=y; wherein y' comprises said second signal, and y comprises said second data that is to be conveyed to the destination device; wherein said third function comprises a relationship of $\chi''=\xi\chi$; wherein $\chi''$ comprises said third signal; wherein said fourth function comprises a relationship of y"=λy and wherein y" comprises said fourth signal; wherein $\lambda=-(a_{HV}/b_{HV})$ and $\xi=-(a_{VH}/b_{VH})$; wherein $a_{HV}$, and $b_{HV}$ respectively comprise a cross-polarization interference coefficient associated with said second polarization of said first transmitter and a cross-polarization interference coefficient associated with said second polarization of said second transmitter; and wherein $b_{VH}$, and $a_{VH}$ respectively comprise a cross-polarization interference coefficient associated with said first polarization of said second transmitter and a cross-polarization interference coefficient associated with said first polarization of said first transmitter.

In further embodiments, $\chi'$ comprises a division by $\Phi$ prior to being transmitted by said first transmitter; and wherein y' comprises a division by $\Psi$ prior to being transmitted by said first transmitter; wherein $\chi''$ comprises a division by $\Phi$ prior to being transmitted by said second transmitter; and wherein y" comprises a division by $\Psi$ prior to being transmitted by said second transmitter; wherein $\Phi$ comprises a first function of channel coefficients; and wherein $\Psi$ comprises a second function of channel coefficients.

In additional embodiments, said first function of channel coefficients comprises a relationship $[a_{VV}-(a_{VH}/b_{VH})\cdot b_{VV}]$; and said second function of channel coefficients comprises a relationship $[a_{HH}-(a_{HV}/b_{HV})\cdot b_{HH}]$; wherein $a_{VV}$, $a_{HH}$, $b_{VV}$ and $b_{HH}$ respectively comprise a co-polarization coefficient associated with said first polarization of said first transmitter, a co-polarization coefficient associated with said second polarization of said first transmitter, a co-polarization coefficient associated with said first polarization of said second transmitter and a co-polarization coefficient associated with said second polarization of said second transmitter; and wherein $a_{VH}$, $a_{HV}$, $b_{VH}$ and $b_{HV}$ respectively comprise a cross-polarization interference coefficient associated with said first polarization of said first transmitter, a cross-polarization interference coefficient associated with said second polarization of said first transmitter, a cross-polarization interference coefficient associated with said first polarization of said second transmitter and a cross-polarization interference coefficient associated with said second polarization of said second transmitter.

In yet other embodiments, said at least one slave device comprises said first transmitter; wherein said first function comprises a relationship of $\chi'=\chi$; wherein $\chi'$ comprises said first signal; wherein $\chi$ comprises said first data transmitted by the master device and intended for the destination device; wherein said second function comprises a relationship of y'=y; wherein y' comprises said second signal; wherein y comprises said second data transmitted by the master device and intended for the destination device; wherein the master device comprises said second transmitter; said third function comprises a relationship of $\chi''=\xi\chi$; wherein $\chi''$ comprises said third signal; and wherein said fourth function comprises a relationship of y"=λy; wherein y" comprises said fourth signal; wherein $\lambda=-(a_{HV}/b_{HV})$ and $\xi=-(a_{VH}/b_{VH})$; wherein $a_{HV}$, and $b_{HV}$ respectively comprise a cross-polarization interference coefficient associated with said second polarization of said first transmitter and a cross-polarization interference coefficient associated with said second polarization of said second transmitter; and wherein $b_{VH}$, and $a_{VH}$ respectively comprise a cross-polarization interference coefficient associated with said first polarization of said second transmitter and a cross-polarization interference coefficient associated with said first polarization of said first transmitter.

In yet further embodiments, $\chi'$ comprises a division by $\Phi$ prior to being transmitted by said first transmitter; and wherein y' comprises a division by $\Psi$ prior to being transmitted by said first transmitter; wherein $\chi$ " comprises a division by $\Phi$ prior to being transmitted by said second transmitter; and wherein y" comprises a division by $\Psi$ prior to being transmitted by said second transmitter; wherein $\Phi$ comprises a first function of channel coefficients; and wherein $\Psi$ comprises a second function of channel coefficients.

Still, in accordance with additional embodiments, said first function of channel coefficients comprises a relationship $[a_{VV}-(a_{VH}/b_{VH})\cdot b_{VV}]$; and said second function of channel coefficients comprises a relationship $[a_{HH}-(a_{HV}/b_{HV})\cdot b_{HH}]$; wherein $a_{VV}$, $a_{HH}$, $b_{VV}$ and $b_{HH}$ respectively comprise a co-polarization coefficient associated with said first polarization of said first transmitter, a co-polarization coefficient associated with said second polarization of said first transmitter, a co-polarization coefficient associated with said first polarization of said second transmitter and a co-polarization coefficient associated with said second polarization of said second transmitter; and wherein $\alpha_{VH}$, $a_{HH}$, $b_{VH}$ and $b_{HV}$ respectively comprise a cross-polarization interference coefficient associated with said first polarization of said first transmitter, a cross-polarization interference coefficient associated with said second polarization of said first transmitter, a cross-polarization interference coefficient associated with said first polarization of said second transmitter and a cross-polarization interference coefficient associated with said second polarization of said second transmitter.

In accordance with still more embodiments, said at least one slave device is proximate to the master device and physically distinct from the master device and wherein said at least one slave device, the master device and the destination device communicate with one another wirelessly.

Yet, in other embodiments, the master device and the at least one slave device communicate therebetween wirelessly by using single polarization transmissions and wherein the at least one slave device and the destination device communicate therebetween wirelessly by using dual polarization transmissions that are concurrent in time and co-frequency therebetween.

In some embodiments, the master device further communicates directly with the destination device wirelessly using dual polarization transmissions that are concurrent in time and co-frequency therebetween.

In other embodiments, said at least one slave device is proximate to the master device and physically connected from the master device and wherein said at least one slave device, the master device and the destination device communicate with one another.

In further embodiments, the master device and the at least one slave device communicate therebetween and wherein the at least one slave device and the destination device communicate therebetween wirelessly by using dual polarization transmissions that are concurrent in time and co-frequency therebetween.

In additional embodiments, the master device further communicates directly with the destination device wirelessly using dual polarization transmissions that are concurrent in time and co-frequency therebetween.

In yet further embodiments, said at least one slave device comprises functionality of a smartphone.

And, in accordance with still additional embodiments, said receiving by at least one slave device first and second data that is transmitted by a master device and is intended for a destination device comprises: regenerating by said at least one slave device said first and second data that is transmitted by the master device and is intended for the destination device.

Further to the above and in accordance with yet more embodiments, said composite transmitter comprises a transmitter of a first smartphone and a transmitter of a second smartphone that is physically distinct and at a distance from the first smartphone; wherein said first transmitter comprises the transmitter of the first smartphone; and wherein said second transmitter comprises the transmitter of the second smartphone.

In some embodiments, said at least one slave device comprises the first smartphone and wherein said master device comprises the second smartphone.

In other embodiments, said at least one slave device comprises the first smartphone and further comprises the second smartphone.

In further embodiments, said receiving by at least one slave device comprises a time interval $t_1 \leq t \leq t_2$ and wherein said conveying the first and second data comprises a time interval $t_3 \leq t \leq t_4$ wherein $t_3 > t_1$.

In addition to the many embodiments that may be provided by the plethora of inventive concepts disclosed herein, as described above, further embodiments may be provided of a system comprising a master device and a processor that is configured to control the system to perform operations comprising: wirelessly communicating by the master device with at least one slave device that is proximate to the master device; wirelessly soliciting by the master device from the at least one slave device a processing capability; wirelessly receiving an acknowledgement by the master device from the at least one slave device that the at least one slave device can provide said processing capability; and receiving said processing capability by the master device from the at least one slave device.

In some embodiments, said wirelessly soliciting by the master device from the at least one slave device a processing capability comprises: soliciting by the master device that the at least one slave device wirelessly receive data from the master device, that the at least one slave device regenerate the data, reformat the data and retransmit the data over first and second polarizations thereof.

In other embodiments, said wirelessly soliciting by the master device from the at least one slave device a processing capability comprises: soliciting by the master device from the at least one slave device a reception of power at the master device from the at least one slave device and/or an audio/video be provided.

Further to the many embodiments that may be provided, as described above, additional embodiments may be provided of a communications system comprising a receiver of a cellular system and a processor that is configured to control the communications system to perform operations comprising: receiving by the receiver of the cellular system a first signal X and a second signal Y, over a channel comprising time-varying, frequency-selective, dispersive, multipath-fading characteristics; wherein the receiving includes receiving by the receiver of the cellular system the first signal X and the second signal Y concurrently in time and co-frequency with one another, over respective first and second polarizations of the receiver; and processing the first signal X and the second signal Y using a plurality of coefficients, $\alpha_{VV}$, $\alpha_{VH}$, $\beta_{HH}$ and $\beta_{HV}$ associated with the channel, so as to reduce a dependence of X on Y and/or a dependence of Y on X; wherein coefficients $\alpha_{VV}$ and $\beta_{HH}$ respectively denote co-polarization coefficient gains associated with a vertical-to-vertical and a horizontal-to-horizontal channel path; and wherein coefficients $\alpha_{VH}$ and $\beta_{HV}$ respectively denote cross-polarization interference coefficients associated with a vertical-to-horizontal and horizontal-to-vertical channel path.

In some embodiments, said processing comprises: multiplying the first signal X by $(1/\alpha_{VV})$ in order to derive first data $\chi$; multiplying said first data $\chi$ with $\alpha_{VH}$ and forming $\alpha_{VH}\chi$; subtracting $\alpha_{VH}\chi$ from said second signal Y; and multiplying an output of said subtracting operation by $\alpha_{VV}/(\alpha_{VV}\beta_{HH}-\alpha_{VH}\beta_{HV})$ to derive second data y; wherein said first data $\chi$ comprises a statistical independence to said second data y.

In other embodiments, said multiplying said first data $\chi$ comprises multiplying a regenerated version of said first data $\chi$.

In further embodiments, said processing comprises: using $\chi=X$ as first data, responsive to a pre-processing that has been performed by a transmitter; forming $(\alpha_{VH}/\alpha_{VV})\chi$; subtracting $(\alpha_{VH}/\alpha_{VV})\chi$ from said second signal Y; and dividing an output of said subtracting operation by $(\beta_{HH}-\xi\alpha_{VH})$ to derive second data y; wherein a value of the parameter $\xi$ may be set as: $\xi=-\beta_{HV}/\alpha_{VV}$; and wherein said first data $\chi$ comprises a statistical independence to said second data y.

In additional embodiments, said forming $(\alpha_{VH}/\alpha_{VV})\chi$ comprises using a regenerated version of said first data $\chi$.

In yet other embodiments, said processing comprises: multiplying the first signal X by $(1/\beta_{HV})$ in order to derive second data y; multiplying said second data y with $\beta_{HH}$ and forming $\beta_{HH}y$; subtracting $\beta_{HH}y$ from said second signal Y; and multiplying an output of said subtracting operation by $\beta_{HV}/(\alpha_{VH}-\alpha_{VV}\beta_{HH})$ to derive first data $\chi$; wherein said first data $\chi$ comprises a statistical independence to said second data y.

Still, in accordance with further embodiments, said multiplying said second data y comprises multiplying a regenerated version of said second data y.

Many other embodiments are also possible. In accordance with some embodiments, a communications system may be provided comprising a receiver of a cellular system and a processor that controls the communications system to perform operations comprising: receiving by the receiver of the cellular system a first signal X and a second signal Y, over a channel comprising time-varying, dispersive, multipath-fading characteristics; wherein the receiving includes receiving by the receiver of the cellular system the first signal X and the second signal Y concurrently in time and co-frequency with one another, over respective first and second polarizations of the receiver; and processing the first signal X and the second signal Y using a plurality of coefficients, $a_{VV}$, $a_{HH}$, $a_{VH}$, $a_{HV}$, $b_{HH}$, $b_{VV}$, $b_{VH}$ and $b_{HV}$ associated with a first and second channel, so as to modify an amplitude and/or magnitude of X and/or Y; wherein $a_{VV}$, and $a_{HH}$ respectively denote co-polarization gains associated with a vertical-to-vertical and horizontal-to-horizontal channel path of the first channel; wherein coefficients $a_{VH}$, and $a_{HV}$ respectively denote cross-polarization gains associated with a vertical-to-horizontal and horizontal-to-vertical channel path of the first channel; said cross-polarization gains, in some embodiments, reflecting interference; wherein coefficients $b_{VV}$, and $b_{HH}$ respectively denote co-polarization gains associated with a vertical-to-vertical and horizontalto-horizontal channel path of the second channel; and wherein coefficients $b_{VH}$, and $b_{HV}$ respectively denote cross-polarization interference gains associated with a vertical-to-horizontal and horizontal-to-vertical channel path of the second channel.

In some embodiments, said processing comprises: multiplying the first signal X by an inverse of $[a_{VV}-(a_{VH}/b_{VH})\cdot b_{VV}]$ in order to derive first data $\chi$; and multiplying the second signal Y by an inverse of $[a_{HH}-(a_{HV}/b_{HV})\cdot b_{HH}]$ in order to derive second data y; wherein said first data $\chi$ comprises a statistical independence to said second data y.

In further embodiments, said respective first and second polarizations of the receiver comprise respective first and second antennas comprising a rotation therebetween.

A communications system/method, according to some embodiments, may include concurrently transmitting, from a first electronic device to a second electronic device, first and second signals via different first and second polarizations, respectively, of a cellular communications channel and/or via different first and second carriers, respectively; wherein said concurrently transmitting comprises concurrently transmitting in time and wherein, in some embodiments, the first and second signals may be transmitted co-frequency therebetween; wherein transmitting the first and second signals co-frequency therebetween comprises transmitting the first signal using a frequency and transmitting the second signal using the frequency.

In accordance with additional embodiments relating to Multi-Device Carrier Aggregation ("MDCA"), a system/method of operating a first device may be provided in order to convey first information to a destination device, by using a functional capability of a second device, and to further convey by the first device second information to the destination device, the system/method comprising: transmitting, by the first device to the second device, a first signal comprising the first information; causing the second device to receive and process the first signal, to responsively form a second signal comprising the first information and to transmit the second signal to the destination device; and transmitting, by the first device to the destination device, a third signal comprising the second information.

In some embodiments, the first device comprises a first wireless device and/or the second device comprises a second wireless device.

In some embodiments, the destination device comprises a base station.

In further embodiments, at least one of the first wireless device and the second wireless device comprises a smartphone.

In yet additional embodiments, at least one of said transmitting, by the first device to the second device, a first signal comprising the first information; and said transmitting, by the first device to the destination device, a third signal comprising the second information comprises: transmitting using an Orthogonal Frequency Division Multiplexed (OFDM) protocol, an Orthogonal Frequency Division Multiple Access (OFDMA) protocol and/or a Single Carrier Frequency Division Multiple Access (SC-FDMA) protocol.

According to yet other embodiments, said causing the second device to receive and process the first signal, to responsively form a second signal comprising the first information and to transmit the second signal to the destination device comprises: causing the second device to transmit the second signal using an Orthogonal Frequency Division Multiplexed (OFDM) protocol, an Orthogonal Frequency Division Multiple Access (OFDMA) protocol and/or a Single Carrier Frequency Division Multiple Access (SC-FDMA) protocol.

According to some embodiments, said causing the second device to receive and process the first signal, to responsively form a second signal comprising the first information and to transmit the second signal to the destination device comprises: causing the second device to perform a Fourier Transform on the first signal.

According to other embodiments, said causing the second device to perform a Fourier Transform on the first signal comprises: causing the second wireless device to generate a plurality of samples of the first signal and to process the plurality of samples of the first signal by performing a Discrete Fourier Transform (DFT), an Inverse Discrete Fourier Transform (IDFT), a Fast Fourier Transform (FFT) and/or an Inverse Fast Fourier Transform (IFFT).

According to additional embodiments, said transmitting, by the first device to the second device, a first signal comprising the first information comprises using a first protocol; and wherein said transmitting, by the first device to the destination device, a third signal comprising the second information comprises a second protocol that differs from the first protocol.

In yet further embodiments, said transmitting, by the first device to the second device, a first signal comprising the first information is based upon a protocol; and wherein said transmitting, by the first device to the destination device, a third signal comprising the second information is also based on the protocol.

In accordance with some embodiments, the system/method further comprises: prior to said transmitting, by the first device to the second device, a first signal comprising the first information, requesting by the first device from the second device a processing capability acknowledgement and receiving at the first device from the second device the processing capability acknowledgement.

According to some embodiments, a method is provided comprising: transmitting, by a wireless device to a second wireless device, a first signal comprising first information; causing the second wireless device to receive and process the first signal, to responsively form a second signal comprising the first information and to transmit the second signal to a destination device; and transmitting, by the wireless device to the destination device, a third signal comprising second information; wherein said causing the second wireless device to receive and process the first signal, to responsively form a second signal comprising the first information and to transmit the second signal to a destination device comprises: causing the second wireless device to transmit to the destination device the second signal substantially concurrently in time with said transmitting, by the wireless device to the destination device, a third signal.

The method further comprising according to some embodiments: prior to said transmitting, by the wireless device to a second wireless device, a first signal comprising first information, requesting by the wireless device from the second wireless device an acknowledgement regarding a processing capability thereof; and receiving at the wireless device from the second wireless device the acknowledgement.

The method further comprising according to some embodiments: causing the destination device to aggregate the first information with the second information wherein said "aggregate the first information with the second information" comprises aggregation of information and/or aggregation of carriers in accordance with 4G LTE carrier aggregation principles known to those skilled in the art. Further to the above, "aggregate the first information with the second information" means assembling (e.g., putting together) the first information with the second information, as appropriate and necessary, for usage and for conveyance/extraction of intelligence therefrom.

According to some embodiments, according to the method, the destination device comprises a base station. According to further embodiments, the wireless device and/or the second wireless device comprises a smartphone.

Further, according to the method, in some embodiments, said transmitting, by a wireless device to a second wireless device, a first signal comprising first information; and/or said transmitting, by the wireless device to the destination device, a third signal comprising second information comprises: transmitting at least one carrier that is based upon Orthogonal Frequency Division Multiplexing (OFDM), Orthogonal Frequency Division Multiple Access (OFDMA) and/or a Single Carrier Frequency Division Multiple Access (SC-FDMA) technology.

According to other embodiments, said causing the second wireless device to receive and process the first signal, to responsively form a second signal comprising the first information and to transmit the second signal to a destination device comprises: causing the second wireless device to transmit the second signal using at least one carrier that is based upon Orthogonal Frequency Division Multiplexing (OFDM), Orthogonal Frequency Division Multiple Access (OFDMA) and/or a Single Carrier Frequency Division Multiple Access (SC-FDMA) technology.

According to yet additional embodiments, said causing the second wireless device to receive and process the first signal, to responsively form a second signal comprising the first information and to transmit the second signal to a destination device comprises: causing the second wireless device to perform a Fourier Transform on the first signal.

According to the method and in accordance with still more embodiments, said causing the second wireless device to perform a Fourier Transform on the first signal comprises: causing the second wireless device to generate a plurality of samples of the first signal and to process the plurality of samples of the first signal by performing a Discrete Fourier Transform (DFT), an Inverse Discrete Fourier Transform (IDFT), a Fast Fourier Transform (FFT) and/or an Inverse Fast Fourier Transform (IFFT).

In further embodiments, said transmitting, by a wireless device to a second wireless device, a first signal comprising first information comprises using a first protocol; and wherein said transmitting, by the wireless device to the destination device, a third signal comprising second information comprises a second protocol that differs from the first protocol.

In yet additional embodiments, said transmitting, by a wireless device to a second wireless device, a first signal comprising first information is based upon a protocol; and wherein said transmitting, by the wireless device to the destination device, a third signal comprising second information is also based on the protocol.

Some embodiments provide a wireless device comprising a processor that is configured to control the wireless device to perform operations comprising: transmitting, by the wireless device to a second wireless device, a first signal comprising first information; causing the second wireless device to receive and process the first signal, to responsively form a second signal comprising the first information and to transmit the second signal to a destination device; and transmitting, by the wireless device to the destination device, a third signal comprising second information; wherein said causing the second wireless device to receive and process the first signal, to responsively form a second signal comprising the first information and to transmit the second signal to a destination device comprises: causing the second wireless device to transmit to the destination device the second signal substantially concurrently in time with said transmitting, by the wireless device to the destination device, a third signal.

According to other embodiments, the operations further comprise: prior to said transmitting, by the wireless device to a second wireless device, a first signal comprising first information, requesting by the wireless device from the second wireless device an acknowledgement regarding a processing capability thereof; and receiving at the wireless device from the second wireless device the acknowledgement.

In accordance with further embodiments, the operations further comprise: causing the destination device to aggregate the first information with the second information; wherein said "aggregate the first information with the second information" comprises aggregation of information and/or aggregation of carriers in accordance with 4G LTE carrier aggregation principles/technologies known to those skilled in the art. Further to the above "aggregate the first information with the second information" means assembling (e.g., putting together) the first information with the second information, as appropriate and necessary, for usage and for conveyance/extraction of intelligence therefrom.

According to some embodiments, the destination device comprises a base station.

According to additional embodiments, the wireless device and/or the second wireless device comprises a smartphone.

According to yet other embodiments, at least one of said transmitting, by the wireless device to a second wireless device, a first signal comprising first information; and said transmitting, by the first wireless device to the destination device, a third signal comprising second information comprises: transmitting using an Orthogonal Frequency Division Multiplexing (OFDM) protocol, an Orthogonal Frequency Division Multiple Access (OFDMA) protocol and/or a Single Carrier Frequency Division Multiple Access (SC-FDMA) protocol.

According to further embodiments, said causing the second wireless device to receive and process the first signal, to responsively form a second signal comprising the first information and to transmit the second signal to a destination device comprises: causing the second wireless device to transmit the second signal using an Orthogonal Frequency Division Multiplexing (OFDM) protocol, an Orthogonal Frequency Division Multiple Access (OFDMA) protocol and/or a Single Carrier Frequency Division Multiple Access (SC-FDMA) protocol.

In accordance with yet other embodiments, said causing the second wireless device to receive and process the first signal, to responsively form a second signal comprising the first information and to transmit the second signal to a destination device comprises: causing the second wireless device to perform a Fourier Transform on the first signal.

In some embodiments, said causing the second wireless device to perform a Fourier Transform on the first signal comprises: causing the second wireless device to generate a plurality of samples of the first signal and to process the plurality of samples of the first signal by performing a Discrete Fourier Transform (DFT), an Inverse Discrete Fourier Transform (IDFT), a Fast Fourier Transform (FFT) and/or an Inverse Fast Fourier Transform (IFFT).

In further embodiments, said transmitting, by the wireless device to a second wireless device, a first signal comprising first information comprises using a first protocol; and wherein said transmitting, by the wireless device to the destination device, a third signal comprising second information comprises a second protocol that differs from the first protocol.

In additional embodiments, said transmitting, by the wireless device to a second wireless device, a first signal comprising first information is based upon a protocol; and wherein said transmitting, by the first wireless device to the destination device, a third signal comprising second information is also based upon the protocol.

In still additional embodiments, said causing the second wireless device to receive and process the first signal, to responsively form a second signal comprising the first information and to transmit the second signal to a destination device comprises: transmitting the second signal by the second wireless device to the destination device also based upon the protocol.

Increasing Spectral Efficiency by Co-Frequency Transmissions

Embodiments of inventive concepts relating to co-frequency transmission and/or reception in a cellular environment are provided. According to some embodiments, a communications method of conveying first and second information to a destination device is provided, the method comprising: transmitting, by a first device to a second device, a first signal comprising the first information; receiving, by the first device from the second device, a second signal comprising the second information; generating, by the first device, a first composite signal comprising a first function of the first information and the second information, wherein the first information and the second information comprise a statistical independence therebetween; and transmitting, by the first device, the first composite signal to the destination device, wherein the transmitting the first composite signal occurs concurrently in time and co-frequency with a transmission by the second device of a second composite signal comprising a second function of the first information and the second information.

According to some embodiments, said generating comprises generating, by the first device, the first composite signal to comprise a linear combination of the first information and the second information, wherein the transmitting the first composite signal comprises transmitting, by the first device, the linear combination of the first information and the second information, wherein the linear combination of the first information and the second information comprises: $\rho + uq$, wherein $\rho$ comprises the first information, wherein q comprises the second information, and wherein u comprises a function of channel-dependent coefficients.

According to the method, in some embodiments, the first device comprises a smartphone.

In further embodiments, said transmitting the first signal comprises: wirelessly transmitting the first signal from the first device to the second device.

According to additional embodiments, said transmitting the first composite signal comprises: wirelessly transmitting the first composite signal from the first device to the destination device.

According to yet other embodiments, the method further comprises: transmitting the second signal from the second device to the first device; receiving the first signal at the second device from the first device; generating, by the second device, the second composite signal comprising the second function of the first information and the second information; and transmitting the second composite signal from the second device to the destination device.

According to further embodiments, said generating the second composite signal comprises generating, by the second device, the second composite signal to comprise a linear combination of the first information and the second information, wherein said transmitting the second composite signal comprises transmitting, by the second device, the second composite signal comprising the linear combination of the first information and the second information, wherein the linear combination of the first information and the second information comprises: $q + \omega\rho$, wherein $\rho$ comprises the first information, wherein q comprises the second information, and wherein $\omega$ comprises a function of channel-dependent coefficients.

In some embodiments, the first device comprises a first smartphone; while the second device comprises a second smartphone.

In further embodiments, said transmitting the second signal comprises: wirelessly transmitting, by the second device to the first device, the second signal comprising the second information.

In additional embodiments, said transmitting the second composite signal comprises: wirelessly transmitting, by the second device, the second composite signal to the destination device.

Embodiments of inventive concepts relating to co-frequency transmission and/or reception (with or without dual polarization transmission/reception) in a cellular environment, in order to increase spectrum efficiency and/or channel throughput, also provide a communications system comprising a first device that is configured to exchange information with a second device, that may be proximate to the first device, and to convey first and second information to a destination device by performing operations comprising: transmitting, by the first device to the second device, a first signal comprising the first information; receiving, by the first device from the second device, a second signal comprising the second information; generating, by the first device, a first composite signal comprising a first function of the first information and the second information, wherein the first information and the second information comprise a statistical independence therebetween; and transmitting, by the first device, the first composite signal to the destination device, wherein the transmitting the first composite signal occurs, in accordance with some embodiments, concurrently in time and co-frequency with a transmission by the second device of a second composite signal comprising a second function of the first information and the second information.

In some embodiments, said generating the first composite signal comprises generating, by the first device, the first composite signal to comprise a linear combination of the first information and the second information, wherein said transmitting comprises transmitting, by the first device, the first composite signal comprising the linear combination of the first information and the second information, wherein the linear combination of the first information and the second information comprises: $\rho + uq$, wherein $\rho$ comprises the first information, wherein q comprises the second information, and wherein u comprises a function of channel-dependent coefficients.

In some embodiments, the first device comprises a smartphone.

In some embodiments, said transmitting the first signal comprises: wirelessly transmitting the first signal from the first device to the second device.

In other embodiments, said transmitting the first composite signal comprises: wirelessly transmitting the first composite signal from the first device to the destination device.

According to additional embodiments, the system further comprises the second device, wherein the second device is configured to perform operations comprising: transmitting the second signal from the second device to the first device; receiving the first signal at the second device from the first device; generating, by the second device, the second composite signal comprising the second function of the first information and the second information; and transmitting the second composite signal from the second device to the destination device.

In some embodiments, said generating the second composite signal comprises generating, by the second device, the second composite signal to comprise a linear combination of the first information and the second information, wherein said transmitting the second composite signal comprises transmitting, by the second device, the second composite signal comprising the linear combination of the first information and the second information, wherein the linear combination of the first information and the second information comprises: q+ωρ, wherein ρ comprises the first information, wherein q comprises the second information, and wherein ω comprises a function of channel-dependent coefficients.

According to some embodiments, the first device comprises a first smartphone and the second device comprises a second smartphone.

According to other embodiments, said transmitting the second signal comprises: wirelessly transmitting, by the second device to the first device, the second signal comprising the second information.

In some embodiments, said transmitting the second composite signal comprises: wirelessly transmitting, by the second device, the second composite signal to the destination device.

In yet other embodiments, at least one of the transmitting the first signal and the receiving the second signal is performed by the first device using unlicensed frequencies.

Constraining a Trajectory of an Object

In some embodiments, a method of limiting a height of an object is provided; the method comprising: estimating a position associated with the object; comparing a height of said position with a not-to-exceed height that is associated with said position; and limiting said height of said position to said not-to-exceed height even though a command to increase said height of said position to a value exceeding said not-to-exceed height is imposed on the object.

In further embodiments, a system comprising a processor that controls the system to perform operations analogous to the above method may also be provided; wherein the operations comprise: estimating a position associated with the object; comparing a height of said position with a not-to-exceed height that is associated with said position; and limiting said height of said position to said not-to-exceed height even though a command to increase said height of said position to a value exceeding said not-to-exceed height is imposed on the object.

In other embodiments, an additional method of limiting a height of an object is provided; the additional method comprising: estimating a position associated with the object; comparing a height of said position with a predetermined lower height that is associated with said position; and limiting said height of said position to no less than said predetermined lower height even though a command to lower said height of said position to a value that is less than said predetermined lower height is imposed on the object.

In yet additional embodiments, a system comprising a processor that controls the system to perform operations analogous to the above additional method may also be provided; wherein the operations comprise: estimating a position associated with the object; comparing a height of said position with a predetermined lower height that is associated with said position; and limiting said height of said position to no less than said predetermined lower height even though a command to lower said height of said position to a value that is less than said predetermined lower height is imposed on the object.

Transferring Power Wirelessly

In further embodiments, a method of transferring power wirelessly to a device that is to be powered is provided, the method comprising: receiving and processing a return signal that is transmitted by said device that is to be powered; transmitting a first forward signal by a first radiating device of a plurality of radiating devices; transmitting a second forward signal by a second radiating device of said plurality of radiating devices; and adjusting a phase of said second forward signal responsive to said receiving and processing; wherein said adjusting is performed such that said second forward signal and said first forward signal add substantially coherently at a location that is associated with said device that is to be powered.

In some embodiments, said receiving and processing comprises: detecting a measure of a phase difference between said first and second forward signals.

In yet other embodiments said adjusting a phase of said second forward signal comprises imposing a phase modulation on said second forward signal and wherein said detecting a measure of a phase difference comprises detecting an amplitude variation caused by said phase modulation.

According to additional embodiments, said adjusting a phase of said second forward signal comprises processing one or more pilot tones of the return signal that is transmitted by said device to be powered and detecting a channel phase.

In yet other embodiments, said receiving and processing comprises: using a plurality of antenna elements; forming a plurality of pencil beam antenna patterns; using said plurality of pencil beam antenna patterns to measure a respective plurality of signal strengths associated with a respective plurality of directions; and identifying one pencil beam antenna pattern of said plurality of pencil beam antenna patters that provides a maximum signal strength.

In accordance with some embodiments, said transmitting a first forward signal by a first radiating device comprises: responsive to said receiving and processing, using a plurality of antenna elements and forming a pencil beam by said first radiating device in a direction of maximum signal strength received by the first radiating device via said return signal from said device to be powered; and wherein said transmitting a second forward signal by a second radiating device comprises: responsive to said receiving and processing, using a plurality of antenna elements and forming a pencil beam by said second radiating device in a direction of maximum signal strength received by the second radiating device via said return signal from said device to be powered.

Some embodiments provide a method of requesting power by a device to be powered, the method comprising: sensing by the device to be powered a presence of one or more radiating devices; requesting power by the device to be powered by transmitting a signal at a frequency; receiving power from at least one radiating device at the frequency; wherein, responsive to said sensing, said requesting occurs periodically with a period of T seconds; said requesting comprises a time duration of τ seconds over said period of T seconds, τ<T; and wherein said requesting continues to occur periodically over an interval of time that is greater than said T seconds; and wherein, responsive to said requesting, said receiving occurs periodically with the period of T seconds; said receiving comprises a time duration of T−τ seconds over said period of T seconds, τ<T; and wherein said receiving continues to occur periodically over an interval of time that is greater than the T seconds.

Other embodiments provide a system of transferring power wirelessly to a device that is to be powered, the system comprising a plurality of radiating devices and a processor that controls the system to perform operations comprising: receiving and processing a return signal that is transmitted by said device that is to be powered; transmitting a first forward signal by a first radiating device of the plurality of radiating devices; transmitting a second forward signal by a second radiating device of said plurality of radiating devices; and adjusting a phase of said second forward signal responsive to said receiving and processing; wherein said adjusting is performed such that said second forward signal and said first forward signal add substantially coherently at a location that is associated with said device that is to be powered.

In some embodiments, said receiving and processing comprises: detecting a measure of a phase difference between said first and second forward signals.

In other embodiments, said adjusting a phase of said second forward signal comprises imposing a phase modulation on said second forward signal and wherein said detecting a measure of a phase difference comprises detecting an amplitude variation caused by said phase modulation.

In further embodiments, said adjusting a phase of said second forward signal comprises processing one or more pilot tones of the return signal that is transmitted by said device to be powered and detecting a channel phase.

In yet additional embodiments, said receiving and processing comprises: using a plurality of antenna elements; forming a plurality of pencil beam antenna patterns; using said plurality of pencil beam antenna patterns to measure a respective plurality of signal strengths associated with a respective plurality of directions; and identifying one pencil beam antenna pattern of said plurality of pencil beam antenna patters that provides a maximum signal strength.

In further embodiments, said transmitting a first forward signal by a first radiating device comprises: responsive to said receiving and processing, using a plurality of antenna elements and forming a pencil beam by said first radiating device in a direction of maximum signal strength received by the first radiating device via said return signal from said device to be powered; and wherein said transmitting a second forward signal by a second radiating device comprises: responsive to said receiving and processing, using a plurality of antenna elements and forming a pencil beam by said second radiating device in a direction of maximum signal strength received by the second radiating device via said return signal from said device to be powered.

Other embodiments provide a system comprising a device to be powered and a processor that controls the system to perform operations comprising: sensing by the device to be powered a presence of one or more radiating devices; requesting power by the device to be powered by transmitting a signal at a frequency; receiving power from at least one radiating device at the frequency; wherein, responsive to said sensing, said requesting occurs periodically with a period of T seconds; said requesting comprises a time duration of τ seconds over said period of T seconds, τ<T; and wherein said requesting continues to occur periodically over an interval of time that is greater than said T seconds; wherein, responsive to said requesting, said receiving occurs periodically with the period of T seconds; said receiving comprises a time duration of T−τ seconds over said period of T seconds, τ<T; and wherein said receiving continues to occur periodically over an interval of time that is greater than the T seconds.

Altering a Function of a Communications Device

Some embodiments provide a method of altering a function of a smartphone, the method comprising: receiving data associated with a driver of a vehicle; ascertaining using a smartphone-based sensor, data associated with a user of the smartphone; and altering a function of the smartphone responsive to detecting a match between said data associated with the driver of the vehicle and said data associated with the user of the smartphone.

In some embodiments, said receiving data comprises: receiving data from the vehicle.

In other embodiments, said ascertaining comprises: ascertaining an image of the user of the smartphone.

In further embodiments, said altering a function comprises: disabling a notification; disabling texting; and/or disabling web surfing.

According to some embodiments, a method is provided of altering a state of a smartphone, the method comprising: receiving a first predetermined signal; storing a first state of the smartphone; altering the state of the smartphone from said first state to a second state by altering a function of the smartphone that is associated with said first state responsive to said receiving the first predetermined signal; receiving a second predetermined signal; and restoring the smartphone from said second state to said first state responsive to said receiving the second predetermined signal.

According to other embodiments, a method is provided of altering a state of a smartphone, the method comprising: estimating a position, a velocity and an acceleration of the smartphone; storing a first state of the smartphone; altering the first state of the smartphone to a second state by altering a function of the smartphone that is associated with said first state responsive to said position comprising one of a plurality of predetermined values, responsive to said velocity exceeding a predetermined threshold and responsive to said acceleration being positive.

In some embodiments said method further comprising: altering the second state of the smartphone to the first state of the smartphone by altering a function of the smartphone that is associated with said second state responsive to said position comprising one of a plurality of predetermined values, responsive to said velocity being below said predetermined threshold and responsive to said acceleration being negative.

According to some embodiments, the first state of the smartphone comprises a GPS function and wherein the second state of the smartphone also comprises a GPS function.

According to other embodiments, said second state comprises the smartphone being in airplane mode.

In some embodiments, a system is provided comprising a smartphone and a processor that controls the smartphone to perform operations comprising: receiving data associated with a driver of a vehicle; ascertaining using a smartphone-based sensor, data associated with a user of the smartphone; and altering a function of the smartphone responsive to detecting a match between said data associated with the driver of the vehicle and said data associated with the user of the smartphone.

In other embodiments, said receiving data comprises: receiving data from the vehicle.

In further embodiments, said ascertaining comprises: ascertaining an image of the user of the smartphone.

In yet additional embodiments, said altering a function comprises: disabling a notification; disabling texting; and/or disabling web surfing.

According to some embodiments, a system is provided comprising a smartphone and a processor that controls the smartphone to perform operations comprising: receiving a first predetermined signal; storing a first state of the smartphone; altering a state of the smartphone from said first state to a second state by altering a function of the smartphone that is associated with said first state responsive to said receiving the first predetermined signal; receiving a second predetermined signal; and restoring the smartphone from said second state to said first state responsive to said receiving the second predetermined signal.

According to further embodiments, a system is provided comprising a smartphone and a processor that controls the smartphone to perform operations comprising: estimating a position, a velocity and an acceleration of the smartphone; storing a first state of the smartphone; altering said first state of the smartphone to a second state by altering a function of the smartphone that is associated with said first state responsive to said position comprising one of a plurality of predetermined values, responsive to said velocity exceeding a threshold and responsive to said acceleration being positive.

In accordance with some embodiments, said operations further comprise: altering the second state of the smartphone to the first state of the smartphone by altering a function of the smartphone that is associated with said second state responsive to said position comprising one of a plurality of predetermined values, responsive to said velocity being below said threshold and responsive to said acceleration being negative.

In accordance with other embodiments, the first state of the smartphone comprises a GPS function and wherein the second state of the smartphone also comprises a GPS function.

In accordance with yet additional embodiments, said second state comprises the smartphone being in airplane mode.

In accordance with yet more embodiments, said threshold comprises a predetermined threshold.

Improving Vehicular Safety

Some embodiments disclosed herein include, without limitation, a system that is configured to perform operations comprising: identifying a plurality of motor vehicles that are within a geographic area; requesting data from at least one motor vehicle of said plurality of motor vehicles; transmitting information to at least one motor vehicle of said plurality of motor vehicles; and controlling a velocity and/or an acceleration of at least one motor vehicle of said plurality of motor vehicles, based on the information that is transmitted.

In some embodiments, said identifying a plurality of motor vehicles comprises: identifying at least one motor vehicle that is within the geographic area by detecting an identifier that is associated with the motor vehicle.

In further embodiments, said detecting comprises wirelessly detecting and said identifier comprises a code that is uniquely associated with the motor vehicle.

In yet additional embodiments, said identifying a plurality of motor vehicles comprises: identifying the plurality of motor vehicles by wirelessly detecting, for each motor vehicle of the plurality of motor vehicles, a respective identifying code that is uniquely associated therewith.

In some embodiments, the geographic area is determined by a processor responsive to a weather condition, a time-of-day and/or an event; wherein, in some embodiments, the event comprises an accident.

In further embodiments, the weather condition comprises rain, ice, snow and/or fog.

In yet other embodiments, said requesting data comprises wirelessly requesting data wherein the data being requested comprises a velocity, a direction of travel, an identity, data from a vehicular sensor and/or data relating to a regulatory compliance.

According to additional embodiments, said transmitting information comprises wirelessly transmitting information; the information comprising a velocity to be achieved.

In accordance with yet more embodiments, said requesting data from at least one motor vehicle of said plurality of motor vehicles comprises requesting data from each motor vehicle of said plurality of motor vehicles.

In some embodiments, said transmitting information comprises transmitting to each motor vehicle of said plurality of motor vehicles a command to increase a velocity thereof, to decrease the velocity thereof or to maintain the velocity thereof unchanged.

In other embodiments, said transmitting information comprises transmitting to each motor vehicle of said plurality of motor vehicles a command wirelessly and directly thereto and/or wirelessly and indirectly thereto.

In further embodiments, said indirectly comprises receiving by a first motor vehicle of the plurality of motor vehicles information from a second motor vehicle of the plurality of motor vehicles.

In yet additional embodiments, said receiving by the first motor vehicle information from the second motor vehicle occurs responsive to the second motor vehicle having received information from the system and/or responsive to the first motor vehicle having ignored or not having acted upon information that has been transmitted thereto by the system or another motor vehicle.

In some embodiments, said controlling a velocity and/or an acceleration comprises controlling a first distance between a first motor vehicle of the plurality of motor vehicles and a second motor vehicle of the plurality of motor vehicles.

In yet more embodiments, said controlling a velocity and/or an acceleration further comprises controlling a second distance between a third motor vehicle of the plurality of motor vehicles and a fourth motor vehicle of the plurality of motor vehicles.

In accordance with additional embodiments, said first distance is substantially equal to said second distance; whereas in accordance with other embodiments, said first distance is greater than said second distance. In accordance with yet additional embodiments, said first distance is less than said second distance.

In some embodiments, said controlling a velocity and/or an acceleration of at least one motor vehicle of said plurality of motor vehicles comprises increasing a velocity of a first motor vehicle of the plurality of motor vehicles while decreasing a velocity of a second motor vehicle of the plurality of motor vehicles; whereas in accordance with other embodiments, said controlling a velocity and/or an acceleration of at least one of said plurality of motor vehicles comprises increasing a velocity of a first motor vehicle of the plurality of motor vehicles while also increasing a velocity of a second motor vehicle of the plurality of motor vehicles.

In accordance with additional embodiments, said transmitting information to at least one motor vehicle comprises providing an option to said at least one motor vehicle to elect to have its velocity and/or acceleration controlled by the system or not.

In some embodiments, said option that is provided to the at least one motor vehicle is responsive to data received by the system from the at least one motor vehicle indicating an acceptance by the at least one motor vehicle to consider relinquishing control of velocity and/or acceleration thereof to the system.

In yet other embodiments, said identifying a plurality of motor vehicles that are within a geographic area comprises specifying the geographic area; and causing at least one signal to be transmitted identifying a position of each motor vehicle of the plurality of motor vehicles.

In additional embodiments, said at least one signal identifying a position of each motor vehicle of the plurality of motor vehicles is received by the system from at least one motor vehicle of the plurality of motor vehicles.

In further embodiments, the system receives said at least one signal from said at least one motor vehicle of the plurality of motor vehicles responsive to the system having specified the geographic area and having caused said at least one motor vehicle to exchange data with at least one other motor vehicle of the plurality of motor vehicles.

In yet more embodiments, said at least one signal identifying a position of each motor vehicle of the plurality of motor vehicles is received by the system from at least one smartphone that is associated with at least one motor vehicle of the plurality of motor vehicles.

In some embodiments, the system receives said at least one signal from said at least one smartphone that is associated with said at least one motor vehicle of the plurality of motor vehicles responsive to the system having specified the geographic area and having caused said at least one smartphone that is associated with said at least one motor vehicle to exchange data with at least one other smartphone that is associated with at least one other motor vehicle of the plurality of motor vehicles.

In other embodiments, said at least one signal identifying a position of each motor vehicle of the plurality of motor vehicles is based upon processing of GPS signals.

In further embodiments, the operations further comprise causing a payment to be received from an account associated with a motor vehicle of the plurality of motor vehicles and/or from an account associated with an occupant of the motor vehicle responsive to the motor vehicle having been identified as being within the geographic area; wherein in some embodiments, said occupant of the motor vehicle is a driver of the motor vehicle.

Embodiments of methods analogous to the embodiments of systems may also be provided.

DETAILED DESCRIPTION

Figure 1A:
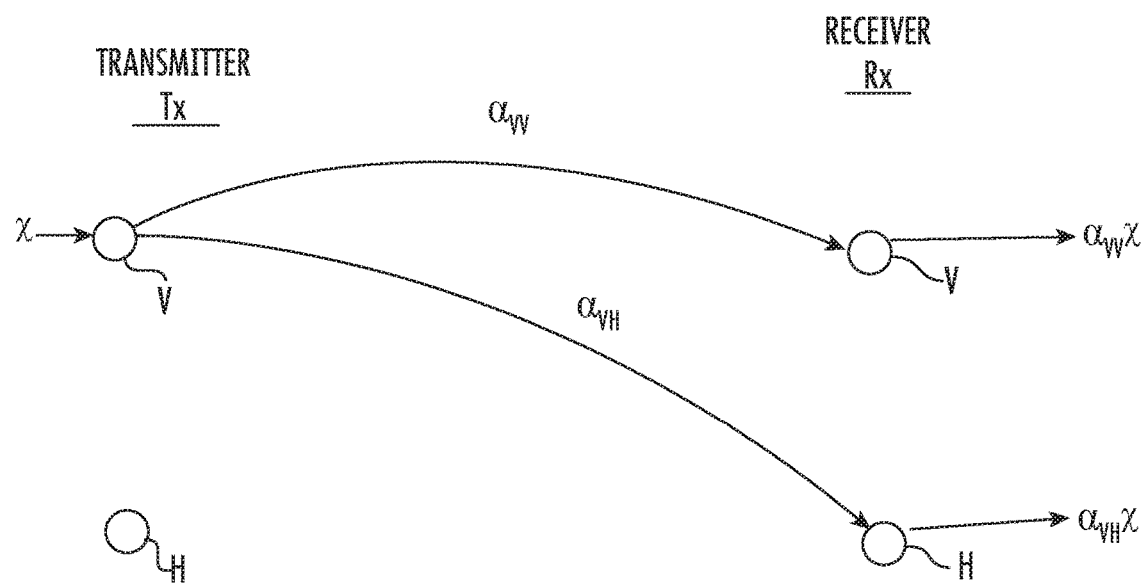
FIG. 1A is a schematic illustration of co-polarization ("co-pol") and cross-polarization ("X-Pol") channel gains from a vertical polarization node "V" of a transmitter "Tx" to vertical "V" and horizontal "H" polarization nodes of a receiver "Rx".

Increasing Wireless Capacity by Using Multiple Polarizations and/or Multi-Device Carrier Aggregation ("MDCA")

It is expected that wireless devices will continue to proliferate with increasing connectivity therebetween. Accordingly, wireless traffic is expected to increase as we have indeed entered an era of a substantially wirelessly interconnected society. In light of this, it stands to reason that any and all available dimensions of signal/physical space that support wireless communications must be utilized maximally. Those skilled in the art know that physical space provides two polarization dimensions e.g., a first (vertical) polarization dimension and a second (horizontal) polarization dimension; wherein said first and second polarization dimensions may be orthogonal therebetween and may be used by a wireless transmitter to convey respective first and second information, over said first and second polarizations, respectively, devoid of interference therebetween (in ideal propagation conditions such as, for example, in free space), thus doubling a communications capacity and/or channel throughput for a given bandwidth being utilized. It is interesting, however, that dual polarization transmission/reception in mobile/cellular communications remains to date unpracticed. Indeed, it is recognized that mobile/cellular communications channels are subject to many propagation anomalies that cause such channels to deviate substantially from that of free space causing significant cross polarization interference. Such cross polarization ("X-Pol") interference may have indeed, to date, discouraged dual-polarization ("dual-pol") transmission and/or reception.

The term "therebetween" as used herein means "with one another." For example, the sentence "it is expected that wireless devices will continue to proliferate with increasing connectivity therebetween" means "it is expected that wireless devices will continue to proliferate with increasing connectivity with one another." Similarly, "orthogonal therebetween" means orthogonal with one another and "devoid of interference therebetween" means devoid of interference with one another.

It will be understood that when an element is referred to as being "connected" or "coupled" to another element, it can be directly connected or coupled to the other element or intervening elements may be present. Furthermore, "connected" or "coupled" as used herein includes wirelessly connected or coupled.

The terminology used herein is for the purpose of describing particular embodiments only and is not intended to be limiting of the inventive concepts. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although terms such as "first" and "second" may be used herein to describe various elements and/or signals, these elements/signals should not be limited by these terms. These terms are only used to distinguish one element/signal from another element/signal. Thus, a first element/signal could be termed a second element/signal, and a second element/signal may be termed a first element/signal without departing from the teachings of the present inventive concepts, as will be appreciated by those skilled in the art.

As used herein, the term "and/or" includes any and all combinations of one or more of the associated listed items. The symbol "/" may also be used as a shorthand notation for "and/or". Further, as may be used herein the term "DFT/FFT" refers to Discrete Fourier Transform and/or Fast Fourier Transform and may include any other Fourier transform, discrete and/or otherwise. The term IDFT/IFFT as may be used herein refers to Inverse Discrete Fourier Transform and/or Inverse Fast Fourier Transform and may include any other inverse Fourier transform, discrete and/or otherwise.

As used herein, the term "transmitter", "receiver" and/or "transceiver" include(s) transmitters/receivers of cellular and/or satellite terminals with or without a multi-line display; smartphones and/or Personal Communications System (PCS) terminals that may include data processing, facsimile and/or data communications capabilities; Personal Digital Assistants (PDA) that can include a radio frequency transceiver and/or a pager, Internet/Intranet access, Web browser, organizer, calendar and/or a Global Positioning System (GPS) receiver; and/or conventional laptop and/or palmtop computers or other appliances, which include a radio frequency transmitter and/or receiver. As used herein, the term "transmitter", "receiver" and/or "transceiver" also include(s) any other radiator and/or receptor of electromagnetic energy, man-made and/or naturally occurring, that may have time-varying and/or fixed geographic coordinates and/or may be portable, transportable, installed in a vehicle (aeronautical, maritime, or land-based) and/or situated/configured to operate locally and/or in a distributed fashion on earth, in vehicles (land-mobile, maritime and/or aeronautical) and/or in space. A transmitter/receiver may also may be referred to herein as a "transceiver," "base station," "access point," "device," "mobile device," "wireless device," "radiating device," "receiving device," "terminal," "radioterminal," "smartphone" and/or simply as a "phone".

It will be understood that the term "substantially overlaps" as used herein means that a first set/interval (that is being compared with/to a second set/interval), overlaps with the second set/interval, but there may be a portion thereof such as, for example, at a beginning, an end and/or elsewhere thereat that may not overlap with the second set/interval. For example, if a first event occurs over a first interval of time, for example, from 6 AM to 10 AM, and a second event occurs over a second interval of time, for example, from 7 AM to 11 AM, then it may be said that the second event substantially overlaps in time with the first event and/or that the first event substantially overlaps in time with the second event. It may also be said that the first and second events are "substantially congruent/concurrent in time". Further, the term "substantially differ" as used herein means that two or more sets (such as, for example, two or more sets of frequencies) that are being referenced or compared therebetween comprise mutually exclusive elements therebetween (such as, for example, comprising mutually exclusive frequencies therebetween) but may also comprise some elements (e.g., some frequencies) that are common therebetween. For example, a first set of frequencies comprising frequencies from, for example, 1 GHz to 3.1 GHz and a second set of frequencies comprising frequencies, for example, from 3 GHz to 5 GHz substantially differ therebetween. In general, the term "substantially" as used herein means "to a great extent, if not entirely or totally".

Inventive concepts will now be described relating to various embodiments of a receiver/transmitter that may enable a wireless communications system and/or method to use dual polarization transmission and/or reception in order to increase a communications capacity, reliability and/or throughput thereof. Accordingly, first information may be transmitted using a first polarization and a given set of frequencies and second information, that may be independent from the first information, may be transmitted, concurrently in time with the first information, using a second polarization and the given set of frequencies. The second polarization may be different from the first polarization, and the second information may be transmitted concurrently in time, and co-frequency, with said first information. As used herein, the term "co-frequency" refers to first and second communications and to respective first and second frequencies associated therewith that at least partially overlap therebetween. For example, first and second signals may be transmitted via the same frequency/frequency band, or the first signal may be transmitted via a first frequency band that overlaps a portion of a second frequency band via which the second signal is transmitted (where each frequency band comprises a set of frequencies). In some embodiments, the first and second polarizations may be orthogonal therebetween and may provide two independent and/or uncoupled (or decoupled) channels over which respective first and second information may be transmitted and/or received, substantially concurrently in time/space therebetween and co-frequency therebetween, devoid of interference from one into the other (i.e., devoid of interference therebetween). In practice, the first and second polarizations may not be orthogonal and/or one or more propagation anomalies such as, for example, reflection(s) and/or fading, may cause the first and second polarizations to deviate from being orthogonal. Such a deviation from orthogonality may cause coupling and/or interference between the two respective polarization channels associated therewith. Accordingly, an adaptive receiver operating in accordance with, for example, a Zero-Forcing ("ZF") algorithm and/or a Least Mean-Squared Error ("LMSE") algorithm may be used to reduce said coupling and/or interference. Instead of, or in combination with, an adaptive receiver, as discussed above, an adaptive transmitter may be used to pre-distort information of the first polarization with that of the second (and/or vice versa) in such a way as to allow said propagation anomalies to at least partially undo or cancel said pre-distortion. This approach may, in some embodiments, reduce a thermal noise increase.

FIG. 1A illustrates a channel comprising two polarizations, labeled in FIG. 1A as "V" and "H". In some embodiments, the label "V" may denote vertical and the label "H" may denote horizontal. In general, however, V denotes a first polarization and H denotes a second polarization. A transmitter, indicated by "Tx" in FIG. 1A, may be configured to perform various functions/operations comprising launching/transmitting a first signal over the first polarization V, and a second signal over the second polarization H. A receiver, indicated by "Rx" in FIG. 1A, may be configured to perform various functions/operations comprising receiving a first signal over a first polarization thereof and receiving a second signal over a second polarization thereof. Such receiver polarizations may also be labeled as "V" and "H," respectively, per the labels used by the transmitter Tx for the two respective polarizations thereof. It will be understood however that a transmitter polarization labelled as "V" may not comprise the same physical orientation as that of a receiver polarization similarly labelled.

In some embodiments, the transmitter Tx may transmit the first and second signals to the receiver Rx via a cellular wireless communications link. For example, the transmitter Tx and the receiver Rx may be a smartphone and a cellular base station, respectively. Alternatively, the receiver Rx may be a smartphone, and the transmitter Tx may be a cellular base station.

Still referring to FIG. 1A, it is illustrated therein that, responsive to the transmitter Tx having launched a signal $\chi$ over a polarization V, the receiver Rx receives $\alpha_{VV}\chi$ on its V polarization port and receives $\alpha_{VH}\chi$ on its H polarization port. It will be understood that channel coefficients $\alpha_{VV}$ and $\alpha_{VH}$ may, in general, be complex valued as will be appreciated by those skilled in the art. Moreover, the channel coefficients $\alpha_{VV}$ and $\alpha_{VH}$ relate to co-pol (i.e., co-polarization) and cross-pol (i.e., cross-polarization) channel gain/attenuation, respectively. As used herein in the context of coefficients, the term "relate to" (or "relates to") refers to a coefficient characterizing (or defining) an aspect of a channel such as, for example, a gain/attenuation, amplitude/magnitude and/or phase thereof, that may be frequency dependent. That is, a channel coefficient, such as, for example, the coefficient $\alpha_{VV}$ and/or $\alpha_{VH}$, may comprise a frequency-dependent aspect in its, for example, magnitude and/or phase characteristic, particularly in embodiments comprising a frequency-selective fading channel, such as may be the case, for example, in the context of a cellular communications system/method, as will be appreciated by those skilled in the art.

As used herein, the term "co-polarization" (or "co-pol") refers to a communication (or transmission) between a vertical polarization port V of a transmitter Tx and a vertical polarization port V of a receiver Rx, or a communication (or transmission) between a horizontal polarization port H of a transmitter Tx and a horizontal polarization port H of a receiver Rx. "Cross-polarization" (or "cross-pol"), on the other hand, refers to interference between different polarizations. For example, the term cross-polarization may refer to a communications leakage (or communications interference) between a vertical polarization port V of a transmitter Tx and a horizontal polarization port H of a receiver Rx, or a communications leakage (or communications interference) between a horizontal polarization port H of a transmitter Tx and a vertical polarization port V of a receiver Rx.

Figure 1B:
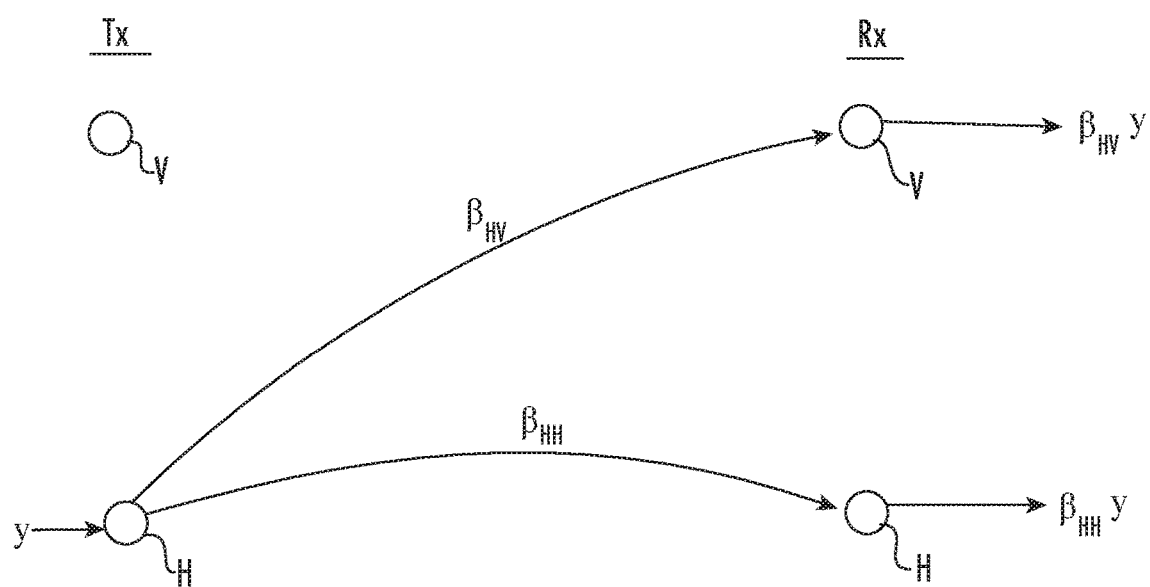
FIG. 1B is a schematic illustration of co-pol and X-Pol channel gains from a horizontal polarization node "H" of a transmitter "Tx" to horizontal "H" and vertical "V" polarization nodes of a receiver "Rx".

FIG. 1B illustrates that, responsive to the transmitter Tx having launched a signal y over its H polarization port the receiver Rx receives a cross-pol signal $\beta_{HV}y$ on its V polarization port and receives a co-pol signal $\beta_{HH}Y$ on its H polarization port. It will be understood that channel coefficients $\beta_{HV}$ and $\beta_{HH}$ may, in general, be complex valued as will be appreciated by those skilled in the art.

The first signal $\chi$ may comprise first data that comprises, in some embodiments, a statistical independence relative to second data of the second signal y. As used herein, the term "statistical independence" is to be interpreted in accordance with the mathematical definition thereof that may be found in texts of probability, random variables and/or stochastic processes known to those skilled in the art (such as, for example, in *Probability, Random Variables, and Stochastic Processes*; Second Edition; by Athanasios Papoulis; Published by McGraw-Hill Book Company; 1984). As such, the term statistical independence may refer to a first data and to a second data that respectively include different information, that may be associated with different respective first and second sources that are independent of one another (e.g., values of the second data are not influenced/dictated by values of the first data).

Figure 2A:
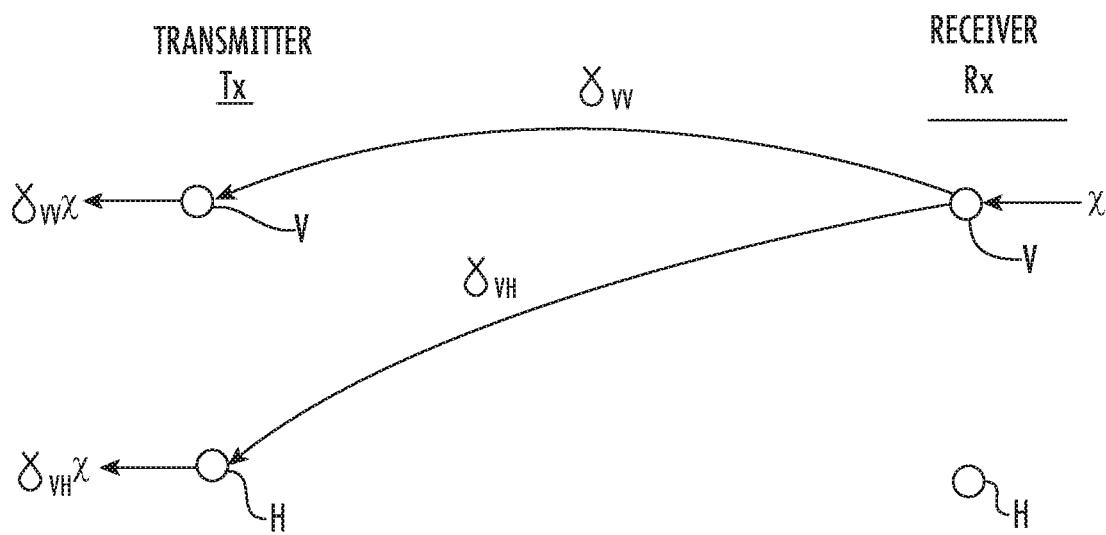
FIG. 2A is a schematic illustration of co-pol and X-Pol channel gains from a vertical polarization node "V" of a receiver "Rx" to vertical "V" and horizontal "H" polarization nodes of a transmitter "Tx".
Figure 2B:
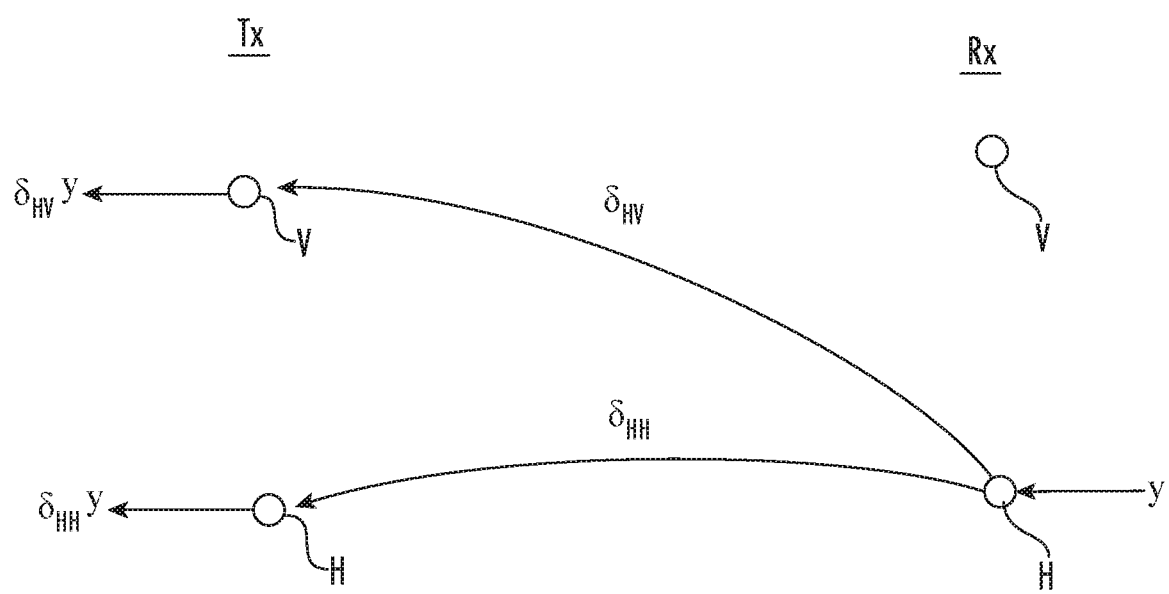
FIG. 2B is a schematic illustration of co-pol and X-Pol channel gains from a horizontal polarization node "H" of a receiver "Rx" to horizontal "H" and vertical "V" polarization nodes of a transmitter "Tx".

Transmissions illustrated in FIGS. 1A and 1B may be referred to as forward link transmissions, while transmissions illustrated in FIGS. 2A and 2B may be referred to as return link transmissions. Similar to FIGS. 1A and 1B, FIGS. 2A and 2B illustrate launching/transmitting of signals (i.e., launching/transmitting of return link signals) from polarization ports V and H of what is labeled as Rx in FIGS. 2A and 2B. It will be understood, however, that in FIGS. 1A through 2B, that which is labeled as a receiver Rx may also include a transmitter Tx and that which is labeled as a transmitter Tx may also include a receiver Rx. Stated differently, in FIGS. 1A through 2B, that which is labeled as Tx or Rx may, in accordance with some embodiments, be a transceiver Tx/Rx, comprising both transmit and receive capability. It will be understood that each of the channel coefficients defined in FIGS. 2A and 2B (i.e., $\gamma_{VV}$, $\gamma_{VH}$, $\delta_{HH}$, $\delta_{HV}$) may, in general, be complex valued.

According to some embodiments, such as, for example, Time Division Duplex ("TDD") embodiments, $\alpha_{VV}$ may be equal to, or may be approximately equal to, $\gamma_{VV}$. Further, in such TDD embodiments $\alpha_{VH}$ may be equal to, or may be approximately equal to, $\delta_{HV}$. Similarly, in TDD embodiments, $\beta_{HH}$ may be equal to, or may be approximately equal to, $\delta_{HH}$; and $\beta_{HV}$ may be equal to, or may be approximately equal to, $\gamma_{VH}$. Values associated with the various channel coefficients that are defined in FIGS. 1A through 2B may be determined/estimated using techniques known to those skilled in the art such as, for example, the use of pilot tones/signals. It will be understood that TDD refers to transmitting and receiving over different time intervals that are mutually exclusive (i.e., do not overlap therebetween) or may overlap partially therebetween. In some embodiments, the term TDD may also refer to using a first set of frequencies for transmitting and a second set of frequencies for receiving wherein, in some embodiments, the second set of frequencies may comprise all, or at least some, of the first set of frequencies. In some embodiments, the second set of frequencies may comprise at least some frequencies of the first set of frequencies and may further comprise frequencies that are mutually exclusive to the first set of frequencies. In other embodiments, all of the second set of frequencies may be mutually exclusive to the first set of frequencies (i.e., there may be no overlap between the second set of frequencies and the first set of frequencies).

Figure 3A:
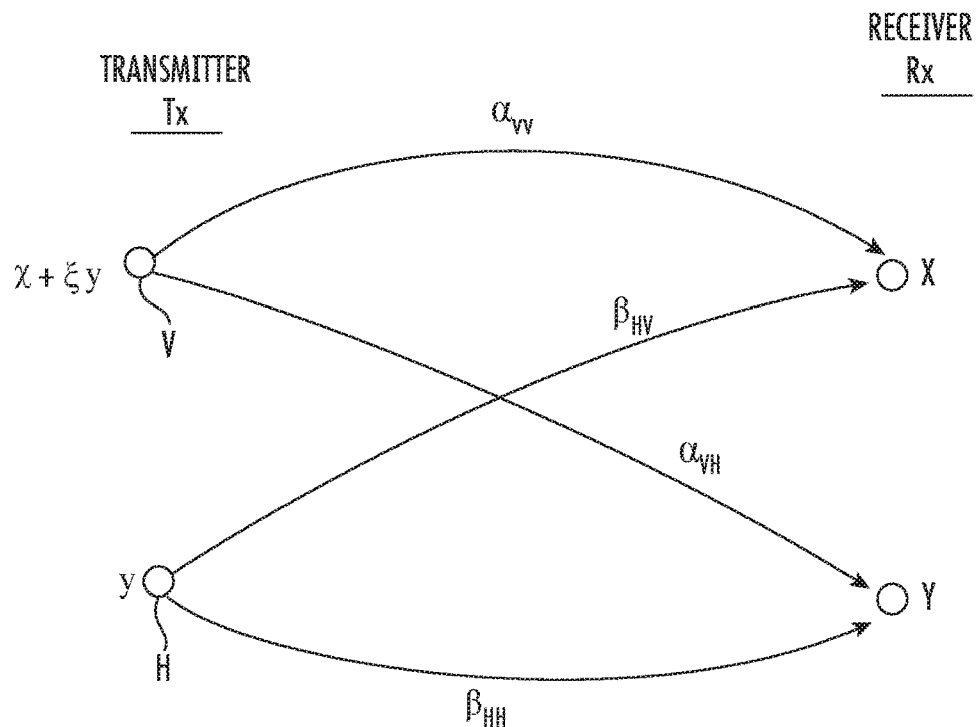
FIG. 3A is a schematic illustration of co-pol and X-Pol channel gains from a vertical polarization node "V" of a transmitter "Tx" to vertical "V" and horizontal "H" polarization nodes of a receiver "Rx"; and further, is a schematic illustration of co-pol and X-Pol channel gains from a horizontal polarization node "H" of the transmitter "Tx" to the horizontal "H" and vertical "V" polarization nodes of the receiver "Rx".

FIG. 3A illustrates transmitting by a Transmitter Tx a signal $\chi+\xi y$ on a first polarization thereof that may be a vertical polarization, or any other polarization, and may be labeled as V, and transmitting a signal y on a second polarization thereof that may be a horizontal polarization, or any other polarization (other than the first polarization), and may be labeled as H. The signal y may be independent of, unrelated to and/or uncorrelated to the signal $\chi$. The coefficient $\xi$ may be complex valued and may serve to pre-distort (or, as may be thought of, to pre-contaminate) $\chi$ by a function of y so as to substantially undo (or partially undo or compensate for) cross polarization interference that may be introduced by one or more channel/propagation anomalies such as reflections, fading, water vapor and/or any other anomaly of the channel/propagation. Still referring to FIG. 3A, a Receiver Rx may receive a signal X on a first polarization thereof (that may, in some embodiments, be defined by, or be associated with, a spatial orientation of a first antenna of the Receiver Rx, that may be a linearly polarized first antenna in accordance with some embodiments), responsive to the Transmitter Tx having transmitted said signals ($\chi+\xi y$) and y over the two respective first and second polarizations thereof, as discussed. The Receiver Rx may also receive a signal Y on a second polarization thereof (that may, in some embodiments, be defined by, or be associated with, a spatial orientation of a second antenna of the Receiver Rx, that may differ in spatial orientation from said first antenna and may be a linearly polarized second antenna according to some embodiments). It will be understood that the transmitter that is illustrated in FIG. 3A and is labelled as "TRANSMITTER Tx", comprising a "V" port that is associated with the signal $\chi+\xi y$, and further comprising a "H" port that is associated with the signal y, may, according to some embodiments, comprise two physically spaced-apart transmitters. In such embodiments, a first transmitter of said two physically spaced-apart transmitters may comprise a transmitter of a first smartphone while a second transmitter of said two physically spaced-apart transmitters may comprise a transmitter of a second smartphone that may be proximate to the first smartphone. Said second smartphone that may be proximate to the first smartphone may desire to relay the signal y to the receiver "RECEIVER Rx" of FIG. 3A, comprising the two ports labelled as "X" and "Y", while the first smartphone may desire to relay the signal $\chi$ to that receiver. Accordingly, the second smartphone may relay signal y to the first smartphone and values of one or more channel coefficients, as necessary, to form the value of $\xi$ at the first smartphone. In some embodiments, the second smartphone may form $\xi$ and relay $\xi$ to the first smartphone; or the second smartphone may form $\xi y$ and relay $\xi y$ to the first smartphone. Accordingly, the first smartphone may transmit $\chi+\xi y$ while the second smartphone transmits y concurrently in time with the transmission of the first smartphone and may also do so co-frequency with the transmission of the first smartphone.

In some embodiments, the Receiver Rx, which may comprise a receiver of a cellular system, may receive the signal X and the signal Y, over a channel comprising, for example, time-varying, dispersive, multipath-fading characteristics. Such a channel may comprise a magnitude/gain response that fluctuates with time (e.g., increasing over a first interval of time and then, decreasing over a second interval of time or vice versa) due to, for example, a plurality of signal paths that enable a respective plurality of signals to arrive at the Receiver Rx. Because of channel variations with time, the plurality of signals of said plurality of signal paths sometimes add constructively therebetween, thus resulting in what may be called an up-fade, while adding destructively therebetween at other times, resulting in what may be called a down-fade. Accordingly, such a channel may be termed a fading channel. A fading channel may also display a phase vs. frequency characteristic that deviates from a linear relationship. The term "dispersive," as used herein, means that the magnitude/gain fluctuations of a fading channel display a dependency on frequency and may thus be characterized as frequency-dependent; i.e., the magnitude/gain response of a fading channel is different for different frequencies, and the phase vs. frequency characteristic of the channel deviates from being linear. Such a channel may be termed a dispersive fading channel. Cellular communications channels comprise dispersive fading characteristics. Accordingly, over a frequency span of a spectrum of a signal, a set of coefficients that may be used to characterize a dispersive fading channel may change in value such that first and second spectral components of said spectrum of a signal (that may be formed and transmitted by a transmitter Tx to the receiver Rx in accordance with some embodiments of the present invention) may depend upon respective first and second sets of channel coefficients that differ therebetween. Stated differently, in some embodiments, a transmitter Tx (that may be a transmitter Tx of a cellular communications system such as, for example, a transmitter of a smartphone or a transmitter of a base station) may use respective first and second different sets of channel coefficients in forming a signal that is to be transmitted to the receiver Rx via a fading dispersive channel. The transmitter Tx may form the signal in a frequency-domain such as, for example, in a Discrete Fourier Transform ("DFT") domain or in a Fast Fourier Transform ("FFT") domain and then, use an Inverse DFT operation ("IDFT") or an Inverse FFT ("IFFT") operation to bring/convert/transform the signal from said frequency-domain into a discrete-time domain and to subsequently transmit the signal over the fading dispersive channel for reception and potentially further processing by the receiver Rx. It will be understood that, in some embodiments, the signal is transmitted by the transmitter Tx following additional processing by the transmitter Tx (and/or by a processor associated therewith). Said additional processing may be distributed over a plurality of stages/sections of the transmitter Tx; wherein the additional processing may comprise operations of filtering, amplification and/or up-conversion, not necessarily in that order. It will also be understood that a set of channel coefficients, as used herein, comprises a number of channel coefficients that is greater than or equal to one and that, in some embodiments, said processor that is associated with the transmitter Tx (and in some embodiments is an integral part of the transmitter Tx) is used in performing said IDFT and/or IFFT. It will also be understood that said transmitter Tx comprises a transmitter of a cellular communications system. Accordingly, in some embodiments, the transmitter Tx comprises a transmitter of a smartphone, a transmitter of a tablet, a transmitter of a lap-top computer (e.g., personal computer), a transmitter of a base station or a transmitter of any other device that is capable of providing communications in a cellular system.

Still referring to FIG. 3A we may write:

$$X = \alpha_{VV}(\chi + \xi y) + \beta_{HV} y = \alpha_{VV}\chi + y(\xi \alpha_{VV} + \beta_{HV}); \text{ and}$$

$$Y = \beta_{HH} y + \alpha_{VH}(\chi + \xi y) = y(\xi \alpha_{VH} + \beta_{HH}) + \alpha_{VH}\chi.$$

Figure 3B:
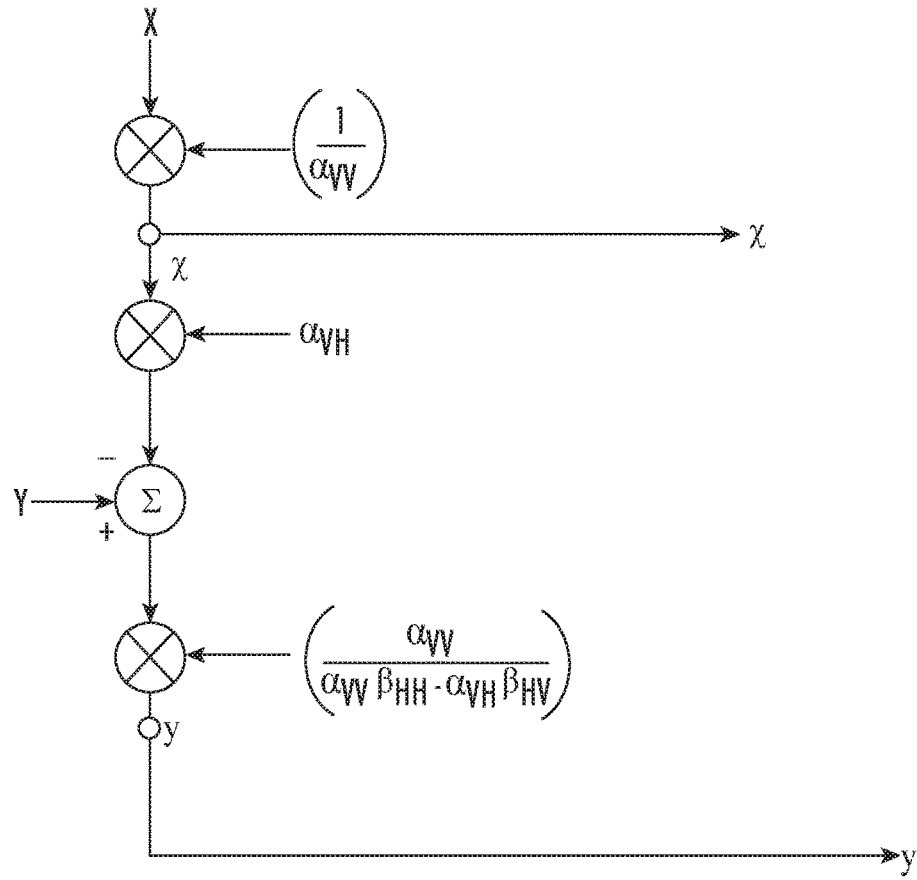
FIG. 3B is a schematic illustration of signal processing according to embodiments of the present invention.

Setting $\xi = -\beta_{HV}/\alpha C_{VV}$ and multiplying X by $1/\alpha_{VV}$ (as illustrated in FIG. 3B) yields $\chi$ at the Receiver Rx.

Next, multiplying $\chi$ at the Receiver Rx by $\alpha_{VH}$ (as illustrated in FIG. 3B) and then subtracting the result from Y, followed by multiplication by $\alpha_{VV}/(\alpha_{VV}\beta_{HH}-\alpha_{VH}\beta_{HV})$, as is illustrated in FIG. 3B, yields y at the Receiver Rx. Accordingly, first and second functions of respective first and second signals, that may be independent of one another (such as $\chi$ and y may be independent of one another) may be transmitted by a Transmitter Tx, substantially simultaneously/concurrently in time therebetween and may further be transmitted substantially co-frequency therebetween, over respective first and second spatial polarizations of Transmitter Tx, following a pre-distortion (or pre-contamination) by the Transmitter Tx of at least one of said first and second signals (e.g., a pre-contamination of $\chi$ in this example) by a component or function of the other (e.g., by $\xi y$ in this example).

As those skilled in the art may appreciate, an amplitude (or magnitude) of a channel coefficient such as, for example, $\alpha_{VV}$ (or any other channel coefficient) may be less than unity owing to attenuation/fading and/or any other characteristic(s) associated with the propagation channel and/or propagation itself. Accordingly, in some embodiments, such as, for example, in Time Domain Duplex ("TDD") embodiments or in any other embodiment that need not be TDD-based, wherein $\alpha_{VV}$ (as well as any other channel coefficient(s)) may be known to the Transmitter Tx, $\chi$ may be pre-distorted (or pre-conditioned) at the Transmitter Tx by multiplying, for example, $\chi$ by an inverse of $\alpha_{VV}$ and/or other function of $\alpha_{VV}$, $\alpha_{VH}$, $\beta_{HV}$ and/or $\beta_{HH}$ in order to avoid (or minimize) processing of $\chi$ at the Receiver Rx that may enhance or amplify a thermal noise (and/or interference) content thereof at the Receiver Rx. Accordingly, the signal on the V port of Transmitter Tx of FIG. 3A, may, for example, become $(\chi/\alpha_{VV}) + \xi y$ while the signal on the H port of Transmitter Tx may, for example, remain y. As such, the signal $\chi$ at the Receiver Rx may become:

$$X = \alpha_{VV}(\chi/\alpha_{VV} + \xi y) + \beta_{HV} y = \chi + y(\beta_{HV} + \xi \alpha_{VV}).$$

Letting $\xi = -\beta_{HV}/\alpha_{VV}$, yields $X = \chi$. Having thus derived $\chi$ and having avoided noise and/or interference enhancement on $\chi$, by having performed processing associated therewith at the Transmitter Tx and having avoided post-processing associated therewith at the Receiver Rx, $\chi$ may be used (or a regenerated version of $\chi$ may be used) to derive y from Y without enhancing or amplifying substantially a thermal noise (and/or interference) content thereof. It may be shown that:

$$Y = \alpha_{VH}(\chi/\alpha_{VV} + \xi y) + \beta_{HH} y = \chi(\alpha_{VH}/\alpha_{VV}) + y(\beta_{HH} + \xi \alpha_{VH}).$$

Accordingly, using knowledge of $\chi$ (or the regenerated version of $\chi$) at the Receiver Rx and using knowledge of coefficients $\alpha_{VH}$ and $\alpha_{VV}$, at the Receiver Rx, $\chi(\alpha_{VH}/\alpha_{VV})$ may be formed and subtracted from Y, followed by division of the result by $(\beta_{HH} + \xi \alpha_{VH})$; wherein $\xi = -\beta_{HV}/\alpha_{VV}$. As used herein, the term "regenerated", "regenerate" or "regenerating" refers to data that is based upon (or generated from) a version of that data comprising noise (e.g., thermal noise) and/or interference (e.g., cross-pol interference). A version of data comprising information as well as noise and/or interference may be processed by, for example, an algorithm/filter in order to reduce/minimize the effect(s) of said noise and/or interference and allow an estimate of the information to be estimated/generated. This estimate of the information may be called regenerated data. By regenerating data, effects of noise and/or interference can be reduced/eliminated.

Further to all of the above, and still referring to FIG. 3A, it may be shown that by letting the signal on the V port of Transmitter Tx be $(\chi' + \xi y')$ and the signal on the H port of Transmitter Tx be $(y' + \lambda \chi')$, wherein $\chi' = \chi[\beta_{HH}/(\alpha_{VV}\beta_{HH} - \beta_{HV}\alpha_{VH})]$, and $y' = y[\alpha_{VV}/(\beta_{HH} - \beta_{HV}\alpha_{VH})]$;

wherein $\xi = -\beta_{HV}/\alpha_{VV}$, and $\lambda = -\alpha_{VH}/\beta_{HH}$; and wherein χ and y comprise/represent respective first and second signals (as previously stated and defined), that the Transmitter Tx intends to convey to the Receiver Rx substantially concurrently in time therebetween and substantially co-frequency therebetween by transmitting concurrently in time and co-frequency therebetween first and second functions of χ and y over respective first and second spatial polarizations associated with Transmitter Tx and/or a propagation medium/channel. Accordingly, subject to the above, it may be shown that at the Receiver Rx, X=χ and Y=y. We observe that in such embodiments, a processing level at the Transmitter Tx is increased, while reducing a processing level at the Receiver Rx, providing a reduction in noise/interference enhancement at the Receiver Rx, particularly under certain ill-conditioned channel and/or propagation conditions as may exist in cellular/mobile communications in an urban, suburban and/or rural setting. Further, it is observed that at least one of the denominator terms of the expression that define y' and/or χ' above may, under certain channel/propagation conditions become small or even zero. Accordingly, the Transmitter Tx may be equipped with a monitor that may be configured to monitor an amplitude/magnitude of $(\alpha_{VV}-\beta_{HV}\alpha_{VH})$ and/or an amplitude/magnitude of $(\beta_{HH}-\beta_{HV}\alpha_{VH})$. Responsive to an amplitude/magnitude of the quantity $(\alpha_{VV}-\beta_{HV}\alpha_{VH})$ and/or $(\beta_{HH}-\beta_{HV}\alpha_{VH})$ being detected by the monitor as being below a threshold or approaching the threshold, the monitor may, according to some embodiments, inform the Transmitter Tx (e.g., and/or a processor associated therewith) to alter a configuration of V and/or H antennas being used by Transmitter Tx. This altering of a configuration of V and/or H antennas being used by Transmitter Tx is further discussed later in reference to FIG. 3F.

Thus, a Transmitter Tx may use one or more channel coefficients, such as the channel coefficients illustrated in FIG. 3A, that may relate to various channel gains, or channel attenuations, (that may be complex channel gains/attenuations), and may be associated with dual-polarization propagation and/or interference associated therewith, to pre-process or to pre-distort (or to pre-contaminate) at least one first signal that is to be launched by the Transmitter Tx on a first polarization thereof and further, to launch by said transmitter Tx at least one second signal on a second polarization thereof, substantially concurrently in time with said at least one first signal and substantially co-frequency with said at least one first signal, followed by, in some embodiments, by a post-processing of at least one first signal that is received at a Receiver Rx; said post-processing comprising multiplications and/or additions with one or more channel coefficients that may relate to said dual-polarization propagation and/or interference associated therewith, in order to derive and/or regenerate a desired signal χ and a desired signal y, at said Receiver Rx. In other embodiments, said post-processing at the Receiver Rx is not necessary.

Relative to that which is illustrated in FIG. 3A and described above, it will be understood that, in some embodiments, instead of the above, or in addition to the above, ξ may be set to $-\beta_{HH}/\alpha_{VH}$ and then, Y may be divided by $\alpha_{VH}$ to yield χ. Further, it will be understood that instead of providing the signal χ+ξy on the V port of the Transmitter Tx and providing the signal y on the H port of the Transmitter Tx, as is illustrated in FIG. 3A, the signal y+ξχ may be provided on the H port of the Transmitter Tx and the signal χ may be provided on the V port of said Transmitter Tx. Such signal provisions may be shown to yield:

$$X=\alpha_{VV}\chi+\beta_{HV}(y+\xi\chi)=\chi(\alpha_{VV}+\xi\beta_{HV})+\beta_{HV}y; \text{ and}$$

$$Y=\alpha_{VH}\chi+\beta_{HH}(y+\xi\chi)=\beta_{HH}y+\chi(\alpha_{VH}+\beta_{HH}\xi).$$

Given the immediately above equations, letting $\xi=-\alpha_{VV}/\beta_{HV}$ and multiplying X by $1/\beta_{HV}$ may yield y at the Receiver Rx. Next, at the Receiver Rx, multiplying y (or a regenerated version thereof) by $\beta_{HH}$ and then subtracting the result from Y, followed by multiplication by $\beta_{HV}/(\alpha_{VH}\beta_{HV}-\alpha_{VV}\beta_{HH})$, may yield χ at the receiver Rx (which may then be used to derive at the Receiver Rx a regenerated version of χ). It will be understood that in accordance with some embodiments, instead of letting $\xi=-\alpha_{VV}/\beta_{HV}$, or in conjunction with letting $\xi=-\alpha_{VV}/\beta_{HV}$ in some embodiments, ξ may be set to $-\alpha_{VH}/\beta_{HH}$ yielding $Y=\beta_{HH}Y$, which may then be used to yield y after division thereof with $\beta_{HH}$. Then, y (or a regenerated version thereof) may be used following multiplication by $\beta_{HV}$ to derive $\chi(\alpha_{VV}+\xi\beta_{HV})$ by subtracting $\beta_{HV}y$ from X. Finally, $\chi(\alpha_{VV}+\xi\beta_{HV})$ may be divided by $(\alpha_{VV}+\xi\beta_{HV})$, wherein $\xi=-\alpha_{VH}/\beta_{HH}$, to yield χ.

Those skilled in the art will appreciate that the statement "in conjunction with letting $\xi=-\alpha_{VV}/\beta_{HV}$ in some embodiments, ξ may be set to $-\alpha_{VH}/\beta_{HH}$ yielding $Y=\beta_{HH}y$, which may then be used to yield y after division thereof with $\beta_{HH}$," and other teachings similar to the above, provide a three-prong approach and/or three alternatives to deriving χ and y at the Receiver Rx:

(1) Deriving χ and y by using $\xi=-\alpha_{VV}/\beta_{HV}$;
(2) Deriving χ and y by using $\xi=-\alpha_{VH}/\beta_{HH}$; and
(3) Deriving χ and y by using $\xi=-\alpha_{VV}/\beta_{HH}$ and using $\xi=-\alpha_{VH}/\beta_{HH}$.

Approach/alternative (3) allows for a comparison to be made following derivation of χ and y (and/or regenerated values associated therewith) using the two values of ξ, thus providing a redundancy protection/assurance/confidence in accordance with some embodiments. In some embodiments, a first portion of spectrum (e.g., a first subcarrier of an OFDM/OFDMA carrier) may be processed using one value of ξ (e.g., $\xi=-\alpha_{VV}/\beta_{HV}$) while a second portion of the spectrum (e.g., a second subcarrier of the OFDM/OFDMA carrier) may be processed using a second value of ξ (e.g., $\xi=-\alpha_{VH}/\beta_{HH}$). Alternatively, or in combination with the above, in some embodiments a transmitter may alternate in using the two stated values of ξ. That is, in some embodiments, over a first interval of time the transmitter uses $\xi=-\alpha_{VV}/\beta_{HV}$ and over a second interval of time the transmitter uses $\xi=-\alpha_{VH}/\beta_{HH}$. Same holds for any other parameter (other than that may be available to, and used by, the transmitter where a choice of more than one value for said parameter is available to the transmitter. In some embodiments, each one of the first and second intervals of time comprises only one signaling interval. In other embodiments, at least one of said first and second intervals of time comprises a plurality of signaling intervals. Further, in some embodiments, said first and second intervals of time are adjacent or successive intervals of time. In some embodiments, the term "signaling interval" means an interval of time that is ≤10 milliseconds ("10 msec.") in duration. In accordance with other embodiments, the term "signaling interval" means an interval of time that is ≤1 millisecond ("1 msec.") in duration. In further embodiments, the term "signaling interval" means an interval of time that is required to process and/or transmit a block of information. In yet additional embodiments, the term "signaling interval" means an interval of time that is required to transmit a first block of information and, in response to having transmitted the first block of information, to receive a second block of information. Combinations of the above are also possible. For example, in some embodiments, the term "signaling interval" means an interval of time that is required to process and/or transmit a block of information wherein the interval of time is 10 msec. As another example, the term "signaling interval" means an interval of time that includes a first interval of time, as required to process and/or transmit a first block of information; wherein the first interval of time may be ≤10 msec. in some embodiments, and may be ≤1 msec. in other embodiments; and further includes a second interval of time that is required to process and/or receive a second block of information, that may be responsive to having transmitted the first block of information over the first interval of time; wherein according to some embodiments, the second interval of time may be ≤10 msec. whereas in other embodiments, the second interval of time may be ≤1 msec. Other combinations are also possible as those skilled in the art will recognize.

Figure 3C:
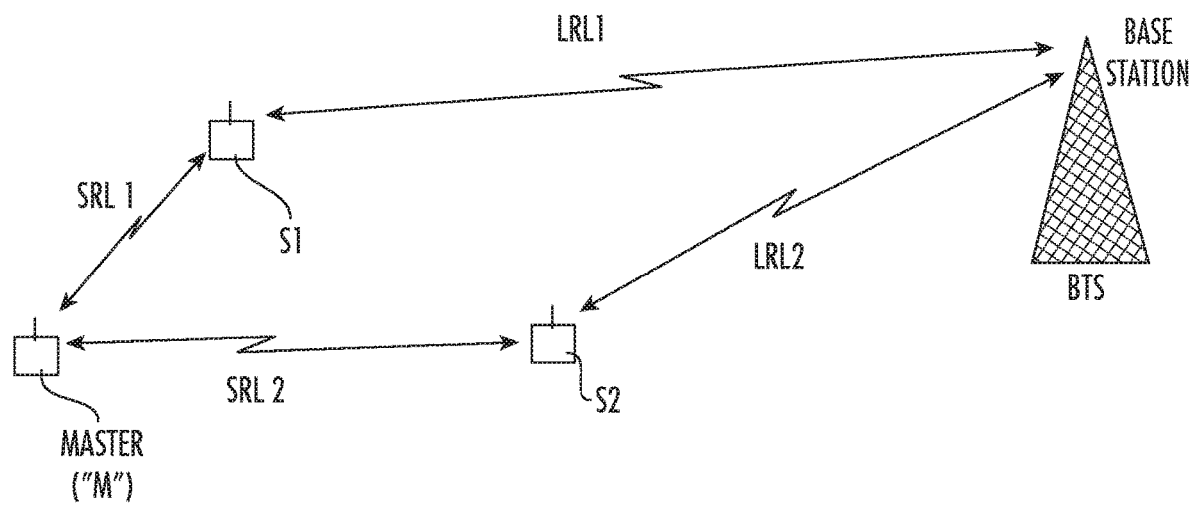
FIG. 3C is a schematic illustration of systems/methods according to embodiments of the present invention.

Further embodiments of inventive concepts that relate to dual-polarization and/or co-frequency/co-channel transmission/reception and may also relate to multi-device carrier aggregation transmission/reception will now be described. These further embodiments comprise using what may be labeled as auxiliary or slave devices, as will now be described. In reference to FIG. 3C, a first device that may, for example, comprise a smartphone, may intend to transmit information to a second device that may, for example, comprise a base station (e.g., a cellular base station). Still referring to FIG. 3C, the first device is labeled as a Master ("M") and the base station is labeled as BTS. Further, two Slave devices, labeled as S1 and S2, respectively, are illustrated in FIG. 3C as being proximate to the first device M so that M may become aware of a presence, and proximity to M, of S1 and S2 by, for example, detecting by M respective first and second short-range signals that may be radiated by S1 and S2 over respective short-range links SRL1 and SRL2 (as illustrated in FIG. 3C); detecting by S1 and/or S2 a short-range signal being radiated by M and informing M accordingly; by having M be informed by the BTS of respective first and second locations associated with S1 and S2; this may, according to some embodiments, be responsive to a location associated with M; and/or by having M be informed by the BTS of respective first and second distances from M associated with S1 and S2; this may, according to some embodiments be responsive to a distance of interest that may be deemed appropriate by the BTS and/or M. Combinations of the above are also possible and may be used, in some embodiments, to provide a level of increased assurance/confidence and/or redundancy. For example, said detecting by S1 and/or S2 a short-range signal being radiated by M and informing M accordingly may be used in conjunction with detecting by M respective first and second short-range signals that may be radiated by S1 and S2. As another example, said detecting by S1 and/or S2 a short-range signal being radiated by M and informing M accordingly may be used in conjunction with having M be informed by the BTS of respective first and second locations associated with S1 and S2 may be used. Other combinations are also possible by, for example, combining the two examples give above. As used herein, in some embodiments, the term "proximate to" refers to a distance of up to about 10 meters. In other embodiments, the term "proximate to" refers to a distance of up to about 100 meters. For example, a master M that is proximate to a slave S1 and/or a slave S2 may communicate therebetween via a BLUETOOTH® or Wi-Fi communications link. In some embodiments, S1 and/or S2 may be closer to M than the BTS is to M. It will be understood that according to some embodiments, the BTS comprises position knowledge of at least some of the devices such as, devices M, S1 and S2 that are within a service region of the BTS. Further, it will be understood that the BTS can communicate with M, S1 and S2, as necessary, and can exercise control over M, S1, and S2 by providing thereto one or more commands dictating/enabling a functionality thereof. Stating this differently, in some embodiments, the BTS is master of all and can dictate any and all functionality that is to be performed by M, S1 and S2.

In some embodiments, a slave device, such as S1, may comprise a smartphone or comprise a device (e.g., a tablet computer, laptop computer, etc.) that comprises smartphone functionality. In some embodiments, a slave device such as S1 (whether the slave device comprises a smartphone or not) may comprise a Radio Frequency ("RF") stage that may comprise a transmit/receive antenna, an Analog-to-Digital ("A/D") converter, a Digital Signal Processor ("DSP"), memory, a Digital-to-Analog ("D/A") converter, a Low-Noise Amplifier ("LNA"), filtering, a Power Amplifier ("PA") and/or a mixer; an Intermediate Frequency ("IF") stage that may comprise an A/D converter, a D/A converter, amplification, filtering and/or mixing; and/or a Base Band ("BB") stage that may comprise an A/D converter, a D/A converter, amplification, filtering, mixing, memory and/or signal processing that may comprise a FFT/IFFT operation, arithmetic operations such as those identified in FIG. 3B, addition, subtraction, multiplication and/or division, estimation/regeneration of data, reformatting of data, equalization, predistortion and/or retransmission of data. Not all stages mentioned above need be present in some embodiments. For example, the IF stage may be bypassed in some embodiments by receiving a signal at RF and converting said signal received at RF directly to BB, as those skilled in the art will appreciate. Any operations performed within a stage need not be in the order identified above nor must all operations identified above for a particular stage be performed within that stage; in some embodiments, some operations, as associated above with a particular stage, may not be performed within that particular stage (or anywhere else) or may be performed within a stage other than said particular stage. Further, if a stage has been bypassed (such as in the example above where the IF stage is bypassed) operations associated therewith may be performed in a remaining stage. It will be understood that not all operations identified above with any one stage must be present and/or be performed within that stage. Some operations identified with a first stage (e.g., RF) may be performed within a second stage (e.g., BB), or not at all.

It will be understood that the term "processor", "signal processor" or "digital signal processor" as used herein may denote any subsystem that is part of a system and is configured to control the system or a portion thereof. Stated differently, a system may comprise a first subsystem and a second subsystem wherein the first subsystem comprises a processor that is configured to control the second subsystem (and even the first subsystem, in some embodiments) to perform certain functions that may comprise one or more predetermined functions. The processor may comprise memory that may comprise a priori stored instructions (e.g., lines of code) that may be executed in some predetermined sequence and used, in some embodiments, in conjunction with other inputs to the system, to control the system to perform certain functions that may comprise a predetermined set of functions. For example, the processor may comprise a DSP or a plurality of DSPs that may be coupled or connected therebetween in order to exchange and/or coordinate information. The Processor, for example, may be configured to examine a content of a signal being received by an antenna of the system and, responsive to the content, may demodulate, regenerate, reformat, distribute over first and second polarizations of a transmitter of the system and/or retransmit said signal being received (or at least a measure, or a content, thereof). More specifically, in embodiments comprising one or more smartphones, those skilled in the art know how one or more processors may be configured within the smartphone and/or external to the smartphone and used to control the smartphone (and/or other devices that the smartphone may be communicating with) to perform functions that may comprise a priori determined/ defined (i.e., predetermined) functions. Accordingly, processors and/or structures associated therewith, as relating to cellular systems (e.g., smartphones, base stations, etc.) are known to those skilled in the art and need not be described further herein.

In some embodiments, SRL1 and/or SRL2 comprise one or more signals that use unlicensed and/or licensed frequencies. In some embodiments, the licensed frequencies comprise frequencies that are licensed and/or used for terrestrial cellular communications and/or frequencies licensed and/or used for satellite communications; e.g., space-to-Earth and/or Earth-to-space communications using, for example, frequencies of an L-band comprising frequencies within an interval from about 1525 MHz to about 1660 MHz. In some embodiments, frequencies used by signals on SRL1 differ from frequencies used by signals on SRL2; in other embodiments, the frequencies used by SRL1 and SRL2 at least partially overlap. In some embodiments signals on SRL1 and SRL2 occur over respective time intervals that are mutually exclusive; in other embodiments, the time intervals at least partially overlap. In some embodiments, signals on SRL1 and/or SRL2 comprise singular polarizations (e.g., are singularly polarized). For example, M may transmit to S1 using a first single polarization and/or M may transmit to S2 using a second single polarization; wherein the first and/or second single polarization may comprise at least one of a Vertical ("V") polarization and a Horizontal ("H") polarization. In other embodiments, signals on SRL1 and/or SRL2 comprise a circular polarization. Any combination or subcombination of the above is possible.

Still referring to FIG. 3C, it is seen that an exchange of information may take place between M and S1 and between M and S2. Said exchange of information between M and S1 and between M and S2 may comprise a bi-directional exchange of information in order to transfer a signal from M to S1 and/or from S1 to M and from M to S2 and/or from S2 to M. Signals that are relayed from M to S1 and/or from M to S2 may then be relayed by S1 and/or S2, respectively, to the BTS. Relaying by S1 and by S2 to the BTS may occur substantially concurrently therebetween in time and/or substantially co-frequency therebetween. It will be understood that in addition to the above, other information exchange, that may also be bi-directional between M and S1 and/or between M and S2 may, for example, comprise pilot signals for the purpose of estimating channel coefficients associated with links SRL1 and/or SRL2, as will be appreciated by those skilled in the art.

Still referring to FIG. 3C, it may be seen that M may communicate with the BTS indirectly, via S1 and/or S2, by first transmitting information to S1 and/or S2, via respective short-range links SRL1 and/or SRL2, followed by S1 and/or S2 relaying the information to the BTS, via respective long-range links LRL1 and/or LRL2, following processing of the information by S1 and/or S2, in some embodiments. In some embodiments one of S1 and S2 may not be present or may not be required. Let's assume, for example, that S2 is not present or is not required. In such embodiments, M may communicate directly with the BTS. That is, subject to the assumption that S2 is not present or is not required, the long-range link LRL2 of FIG. 3C may span the distance from M to the BTS (i.e., the link LRL2 may be established directly between M and the BTS); M may also use S1, as discussed earlier, to communicate with the BTS indirectly by sending information to S1 via link SRL1 followed by S1 relaying the information that it has received from M to the BTS via LRL1.

It will be understood that although FIG. 3C illustrates S1 and S2 as being distinct from M and at a distance from M, wherein M is illustrated as communicating with S1 and/or S2 wirelessly, in some embodiments S1 and/or S2 may be integrated and/or physically connected/attached with/to M. In such embodiments, M may communicate with S1 and/or S2 via means other than wireless (not necessarily to the exclusion of wireless). It will also be understood that M may communicate, and exchange information, with more than two "slave" or "auxiliary" devices (not illustrated in FIG. 3C). In some embodiments, M may communicate with a second slave device (such as the second slave device S2) indirectly, by transmitting/receiving information to/from a first slave device (such as the first slave device S1) and requesting/causing S1 to relay/receive/request information to/from S2. In some embodiments, the master device M may communicate, and exchange information, with slave devices S1, S2, . . . and Sn; n≥3, directly and/or indirectly therewith. In some embodiments, a large amount of information may be relayed by M to S1, S2, . . . and/or Sn over a relatively short interval of time, using, for example, a substantially broadband transmission technology such as, for example, an Ultra-Wide Broadband ("UWB") transmission technology. It will be understood that, in some embodiments, wherein S1, S2, . . . and/or Sn is/are proximate to M, M may transmit information to S1, S2, . . . and/or Sn using a relatively low (or very low) power level. Accordingly, in some embodiments, M may radiate a set of frequencies, that may comprise a substantially broadband set of frequencies, at the relatively low (or very low) power level without causing a harmful level of interference to one or more other devices that may also be using said set of frequencies and may not be as proximate to M as is the case with S1, S2, . . . and/or Sn. In accordance with some other embodiments, responsive to a proximity condition between M and S1, S2, . . . and/or Sn having been satisfied, such as, for example, a distance between M and S1, S2, . . . , and/or Sn being sufficiently small (wherein, for example, the distance is less than or equal to 10 meters), a transmission by M to one or more of S1, S2, . . . and/or Sn may comprise microwave frequencies that are greater than or equal to 10 MHz. Reception of information at M from S1, S2, . . . and/or Sn may also comprise frequencies ≥10 MHz. In other embodiments, responsive to said proximity condition between M and S1, S2, . . . and/or Sn, having been satisfied, the transmission by M to S1, S2, . . . and/or Sn may comprise microwave frequencies ≥20 MHz. Reception of information at M from S1, S2, . . . and/or Sn may also comprise frequencies ≥20 MHz. Any combination of the above may also be used. For example, a transmission from M to devices S1, S2, . . . and/or Sn may comprise frequencies ≥20 MHz while a reception at M from devices S1, S2, . . . and/or Sn may comprise frequencies <20 MHz; or vise-a-versa.

Referring again to FIG. 3C, a carrier aggregation system/ method/mode/function may be provided comprising: receiving from M, at one or more slave/auxiliary device(s) (only two of which, S1 and S2, are illustrated in FIG. 3C) information, that may be broadband information, over respective short-range links (only two of which, SRL1 and SRL2, are illustrated in FIG. 3C), and respectively transmitting by the plurality of slave devices and, in some embodiment, also transmitting from M to the BTS, over respective long-range links (only two of which, LRL1 and LRL2, are illustrated in FIG. 3C), using a plurality of carriers that, according to some embodiments, comprise Orthogonal Frequency Division Multiplexed (or Multiplexing) ("OFDM") carriers, Orthogonal Frequency Division Multiple Access ("OFDMA") carriers and/or Single Carrier Frequency Division Multiple Access ("SC-FDMA") carriers in accordance with, for example, a 4G LTE and/or a 5G LTE protocol, air interface and/or standard. Carriers other than those described above may also be used/transmitted, not necessarily to the exclusion of one or more carriers as those described above. In some embodiments, at least one, and in other embodiments, each one, of the slave/auxiliary device(s) and/or M, may be a multi-band/multi-mode capable device that can transmit/receive carriers within a first band of frequencies ("B1"), a second band of frequencies ("B2"), . . . and/or a Nth band of frequencies ("BN"); N≥2. Thus, in accordance with some embodiments, at least one of said long-range links (FIG. 3C) and/or a combination thereof may comprise at least two carriers, or is capable of supporting at least two carriers, at least one of which may, in some embodiments, be partially populated. In some embodiments, said at least two carriers comprises at least one OFDM, OFDMA and/or SC-FDMA carrier; wherein the term partially populated as used herein means not having all subcarriers occupied (or not having used) all subcarriers of said at least one OFDM, OFDMA and/or SC-FDMA carrier that are available to be used to transport data. In some embodiments, a first carrier, of the at least two carriers, is included in a specific band of frequencies (such as, for example, in the band of frequencies labeled as B2) and a second carrier, of the at least two carriers, is also included in the specific band of frequencies B2 but occupies/uses frequencies that differ from those occupied/used by the first carrier. In other embodiments, a first carrier, of the at least two carriers, is included in a first band of frequencies (such as, for example, in the band of frequencies labeled as B1) and a second carrier, of the at least two carriers, is included in a second band of frequencies (such as, for example in the band of frequencies labeled as B2). In some embodiments, B1 may, for example, comprise frequencies from 880 MHz to 960 MHz and B2 may comprise frequencies from 1920 MHz to 2170 MHz. In yet further embodiments, a first carrier, of the at least two carriers, is included in a specific band of frequencies (such as, for example, in the band of frequencies labeled as B1), a second carrier, of the at least two carriers, is also included in the specific band of frequencies B1 but occupies/uses frequencies that differ from those occupied/used by the first carrier, and a third carrier, of the at least two carriers, is included in another band of frequencies (such as, for example in the band of frequencies labeled as B2). It will be understood that, in accordance with some embodiments, at least one long-range link of the plurality of long-range links (only two of which, LRL1 and LRL2, are illustrated in FIG. 3C), may be a bi-directional link transporting information from a slave device to at least one base station (e.g., the BTS that is illustrated in FIG. 3C) and from the at least one base station to the slave device.

Inventive concepts such as those described above may be used to provide a system/method of operating a first device in conveying first information to a destination device and second information to the destination device by communicating with, and using capabilities and/or functions of a second device; the system/method comprising: transmitting, by the first device to the second device, a first signal comprising the first information; causing the second device to receive and process the first signal, to responsively form a second signal comprising the first information and to transmit the second signal to the destination device; and transmitting, by the first device to the destination device, a third signal comprising the second information. In some embodiments, the first device is a wireless device and/or the second device is a wireless device.

It will be understood that, in some embodiments, said at least one base station, such as the BTS illustrated in FIG. 3C, includes a processor that controls the at least one base station to perform operations and/or functions comprising: aggregating information associated with a plurality of carriers received at the at least one base station over different frequencies, over different bands of frequencies and/or from different devices, at least one of which is a slave device (S1, S2) and, in some embodiments, at least one of which is a master device (M). Further, in some embodiments, the master device (M) includes a processor that controls the master device to perform operations and/or functions comprising: aggregating information associated with a plurality of carriers received at the master device (M) directly from the at least one base station (BTS) and/or from at least one slave device, over different frequencies and/or over different frequency bands. Conventional concepts/principles of carrier aggregation may be used to aggregate information as are known to those skilled in the art. The term "aggregating information" or "aggregate information" as used herein may be interpreted in accord with said conventional concepts/principles relating to systems/methods of carrier aggregation that are known to those skilled in the art.

The term "at least one base station" as used herein refers to embodiments that may comprise more than one base station wherein, for example, a first and a second base station may be positioned at a distance from one another and may be connected therebetween in order to provide a diversity improvement in signal strength and/or quality of service relating to return-link transmissions and/or forward-link transmissions. Accordingly, in some embodiments, a method/system may be provided comprising a plurality of operations and/or functions; the plurality of operations and/or functions may be managed/controlled/performed by one or more processors that may be connected therebetween (wirelessly and/or otherwise) and may communicate with one another (wirelessly and/or otherwise) in order to control functions and/or operations of the base station(s) and/or any subsystem associated/connected therewith/thereto; the operations and/or functions comprising: receiving at a first base station a first version of a carrier and receiving at a second base station a second version of the carrier; modifying an amplitude and/or a phase of the carrier that is received at one of the first and second base stations; and adding the carrier received at the second base station to the carrier that is received at the first base station following said modifying. In some embodiments, said modifying comprises a frequency dependency over a frequency span of the carrier in that a value by which the amplitude and/or phase of the carrier is modified at a first frequency differs from a value by which the amplitude and/or phase of the carrier is modified at a second frequency; the second frequency differing from the first frequency. Accordingly, various diversity methodologies/systems/methods may be provided on return link transmissions including: selection diversity, maximum power diversity combining or maximal ratio diversity combining, as are known to those skilled in the art.

A variation of the various diversity methodologies/systems/methods described above may be provided on transmissions by the at least one base station, that are intended for the master (M) device. Functions analogous to those performed by a plurality of base stations (as previously described) may now be performed by a respective plurality of slave devices that are in communications with (i.e., are connected with) the master (M) device and may also be connected with one another, as those skilled in the art will appreciate. Accordingly, in such an embodiment, a method/system may be provided comprising performing a plurality of operations/functions; wherein such operations/functions may be performed by one or more processors that may communicate with one another, control the master (M) device and/or a plurality of slave devices that may be connected thereto and/or therebetween; the operations/functions comprising: receiving at a first slave device (S1) a first version of a carrier and receiving at a second slave device (S2) and/or at the master device (M) a second version of the carrier; modifying an amplitude and/or a phase of the carrier that is received at a first one of the first slave device, the second slave device and the master device; and adding the carrier thus received and modified, to a version of the carrier that is received at a second one of the first slave device, the second slave device and the master device (it will be understood that said modifying and/or said adding may be performed at one or more of the slave devices and/or at the master (M) device). In some embodiments, said modifying comprises a frequency dependency over a frequency span of the carrier in that a value by which the amplitude and/or phase of the carrier is modified at a first frequency thereof differs from a value by which the amplitude and/or phase of the carrier is modified at a second frequency thereof; the second frequency differing from the first frequency. Accordingly, various diversity methodologies/systems/methods may be provided on forward link transmissions including but not limited to: selection diversity, maximum power diversity combining or maximal ratio diversity combining, as are known to those skilled in the art. It will be understood that the term "modifying an amplitude of the carrier" may mean, in some embodiments, reducing the amplitude of the carrier to substantially zero (e.g., making the amplitude of the carrier zero, near zero, or discarding (i.e., not using) the carrier altogether). Systems/methods of selection diversity, maximum power diversity combining and maximal ratio diversity combining are known to those skilled in the art and need not be described further herein. It will be understood that, in some embodiments, a first slave device (e.g., S1) may communicate directly with a second slave device (e.g., S2) by, for example, establishing a link therebetween, that may, in some embodiments, be a wireless link (not illustrated in FIG. 3C) and/or the first slave device may communicate indirectly with the second slave device via the master (M) device, via, for example, links SRL1 and SRL2, as is illustrated in FIG. 3C.

Still referring to FIG. 3C, information from M may be sent to S1 over link SRL1 during a first interval of time, and/or information from M may be sent to S2 over link SRL2 during a second interval of time. In some embodiments, the first and second intervals of time substantially overlap with one another and, in some embodiments, frequencies used over links SRL1/SRL2 comprise microwave frequencies that are greater than 10 GHz. In other embodiments, frequencies used over links SRL1/SRL2 comprise microwave frequencies that are greater than 20 GHz. In some embodiments, information received at S1/S2 is stored by S1/S2 and/or is processed by S1/S2 prior to being retransmitted at a later time by S1/S2 so that said information may be received by the BTS. Information from S1 may be sent to the BTS over link LRL1 during a third interval of time, and/or information from S2 may be sent to the BTS over link LRL2 during a fourth interval of time. According to some embodiments, the first interval of time may be substantially congruent/concurrent in time with the second interval of time (i.e., the first interval of time substantially overlaps with the second interval of time) and the third interval of time may be substantially congruent/concurrent in time with the fourth interval of time (i.e., the third interval of time substantially overlaps with the fourth interval of time); the third interval of time may be substantially devoid of being congruent/concurrent in time with the first interval of time and/or with the second interval of time; the fourth interval of time may be substantially devoid of being congruent/concurrent in time with the first interval of time and/or with the second interval of time; frequencies used to establish SRL1 and transmit information from M to S1 via SRL1 comprise frequencies that substantially differ from frequencies used to establish SRL2 and transmit information from M to S2 via SRL2; frequencies used to establish SRL1 and transmit information from M to S1 via SRL1 comprise unlicensed frequencies and/or frequencies licensed and/or used for satellite communications; frequencies used to establish SRL2 and transmit information from M to S2 via SRL2 comprise unlicensed frequencies and/or frequencies licensed and/or used for satellite communications; frequencies used to establish LRL1 and transmit information from S1 to the BTS using LRL1 comprise licensed frequencies and frequencies used to establish LRL2 and transmit information from S2 to the BTS using LRL2 comprise licensed frequencies; links LRL1 and LRL2 comprise respective first and second signals that are transmitted substantially co-frequency therebetween and further, are transmitted substantially simultaneously in time therebetween by S1 and S2; each one of links SRL1 and SRL2 comprises a linearly polarized signal; and each one of links SRL1 and SRL2 comprises a signal that is transmitted by M over a single polarization (i.e., each one of links SRL1 and SRL2 is devoid of first and second independent signals being transmitted by M on respective first and second polarizations that may be substantially orthogonal therebetween). It is noted that given the short range of links SRL1 and/or SRL2, dual polarization transmission from M to S1 and/or from M to S2 may not be necessary. That is, in some embodiments, at least some, or even all, of the information that M needs to send to S1 and/or S2 may be sent thereto by M using a transmission comprising a single polarization. However, in other embodiments, dual polarization transmission may be used on link SRL1 and/or SRL2. In some embodiments, dual polarization transmission over the long-range links LRL1 and/or LRL2 may be necessary/beneficial in order to, for example, satisfy bandwidth efficiency concerns over these long-range links. For example, dual polarization transmission may provide increased (e.g., doubled) transmission capability relative to transmitting over a single polarization.

Further embodiments may be based on combinations, sub-combinations and/or variations of the above. For example, frequencies used by the short-range links SRL1 and/or SRL2 may comprise frequencies that are licensed and/or used for terrestrial cellular communications and, in some embodiments, links SRL1 and SRL2 may further comprise unlicensed frequencies and/or frequencies licensed and/or used for satellite communications. In some embodiments, signals launched on short-range links SRL1 and/or SRL2 by M may comprise a circular polarization that may be a Right-Hand Circular Polarization ("RHCP") or a Left-Hand Circular Polarization ("LHCP"). In further embodiments, dual-Pol transmission, using any one of the techniques described above (or any combination thereof), may be used by M to convey information to S1 (i.e., to convey to S1 signals $\chi$ and y) over a first interval of time. Accordingly, for example, M may transmit ($\chi+\xi y$) on a V polarization thereof and further, M may transmit y on a H polarization thereof, as previously discussed in reference to FIG. 3A. At S1, based on the processing illustrated in FIG. 3B, for example, the signals $\chi$ and y may be attained/derived and/or regenerated. Alternatively, for example, as discussed earlier, instead of providing the signal $\chi+\xi y$ on the V port of the Transmitter Tx and providing the signal y on the H port of the Transmitter Tx, as is illustrated in FIG. 3A, the signal $y+\xi\chi$ may be provided on the H port of the Transmitter Tx and the signal $\chi$ may be provided on the V port of said Transmitter Tx.

Figure 3D:
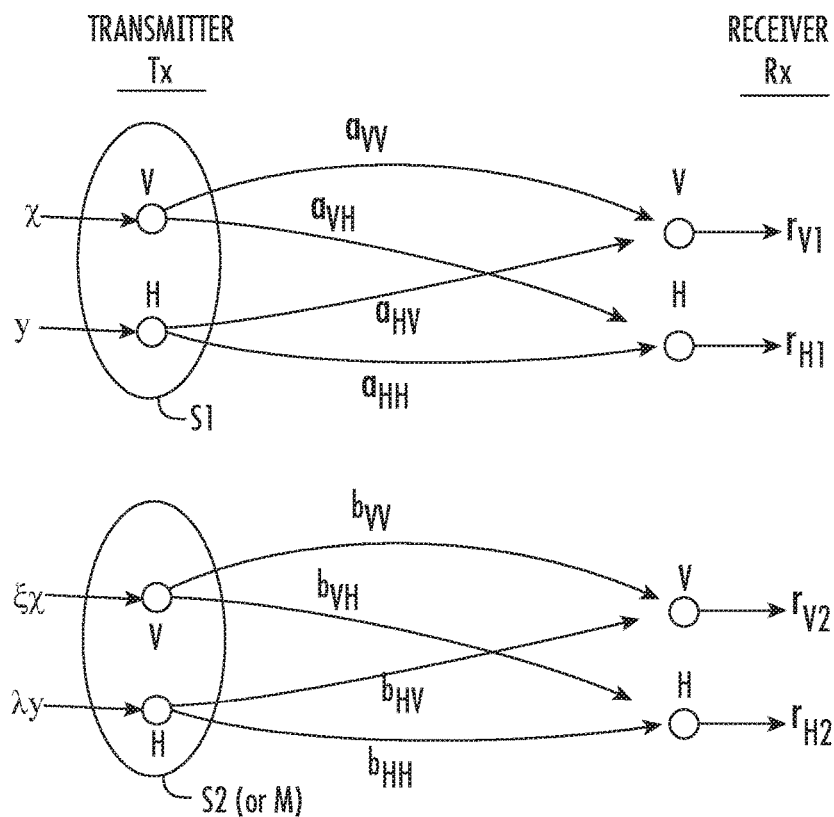
FIG. 3D is a schematic illustration of systems/methods according to further embodiments of the present invention.

Then, over a second interval of time that may, according to some embodiments, be substantially mutually exclusive with the first interval of time, S1 may establish link LRL1 between S1 and the BTS and may transmit over link LRL1 signals $\chi$ and y over respective V and H polarizations thereof, as is illustrated by the top portion of FIG. 3D. Also, over the second interval of time, the long-range link LRL2 may be established between M and the BTS (as previously discussed for the case when S2 is not present or is not needed), or between S2 and the BTS if S2 is present and is needed, and M (or S2) may transmit signals $\xi\chi$ and $\lambda y$ over respective V and H polarizations thereof, as is illustrated by the lower portion of FIG. 3D. Accordingly, at a BTS, for example, at V- and H-polarized receivers/antennas thereof, respective aggregate signals $R_{V1,2}$ and $R_{H1,2}$ may be received and written as:

$$R_{V1,2}=r_{V1}+r_{V2}=\chi(a_{VV}+\xi b_{VV})+y(a_{HV}+\lambda b_{HV}); \text{ and}$$

$$R_{H1,2}=r_{H1}+r_{H2}=\chi(a_{VH}+\xi b_{VH})+y(a_{HH}+\lambda b_{HH}).$$

Setting $\lambda=-(a_{HV}/b_{HV})$ and $\xi=-(a_{VH}/b_{VH})$ yields, $$R_{V1,2}=\chi[a_{VV}-(a_{VH}/b_{VH})\cdot b_{VV}]\equiv\chi\Phi;\text{and}$$

$$R_{H1,2}=y[a_{HH}-(a_{VH}/b_{VH})\cdot b_{HH}]\equiv y\Psi;$$

wherein the parameters $\Phi$ and $\Psi$ will, in general, be complex-valued and wherein, according to some embodiments, the signals $r_{V1}$ and $r_{V2}$ may appear substantially co-frequency therebetween and substantially simultaneously in time therebetween on a vertically polarized receiver/antenna of the BTS, yielding the aggregate signal $R_{V1,2}$ thereat, while substantially concurrently in time therewith, the signals $r_{H1}$ and $r_{H2}$ may appear substantially co-frequency therebetween and substantially simultaneously in time therebetween on a horizontally polarized receiver/antenna of the BTS yielding the aggregate signal $R_{H1,2}$ thereat. It will be understood that in accordance with some embodiments instead of $\chi$, $\chi$ divided by $\Phi$ may be transmitted and, instead of y, y divided by $\Psi$ may be transmitted (i.e., $\chi/\Phi$ and $y/\Psi$ may be transmitted instead of $\chi$ and y, respectively). Accordingly, thermal noise enhancement at the receiver may be avoided or reduced. This implies S1 and S2 having knowledge of the various channel coefficients defining $\Phi$ and $\Psi$.

It will be understood that instead of conveying $\chi$ and y by M to S1 over link SRL1 and then transmitting $\chi$ and y by S1 to the BTS over link LRL1 on respective V and H polarizations thereof; and further transmitting $\xi\chi$ and $\lambda y$ by M directly to the BTS over link LRL2 on respective V and H polarizations thereof, as described above, according to further embodiments M may convey $\chi$ and y to S1 over link SRL1 and may also convey $\chi$ and y to S2 over link SRL2 and then, have S1 and S2 transmit to the BTS, over respective links LRL1 and LRL2, in accordance with the top and bottom portions of FIG. 3D, respectively, in order to substantially achieve a result as discussed above. It will also be understood and appreciated by those skilled in the art that short-range link communications of the type as described above between M and S1 and/or between M and S2, may be extended to more than two slave devices. That is, according to some embodiments, M may be in short-range proximity with more than one or two slave devices that may be capable of being engaged by M (and/or the BTS) to coordinate reception and/or transmission of signals with M. Accordingly, in some embodiments, M may select based on certain criteria (with or without assistance from the BTS and/or the slave devices that may be capable of being engaged) a first set of slave devices, comprising at least one slave device, and may relay information relating to said selection of the first set of slave devices to the BTS. Based on said first set of slave devices, M may begin to transmit and/or receive information (voice and/or data) to/from the BTS using the first set of slave devices.

In some embodiments, M may, from time-to-time, re-evaluate its selection of said first set of slave devices and, responsive to said certain criteria and/or other concern(s), may select a second set of slave devices, comprising at least one slave device, may relay information to the BTS relating to the second set of slave devices and may begin to transmit and/or receive information (voice and/or data) to/from the BTS using the second set of slave devices and, in some embodiments, ceasing use of the first set of slave devices. It will be understood that the second set of slave devices may comprise a number of slave devices that differs from a number of slave devices included in the first set of slave devices. It will also be understood that the second set of slave devices may include one or more slave devices that are also included in the first set of slave devices or may not include any slave devices that are included the first set of slave devices. Further, it will be understood that said certain criteria and/or other concern(s) may comprise a distance between M and a slave device, a quality of a wireless link between M and a slave device, a quality of a wireless link between a slave device and a BTS, a battery level of a slave device, whether or not a slave device is already engaged in communications with a BTS, etc.

In some embodiments, M may wirelessly communicate with at least one slave device that is proximate to M. As used herein with respect to M, the term "wirelessly communicating" (or "wirelessly communicate") may refer to a preliminary communication, such as a handshake communication, that occurs between M and the at least one slave device before M wirelessly requests a processing capability of the at least one slave device.

In some embodiments, several sets of slave devices that may be used by M may be identified as such by M, by the BTS that is serving, or is in a position to serve, M and/or by the slave devices themselves; wherein such identification process may be based upon a comparison of position between that of M and the position of one or more slave devices (wherein such comparison may, in some embodiments, be performed by the BTS), may be based upon signal strength measurements made by M of signals emitted by the one or more slave devices, measurements made by the one or more slave devices of a signal emitted by M and/or measurements made by the BTS of signal strengths and/or positions. Accordingly, in some embodiments, M may "cycle" in accordance with a predetermined algorithm (or rotate in accordance with said predetermined algorithm) between said several sets of slave devices for reasons of, for example, providing diversity protection of communications performance and/or for reducing processing requirements and battery expenditure of any one specific slave device. In other embodiments, M may use a first set of slave devices, of a plurality of sets of slave devices, until a communications performance associated therewith degrades to below a predetermined threshold and/or until said certain criteria and/or other concern(s) indicate that a change may be made from said first set of slave devices to a second set of slave devices. Accordingly, M may switch to using the second set of slave devices of said plurality of sets of slave devices and may cease using the first set of slave devices.

It will be understood that in some embodiments, one or more slave devices may be connected to an Intranet/Internet, the BTS and/or a system element of an operator associated with the BTS via means other than wireless (not necessarily to the exclusion of wireless). It will also be understood that one or more slave devices may be fixed relative to the BTS and may be situated on a building or other structure. Any slave device discussed herein may comprise a smartphone that may be configured to communicate with a BTS using a Long-Term Evolution ("LTE") protocol and/or air interface that may be a 4G and/or a 5G protocol and/or air interface comprising, according to some embodiments, an Orthogonal Frequency Division Multiplexed ("OFDM") technology/standard/air interface, an Orthogonal Frequency Division Multiple Access ("OFDMA") technology/standard/air interface and/or a Single Carrier Frequency Division Multiple Access ("SC-FDMA") technology/standard/air interface. It will be understood that the inventive concepts and/or embodiments disclosed herein may be applied to any communications system/method including, without limitation, WiFi, BLUETOOTH®, fiber optical, terrestrial and/or space-based. It will also be understood that said inventive concepts and/or embodiments may be used in a Frequency Division Duplex ("FDD") or Time Division Duplex ("TDD") system/method.

It would indeed be unduly repetitious and obfuscating to describe in detail and/or illustrate every embodiment of each combination, sub-combination and/or variation that is possible using aspects, elements, architectures and/or parameters described above and illustrated in FIGS. 3A, 3B, and/or 3C. Accordingly, the present description shall be construed to constitute a complete written description that supports each and every possible combination, sub-combination and/or variation of aspects, architectures, elements and/or parameters described herein, and of the manner and process of making and using them, and shall support Claims to any such combination, sub-combination and/or variation.

Figure 3E:
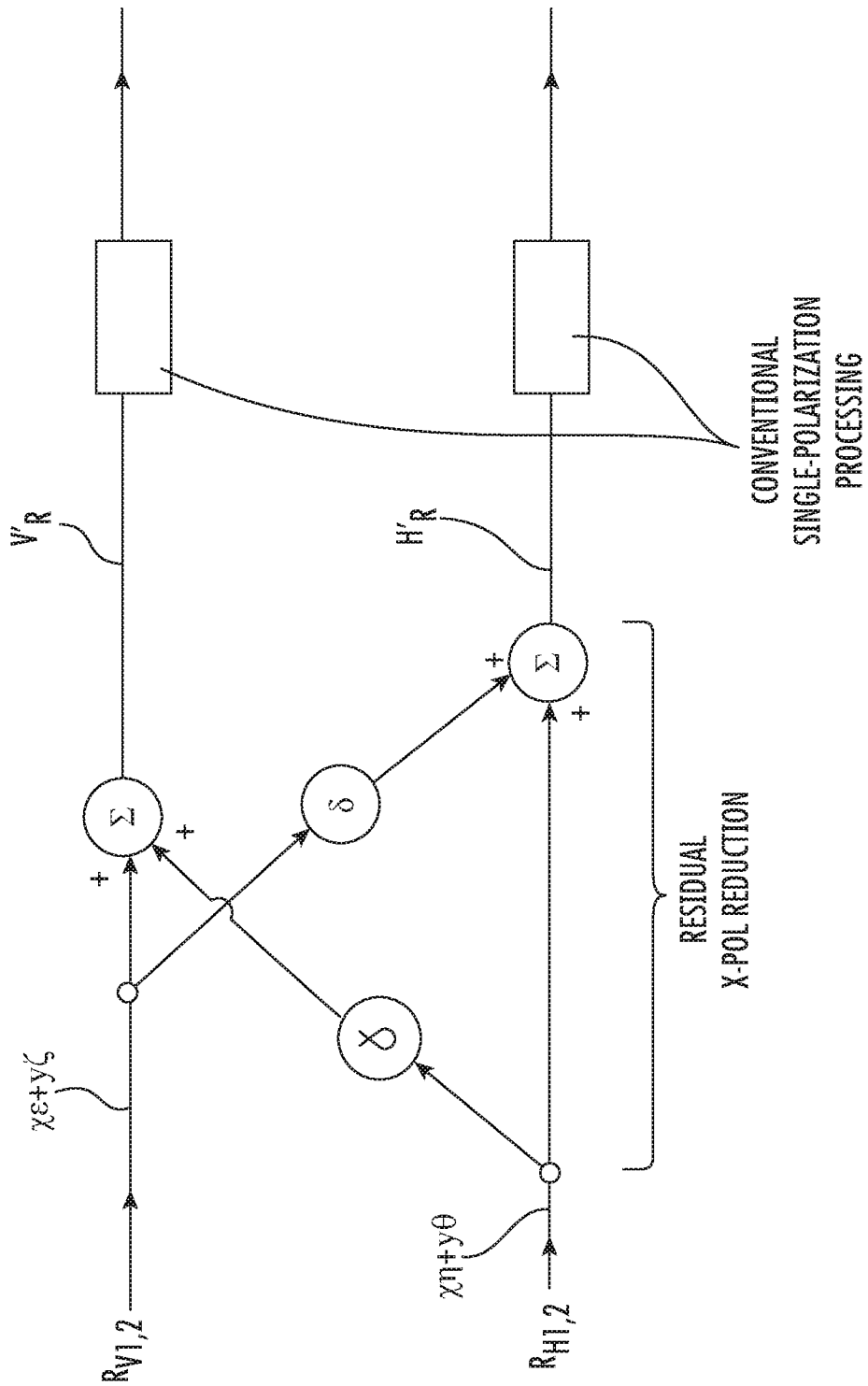
FIG. 3E is a schematic illustration of systems/methods according to yet additional embodiments of the present invention.

Now in reference to FIG. 3E, a receiver architecture is illustrated that may be used, in some embodiments, following a transmitter/receiver processing as described above and, in some embodiments, absent the transmitter/receiver processing described above, in order to reduce a residual X-Pol interference that may be present and further, to compensate for amplitude and/or phase channel-induced variations in each one of the co-pol signals (the co-pol signal on V being $\chi$, and the co-pol signal on H being y). For example, if due to a measurement error, estimation error and/or any other reason, instead of having $R_{V1,2}=\chi\Phi$ and $R_{H1,2}=y\Psi$ as may be desirable and described earlier (i.e., instead of having $R_{V1,2}$ and $R_{H1,2}$ each including only a desired co-pol signal while each being substantially devoid of X-Pol interference), we may have $R_{V1,2}=\chi\varepsilon+y\zeta$ and $R_{H1,2}=\chi\eta+y\theta$ as illustrated in FIG. 3E, wherein in that case the X-Pol interference components may have to be reduced (or substantially eliminated) in some embodiments; i.e., the term $y\zeta$ being the X-Pol interference component in $R_{V1,2}$ may have to be reduced (or substantially eliminated) and $\chi\eta$ being the X-Pol interference component in $R_{H1,2}$ may have to be reduced (or substantially eliminated). In some embodiments, reducing (or substantially eliminating) the X-Pol interference components as discussed above, may yield, or approximately yield, $V_R'=\chi[\varepsilon-\eta(\zeta/\theta)]$, having set, or approximately having set, $\gamma=-\zeta/\theta$; similarly, such embodiments may yield, or approximately yield, $H_R'=y[\theta-\zeta(\eta/\varepsilon)]$, by setting, or approximately setting $\delta=-\eta/\varepsilon$. As those skilled in the art will appreciate, the settings/equations above are based on an approach (or algorithm) such as a "zero-forcing" approach (or algorithm). However, in some embodiments, a minimum mean-squared error approach (or algorithm) may be used instead of the zero-forcing approach or in conjunction with the zero-forcing approach to derive other settings that may substantially equate with those given above for with the zero-forcing approach. As those skilled in the art know, as a value of noise (e.g., thermal noise) and/or interference becomes small (e.g., approaches zero), a performance and/or setting of the minimum mean-squared error algorithm approaches that of the zero-forcing algorithm. It will be understood by those skilled in the art that each one of the parameters listed above may, in general, be complex valued. It will further be understood that, in an expression such as, for example, $R_{V1,2}=\chi\varepsilon+y\zeta$ the quantity $\chi\varepsilon$ denotes a co-pol (or co-polarized) component of $R_{V1,2}$; wherein $R_{V1,2}$ denotes a signal associated with a vertically-polarized antenna of a receiver and wherein $\chi$ (or a function thereof) denotes a signal that is transmitted by a vertically-polarized antenna of a transmitter. Further, assuming that the signal y (or a function thereof) denotes a signal transmitted by a horizontally-polarized antenna of the transmitter, the quantity $y\zeta$ of $R_{V1,2}$ denotes a X-Pol interference component of $R_{V1,2}$.

In some embodiments, a transmitter and/or receiver may be equipped with a plurality of dual-pol antenna configurations such as, for example, a first V- and H-polarized antenna configuration, a second V- and H-polarized antenna configuration, and even a third V- and H-polarized antenna configuration. It will be understood that a designation (or label) such as V-polarized (or a H-polarized) for an antenna may be arbitrary. That is, for an antenna that is fixed relative to the Earth such a designation (or label) may be appropriate since an orientation of the antenna relative to a surface of the Earth may remain substantially invariant. However, in some situations, particularly in situations wherein an antenna orientation relative to a surface of the Earth may vary, such as may be the case in a mobile (e.g., smartphone) situation, a designation such as V-polarized (or H-polarized) may be of a lesser significance and may be viewed as an arbitrary designation. In such situations, one may use any other label, designation and/or discriminator to identify a first and a second polarization. It will further be understood that one or more of the various coefficients that are used herein to characterize one or more co-polarization (co-pol) channel gain(s), one or more cross-polarization (X-Pol) interference gain(s) and/or one or more correction (or interference reduction) gain(s)/parameter(s) such as $\alpha_{VV}$, $\alpha_{VH}$, $\beta_{HH}$, $\beta_{HV}$, $a_{VV}$, $a_{VH}$, $a_{HH}$, $a_{HV}$, $b_{VV}$, $b_{VH}$, $b_{HH}$, $b_{HV}$, $\varepsilon$, $\zeta$, $\eta$, $\theta$, $\xi$, $\lambda$, $\gamma$ and/or $\delta$, may not only be time dependent but may also be frequency dependent. Accordingly, in some embodiments, comprising, for example, an Orthogonal Frequency Division Multiplexed ("OFDM") and/or Orthogonal Frequency Division Multiple Access ("OFDMA") system/method, comprising a plurality of subcarriers, a first group of subcarriers, comprising one or more subcarriers, may be processed using a first set of coefficients and a second group of subcarriers, comprising one or more subcarriers, may be processed using a second set of coefficients that may differ from the first set of coefficients.

Figure 3F:
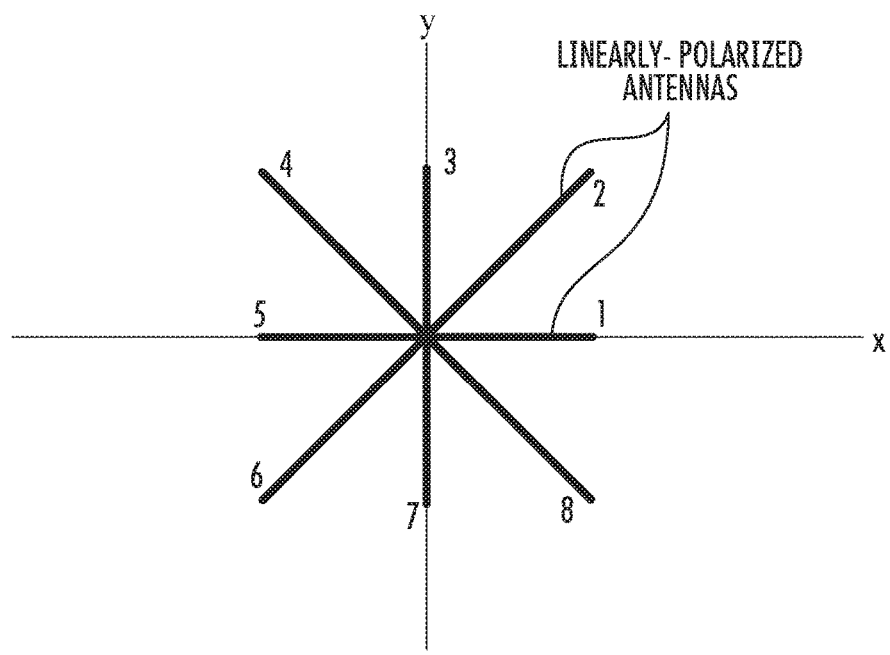
FIG. 3F is a schematic illustration of antenna systems/methods according to embodiments of the present invention.

FIG. 3F illustrates a transmitter/receiver comprising a plurality of, for example, linearly-polarized antennas. Antenna combination 4 and 2, for example, may be used to form a first V- and H-polarized configuration wherein, for example, antenna 4 may represent the V polarization and antenna 2 the H polarization. Antenna combination 5 and 3, for example, may be used to form a second V- and H-polarized configuration wherein, for example, antenna 5 may represent the V polarization and antenna 3 the H polarization. Similarly, antenna combination 3 and 1, for example, may be used to form a third V- and H-polarized configuration wherein, for example, antenna 3 may represent the V polarization and antenna 1 the H polarization, etc. It will be understood that the "x-axis" of FIG. 3F may represent an orientation that may be substantially parallel to a surface of the Earth at a location associated with the transmitter/receiver, and that the "y-axis" of FIG. 3F, may represent an orientation that may be substantially perpendicular to the x-axis, as is illustrated in FIG. 3F. It will also be understood that an angle difference between two adjacent antennas of FIG. 3F may be substantially 45° (45 degrees) in some embodiments. That is, in some embodiments, a difference in a polarization angle (such as a linear polarization angle) between, for example, antennas 1 and 2 of FIG. 3F may be substantially 45 degrees; a difference in a polarization angle (such as a linear polarization angle) between, for example, antennas 2 and 3 of FIG. 3F may be substantially 45 degrees; a difference in a polarization angle (such as a linear polarization angle) between, for example, antennas 3 and 4 of FIG. 3F may be substantially 45 degrees, etc. In other embodiments, other antenna orientations may be possible such as, for example, a difference in a polarization angle (such as a linear polarization angle) between, for example, antennas 1 and 2 of FIG. 3F being, for example, 30 degrees; a difference in a polarization angle (such as a linear polarization angle) between, for example, antennas 2 and 3 of FIG. 3F being, for example, 60 degrees; a difference in a polarization angle (such as a linear polarization angle) between, for example, antennas 3 and 4 of FIG. 3F being, for example, 30 degrees, etc. Many other antenna orientations are possible as those skilled in the art will appreciate.

In some embodiments, a first transmitter/receiver may use a first antenna combination such as, for example, an antenna combination comprising antennas 4 and 2 of FIG. 3F, for a first transmission/reception and then, the first transmitter/receiver may use a second antenna combination such as, for example, an antenna combination comprising antennas 5 and 3 of FIG. 3F, for a second transmission/reception. The decision to change from said first antenna combination to said second antenna combination may, in some embodiments, depend upon (and/or be responsive to) a motion of the first transmitter/receiver, a motion of a second transmitter/receiver that may be communicating (and/or exchanging information) with the first transmitter/receiver, a change in a propagation channel, a correction gain that may be calculated as a ratio, such as, for example $\xi$, $\lambda$, $\gamma$ and/or $\delta$ having exceeded a threshold value (in magnitude and/or in real/imaginary component(s) thereof), a correction gain that may be calculated as a ratio (as is, for example, illustrated in FIG. 3B) having exceeded a threshold value (in magnitude and/or in real/imaginary component(s) thereof) and/or a change in at least one coefficient that is used to characterize a co-polarization (co-pol) channel gain, a cross-polarization (X-Pol) interference gain and/or a correction (or interference reduction) gain (e.g., $\alpha_{VV}$, $\alpha_{VH}$, $\beta_{HH}$, $\beta_{HV}$, $a_{VV}$, $a_{VH}$, $a_{HH}$, $a_{HV}$, $b_{VV}$, $b_{VH}$, $b_{HH}$, $b_{HV}$, $\epsilon$, $\zeta$, $\eta$, $\theta$, $\xi$, $\lambda$, $\gamma$ and/or $\delta$). In some embodiments, instead of said change from said first antenna combination to said second antenna combination, both the first and second antenna combinations may be used substantially concurrently by said transmitter/receiver for the second and/or the first transmission/reception. In some embodiments two or more antenna combinations of the transmitter/receiver may be used substantially concurrently for one or more transmissions/receptions.

Figure 3G:
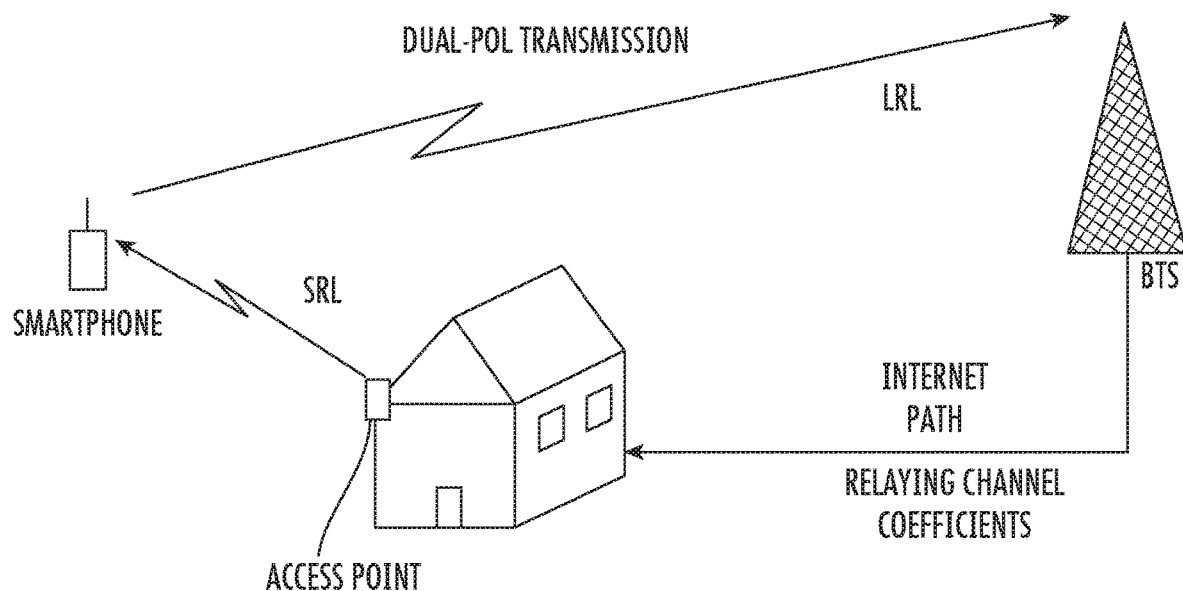
FIG. 3G is a schematic illustration of systems/methods according to embodiments of the present invention.

In some embodiments, as is illustrated in FIG. 3G, a BTS may process one or more signals, such as, for example, one or more pilot signals, that may be transmitted by a device, such as a smartphone, using an OFDM/OFDMA protocol or air interface. The BTS may determine (or estimate) from such processing one or more channel coefficients such as those discussed above: $\alpha_{VV}$, $\alpha_{VH}$, $\beta_{HH}$, $\beta_{HV}$, $a_{VV}$, $a_{VH}$, $a_{HH}$, $a_{HV}$, $b_{VV}$, $b_{VH}$, $b_{HH}$ and/or $b_{HV}$. The BTS may then relay said one or more channel coefficients, as may be appropriate, as may be needed and/or as may be necessary, to a smartphone in order for the smartphone to, for example, perform processing as described earlier. As is illustrated in FIG. 3G, in some embodiments the BTS may receive and process a transmission from a smartphone (that may be a dual-polarization transmission, or "Dual-Pol Transmission" as is labelled in FIG. 3G) over a link, that may be a Long Range Link (labelled as "LRL" in FIG. 3G) and then, the BTS may relay said one or more channel coefficients to the smartphone using, for example, an internet connection (and/or any other transmission means) that may be based on wireline and/or wireless connectivity with an access point (e.g., a WiFi access point, a femtocell, a microcell, a picocell and/or any other device including smartphone(s)) that may be proximate to the smartphone that is illustrated in FIG. 3G. The access point may relay said one or more channel coefficients to the smartphone via a link that may be a Short-Range Link (labelled as "SRL" in FIG. 3G). The SRL may be based upon unlicensed and/or licensed frequencies that may comprise frequencies licensed for terrestrial and/or satellite usage. It will be understood that even though the various communications links of FIG. 3G are illustrated as unidirectional links, one or more of these links may be bidirectional.

It would indeed be unduly repetitious and obfuscating to describe in detail and/or illustrate every embodiment of each combination, sub-combination and/or variation that is possible using aspects, elements, architectures and/or parameters described above and illustrated in FIGS. 3A, 3B, 3C, 3D, 3E, 3F and/or 3G. Accordingly, the present description shall be construed to constitute a complete written description that supports each and every possible combination, sub-combination and/or variation of aspects, architectures, elements and/or parameters described herein, and of the manner and process of making and using them, and shall support Claims to any such combination, sub-combination and/or variation.

Systems/Methods of Disabling and/or Enabling Smartphone Functions

For reasons of, for example, safety, it may be desirable to suspend/disable and/or silence one or more functions/features of a smartphone (and/or any other device that may be a communications device) when a user of the smartphone (and/or said any other device) is operating a motor vehicle (i.e., is driving a motor vehicle) and/or is engaged in some other activity that may require such action. More specifically, a function/feature of the smartphone and/or said any other device, such as, for example, a function/feature relating to data, texting, voice and/or video may be suspended/disabled and/or silenced responsive to an operating state of the user of the smartphone and/or said any other device (e.g., responsive to a driving state of the user of the smartphone and/or said any other device). Other operating states of the user may, for example, be a sleep/relaxation state, a concentration state, a down-time state (e.g., a vacation state and/or a travel state), a not feeling well state (e.g., a state of being sick), a do not disturb state, etc., as may, for example, be defined/specified by the user of the smartphone, an employer of the user of the smartphone, a guardian/parent of the user of the smartphone, a geographic area where the user is in, a building where the user is in (such as, for example, a concert hall), a government/police authority, a velocity/acceleration associated with the user, a weather condition, a background noise level (or a lack thereof) and/or a calendar entry associated with the user.

It will be understood that although the discussion below is, for the sake of simplicity and/or clarity, focused on disabling/enabling functions/features of a smartphone, this is not presented so for limitation; the discussion is also applicable for said any other device that may, according to some embodiments, be a communications device other than a smartphone.

In some embodiments, said function/feature of the smartphone relating to data, texting, voice and/or video may, for example, comprise suspending/disabling and/or silencing sending and/or receiving by the smartphone data, texting, voice and/or video responsive to said operating state of the user of the smartphone (e.g., responsive to said driving state of the user of the smartphone). In other embodiments, said function/feature of the smartphone relating to data, texting, voice and/or video may, for example, comprise suspending/disabling and/or silencing a notification by the smartphone to the user, responsive to the operating state of the user (e.g., responsive to the driving state of the user), that data, texting, voice and/or video has been received, is being received and/or the smartphone is being paged. According to some embodiments, even though said function and/or feature of the smartphone may be suspended/disabled and/or silenced responsive to said operating state of the user of the smartphone (e.g., responsive to said driving state of the user of the smartphone), a component of said data, texting, voice and/or video that is received at/by the smartphone may be stored by the smartphone at the smartphone, at an access point serving the smartphone and/or at a base station (e.g., a cellular base station) serving the smartphone and, at a later time, such data that is stored (or a portion and/or measure/indicator thereof) may be presented to the smartphone and/or by the smartphone to the user responsive to said operating state (e.g., responsive to said driving state) of the user having changed from an "active operating" state (e.g., having changed from an "active driving" state) to a "non-active operating" state (e.g., a "non-driving" state).

In some embodiments, said "active driving" state comprises the motor vehicle having been placed/positioned in a state other than a park state (e.g., the motor vehicle gears having been disengaged from a park state and having been placed/positioned in, for example, a drive forward state, a drive backward state or neutral state). Accordingly, in some embodiments, said "non-driving" state comprises the motor vehicle gears having been placed/positioned in the park state. In general, said "active operating" state comprises a sleep/relaxation state, a concentration state, a driving state, a down-time state (e.g., a vacation state and/or a travel state), a not feeling well state (e.g., a state of being sick), being in a predetermined geographic area, being in a predetermined building (such as, for example, in a concert hall) and/or a do not disturb state, as may, for example, be defined/specified by the user of the smartphone, by a signal that is being radiated in the vicinity of the smartphone, by a calendar associated with the user, by an employer of the user, by a guardian/parent of the user, by the predetermined geographic area/building and/or by an authority (e.g., government and/or police). It will be understood that, in accordance with some embodiments, having first defined what an "active operating" state is, it follows that said "non-active operating" state is a state that is devoid of any attribute/aspect that is used to define the "active operating" state.

According to some embodiments, said function of the smartphone relating to data, texting, voice and/or video may be suspended/disabled and/or silenced selectively responsive to, for example, a predetermined priority that may be associated with an entity that is paging the smartphone and/or an entity that the smartphone is attempting to page and/or communicate with. For example, even though the motor vehicle may be in the active driving state, if a security company such as, for example, ADT or CPI has been engaged by the driver and is calling, texting and/or otherwise attempting to communicate with the driver, the driver may want such a call/communication to go through while other calls/communications (say, for example, those from friends, colleagues, telemarketers, etc.) may be blocked. Similarly, if, for example, a wife, daughter, son or brother of the driver is calling or has sent a text message, the driver may want such a call and/or text message to selectively go through while other calls and/or text messages may be blocked (i.e., may be stored, as previously discussed, and presented to the driver at a later time).

According to embodiments of inventive concepts presented herein, a motor vehicle (or simply a vehicle) may ascertain/establish an input from a driver thereof responsive to the motor vehicle having been disengaged from a park state. Said input from the driver of the motor vehicle may, for example, comprise a photograph/image/scan of the driver, comprising the driver's face and/or facial features (e.g., eyes, nose, mouth, hair, forehead and/or wrinkles thereof, etc.) and/or one or more other features of the driver that may comprise one or more physiological features of the driver such as, for example, data associated with a handprint and/or a fingerprint of the driver, data associated with a sound/voice of the driver and/or any other physiological feature of the driver that may provide a measure that may be unique or substantially unique to the driver. The motor vehicle may be equipped with a camera/scanner that may be triggered by, and be responsive to, the motor vehicle having attained and/or having been placed in a state other than the park state. Said input from the driver of the motor vehicle may be ascertained by the motor vehicle and/or may be processed by the motor vehicle upon having disengaged the motor vehicle from the park state (or soon thereafter) and/or at other times thereafter. It will be understood that the term "substantially unique" as used herein means that there is a very small chance/probability that said measure may belong to, and be associated with, a person other than the driver. It will also be understood that the term "small chance/probability" includes zero, non-zero but infinitesimally small, and greater than infinitesimally small but small (e.g., less than or equal to, for example, $10^{-3}$, $10^{-4}$, $10^{-5}$ or less than or equal to $10^{-6}$, etc.).

Having ascertained/established by the motor vehicle the input from the driver thereof, as described above (or even prior thereto in some embodiments), the motor vehicle may transmit an interrogation signal requesting from each smartphone that is able to receive said interrogation signal a response. Said interrogation signal may be a low-power, short-range interrogation signal so as to be received only by smartphones that are within the motor vehicle and/or proximate thereto. The interrogation signal may, according to some embodiments, trigger a smartphone that receives it to transmit a facial and/or other feature of its user and/or data associated therewith. As may be appreciated by one skilled in the art, a smartphone may be configured to perform various operations/functions comprising storing data associated with a fingerprint of a user; taking an image of the user (that may be a facial image comprising one or more features, aspects and/or characteristics of the user's nose, eye(s)/cornea(s), lip(s), forehead, hair, etc.) and storing such image and/or other facial features of the user; and performing such functions transparent to the user and, in some embodiments, doing so following the user handling the smartphone and/or looking at its display. Accordingly, each smartphone that receives the interrogation signal may provide a response to the motor vehicle (and/or to another processing facility), comprising such features/data associated with its user.

The features/data associated with one or more users of one or more respective smartphones that may have provided an interrogation response may be received by/at the motor vehicle (and/or may also be received by/at said another processing facility) and may be processed thereat in order to detect a match between data provided by (or ascertained from) the driver of the motor vehicle and data provided by (or ascertained from) the one or more users of said one or more respective smartphones; it is understood that the motor vehicle may also be configured to perform operations comprising sending/forwarding data ascertained from the driver of the motor vehicle to said another processing facility. A match may be found and may be used to identify one smartphone of said one or more respective smartphones that may be associated with the driver of the motor vehicle and may, therefore, need to be suspended/disabled and/or silenced (in at least some functions/features thereof) for a period of time during which the motor vehicle is disengaged from the park state.

Interrogation responses may, according to some embodiments, be staggered in time (deterministically, randomly and/or pseudo-randomly) in order to reduce a probability of collision between a first response from a first smartphone and a second response from a second smartphone. In the event of a collision or a no match situation (which may be due to a collision) the motor vehicle may transmit the interrogation signal again. According to some embodiments, the motor vehicle may ascertain the input from the driver periodically (or otherwise) and may also transmit an interrogation signal periodically (or otherwise) while the motor vehicle is in a state other than the park state; for example, the motor vehicle may do so once every 250, 500, 750, or 1000 milliseconds; or at any other interval of milliseconds such as, for example, once every 2500 milliseconds. In some embodiments, interrogations and/or responses thereto may use and/or may be based upon a short-range communications link and may use a BLUETOOTH®-based protocol and/or any other protocol. In other embodiments, interrogations may use and/or may be based upon a short-range communications link and may use a BLUETOOTH® protocol or any other protocol, while responses thereto may use and/or may be based upon a short-range communications link and/or a long-range communications link and may use a BLUETOOTH®-based protocol or any other protocol.

It will be understood that, instead of first ascertaining by the motor vehicle said input from the driver, then transmitting the interrogation signal and then receiving response(s) from the interrogation signal, as is described above, such order of operations may be changed according to some embodiments. For example, the interrogation may be transmitted first (say after the motor vehicle is disengaged from the park state), followed by one or more responses to the interrogation, followed by the motor vehicle ascertaining the input from the driver of the motor vehicle. In some embodiments two or more of the functions mentioned above may be performed simultaneously or substantially simultaneously; and other combinations of functions and/or sequence of functions may be performed. It will also be understood that instead of processing one or more responses from the interrogation at/by the motor vehicle and/or at/by a facility other than the motor vehicle in order for the motor vehicle and/or said facility other than the motor vehicle to decide which smartphone is associated with the driver of the motor vehicle in order to potentially put that smartphone under a restriction as previously discussed, the motor vehicle may transmit the input from the driver of the motor vehicle and may have one or more smartphones make decisions as to which one of the smartphones needs to potentially be restricted (suspended/disabled and/or silenced, as discussed earlier). In some embodiments both may be done. That is, one or more responses from the interrogation may be received and processed at/by the motor vehicle and/or at/by said facility other than the motor vehicle in order for the motor vehicle and/or the other facility to decide which smartphone is associated with the driver of the motor vehicle (and then potentially put that smartphone under a restriction as previously discussed), and also, the motor vehicle may transmit the input from the driver of the motor vehicle and may have one or more smartphones make decisions as to which one of the smartphones needs to potentially be restricted (i.e., suspended/disabled and/or silenced, as discussed earlier). Combinations of performing functions, other than those described above, are also possible.

According to some embodiments of inventive concepts presented herein, a user of a smartphone may voluntarily decide to configure his/her smartphone to perform various functions including allowing the smartphone to be disabled/suspended and/or silenced in one or more features/modes thereof in the event the user of the smartphone is driving a motor vehicle (as decided by the motor vehicle, by a facility other than the motor vehicle and/or by the smartphone, as described earlier), and responsive to a command to disable/suspend and/or silence that may be received and/or be generated at/by the smartphone. Further, the user of the smartphone may selectively allow for some functionality of the smartphone to continue to be enabled even though the user is driving and/or to allow selectively for some entities (persons and/or companies) to continue to have communications access to/with the smartphone. To do all this, the user of the smartphone may access a program, web page, or menu (say from Verizon, for example, if the user of the smartphone is a Verizon subscriber), present his/her smartphone number and then have said program, web page or menu guide the user, to configure his/her smartphone. Simple, straightforward questions may be presented to the user, such as, for example:
(1) Do you want certain functions of your smartphone to be disabled while you're driving?
If the answer is yes, then a follow-on question may be:
(2) Please select all functions that you would like disabled while driving; the options presented may be:
voice calls and/or ring tone(s) associated therewith;
texting and/or notifications thereof;
email presentation and/or notifications associated therewith;
one or more combinations of the above;
. . . etc.

Other questions may have to do with selectively allowing one or more business and/or one or more persons/individuals to get through to, and communicate with, the user, in substantially real time, even when the user is driving. Such businesses and/or individuals may be defined by and/or be specified by providing their phone number(s), name(s) and/or other coordinates such as, for example, an address or addresses and/or a code or codes that may have been negotiated a priori between the user and a person or between the user and a business.

A parent may exercise control over a child's smartphone functionality conditioned upon a driving state of the child. Accordingly, the parent may exercise control over one or more functions of a smartphone being used by said child in that, responsive to a driving state of the child (as sensed, for example, by said child's smartphone) one or more functions of the child's smartphone may be suspended/disabled/silenced during a time interval of driving activity by the child. Said driving state and/or driving activity of the child may comprise a velocity, a time-of-day and/or an acceleration. Further, a person may exercise control over one or more functions of any smartphone that is that person's legal/financial responsibility responsive to a driving state and/or driving activity as sensed, for example, by said any smartphone; wherein said driving state and/or driving activity may comprise a velocity, a time-of-day and/or an acceleration.

An account manager/owner may exercise control over a plurality of smartphones associated with an account that is managed/controlled/owned by said account manager/owner. Accordingly, the account manager/owner may exercise control over one or more functions of at least some smartphones associated with said account in that, responsive to a driving state and/or driving activity of a user of a smartphone of said at least some smartphones the one or more functions of the smartphone may be suspended, disabled and/or silenced during a time interval of driving activity by the user of the smartphone.

A carrier (such as, for example, Verizon), a State (such as, for example, North Carolina), a City (such as, for example, Raleigh, N.C.), a neighborhood, a building (such as, for example, a concert hall), a location (such as, for example, a runway of an airport), a county, certain roads, highways, freeways, etc. may exercise control over one or more functions of at least some smartphones, and in some embodiments all smartphones, that may be associated with and/or may be within said carrier, State, City, neighborhood, building, location, certain roads, highways and/or freeways responsive to a driving state and/or driving activity of a user of a smartphone of said at least some smartphones or said all smartphones; and/or responsive to a velocity, altitude and/or acceleration/deceleration of at least one smartphone. In some embodiments, the carrier, the State, the City, the neighborhood, said certain roads, highways, freeways, etc. may exercise control over said one or more functions of said at least some smartphones provided the users of the at least some smartphones have provided a consent. In some embodiments, the consent may not be required.

In some embodiments, all smartphones that respond to an interrogation may be disabled/suspended and/or silenced; including that of a driver as well as any smartphone(s) associated with passenger(s). Doing so may avoid a scenario whereby prior to initiating driving a person who intends to be a passenger "handles" the phone a person who intends to be a driver and the person who intends to be the driver handles the phone of the person who intends to be the passenger. Accordingly, upon interrogation the driver's phone may send a picture, features and/or data associated with the passenger and the passenger's phone may send a picture, features and/or data associated with the driver thus potentially causing the vehicle to disable the passenger's phone and not that of the driver. Thus, in some embodiments, both smartphones may be disabled (i.e., all smartphones that respond to an interrogation may be disabled). In some embodiments, all smartphones that respond to an interrogation may be disabled responsive to at least one smartphone having detected data that does not correlate with data stored in the smartphone relating to an earlier time (e.g., facial features/picture taken by the smartphone prior to, and a short while before, the interrogation, differing from that/those stored in the smartphone at earlier times).

Figure 4:
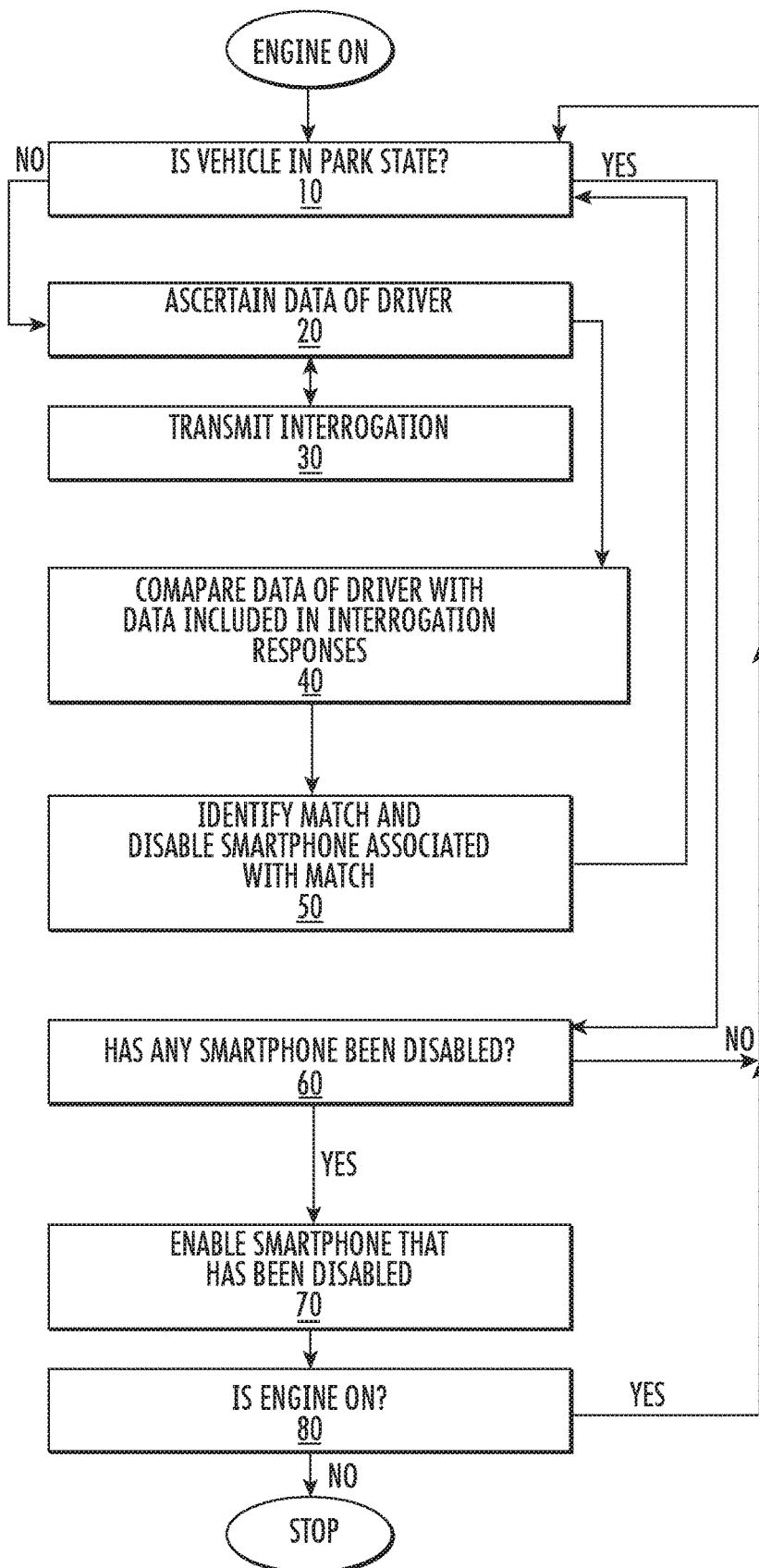
FIG. 4 is a flow chart of systems/methods according to further embodiments of the present invention.

FIG. 4 is a block diagram (or flow chart) that illustrates aspects of inventive concepts disclosed herein. The process/algorithm shown in FIG. 4 starts operating following turning on of the engine of the motor vehicle. If the motor vehicle (or simply the vehicle) is determined to be in a Park State (at block 10) then a determination is made at block 60 as to whether or not any smartphone has been disabled prior to the vehicle being put in the Park State. Clearly, if the engine of the vehicle just turned on and the driver hasn't had a chance yet to place the vehicle in any state other than the Park State, no smartphone would have been disabled and the answer at block 60 would be No. However, if the vehicle had been driving and just arrived at a destination (and the driver just placed the vehicle in the Park State), then the answer at block 60 is Yes and those smartphones that may had been disabled may now be enabled as is indicated at block 70. If the engine of the vehicle is still on, as determined at block 80, the process/algorithm jumps to, and continues at, block 10 to account for the possibility that the Park State may be disengaged in the event the driver decides to continue driving to another destination. Said jumping to, and continuing at, block 10 may, in some embodiments occur following 500 milliseconds, 1000 milliseconds or any other number of milliseconds following the decision at block 80.

If at block 10 it is determined that the vehicle is in a state other than the Park State, then the process/algorithm jumps to, and continues at, block 20. Following ascertaining data of the driver at block 20, the interrogation signal is transmitted at block 30, and the comparison indicated at block 40 is made (not necessarily in that order). A match associated with the smartphone of the driver is determined in block 50 and the driver's smartphone is disabled.

Figure 5:
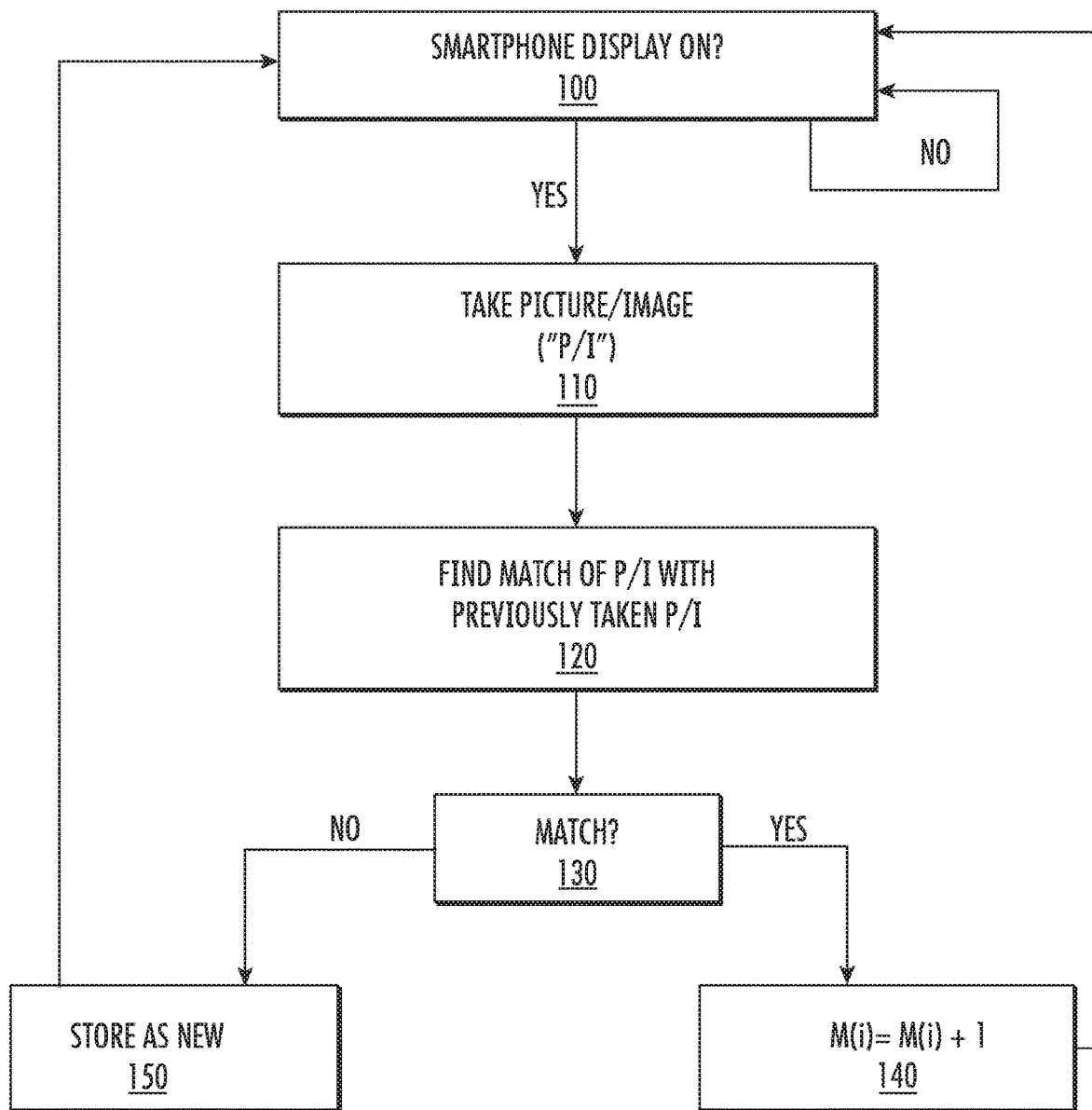
FIG. 5 is a flow chart of systems/methods according to yet further embodiments of the present invention.

FIG. 5 illustrates functions that may be performed by a smartphone in order to gather data associated with a user thereof. When a smartphone is handled by a user, one of the first things that the user does is to look at and observe the display/screen of the smartphone. Further, as the user continues to handle the smartphone (by reading/sending email(s), reading/sending text message(s), looking at pictures and/or downloading data, etc.) the user continues to look at and observe the display of the smartphone. Accordingly, responsive to the display of a smartphone becoming lit (block 100 of FIG. 5), and, in some embodiments, during a time interval when the display of the smartphone may not be lit, the smartphone may, according to some embodiments, take a Picture/Image ("P/I") at block 110. Next, the purpose of function(s) performed at block 120 relate(s) to categorizing said P/I. If, for example, said P/I relates to a picture of facial features of the user and such facial features are already held/stored, for example, within the smartphone, then a match between the P/I and said features that are already held/stored may be declared at block 130 and a counter at block 140 may, responsively, be incremented, for example, by one unit. Otherwise, if a match is not declared at block 130, the P/I taken may be stored as a new P/I to be compared at a later time with whatever further P/I is taken by the smartphone at block 110. The phrase "display of a smartphone becoming lit" as used herein means that the display of the smartphone is in sleep mode (e.g., is dark/black, or has no image at all).

In some embodiments, each P/I that fails to generate a match at block 130 may be stored as a new P/I at block 150 and may be associated with a separate counter (i.e., may be associated with its own unique counter) which may be incremented at a next time when a match is determined to have occurred relative to that P/I. In some embodiments, only one P/I (i.e., a single P/I) is taken by the smartphone responsive to the display/screen of the smartphone having been lit and/or turned on. In other embodiments, a new P/I may be acquired/taken by the smartphone periodically (for example, once every X milliseconds) as long as the display of the smartphone remains on/lit. In some embodiments, a P/I that is associated with a counter whose value is greater than each one of all other counters (associated with other Pictures/Images ("P/Is") that have been taken by the smartphone) may be associated with relevant data of the user of the smartphone and may comprise data that is included in the interrogation response that is sent by the smartphone to the motor vehicle responsive to the motor vehicle having issued an interrogation (see block 40 of FIG. 4). In some embodiments, all other data associated with any and all P/Is not having a maximum count is ignored and is not included in the interrogation response.

In further embodiments, responsive to a first predetermined value of geographic position that may include altitude and/or velocity/acceleration that may be associated with a smartphone, as may be sensed by the smartphone itself using one or more smartphone-based sensors/processors and/or by a system that is in communications with the smartphone, said smartphone may initiate a silencing/disablement of certain functions and/or enablement of certain other functions including placing itself in "airplane mode". The term "airplane mode" is known to those skilled in the art and need not be described/defined further herein. In addition to the above, according to some embodiments, responsive to a second predetermined value of geographic position that may include altitude, velocity (or a steady decrease thereof), acceleration and/or deceleration, that may be associated with the smartphone, as may be sensed by the smartphone itself using one or more smartphone-based sensors/processors and/or by a system that is in communications with the smartphone, the smartphone may resume "normal mode functionality"; wherein said "normal mode functionality" means functionality associated with the smartphone prior to the smartphone having, for example, placed itself in airplane mode and/or prior to having initiated said silencing/disablement of certain functions and/or enablement of certain other functions. This means that said "normal mode functionality" may be stored by the smartphone and/or by the system that is in communications with the smartphone. Said first and/or second predetermined values of geographic position including altitude and/or velocity acceleration may, according to some embodiments, be threshold values of geographic position including altitude and/or velocity acceleration.

In a building environment, for example, in a concert hall building environment, instead of relying on individuals to silence their smartphones at the beginning of a performance, a predetermined signal may be radiated by said building to instruct/command at least some (and in some embodiments all) smartphones to silence themselves. A smartphone may sense a level of background noise and, responsive to a level thereof may adjust a function thereof such as, for example, a volume, a ring level and/or a vibration duration and period associated therewith.

Other inventive concepts that relate to using/configuring a smartphone include configuring a tabletop, or other surface, denoted simply herein as "surface", with functionality comprising communicating with a smartphone that is on/near the surface and displaying on said surface via smartphone-to-surface communications (that may be near field communications) content that is delivered via the smartphone to the surface. For example, a person who is at a friend's house may desire to share photographs and/or other information with the friend. Accordingly, the person may place his/her smartphone, for example, on a suitably configured tabletop at the friend's house and thus display, on said tabletop, said photographs and/or other information responsive to the person having provided an authorization to the smartphone to do so. The content displayed on the tabletop may be content that resides within the smartphone and/or in a server/cloud.

Additional inventive concepts that relate to using a smartphone include configuring one or more devices in, for example, a home/office environment to perform functions comprising connecting and/or communicating with a smartphone, using, for example, a WiFi technology, an Ultra-Wide-Band ("UWB") technology and/or any other technology/protocol over licensed and/or unlicensed frequencies, while the smartphone is within, or proximate to, said home/office; and configuring the smartphone so as to be connecting and/or communicating with the one or more devices in said home/office and performing functions comprising connecting and/or communicating with said one or more devices, using said WiFi technology, UWB and/or other technology/protocol over licensed and/or unlicensed frequencies, while the smartphone is within, or proximate to, said home/office. Accordingly, the smartphone may be connecting and/or communicating with flat screen(s), camera(s), speaker(s), microphone(s) of the home/office.

In some embodiments, the smartphone may be communicating with at least some devices of the home/office that are most proximate thereto while refraining from communicating with one or more devices of the home/office that are at a further distance therefrom, but connecting therewith, so that a visual/audio associated with the smartphone may be presented via said at least some devices that are most proximate thereto; such as, for example, flat screen(s), camera(s), speaker(s), microphone(s); not necessarily to the exclusion of presenting said visual/audio via the relatively little display and/or other input/output of the smartphone. As used herein and within the present paragraph, the term "connecting" means the smartphone being cognizant of a presence of a device and being on stand-by relative to delivering and/or receiving said visual/audio to/from that device; whereas the term "communicating" as used herein and within the present paragraph means delivering and/or receiving said visual/audio to/from that device. In some embodiments, the "refraining" aspect as described above and within the present paragraph may not be used (i.e., may be disabled). That is, the smartphone may be configured so as to be communicating with all devices of the home/office.

It would be unduly repetitious and obfuscating to describe in detail and/or illustrate every combination and/or sub-combination of the plurality of embodiments that are described herein and relate to disabling/enabling smartphone functions responsive to safety concerns and/or other reasons. Accordingly, the present specification, including any and all drawings thereof and Claims thereof shall be construed to constitute a complete written description of all combinations and/or sub-combinations of the embodiments described herein, and of the manner and process of making and using them, and shall support Claims to any such combination and/or sub-combination.

Systems/Methods of Providing a Service, Such as Providing Power, Wirelessly

In some embodiments of inventive concepts, plurality of radiating devices, each one of which may comprise and/or be connected to a plurality of antennas, may be configured to radiate electromagnetic power (i.e., electrical power), substantially simultaneously with one another, such that at a receiving antenna a plurality of waveforms, corresponding to a plurality of signals that have been radiated by said plurality of devices, combine substantially coherently (i.e., combine substantially in-phase and/or on a voltage basis) with one another. Accordingly, a total power radiated by each one of said plurality of devices may be reduced and/or minimized while providing a desired level of electrical power to the receiving antenna.

The receiving antenna may be connected/coupled to a device to be powered and/or charged, such as, for example, a smartphone, a computer, a lamp, etc., and/or a battery thereof. Further, the receiving antenna, also comprising transmission capability in some embodiments, may comprise a structure on to which the device to be powered and/or charged may be placed. Accordingly, in such embodiments, the receiving antenna may, for example, be coupled to said device to be powered and/or charged inductively and/or via any other near field technique that may be known to those skilled in the art.

It will be understood that the term "antenna" or "antennas" as used herein includes any passive and/or active element/component that is responsive to an electromagnetic field and provides an output that is a measure of said electromagnetic field. An antenna or antennas may comprise any shape and/or structure (e.g., one-dimensional, two-dimensional, three-dimensional, circular, cylindrical, planar/patch), may be linearly polarized and/or circularly polarized, and may comprise one or more materials including conductive material(s), semiconductor(s), nonconductor(s)/insulator(s) and/or crystal(s).

A plurality of antennas that is associated with and/or connected to a radiating device of said plurality of radiating devices may, according to some embodiments, transmit/radiate a respective plurality of signals, comprising respective amplitudes and/or phases that may generally differ from one another, in order to direct a total power being radiated towards a direction associated with said receiving antenna. In order to do so, according to some embodiments, the receiving antenna that may be connected to a device to be powered and/or to a battery thereof may provide information to said radiating device of said plurality of radiating devices that is associated with and/or connected to said plurality of antennas. The information provided may comprise: location information; an identity that, according to some embodiments, may be uniquely associated with said receiving antenna, device and/or battery that may be associated therewith; and/or one or more pilot signal(s) that may convey to said plurality of antennas associated with and/or connected to said radiating device of said plurality of radiating devices channel information.

Accordingly, the receiving antenna that may be connected to a device to be powered and/or to a battery thereof may provide information to said radiating device of said plurality of radiating devices that is associated with and/or connected to said plurality of antennas and, responsive to such information, the plurality of antennas that is associated with and/or connected to the radiating device of said plurality of radiating devices may transmit/radiate, according to some embodiments, a respective plurality of signals, comprising respective amplitudes and/or phases that may generally differ from one another, in order to direct a total power being radiated substantially towards said receiving antenna while reducing power levels towards locations other than that associated with said receiving antenna. Doing so may, according to some embodiments, be based upon one or more of systems/methods described in U.S. patent application Ser. No. 15/868,281, filed Jan. 11, 2018, entitled Conveying Information via Auxiliary Device Selection, or may be based on a combination and/or sub-combination of said systems/methods of said U.S. patent application Ser. No. 15/868,281, which is assigned to the assignee of the present invention, the disclosure of which is hereby incorporated herein by reference in its entirety as if set forth fully herein. For example, FIG. 2 of U.S. patent application Ser. No. 15/868,281 and the accompanying description thereof therein may serve as a basis for an embodiment in which power is delivered to one or more devices (such as, for example, devices $AD_1$ through $AD_4$ of FIG. 2 of U.S. patent application Ser. No. 15/868,281) by transmitting signals from a plurality of antennas (such as, for example, antennas 10-1 through 10-4 of FIG. 2 of U.S. patent application Ser. No. 15/868,281), as will be appreciated by those skilled in the art.

Figure 6A:
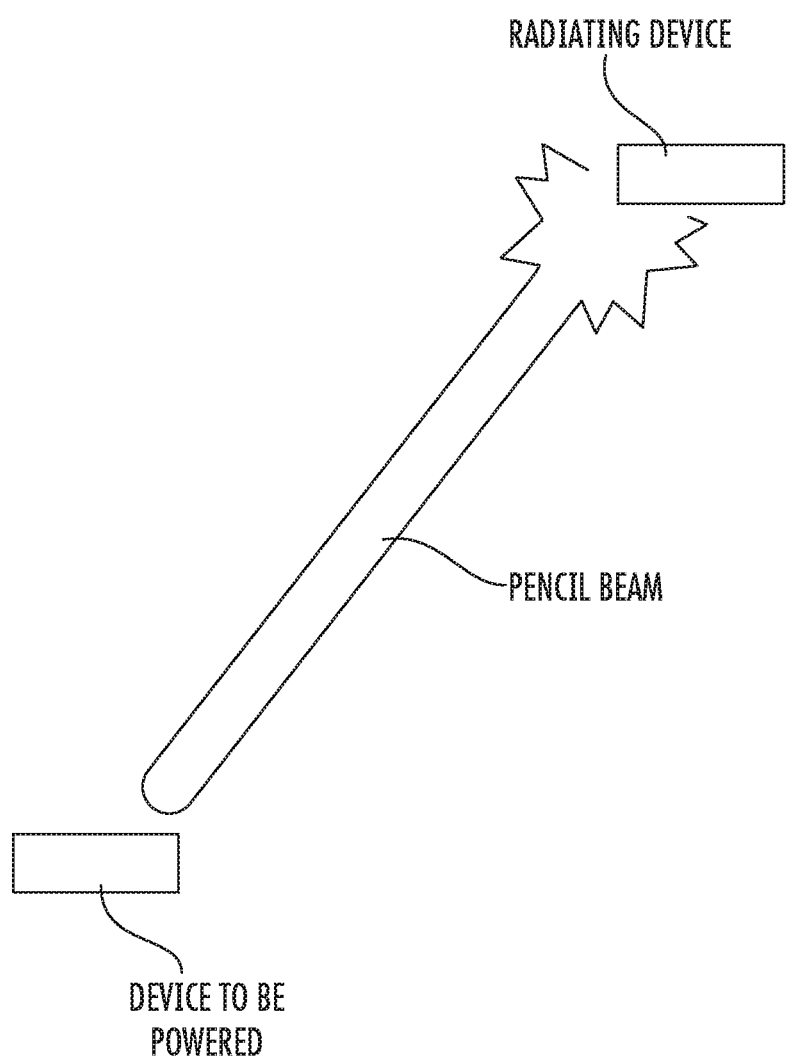
FIG. 6A is a schematic illustration of a pencil beam antenna pattern.
Figure 6B:
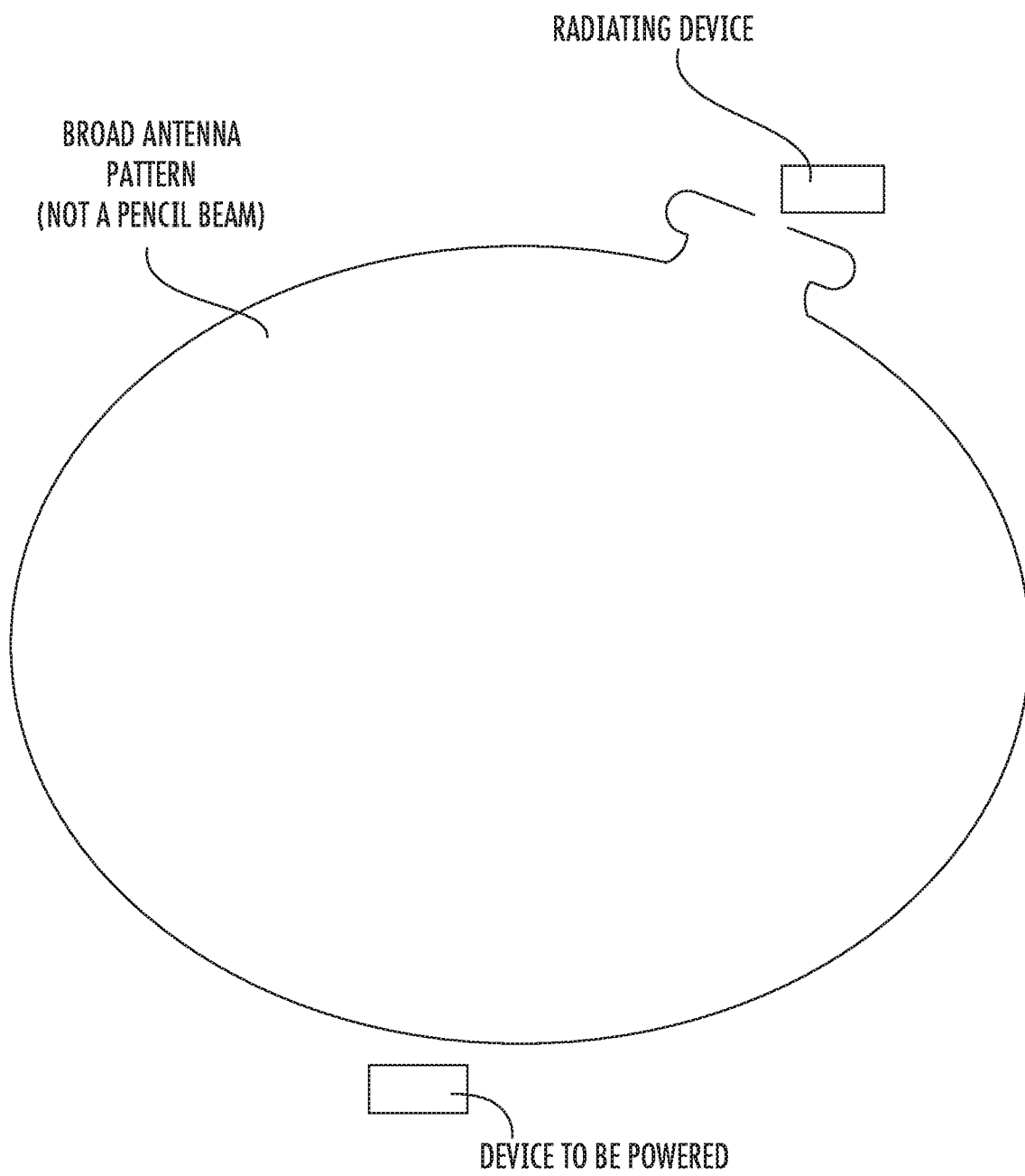
FIG. 6B is a schematic illustration of a broad antenna pattern.
Figure 7:
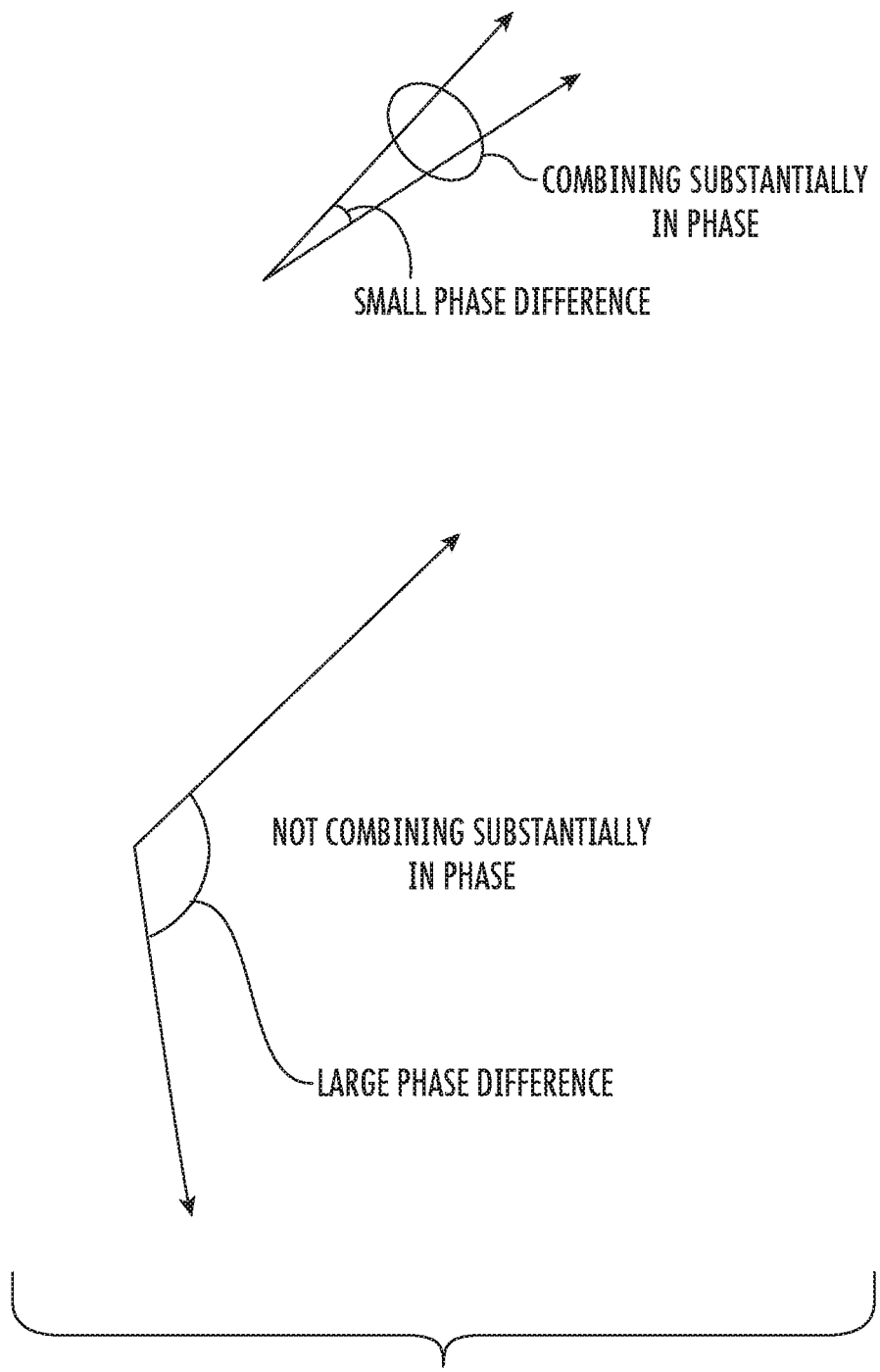
FIG. 7 is a schematic illustration of vectors/phasors adding substantially in-phase and substantially out-of-phase.

Imagine now a large number N of radiating devices that may, according to some embodiments of inventive concepts presented herein, be connected with one another in that at least two radiating devices of said large number N of radiating devices may be connected, wirelessly and/or otherwise, with one another. Further, imagine that each one of said large number N of radiating devices uses an array of antenna elements to form a "pencil beam" in order to transmit energy/power directionally towards a device that requires energy/power. Thus, a number N of pencil beams may be formed. Further, imagine that N electromagnetic waves/signals that may be launched by said number N of radiating devices, via said array of antenna elements that may be used by each one of said number N of radiating devices, are conditioned (in amplitude and/or phase) so that upon interception by an antenna of said device that requires energy/power said N electromagnetic waves/signals (or corresponding measures thereof) may combine substantially in-phase, or substantially coherently, on a voltage basis, at said antenna of said device that requires energy/power. Based on the above, one skilled in the art may appreciate that as N becomes very large, a power level associated with each one of said N pencil beams becomes very small. Accordingly, given a sufficiently large N, a concern of radiation absorption by a living organism (human and/or otherwise) may diminish while a power level being delivered to said device that requires energy/power may remain unaffected or increase. It will be understood that the term "pencil beam" as used herein denotes a narrow/directional antenna beam or pattern, as illustrated in FIG. 6A, that directs a large percentage of a total radiated energy/power in substantially a desired direction while minimizing a percentage of said energy/power that is launched in direction(s) other than the desired direction. In some embodiments, at least 75% of said total radiated energy/power is launched by the pencil beam in said desired direction. For comparison, FIG. 6B illustrates a broad antenna pattern other than a pencil beam. Further, it will be understood that "combine substantially in-phase" or "combine substantially coherently" as used herein denotes constructive addition of two or more quantities, each comprising an amplitude and a phase (such as, for example, two or more phasors/vectors), such that upon combining a maximum phase-difference between any two of said two or more quantities is relatively small (e.g., is no more than 10°, 20°, 30° or even 45°), as illustrated in FIG. 7.

Combining two vector/phasor quantities substantially coherently or substantially in-phase may be accomplished by, for example, having a Device to be Powered ("DtbP") transmit a Channel Sounding Signal ("CSS") that may be received and processed by a First Radiating Device ("FRD") and by a Second Radiating Device ("SRD"). Accordingly, the FRD (that may comprise a processor and/or a processor that is connected to the FRD) may be used to determine/estimate a channel phase that exists between the DtbP and the FRD; and the SRD (that may comprise a processor and/or a processor that is connected thereto) may similarly be used to determine/estimate a channel phase that exists between the DtbP and the SRD. Said determine/estimate a channel phase may be accomplished by, for example, including one or more a priori known to the FRD and to the SRD (or a priori known to a processor connected thereto) pilot symbols/tones in the CSS and/or via any other technique known to those skilled in the art. It will be understood that, in some embodiments, a plurality of radiating devices may be connected to a single processor. In other embodiments, each radiating device of a plurality of radiating devices may comprise a processor and may also be connected to a processor that is common to, and is used to service all of, the plurality of radiating devices.

Using such information (i.e., channel phase information), the FRD may radiate a first signal and the SRD may radiate a second signal such that said first signal and said second signal may arrive at the DtbP substantially coherently therebetween. As an example, let's assume that the CSS as received by the SRD indicates a channel phase that is θ degrees greater than that associated with the FRD. That is, the CSS as received by the FRD indicates a channel phase that is θ degrees less than that associated with the SRD. Accordingly, if the FRD were to transmit a signal at a given phase and the SRD were to transmit the signal at a phase equal to said given phase minus θ, then the two signals would arrive at the DtbP substantially in-phase therebetween; i.e., the signal transmitted by the FRD and the signal transmitted by the SRD would arrive at the DtbP substantially coherently therebetween; having a zero or near zero phase difference therebetween.

Alternatively, or in combination with the above, combining two vector/phasor quantities substantially coherently or substantially in-phase may be accomplished by, for example, using an approach as described in the paper "Maximum-Power and Amplitude-Equalizing Algorithms for Phase Control in Space Diversity Combining" which appeared in The Bell System Technical Journal ("BSTJ"), Vol. 62, No. 1, January 1983 and is hereby incorporated herein by reference in its entirety as if fully set forth herein. Accordingly, a first radiating device may radiate a first signal via, for example, a first pencil beam and a second radiating device may radiate a second signal via, for example, a second pencil beam and impose a phase modulation on said second signal per the teachings of the above referenced BSTJ article. As a DtbP receives said first and second signals, the DtbP and/or a processor thereof may detect an amplitude modulation, resulting from said phase modulation, and relay said amplitude modulation (or a measure thereof) back to the second radiating device to be processed and used by the second radiating device in adjusting a phase of said second signal. The approach of coherently combining two signals, as presented by the referenced BSTJ article, may be extended to more than two signals. For example, a third signal may be transmitted by a third radiating device via, for example, a third pencil beam and impose a phase modulation on said third signal of a frequency that differs from the phase modulation frequency imposed on said second signal. Accordingly, the DtbP and/or the processor thereof may detect an amplitude modulation associated with said phase modulation of said third signal, and relay such amplitude modulation (or a measure thereof) back to the third radiating device to be processed and used by the third radiating device in adjusting a phase of said third signal.

As an illustrative example, consider the following: If voltage $V_1$ is delivered to a receiving antenna from a first radiating device and voltage $V_2$ is delivered to said receiving antenna from a second radiating device; and $V_1$ and $V_2$ add substantially coherently therebetween at the receiving antenna (let's assume zero phase difference between them), then a total voltage of:

$V_1+V_2$ is generated at the receiving antenna;

wherein an associated power level is $P=(V_1+V_2)^2=V_1^2+V_2^2+2V_1V_2$.

Assuming $V_1=V_2=V$, then $P=4V^2$. Accordingly, a power amplification (or a power concentration) over and above power addition of two radiators may be provided in a desired direction and/or towards a desired point/region of space where an antenna of a device to be supplied with energy/power may be located. Having done so, a power being transmitted towards points/regions of space other than said desired point/region of space may be reduced (owing to power conservation).

According to some embodiments, frequencies that may be used by a plurality of radiating devices to deliver energy/power to one or more devices in a home and/or business environment may be in a GHz range (e.g., at or greater than 1 GHz). As those skilled in the art can appreciate, as a frequency of operation increases, a size and/or cost associated with an array of antenna elements that may be needed to form a pencil beam may be reduced and it may become easier to install/integrate such radiating devices on/in walls, ceilings, floors, furniture and/or at other locations of said home and/or business environment.

Figure 8:
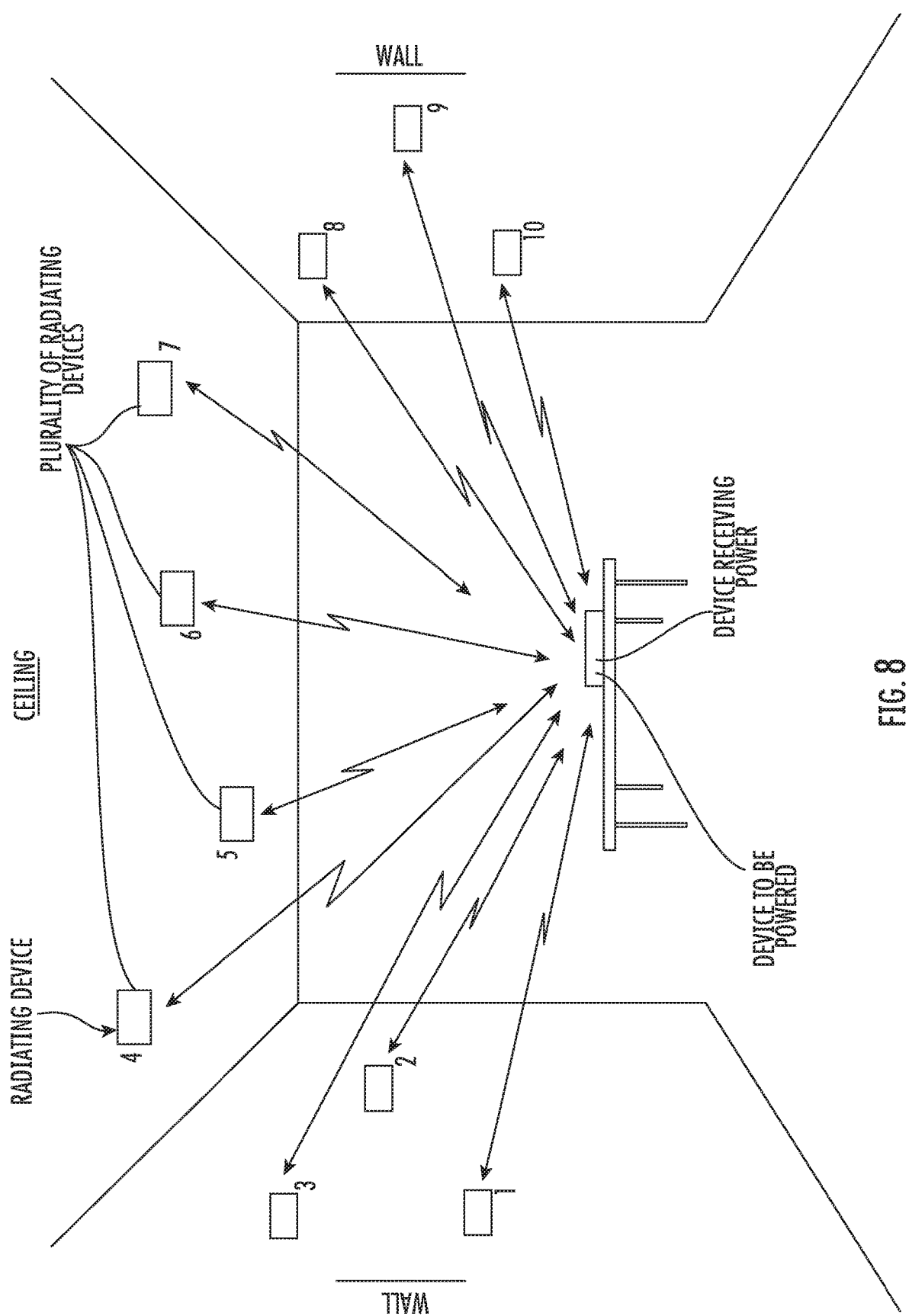
FIG. 8 is a schematic illustration of systems/methods according to embodiments of the present invention.

FIG. 8 illustrates a Device to be Powered ("DtbP") wirelessly by using a Plurality of Radiating Devices ("PoRD"). FIG. 8 illustrates ten (10) radiating devices labeled one (1) through ten (10) that are attached to and/or integrated with one or more walls and/or a ceiling of a room of a building. In FIG. 8, the DtbP has been placed on a table in the room of the building that is equipped with said PoRD.

FIG. 8 is provided for illustrative purposes only and the DtbP need not be placed on said table; the DtbP may be, for example, in a pocket of a user or at any other place/location that is proximate/accessible to the PoRD. The PoRD may be situated/placed anywhere in/around the room (not necessarily as illustrated in FIG. 8); the PoRD may, for example, be plugged into electrical wall outlets, may be hung on walls as decorative pieces (assuming they are so made in appearance) and/or may even be imbedded in and/or integrated with the floor and/or a cover thereof. It will be understood that the term Plurality of Radiating Devices (or PoRD) as used herein refers to a number of radiating devices that is greater than or equal to two; wherein a radiating device comprises an antenna that may comprise a plurality of antenna elements, a power source and a processor that is connected to the radiating device and to at least one more radiating device and controls said radiating device and said at least one more radiating device to form one or more pencil beams and deliver power to one or more devices to be powered.

As the DtbP determines that it requires power because, for example, a battery thereof needs charging and/or the DtbP is using power to perform a function, the DtbP may transmit a request for power responsive to said determination (i.e., a need for power) and, in some embodiments, responsive to having detected proximity to the PoRD. Said "having detected proximity" may comprise having at least one of said PoRD periodically and/or otherwise transmit a signal that may be detected by the DtbP. In some embodiments, in lieu of the above, or in combination with the above, the DtbP may transmit a signal comprising a solicitation for power and/or a solicitation for a response from at least one device of a PoRD that may be in a position to provide power to the DtbP. The request/solicitation for power may comprise a wide-band and/or an Ultra-Wide Band ("UWB") signal component, that may be used by at least some of the PoRD to determine a location associated with the DtbP in accordance with techniques known to those skilled in the art. Alternatively, or in combination with the above, at least some of said PoRD, may each transmit a signal, which may comprise a wide-band and/or UWB component, that may be processed by the DtbP in order to determine a position thereof relative to at least some of the PoRD. Accordingly, in some embodiments, the PoRD may assume a role and/or functionality (at least partially) of the Global Positioning Satellites ("GPS").

In some embodiments, one or more of the PoRD may use one or more pencil beams to scan space for signal strength; e.g., one or more of the PoRD illustrated in FIG. 8 may use one or more pencil beams to scan space associated with the room that is illustrated in FIG. 8. In some embodiments, said one or more of the PoRD may each form a pencil beam and use that pencil beam to determine received signal strength as a function of pointing direction of the pencil beam. In other embodiments, two or more of the PoRD that may be connected with one another may coordinate/share respective antenna elements in forming said one or more pencil beams and using said one or more pencil beams to scan space for signal strength being radiated by a DtbP. In some embodiments, scanning space via one or more pencil beams may, once initiated, be performed periodically over an interval of time. Said interval of time may correspond to a length of time needed to charge a DtbP; said periodically may comprise, for example, once every 250 milliseconds or once every 500 milliseconds (i.e., often enough) so as to maintain dynamic tracking of the DtbP in case the DtbP is moved (or is moving) while it is being charged/powered.

In some embodiments, initiating scanning of space as discussed above comprises the DtbP being equipped with a processor that is responsive to a battery state of the DtbP and, responsive to a value associated with said battery state of the DtbP, the processor controls the DtbP to begin to radiate a predetermined signal at a predetermined frequency. In some embodiments, the DtbP begins to radiate said predetermined signal responsive to having detected by the DtbP a presence of the PoRD, irrespective of the battery state of the DtbP. In some embodiments, said predetermined signal comprises an intensity of power to be sent via a pencil beam to the DtbP. It will be understood that, in accordance with some embodiments, said predetermined signal comprises aspects that may be predetermined and aspects that may not be predetermined. For example, a power level intensity that the DtbP requests may not be predetermined and may depend on a level of discharge and/or other aspect of the DtbP or the battery thereof.

In some embodiments, responsive to receiving, processing and/or detecting of said predetermined signal by a component of the PoRD or by a device that is connected to the PoRD, at least one of the PoRD may begin scanning space for signal strength as described above. In some embodiments, for each one of the PoRD that may be involved in providing power to the DtbP, a processor that is connected thereto (i.e., a processor that is connected to each one of the PoRD that may be involved in providing power to the DtbP) may be used to determine an antenna pointing direction that may be associated with a maximum (or near maximum) signal strength received at said each one of the PoRD in response to said predetermined signal having been radiated by said DtbP and associate therewith a specific pencil beam providing said maximum (or near maximum) signal strength at said each one of the PoRD. It will be understood that in some embodiments, said each one of the PoRD that may be involved in providing power to the DtbP may be controlled by said processor that is connected thereto in order for said each one of the PoRD to form a pencil beam that yields said maximum (or near maximum) signal strength, and to use said pencil beam to radiate electromagnetic power substantially in a direction of said maximum (or near maximum) signal strength. It will be understood that at least some forward-link frequencies launched by a pencil beam (e.g., frequencies launched by a pencil beam in order to power the DtbP) may differ from return-link frequencies received by the pencil beam (e.g., frequencies associated with said predetermined signal that is radiated by the DtbP).

According to some embodiments, two or more DtbP may be in close proximity with one another and may need to be powered. Responsive to a detection of a presence associated therewith (i.e., associated with the PoRD) and/or responsive to a need to be powered, the two or more DtbP may communicate with one another (using, for example, a BLUETOOTH® protocol/frequency and/or any other protocol/frequency) and may thus coordinate a first predetermined signal/frequency to be radiated by a first DtbP, a second predetermined signal/frequency to be radiated by a second DtbP, a third predetermined signal/frequency to be radiated by a third DtbP, etc. (It will be understood that the term "frequency" as used herein may include a plurality of frequencies). In such embodiments, the two or more DtbP may be powered concurrently in time by the PoRD or sequentially in time. In some embodiments, at least two DtbP are powered concurrently in time.

Powering concurrently in time two or more DtbP by a PoRD may comprise, according to some embodiments, a first PoRD powering the first DtbP using a first frequency and a first plurality of pencil beams (or at least one first pencil beam), a second PoRD powering the second DtbP using a second frequency and a second plurality of pencil beams (or at least one second pencil beam), a third PoRD powering the third DtbP using a third frequency and a third plurality of pencil beams (or at least one third pencil beam), etc. In some embodiments, any two of said first, second and third frequencies may differ from one another and may be devoid of overlap therebetween (i.e., may be substantially devoid of common frequencies therebetween). In other embodiments, at least two of said first, second and third frequencies may comprise an overlap therebetween. In some embodiments, powering concurrently in time two or more DtbP by a PoRD may comprise using by the PoRD a first frequency and a first set of pencil beams to power a first DtbP, using a second frequency and a second set of pencil beams to power a second DtbP, using a third frequency and a third set of pencil beams to power a third DtbP, etc. The first, second and third sets of pencil beams may differ from one another depending on respective first, second and third locations of associated devices to be powered. The first, second and third frequencies may differ from one another and may correspond to respective first, second and third frequencies used, respectively, by first, second and third DtbP in transmitting, as discussed earlier, respective first, second and third predetermined signals. In some embodiments, the first, second and third sets of pencil beams differ therebetween responsive to respective first, second and third locations of respective first, second and third devices to be powered differing therebetween, a first PoRD is used to provide power to the first DtbP using a frequency, a second PoRD is used to provide power to the second DtbP using the frequency and a third PoRD is used to provide power to the third DtbP using the frequency. Other combinations, sub-combinations and/or variations of the embodiments described herein are possible.

It would be unduly repetitious and obfuscating to describe in detail and/or illustrate every combination and/or sub-combination of the plurality of embodiments that are described herein. Accordingly, the present specification, including the drawings and Claims thereof shall be construed to constitute a complete written description of all combinations and/or sub-combinations of the embodiments described herein, and of the manner and process of making and using them, and shall support Claims to any such combination and/or sub-combination.

Accordingly, a plurality of devices to be powered may be powered by the PoRD substantially concurrently in time and/or sequentially in time. Having determined by the PoRD a location of a first DtbP and a location of a second DtbP, and having received by the PoRD respective requests for power from said first DtbP and from said second DtbP, at least some of the PoRD may form a first set of pencil beams and radiate power to the first DtbP using the first set of pencil beams over a first duration of time; and at least some of the PoRD may form a second set of pencil beams and use the second set of pencil beams to provide power to the second DtbP over a second duration of time that may be overlapping with the first duration of time fully or partially or may not overlap with it at all as may be the case in providing power sequentially in time. Said at least some of the PoRD that form the first set of pencil beams and radiate power to the first DtbP using the first set of pencil beams over a first duration of time and said at least some of the PoRD that form a second set of pencil beams and use the second set of pencil beams to provide power to the second DtbP over the second duration of time may comprise a set of radiating devices that is common therebetween. According to some embodiments, the first and second durations of time may overlap with one another (i.e., may occur concurrently).

A first frequency (or first frequencies) may be used by the PoRD to provide power to said first DtbP and a second frequency (or second frequencies) may be used by the PoRD to provide power to said second DtbP. The first frequency and the second frequency may comprise one or more frequencies that are common therebetween or may comprise respective frequencies that are substantially mutually exclusive therebetween. In some embodiments, a first set of frequencies, comprising a plurality of frequencies, may be used in lieu of or in combination with said first frequency and/or a second set of frequencies, comprising a plurality of frequencies, may be used in lieu of or in combination with said second frequency. The first set of frequencies may fully overlap with, partially overlap with or be mutually exclusive with the second set of frequencies. According to some embodiments, said set of frequencies (either the first, second or both) may comprise a spread spectrum signal in order to reduce a density of energy/power being radiated.

According to some embodiments, a first radiating device of the PoRD may be selected to provide power to a DtbP responsive to a characteristic of a line-of-sight path between said first radiating device and the DtbP. Said characteristic may comprise a strength of a signal that is radiated by the DtbP and received/measured at/by said first radiating device and/or is radiated by the first radiating device and is received/measured at/by the DtbP. Further, a second radiating device of the PoRD may not be selected to provide power to a DtbP responsive to a characteristic of a line-of-sight path between the second radiating device and the DtbP. In some embodiments, responsive to said strength of a signal that is radiated by a specific DtbP and received/measured at/by a specific radiating device and/or is radiated by the specific radiating device and is received/measured at/by the specific DtbP, said specific radiating device may or may not be selected to provide power to said specific DtbP. In some embodiments, a specific radiating device is selected to provide power to a specific DtbP provided said strength of said signal is greater than or equal to a threshold value; the specific radiating device is not selected otherwise. Such a measurement comprising signal strength as described in the present paragraph may, according to some embodiments, be performed periodically (say once per second, or more frequently than that) in order to account for an environment that may be changing effecting said strength of said signal.

Let N denote the total number of available radiating devices (N=10 in FIG. 8), and let M denote a number of radiating devices selected per the paragraph above; M N. In some embodiments, a "cycling" among the M radiating devices may serve to scramble, randomize and/or reduce a level of radiation impacting a specific location (this may be of benefit to living organisms such as pets and/or humans). Accordingly, if M=7, for example, a first set of radiating devices comprising, for example, three (3) radiating devices of the M devices may be activated to provide power to a DtbP. Later, for example, one second later, a second set of radiating devices comprising, for example, three (3) radiating devices of the M devices that differ in at least one radiating device relative to the first set, may be chosen to provide power to the DtbP. In general, it may be stated that if $L_1<M$ and $L_2<M$ wherein $L_1$ differs from $L_2$ in the physical radiating devices that it represents (and/or in a number of radiating devices that it represents) then, over a first interval of time said $L_1$ radiating devices of the M devices may be activated to provide power to a DtbP and, over a second interval of time, said $L_2$ radiating devices of the M devices may be activated to provide power to the DtbP.

In some embodiments, a time-line of a sequence of events may comprise the following:
(a) a DtbP enters an area being served by a PoRD;
(b) the DtbP senses a presence of the PoRD (at least one of the PoRD or a transmitter and/or processor connected thereto is configured to transmit a presence signal);
(c) the DtbP sends a request for power;
(d) the request for power is acknowledged by the PoRD;
(e) the DtbP begins to transmit a CSS once every T second(s); a duration of the CSS is τ seconds; wherein τ<T; in some embodiments, τ=T/2, T/3, T/4, T/5, T/6, T/7, T/8, T/9, T/10 or any other fraction of T;
(f) each radiating device of the PoRD scans space via a pencil beam and determines direction of strongest pencil beam signal;
(g) for the pencil beam offering strongest received signal a radiating device estimates channel phase;
(h) radiating device uses pencil beam offering strongest received signal to radiate power over a duration of time substantially equal to T−τ seconds; phase of signal is adjusted responsive to detected channel phase for the pencil beam used.

Numerous other embodiments of systems/methods presented herein are possible. For example, a wall of a room may be equipped with, for example, a Heat Radiator ("HR") comprising, for example, moisture that may, in some embodiments, be water moisture. In some embodiments, the HR may be a portable device that may be situated anywhere within the room. Accordingly, responsive to a temperature of the room having fallen below a threshold, the HR may request power from the PoRD. Responsive to such a request, the PoRD may radiate electromagnetic power in a direction of the HR in order to heat the moisture of the HR (just like a microwave oven would do) and thus provide heat energy to be radiated by the HR.

It will be understood by those skilled in the art that as a duration of time during which charging of a device/battery is to take place increases, a Power Spectral Density ("PSD") level (or simply a power level) being radiated and associated with said charging decreases. Accordingly, in some embodiments, a parameter that may be set/dictated/specified by a user of a device/battery to be charged comprises a duration of time during which said charging is to take place. In some embodiments, charging "overnight" may be selected wherein a meaning of said overnight may be predetermined by the user or by a manufacturer of the device/battery to be charged. In other embodiments, a time to start charging and/or a time to end charging may be selected. A default charging rate may also be available in some embodiments. In some embodiments, a detection of, for example, motion (or the absence thereof) may be used to change a charging rate of the device/battery to be charged and, responsively, reduce (for the case where motion is detected) or increase (for the case of motion being absent over a predetermined interval of time) a power level associated therewith that is being radiated by one or more of the PoRD.

Systems/Methods of Trajectory Limiting (e.g., Altitude Limiting)

An object, such as for example a drone, may be equipped with various electrical and mechanical subsystems including a processor that, among other operations/functions, may be configured to estimate the object's geographic position, including the object's altitude, or height, relative to a surface of the Earth (e.g., relative to a ground level) and, responsive to the object's geographic position, the processor may perform operations comprising controlling said object's height such that, for example, the object's height does not exceed a predetermined limit; wherein said predetermined limit may be a priori associated with said object's geographic position that is estimated by said processor; and wherein said predetermined limit may be stored in a data base (internal and/or external to the object) that may be accessible to the object. It will be understood that in addition to said processor controlling the object's height, other motion associated with the object may also be controlled (e.g., lateral motion may also be controlled and restricted responsive to geographic position of the object). The object may become airborne, may receive command(s) to follow a trajectory and the object may follow said trajectory as long as a height and/or other coordinate associated therewith does not violate a "forbidden" limit such as, for example, a not-to-exceed height that may have been so designated and associated with a geographic area associated with said trajectory. For example, if a height associated with the trajectory violates a not-to-exceed predetermined height, a limit in height in the object's trajectory may be imposed in accordance with said not-to-exceed predetermined height.

The object may be a flying object that is manned or unmanned. The object may be a drone, as already mentioned above, or it may be an airplane (manned or unmanned), a missile and/or other airborne and/or spaceborne object.

According to some embodiments, in lieu of the above or in combination with the above, the processor may perform operations comprising controlling said object's height not to decrease below a predetermined lower limit responsive to a geographic position that the object's trajectory is traversing; wherein said predetermined lower limit may be a priori associated with said object's geographic position that is estimated by said processor; and wherein said predetermined lower limit may be stored in a data base that may be accessible to the object. The object may become airborne, may receive command(s) to follow a trajectory and the object may follow said trajectory as long as a height associated therewith does not violate, for example, said predetermined lower limit height that may have been so designated and associated with a geographic area associated with said trajectory. If, for example, a height associated with the trajectory attempts to violate said predetermined lower limit level, a restriction may be imposed in accordance with said predetermined lower limit height.

Figure 9:
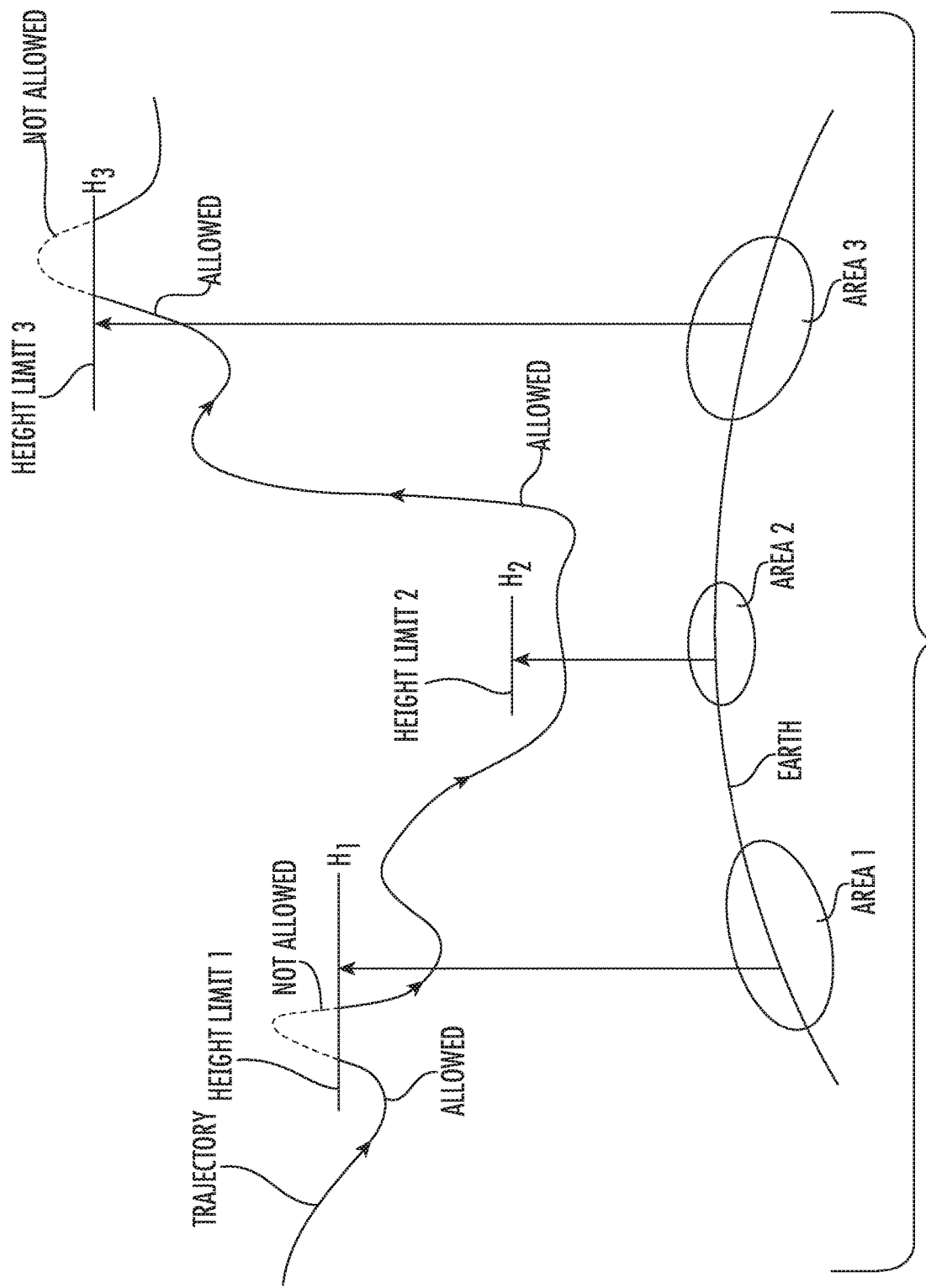
FIG. 9 is a schematic illustration of trajectory limiting according to embodiments of the present invention.

More specifically, FIG. 9 illustrates a trajectory that is to be executed by an airborne object. The airborne object may be a drone or any other airborne object that may be equipped with said processor. The trajectory is to traverse (i.e., go over) geographic areas 1, 2 and 3 as is illustrated in FIG. 9. Each one of the illustrated areas (labelled as Area 1, Area 2 and Area 3 in FIG. 9), is associated with a not-to-exceed limit in height, indicated in FIG. 9 as Height Limit 1 (or "$H_1$"), Height Limit 2 (or "H2") and Height Limit 3 (or "$H_3$"), respectively. We observe that the trajectory over Area 1 that would have exceeded $H_1$ (as indicated by the dashed line labelled "not allowed") is now constrained to not exceed Height Limit 1 (or "$H_1$"). In traversing Area 2, the trajectory does not violate any not-to-exceed height limit and is, therefore, unaltered/unconstrained. However, in traversing Area 3, we observe a "clipping" or a constraint being imposed on the trajectory owing to the trajectory attempting to exceed $H_3$; the not-allowed dashed portion of the trajectory over Area 3 is prevented from materializing. Accordingly, a height of the trajectory over Area 3 is maintained at or below Height Limit 3.

It will be understood that although three Height Limits ($H_1$, $H_2$, $H_3$) are illustrated in FIG. 9 (corresponding to the three geographical areas Area 1, Area 2 and Area 3 of FIG. 9), more than three Height Limits (or less than three Height Limits) may be present, corresponding to more (or less) than three geographical areas. Further, it will be understood that each one of the Height Limits may change over time. That is, $H_1$, for example, may be assigned a value of 500 feet from, say, 5 AM to 1:30 PM and a value of 1,350 feet thereafter. Such a variation may be repeated daily for a number of days after which it may change to some other limit/variation that may even include a "no fly zone" limit/variation (i.e., $H_1=0$).

Figure 10:
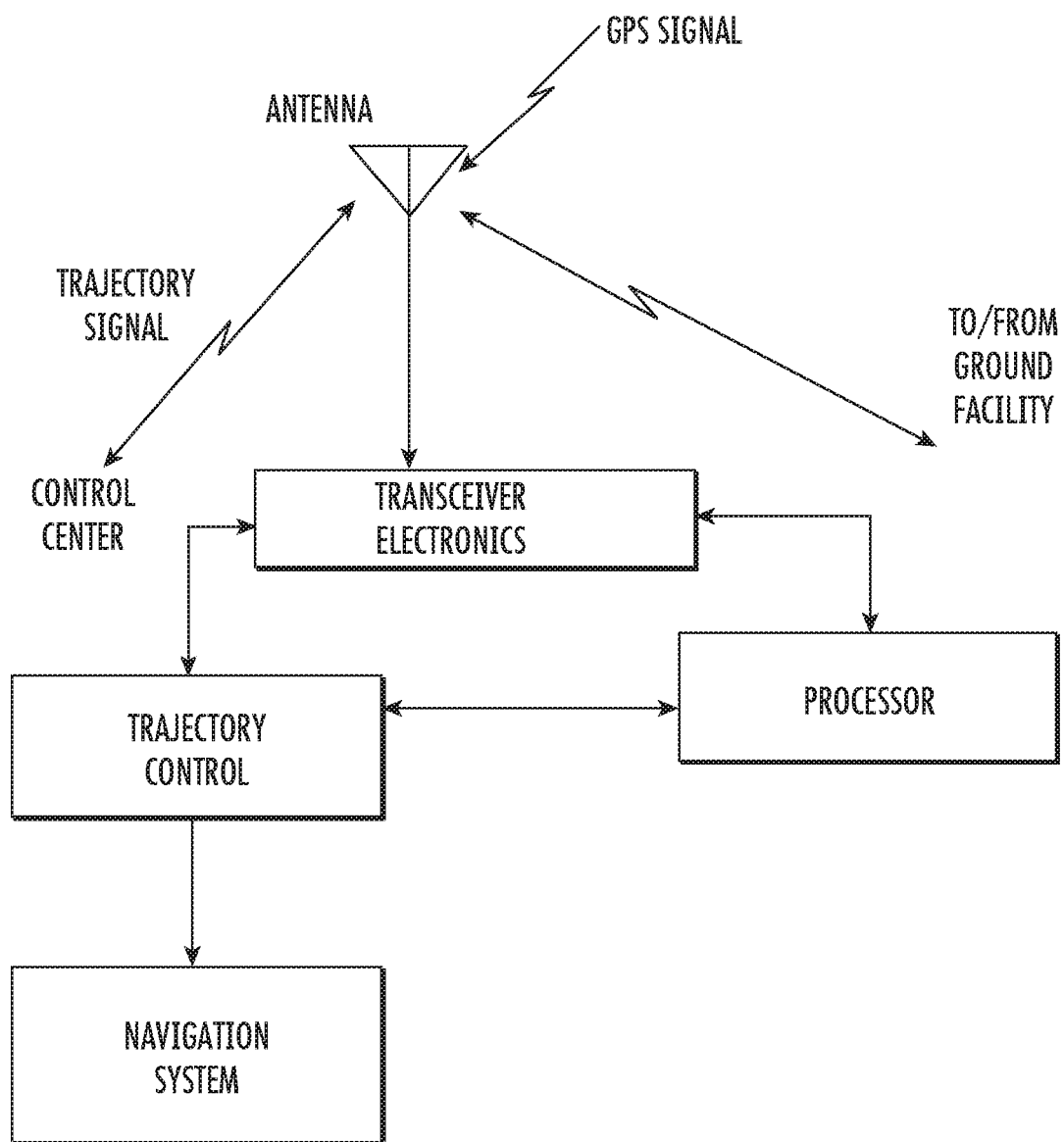
FIG. 10 is a schematic illustration of systems/methods according to embodiments of the present invention.

FIG. 10 is illustrative of a system/method that may be used to control a trajectory of an object in accordance with various Height Limits over respective various areas of geography as illustrated in FIG. 9. The system/method includes an Antenna subsystem that may receive various signals to be processed by a Transceiver Electronics subsystem and a Processor subsystem. As those skilled in the art can appreciate, the Transceiver Electronics subsystem may perform functions such as filtering (at one or more stages thereof), amplification (at one or more stages thereof), down-conversion (or frequency shifting), sampling in order to convert one or more signals from an analog domain to a discrete-time domain, digitalization in order to represent signal values in terms of groupings of bits (or bytes) and/or other functions, not necessarily in an order as may be suggested by the present paragraph and/or FIG. 10. According to some embodiments, some of the stated functions that may be performed by the Transceiver Electronics subsystem may, at least partially, be allocated to, and performed by, the Processor subsystem.

The Processor subsystem may receive Global Positioning System ("GPS") signals and/or other signals and may process such GPS signals (and/or the other signals) in order to determine (or estimate) a three-dimensional position thereof (and/or a three-dimensional position of the flying object that may be the same as the three-dimensional position associated with the Processor subsystem). Responsive to said three-dimensional position of the flying object, an altitude (or height) thereof, a geographical area associated therewith and a Height Limit associated with said geographical area, the Processor subsystem may determine that a trajectory of the flying object needs to be modified, constrained and/or restricted to, for example, not exceed a predetermined height that may be associated with said geographical area. Accordingly, the Processor subsystem may do so by providing appropriate command(s) to the Trajectory Control subsystem and may further provide information of its decision to limit a height, intent of doing so and/or having done so to a Ground Facility and/or to a Control Center that may be providing a Trajectory Signal to the flying object. Said Ground Facility and/or Control Center may transmit a command to the Processor subsystem responsive to having received therefrom said information in order to provide further instruction(s) to the Processor subsystem. Said further instruction(s) may comprise an identity, code, priority, biometric information and/or other information. The Ground Facility may include a data base that may include said Height Limit associated with said geographical area. In some embodiments, the Ground Facility and the Control Center are integrated and/or connected (e.g., the Ground Facility comprises the Control Center and/or is connected to the Control Center or the Control Center comprises the Ground Facility and/or is connected to the Ground Facility).

Figure 11:
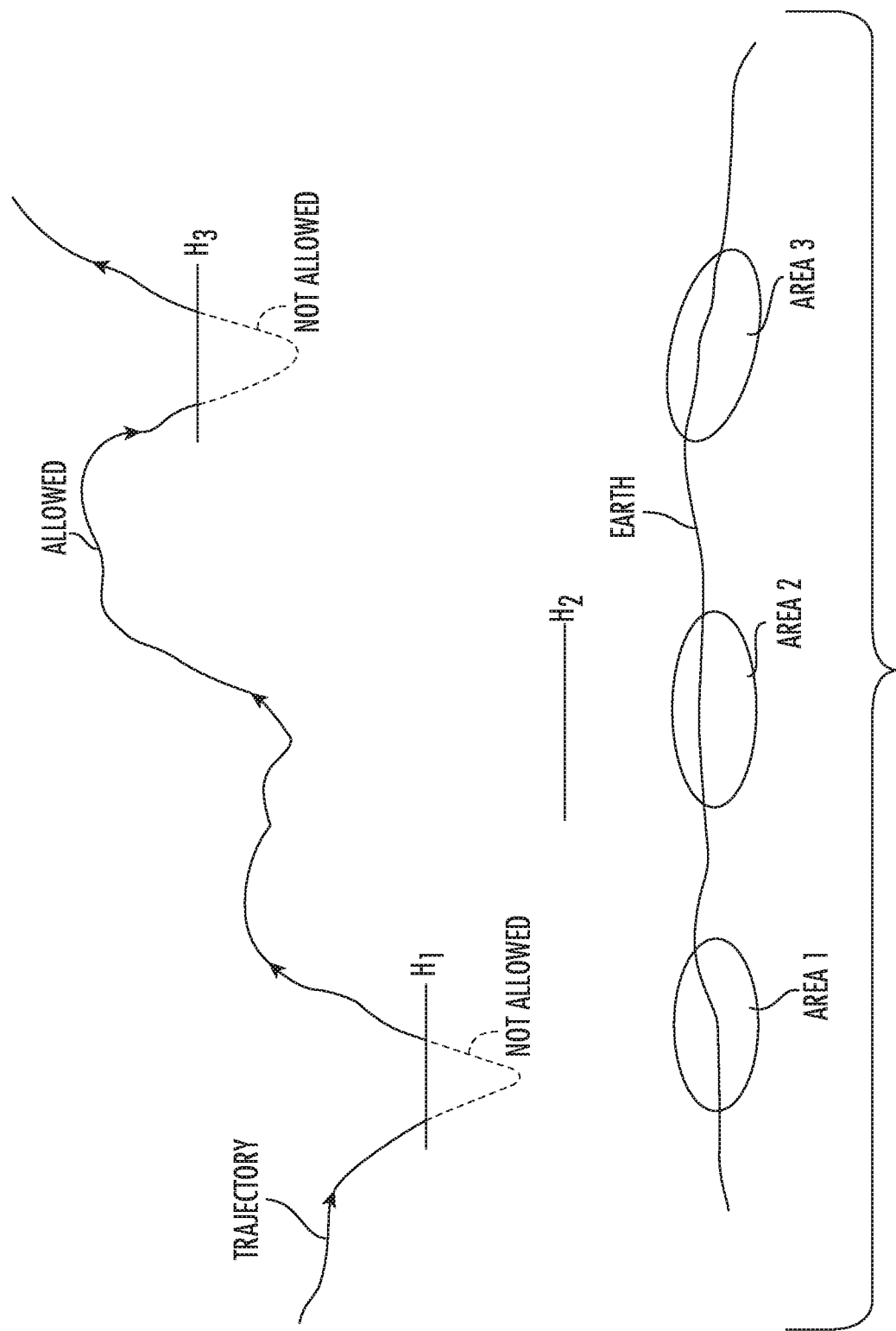
FIG. 11 is a schematic illustration of trajectory limiting according to further embodiments of the present invention.
Figure 12:
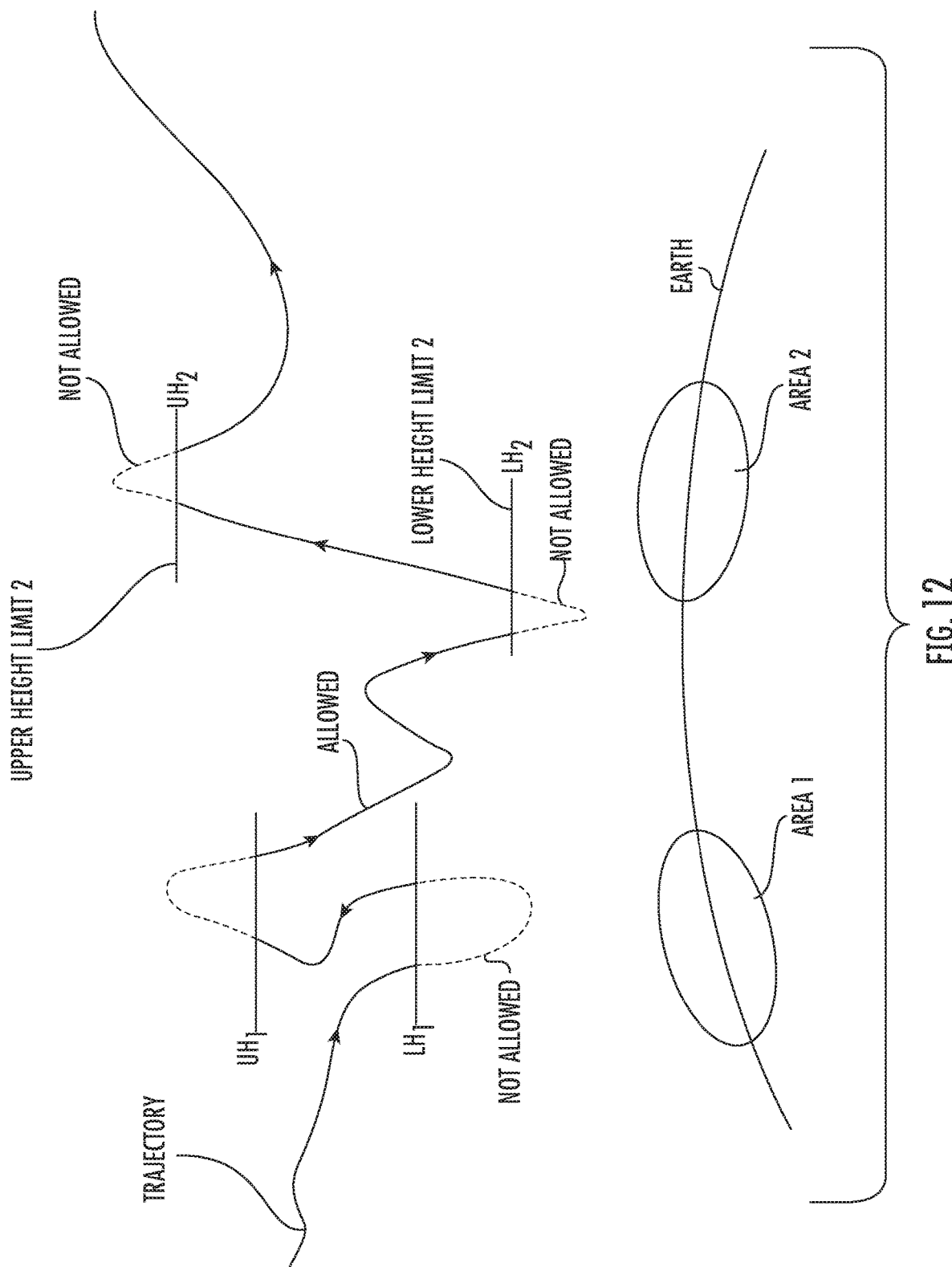
FIG. 12 is a schematic illustration of trajectory limiting according to yet additional embodiments of the present invention.

The description above relating to FIGS. 9 and 10 is, for the sake of simplicity, restricted to systems/methods of limiting a height to a not-to-exceed level responsive to a predetermined geographic position. However, analogous systems/methods may be provided for limiting a height to above of, or at, a lower limit of height responsive to a geographic position. Further, systems/methods may be provided for maintaining a height between a lower limit and an upper limit responsive to a geographic position. For example, the limits of $H_1$, $H_2$, and $H_3$ of FIG. 9, instead of representing upper height limits, as is the case in FIG. 9, may represent lower height limits over respective geographic areas. FIG. 11 illustrates such an embodiment, while FIG. 12 illustrates an embodiment of maintaining a height between a lower limit and an upper limit over certain geographic areas.

Additional Flowcharts of Operations and Block Diagrams of Electronic Nodes

Figure 13A:
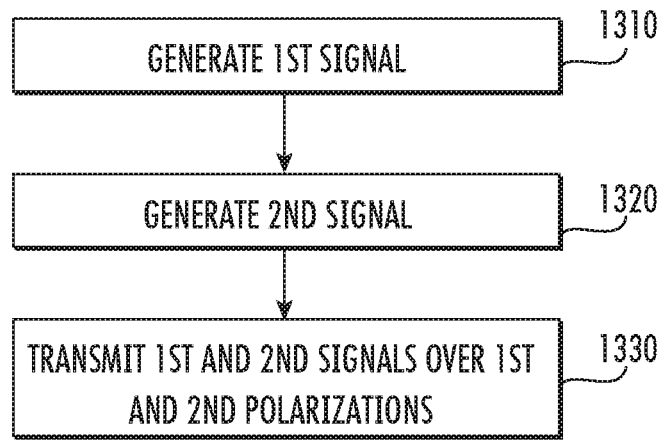
FIGS. 13A-13D are flowcharts illustrating operations of electronic devices, according to some embodiments of the present inventive concepts.

FIGS. 13A-13D are flowcharts illustrating operations of electronic devices/nodes, according to some embodiments of the present inventive concepts. For example, FIG. 13A illustrates operations by a transmitter Tx device. The operations of the transmitter Tx include generating (Block 1310) a first signal $\chi$ (e.g., FIGS. 1A, 3A, 3D) and, further, generating (Block 1320) a second signal y (e.g., FIGS. 1B, 3A, 3D). Moreover, in some embodiments, the operations include transmitting (Block 1330) the first signal $\chi$ and the second signal y over different (e.g., orthogonal) respective first and second polarizations of the transmitter Tx to a receiver Rx. In some embodiments, the first signal $\chi$ comprises first data that is to be conveyed by the transmitter Tx to the receiver Rx and the second signal y comprises second data that is to be conveyed by the transmitter Tx to the receiver Rx. In other embodiments, the operations include transmitting a function of the first signal $\chi$, $\chi'$, and a function of the second signal y, y', over different (i.e., spatially distinct) respective first and second polarizations of the transmitter Tx to the receiver Rx (wherein $\chi'$ and y' may be generated from $\chi$ and y using functional relationships, as described earlier). In some embodiments, said function of the first signal $\chi$, $\chi'$, comprises a first functional relationship that depends on $\chi$ and/or one or more channel coefficients; and said function of the second signal y, y', comprises a second functional relationship that depends on y and/or one or more channel coefficients (e.g., FIGS. 3A, 3D). In some embodiments, the first signal $\chi$ comprises first data that the transmitter Tx intends to transmit to the receiver Rx and the signal y comprises second data that the transmitter Tx intends to transmit to the receiver Rx; wherein, in some embodiments, the first and second data are independent of one another.

For example, the transmitter Tx may transmit the first signal $\chi$ (or $\chi'$) via a vertical polarization V (e.g., a vertical polarization node/port) of the transmitter Tx, and may transmit the second signal y (or y') via a horizontal polarization H (e.g., a horizontal polarization node/port) of the transmitter Tx. In some embodiments, the transmitter Tx may transmit the first signal $\chi$ (or $\chi'$) and the second signal y (or y') substantially concurrently therebetween in time, and/or substantially co-frequency therebetween, over the respective first and second polarizations. As an example, transmitting (Block 1330) operation(s) may include concurrently transmitting, from a first electronic device (the transmitter Tx) to a second electronic device (the receiver Rx), the signals χ (or χ') and y (or y') via different first and second polarizations, respectively, of a cellular communications channel. Moreover, data in the first signal χ may be statistically independent of data in the second signal y. The signals χ' and y' may depend upon different first and second channel coefficients, respectively.

The ports V and H of the transmitter Tx may be different ports (e.g., antennas) of the same first electronic device/node, and the ports V and H of the receiver Rx may be different ports (e.g., antennas) of the same second electronic device/node, which is separate from the first electronic device/node. Moreover, (i) the channel path between the port V of the transmitter Tx and the port V of the receiver Rx and (ii) the channel path between the port V of the transmitter Tx and the port H of the receiver Rx may be first and second different channel paths of the same propagation medium between the transmitter Tx and the receiver Rx. Also, (iii) the channel path between the port H of the transmitter Tx and the port V of the receiver Rx and (iv) the channel path between the port H of the transmitter Tx and the port H of the receiver Rx may be third and fourth different channel paths of that same propagation medium between the transmitter Tx and the receiver Rx. In some embodiments, any one of said first, second, third and fourth channel paths differs from any other one of said first, second, third and fourth channel paths; wherein the term "differs" comprises a different spatial trajectory and/or a different complex coefficient associated therewith.

Figure 13B:
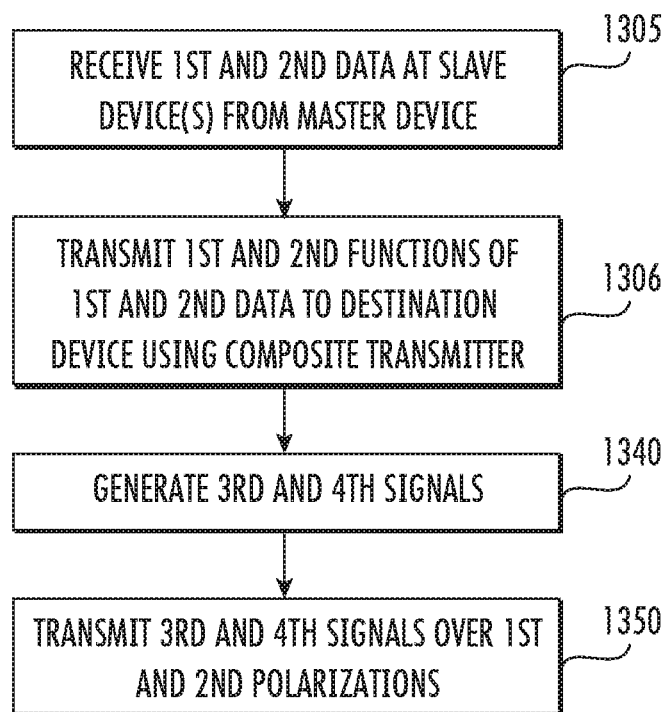

Referring to FIG. 13B, a transmitter Tx that is to convey first and second data to a destination device, comprising a dual-polarization receiver Rx, may comprise one or more slave device(s) (e.g., S1 and/or S2 of FIGS. 3C/3D). In some embodiments, the slave device(s) may receive (Block 1305) the first and second data from a master device M (as is illustrated in FIG. 3C). In some embodiments, a plurality of slave devices may receive the first and second data. Moreover, the slave device(s) may transmit (Block 1306) functions of the first and second data to the destination device, such as a base station BTS (FIG. 3C) via a composite transmitter. The composite transmitter may comprise a plurality of transmitters, such as a first transmitter of a first slave device and a second transmitter of a second slave device (as is illustrated by the first/top and second/bottom dual-polarization transmitters, respectively, of FIG. 3D). For example, transmitting (Block 1306) via the composite transmitter may include using the first transmitter to perform the operation(s) in FIG. 13A of generating (Block 1310) the first signal χ' based on a first function of the first and/or second data, and further, generating (Block 1320) the second signal y' based on a second function of the first and/or second data, and transmitting (Block 1330/1306) the first signal χ' and the second signal y' over different respective first and second polarizations (of the first transmitter). In some embodiments, for example, as is illustrated by the first dual polarization transmitter at the top of FIG. 3D, the function of the first signal is the first signal, χ'=χ, and/or the function of the second signal is the second signal, y'=y; wherein, as stated earlier for some embodiments, the first signal χ comprises first data that the transmitter Tx intends to transmit to the receiver Rx and the signal y comprises second data that the transmitter Tx intends to transmit to the receiver Rx.

Referring still to FIG. 13B, the second transmitter of the composite transmitter may generate (Block 1340) a third signal based on a third function of the first and/or second data, and a fourth signal based on a fourth function of the first and/or second data (e.g., bottom portion of FIG. 3D). Moreover, the second transmitter may transmit (Block 1350) the third and fourth signals over different respective first and second polarizations of the second transmitter (e.g., bottom portion of FIG. 3D). In some embodiments, the first, second, third, and fourth signals may be transmitted substantially concurrently in time with one another and/or substantially co-frequency with one another.

Figure 13C:
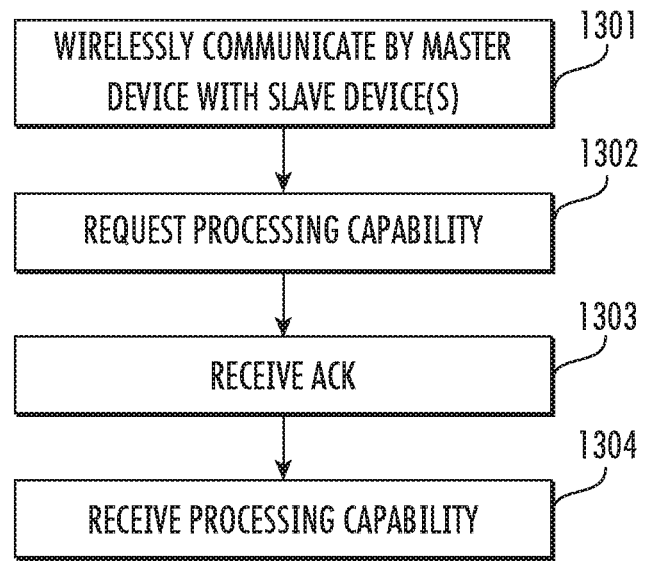

Referring to FIG. 13C, a master device M (FIG. 3C) may wirelessly communicate (Block 1301) with at least one slave device that is proximate to the master device M. As an example, the master device M and the slave device(s) may perform a preliminary communication. For example, the master device M and the slave device(s) may exchange their respective device identifications, device types (e.g., smartphone, iPad, lop-top computer, base station/access point), current locations, and/or device capabilities available for use. The master device M may subsequently wirelessly request (Block 1302) from the slave device(s) a processing capability of the slave device(s). For example, the master device M may request electrical power to be provided/delivered/transmitted to it by/from the slave device(s). As another example, the master device M may request that a calculation, analysis and/or algorithm be performed/executed by one or more of the slaves/auxiliary devices and, responsive to an outcome of said calculation/analysis/algorithm that is performed, an action may be taken by one or more slave devices and/or by the master device M. As a further example, the master device M may request that one or more wireless links be established between a first slave device, a second slave device and/or the master device M and that such one or more wireless links be maintained as long as a quality-of-service associated therewith remains above a threshold and be terminated otherwise; and then, be reestablished (with the same or different slave device(s)) as a quality-of-service associated therewith becomes acceptable (e.g., improves/becomes above the threshold). The master device M may then wirelessly receive (Block 1303) an acknowledgment ("ACK") from the slave device(s) that the slave device(s) can provide the processing capability. Moreover, the master device M can receive (Block 1304) the processing capability from the slave device(s). For example, the slave device(s) of FIG. 3C may agree to transmit signals (as illustrated in FIG. 3D) to the destination device on behalf of the master device M. In some embodiments, one or more of the operations of FIG. 13C may be performed prior to at least one of the operations of FIG. 13B. Alternatively, the operations of FIG. 13C may be performed without performing the operations of FIG. 13B.

Figure 13D:
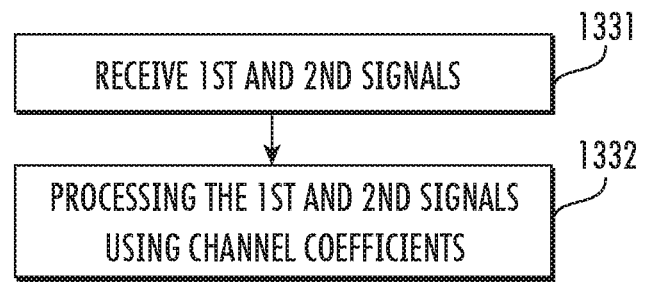

Referring to FIG. 13D, a receiver Rx (FIGS. 1A, 1B, 3A) may receive (Block 1331) first and second signals from a transmitter Tx, comprising functions of signals χ (or χ') and y (or y') that the transmitter Tx has transmitted. For example, the receiver Rx may receive functions of the first and second signals χ (or χ') and y (or y') that are transmitted by the transmitter Tx (Block 1330) in FIG. 13A. In some embodiments, the receiver Rx may receive the functions of the first and second signals χ (or χ') and y (or y') concurrently in time and co-frequency with one another over different respective polarizations (e.g., H and V) of the receiver Rx. Moreover, the receiver Rx may process (Block 1332) the functions of the first and second signals χ (or χ') and y (or y') using one or more channel coefficients (e.g., $\alpha_{VV}$, $\alpha_{VH}$, $\beta_{HV}$, and/or $\beta_{HH}$).

Figure 14:
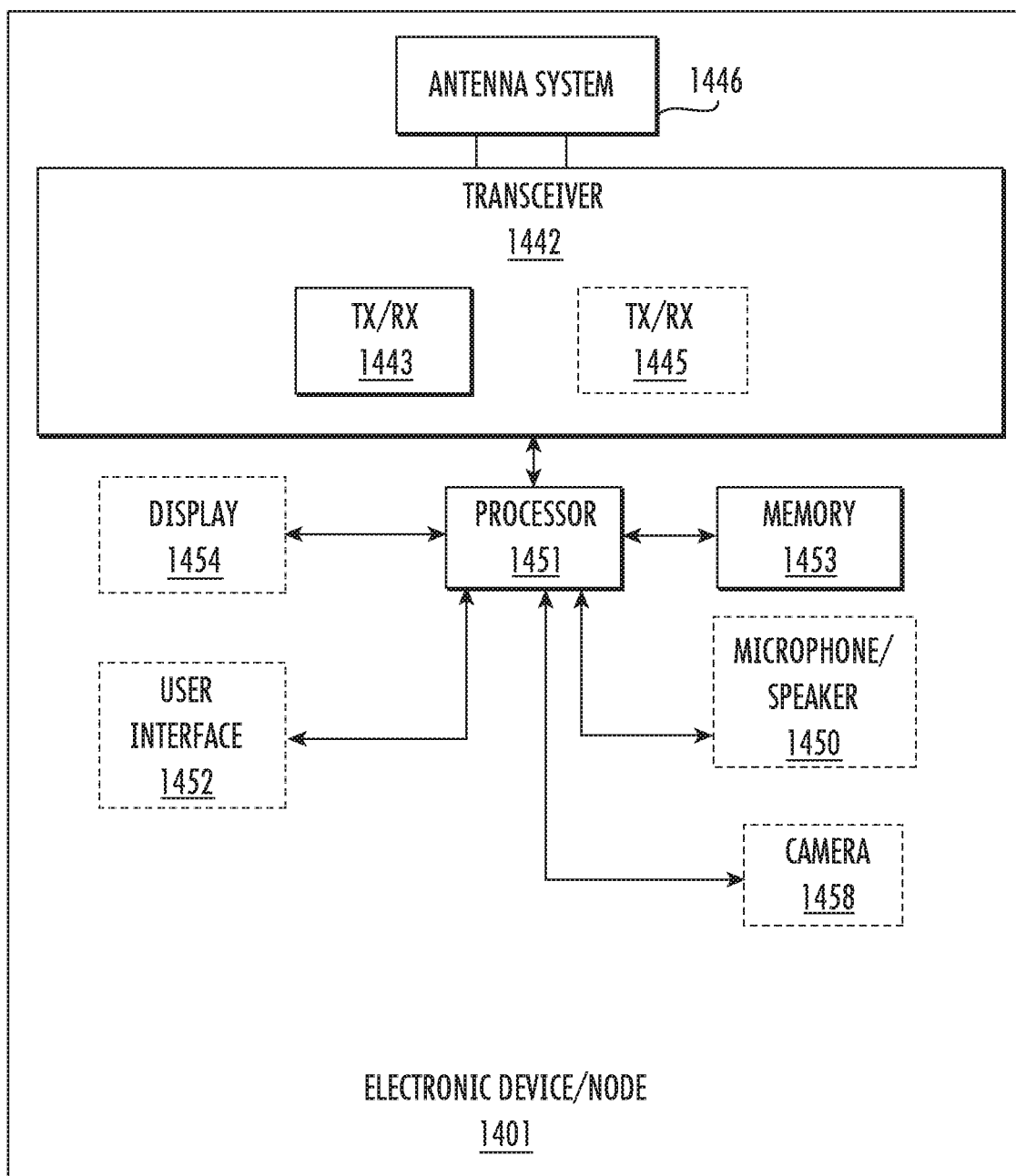
FIG. 14 is a block diagram of an electronic device, according to some embodiments of the present inventive concepts.

FIG. 14 is a block diagram of an electronic device/node 1401, according to some embodiments of the present inventive concepts. Any device among a transmitter Tx, a receiver Rx, a master device M (FIG. 3C), and slave device(s) S1/S2

(FIG. 3C) may include components of the electronic device/ node 1401. For example, the electronic device/node 1401 may be a wireless electronic user device, such as a smartphone, a smartwatch, a tablet computer, or a laptop computer. Alternatively, the electronic device/node 1401 may be a base station BTS (FIG. 3C).

As illustrated in FIG. 14, an electronic device/node 1401 may include an antenna system 1446, a transceiver 1442, a processor (e.g., processor circuit) 1451, and a memory 1453. Moreover, the electronic device/node 1401 may optionally include a display 1454, a user interface 1452, a microphone/ speaker 1450, and/or a camera 1458.

A transmitter portion of the transceiver 1442 may convert information, which is to be transmitted by the electronic device/node 1401, into electromagnetic signals suitable for radio communications. A receiver portion of the transceiver 1442 may demodulate electromagnetic signals, which are received by the electronic device/node 1401. The transceiver 1442 may include transmit/receive circuitry (TX/RX) that provides separate communication paths for supplying/receiving RF signals to different radiating elements of the antenna system 1446 via their respective RF feeds. Accordingly, when the antenna system 1446 includes two antenna elements, the transceiver 1442 may include two transmit/ receive circuits 1443, 1445 connected to different ones of the antenna elements via the respective RF feeds. For example, the transmit/receive circuit 1443 may be connected to a Wi-Fi antenna or a close/short-range (e.g., a BLUETOOTH® or Wi-Fi) antenna, whereas the transmit/receive circuit 1445 may be connected to a cellular antenna. Moreover, in some embodiments, the antenna system 1446 may include first and second cellular antennas that generate different first and second polarizations, respectively.

Referring still to FIG. 14, the memory 1453 can store computer program instructions that, when executed by the processor circuit 1451, carry out operations of the electronic device/node 1401. In some embodiments, the memory 1453 can be a non-transitory computer readable storage medium including computer readable program code therein that when executed by the processor 1451 causes the processor 1451 to perform a method described herein. As an example, the memory 1453 can store computer readable program code that can perform the operations illustrated in Blocks 1310 and 1320 of the flow chart of FIG. 13A or the operation(s) Block 1332 of the flow chart of FIG. 13D. Moreover, in some embodiments, the processor 1451 may coordinate with the transceiver 1442 to perform the operations illustrated in Blocks 1310 and 1320 of the flow chart of FIG. 13A or the operation(s) Block 1332 of the flow chart of FIG. 13D. For example, the processor 1451 and/or the transceiver 1442 may use one or more channel coefficients, to pre-compensate and/or pre-distort (before transmission) or post-compensate/ post-distort (after transmission) for cross-polarized and/or co-polarized RF signals. The memory 1453 can be, for example, a non-volatile memory, such as a flash memory, that retains the stored data while power is removed from the memory 1453.

Figure 15:
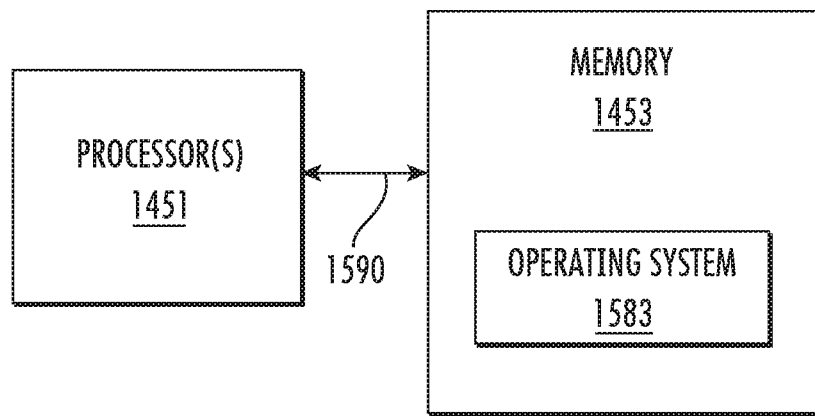
FIG. 15 is a block diagram of an example processor and memory that may be used in accordance with embodiments of the present inventive concepts.

FIG. 15 is a block diagram of an example processor 1451 and memory 1453 that may be used in accordance with embodiments of the present inventive concepts. The processor 1451 communicates with the memory 1453 via an address/data bus 1590. The processor 1451 may be, for example, a commercially available or custom microprocessor. In some embodiments, the processor 1451 may be a digital signal processor. Moreover, the processor 1451 may include multiple processors. The memory 1453 is representative of the overall hierarchy of memory devices containing the software and data used to implement various functions as described herein. The memory 1453 may include, but is not limited to, the following types of devices: cache, ROM, PROM, EPROM, EEPROM, flash, Static RAM (SRAM), and Dynamic RAM (DRAM).

Referring still to FIG. 15, the memory 1453 may hold various categories of software and data, such as an operating system 1583. The processor 1451 and memory 1453 may be part of an electronic device/node 1401. Accordingly, the operating system 1583 can control operations of the electronic device/node 1401. In particular, the operating system 1583 may manage the resources of the electronic device/ node 1401 and may coordinate execution of various programs by the processor 1451.

It would be unduly repetitious and obfuscating to describe in detail and/or illustrate every combination and/or subcombination of the plurality of embodiments that are described herein. Accordingly, the present specification, including the drawings and Claims thereof shall be construed to constitute a complete written description of all combinations and/or sub-combinations of the embodiments described herein, and of the manner and process of making and using them, and shall support Claims to any such combination and/or sub-combination.

Increasing Spectral Efficiency by Co-Frequency Transmissions

According to additional inventive concepts that will now be described, first and second devices, at least one of which may be a mobile device such as, for example, a smartphone, may transmit/radiate, using respective antenna elements thereof, respective first and second signals occurring concurrently in time therebetween. The first and second devices may also transmit/radiate the respective first and second signals co-frequency therebetween. As used herein, the phrase "concurrently in time therebetween" means that the first signal is being transmitted/radiated by an antenna of the first device over a first interval of time defined by $t_{11} \le t \le t_{12}$ and that the second signal is being transmitted/radiated by an antenna of the second device over a second interval of time defined by $t_{21} \le t \le t_{22}$, wherein according to some embodiments, $t_{11} \le t_{21} < t_{12}$. Moreover, the phrase "co-frequency therebetween" means that the first signal that is being transmitted/ radiated by the first device comprises a frequency (or frequencies), and that the second signal that is being transmitted/radiated by the second device also comprises said frequency (or frequencies).

Figure 16:
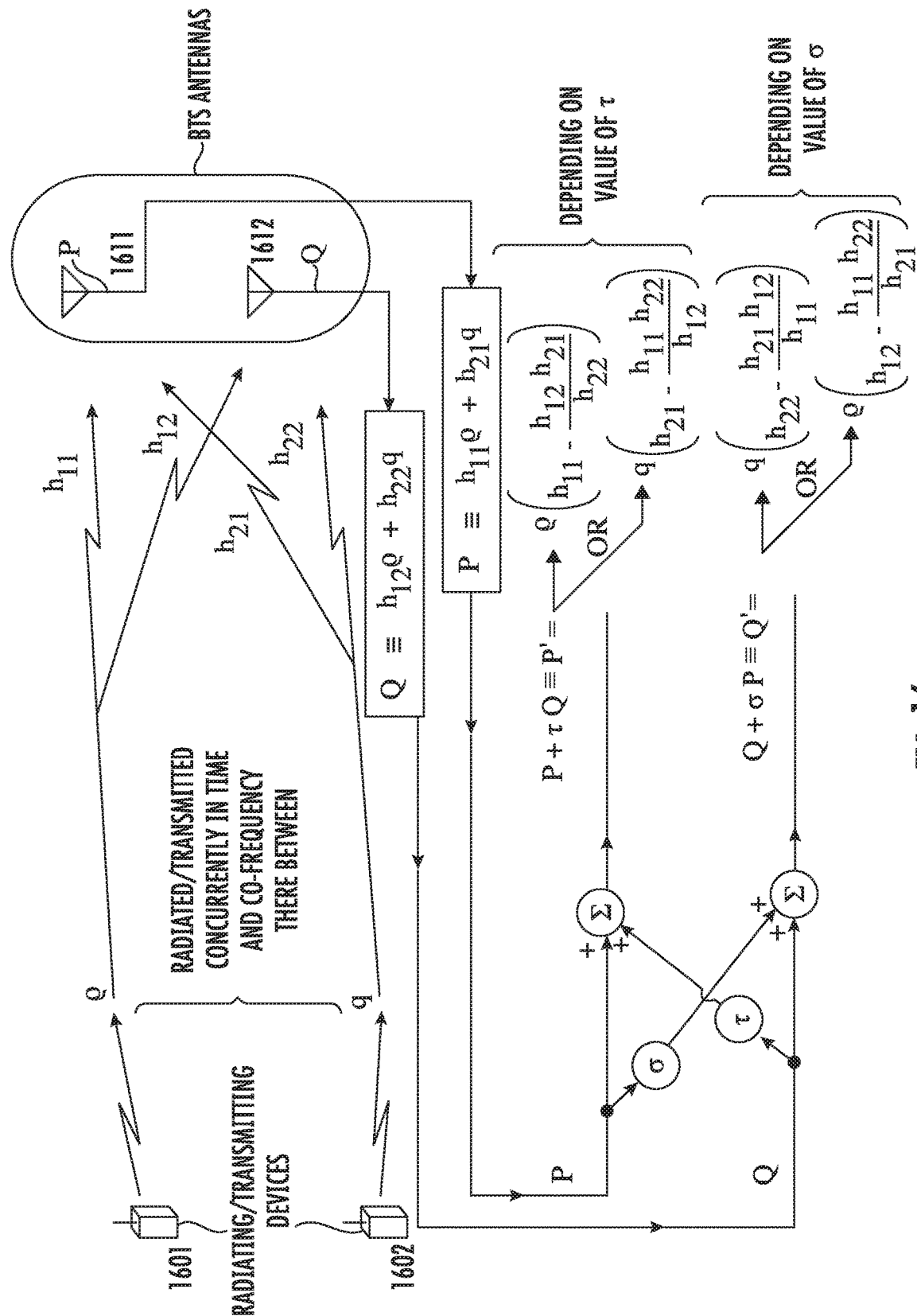
FIGS. 16-21 are schematic illustrations of systems/methods according to embodiments of the present invention.

Referring now to FIG. 16, first and second devices 1601, 1602 are illustrated transmitting/radiating, concurrently in time therebetween and co-frequency therebetween, signals ρ and q, respectively. The signals ρ and q may comprise a statistical independence therebetween. Signals that are unrelated/independent to/from one another and/or represent different types of information may be said to comprise a statistical independence therebetween. For example, signal ρ may represent transmitting a voice conversation while signal q may represent transmitting data associated with a picture or data associated with a chapter of a book. Still referring to FIG. 16, first and second antennas 1611, 1612 of a BTS are illustrated, receiving respective signals P and Q, responsive to the signals ρ and q having been transmitted/ radiated by said first and second devices 1601, 1602, respectively; wherein $P \equiv (h_{11})\rho + (h_{21})q;$ $Q \equiv (h_{12})\rho + (h_{22})q;$ and wherein $h_{11}$, $h_{12}$, $h_{21}$ and $h_{22}$ denote channel coefficients that may be complex-valued and/or time-varying and may, according to some embodiments, also be frequency dependent, as will be appreciated by those skilled in the art. It will be understood that in the expressions above for the signals P and Q, noise has been ignored for the sake of simplicity. As is further illustrated in FIG. 16, linear combinations of the signals P and Q may be formed at the BTS, yielding the signals $$P'=P+\tau Q; \text{ and}$$

$$Q'=Q+\sigma P;$$

wherein, by letting $\tau=-h_{21}/h_{22}$ and $\sigma=-h_{12}/h_{11}$, the signals P' and Q' may become substantially decoupled/independent from one another yielding:

$$P'=[h_{11}-(h_{12}h_{21}/h_{22})]\rho; \text{ and}$$

$$Q'=[h_{22}-(h_{12}h_{21}/h_{11})]q.$$

Finally, P' may be multiplied by (or approximately by) $1/[h_{11}-(h_{12}h_{21}/h_{22})]$ to yield substantially ρ, and Q' may be multiplied by (or approximately by) $1/[h_{22}-(h_{12}h_{21}/h_{11})]$ to yield substantially q.

Values of the channel coefficients $h_{11}$, $h_{12}$, $h_{21}$ and $h_{22}$ may be estimated using techniques known to those skilled in the art, such as, for example, by processing pilot signals. Pilot signals may be included in signals ρ and q, and/or in other signals that may be received at the BTS from radiating/transmitting devices 1601 and 1602 and/or received at the radiating/transmitting devices 1601 and 1602 from the BTS. In some embodiments, the channel coefficients $h_{11}$, $h_{12}$, $h_{21}$ and $h_{22}$ may be estimated at the BTS and/or by a processor (e.g., a processor 1451 (FIG. 14)) associated therewith (that may be at the BTS in some embodiments). In other embodiments, such as, for example, in a TDD embodiment wherein forward and return links comprise common frequencies therebetween, and wherein the channel (or channels) involved in propagation from/to radiating/transmitting devices 1601 and 1602 to/from the BTS comprises quasi-static and reciprocal characteristics, said channel coefficients $h_{11}$, $h_{12}$, $h_{21}$ and $h_{22}$ may be estimated at the radiating/transmitting devices 1601 and 1602 and used thereat, relayed to the BTS to be used thereat and/or estimated at the BTS and used thereat and/or relayed to the radiating/transmitting devices 1601 and 1602 to be used thereat. Accordingly, in such TDD embodiments, instead of multiplying P' as described above, at the BTS, by (or approximately by) $1/[h_{11}-(h_{12}h_{21}/h_{22})]$ to yield substantially p, and further multiplying Q' as described above, at the BTS, by $1/[h_{22}-(h_{12}h_{21}/h_{11})]$, or by a quantity approximate to $1/[h_{22}-(h_{12}h_{21}/h_{11})]$, to yield substantially q, such multiplications may be performed at/by the radiating/transmitting devices 1601 and 1602 on signals ρ and q, respectively (as will further be discussed below in reference to FIG. 19).

In some embodiments, respective pilot signal(s) of ρ and q comprise substantially different frequencies therebetween (or different FFT bins therebetween). This is to reduce/prevent overlap/interference between a pilot signal of ρ and a pilot signal of q at, for example, the BTS and thus allow a BTS processor (or any other processor) to estimate said channel coefficients $h_{11}$, $h_{12}$, $h_{21}$ and $h_{22}$ more reliably. In accordance with one convention (as illustrated in FIG. 16), a BTS antenna that is arbitrarily designated/labeled as "first" or "1611" may associate a received signal whose pilot(s) are in "first" predetermined locations with the signal ρ and with the channel coefficient $h_{11}$ whereas a signal being received by the same "1611" BTS antenna, whose pilot(s) are at "second" predetermined locations, may be associated with the signal q and with the channel coefficient $h_{21}$. Similarly, in accordance with the convention, a BTS antenna that is arbitrarily designated/labeled as "second" or "1612" may associate a received signal whose pilots are in "first" predetermined locations with the signal ρ and with the channel coefficient $h_{12}$ whereas a signal being received by the same "1612" BTS antenna, whose pilots are at "second" predetermined locations, may be associated with the signal q and with the channel coefficient $h_{22}$.

It will be understood that instead of letting $\tau=-h_{21}/h_{22}$ and $\sigma=-h_{12}/h_{11}$ as described above, values of τ and σ may be set as follows: $\beta=-h_{11}/h_{12}$ and $\sigma=-h_{22}/h_{21}$ to yield:

$$P'=[h_{21}-(h_{11}h_{22}/h_{12})]q; \text{ and}$$

$$Q'=[h_{12}-(h_{11}h_{22}/h_{21})]\rho.$$

Then, P' may be multiplied by (or multiplied approximately by) $1/[h_{21}-(h_{11}h_{22}/h_{12})]$ to yield substantially q, and Q' may be multiplied by $1/[h_{12}-(h_{11}h_{22}/h_{21})]$, or may be multiplied by a quantity approximate to $1/[h_{12}-(h_{11}h_{22}/h_{21})]$, to yield substantially ρ. Accordingly, in some embodiments, the quantity P' may be used to provide an estimate of ρ or q depending on the setting of τ, as is further illustrated in FIG. 16, and the quantity Q' may be used to provide an estimate of q or ρ depending on the setting of σ, as is further illustrated in FIG. 16.

The phrase "or multiplied approximately by" or "may be multiplied by a quantity approximate to" is used hereinabove to allow for embodiments in which a noise enhancement penalty may be reduced by deviating from "ideal channel inversion" or "ideal channel equalization." That is, the quantities P' and Q' may include noise and/or interference terms that have been omitted from the expressions above for the sake of simplicity and clarity. Thus, multiplying P' above by, for example, $1/[h_{21}-(h_{11}h_{22}/h_{12})]$, as may be necessary to "ideally invert" or "ideally equalize" effects of propagation (and thus yield a quantity that is substantially devoid of propagation effects/distortion to be used to deduce/estimate q), may substantially increase a noise/interference variance associated therewith, particularly if the magnitude of $1/[h_{21}-(h_{11}h_{22}/h_{12})]$ is substantially greater than unity; (that is, particularly if $1/[h_{21}-(h_{11}h_{22}/h_{12})]|>>1$; wherein |•| denotes magnitude of "•"). Similar statements may be made relative to Q' above.

In some embodiments, a processor (e.g., a processor 1451 (FIG. 14)), that may be at the BTS, may be configured to perform operations comprising:

forming the quantities $P'=P+\tau Q$ and $Q'=Q+\sigma P$; and setting $\tau=-h_{21}/h_{22}$ and $\sigma=-h_{12}/h_{11}$ therein.

In other embodiments, the processor, that may be at the BTS, may be configured to perform operations comprising: forming the quantities $$P'=P+\tau Q; \text{ and}$$

$$Q'=Q+\sigma P;$$

and setting $\tau=-h_{11}/h_{12}$ and $\sigma=-h_{22}/h_{21}$ therein. In further embodiments, the processor, that may be at the BTS, may be configured to perform operations comprising: forming the quantities $$P'=P+\tau Q; \text{ and}$$

$$Q'=Q+\sigma P;$$

and setting $\tau=-h_{21}/h_{22}$ and $\sigma=-h_{12}/h_{11}$ therein over a first interval of time; and then, setting $\tau=-h_{11}/h_{12}$ and $\sigma=-h_{22}/h_{21}$ therein over a second interval of time; or vice versa. In some embodiments, changing by said processor from a first set of values of τ and σ to a second set of values of τ and σ may be responsive to a change of a state of a propagation channel (or propagation medium); wherein the change of the state of the propagation channel may comprise a change therein in fading, attenuation, interference and/or noise.

Thus, in accordance with the inventive concepts described above, a plurality of devices may transmit/radiate a plurality of signals, respectively, using a respective plurality of antennas thereof; wherein said plurality of signals may be transmitted/radiated concurrently in time therebetween and co-frequency therebetween. It will be understood that even though only two devices 1601, 1602 are illustrated in FIG. 16 as transmitting/radiating two respective signals, ρ and q, concurrently in time therebetween and co-frequency therebetween, the inventive concepts described herein are not limited to two devices. In some embodiments, a number of devices that is greater than two may be used to transmit/radiate, concurrently in time therebetween and co-frequency therebetween, a number of respective signals that is greater than two. In such embodiments, a number of BTS antennas may be greater than two. That is, in such embodiments, a BTS that is receiving said number of signals that is greater than two may comprise an antenna system comprising a number of distinct antenna elements that is greater than two (e.g., a number of spaced-apart antenna elements that is greater than two).

In some embodiments, a number of antennas (or antenna elements) at/of a BTS may be greater than one (i.e., two or more) in order to allow processing at the BTS as described earlier and as illustrated in FIG. 16. Said number of antennas (or antenna elements) at/of the BTS may be substantially localized on one antenna tower at/of the BTS, at various horizontal and/or vertical positions thereof, or may be distributed over a plurality of antenna towers at/of the BTS, spanning a geographic area that is associated with said BTS. Further, at least some of said number of antennas (or antenna elements) may be connected to the BTS and may be positioned at/on houses, buildings, water towers, utility poles/towers and/or other structures, spanning the geographic area that is associated with the BTS. In some embodiments, a roof of a house (and/or one or more walls thereof) may be equipped with one or more antennas and various other electronics, that may be connected thereto, as appropriate and as known to those skilled in the art. Accordingly, in some embodiments, a signal may be received at the house, via the one or more antennas thereof, amplified and/or further processed thereat, using said various other electronics, and retransmitted. In some embodiments, said signal may comprise a satellite signal; i.e., a signal transmitted by an Earth-orbiting satellite. Such a satellite signal may be received at the house, via the one or more antennas thereof, amplified and/or further processed thereat, using said various other electronics, and retransmitted. Said retransmitted may comprise a local retransmission that covers, for example, a radius of 1000 meters around the house. The local retransmission may be received by one or more end user devices such as, for example, one or more smartphones that include satellite mode communications capability. The one or more end user devices may respond by transmitting a return-link satellite signal which may be received at the house, via the one or more antennas thereof, amplified and/or further processed thereat, using said various other electronics, and retransmitted to the satellite. It will be understood that receiving a satellite signal at the house, from a satellite, and/or transmitting a signal from the house to the satellite may best be accomplished by using one or more antennas of the house that relate to the roof thereof. Further, it will be understood that receiving a signal at the house, from an end user device, and/or transmitting a signal from the house to the end user device may best be accomplished by using one or more antennas of the house that relate to one or more wall/side thereof. It will also be understood that instead of a house, or in conjunction with the house, other buildings, water towers, utility poles/towers and/or other structures may be used. Those skilled in the art will understand that, in the example given above, the house including the one or more antennas and various other electronics thereof serve as a repeater and/or base station.

Figure 20:
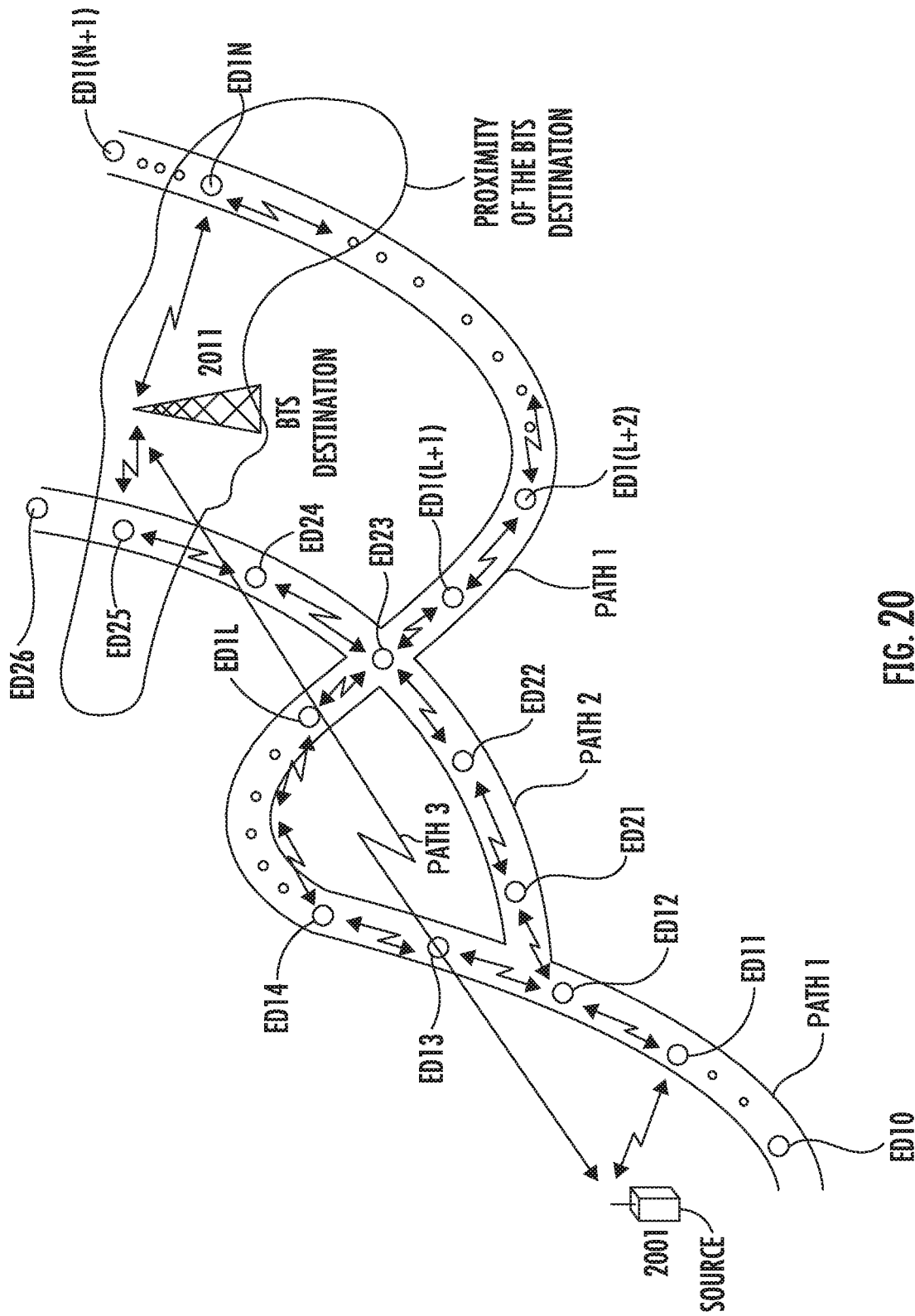
Figure 21:
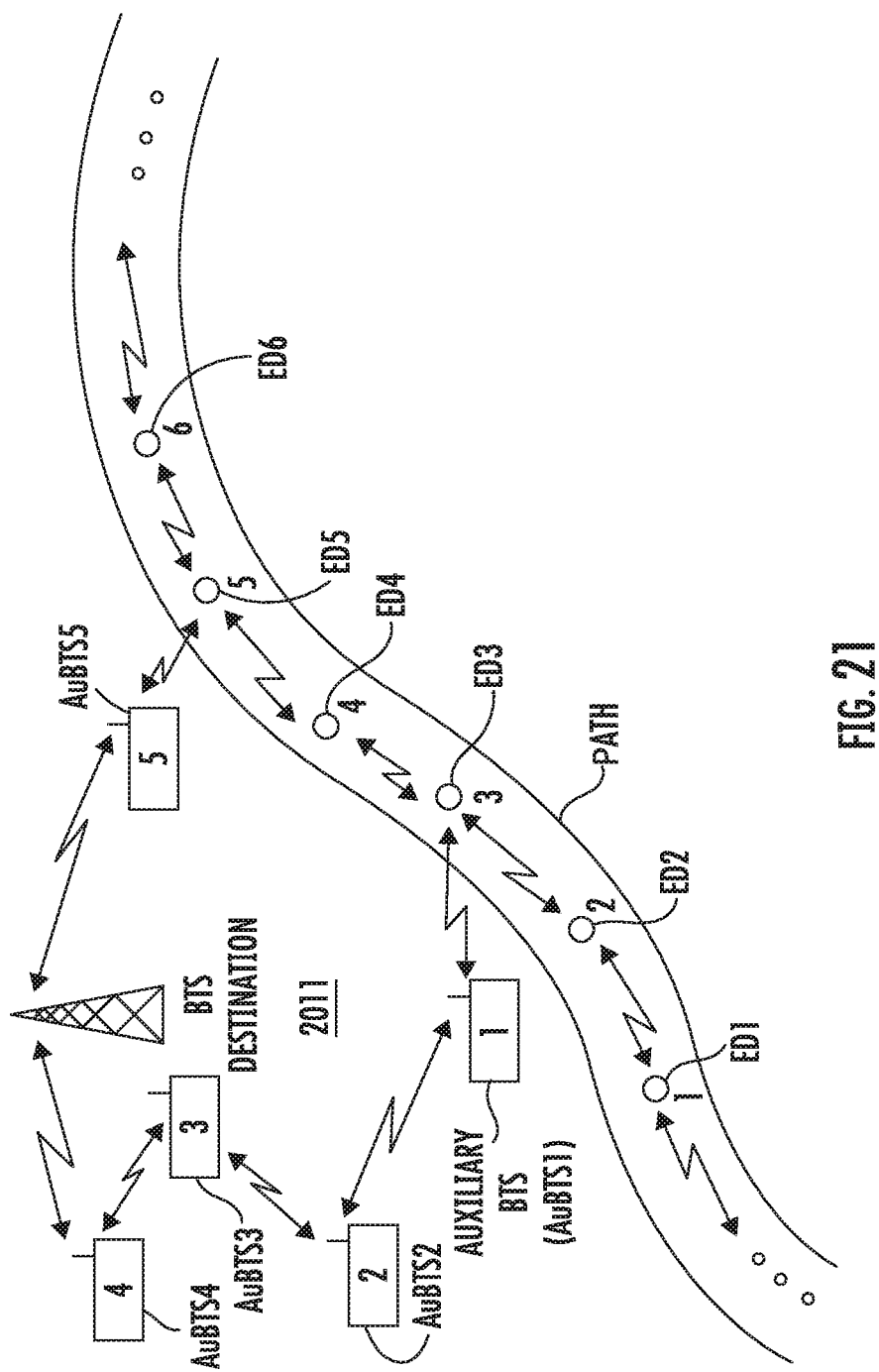

In some embodiments, each one of a plurality of houses and/or other structures spanning a geographic area that is associated with a BTS may be equipped with electronics and an antenna system; wherein said electronics and antenna system may be termed/labeled as an auxiliary base station ("Auxiliary BTS" or "AuBTS"; as illustrated in FIG. 21), that may be connected to the BTS and may be configured to perform operations comprising: receiving, directly and/or indirectly via one or more intermediary electronic devices (as illustrated in FIGS. 20 and/or 21), information from a plurality of transmitting/radiating devices (such as the devices 1601, 1602 illustrated in FIG. 16) and relaying the received information from the transmitting/radiating devices to the BTS; and receiving information from the BTS (wirelessly and/or otherwise) and transmitting/radiating the information that is received from the BTS to said plurality of transmitting/radiating devices directly thereto and/or via one or more intermediary electronic devices (it will be understood that the transmitting/radiating devices 1601, 1602 of FIG. 16 are also capable of receiving).

In accordance with some embodiments, a wireless provider/operator, such as, for example, VERIZON WIRELESS®, may deploy an "antenna farm" over the service area of the BTS; wherein each element of the antenna farm may be connected to the BTS; wherein "antenna farm" means that each of a plurality of houses and/or other structures spanning the geographic area that is associated with the BTS may be equipped with electronics and an antenna system; and wherein the electronics and the antenna system may be connected to the BTS and may be configured to perform operations as stated above. Those skilled in the art will appreciate that as a density of the antenna farm increases over the geographic area that is associated with the BTS, a frequency reuse associated with the antenna farm increases and a power radiated to/from the antenna farm per device being served by, and communicating with, the antenna farm (and, therefore, with the BTS) decreases. Furthermore, a distance between a component of the antenna farm (e.g., a distance between an antenna of the antenna farm) and a device being served by, and communicating with, the component of the antenna farm decreases. Accordingly, frequencies higher than conventional cellular frequencies may be used, at least in providing forward-link communications. The term "electronics" as used above may comprise amplification, frequency translation, regeneration of data, reformatting of data, filtering, conversion from one air interface to another air interface and/or any other signal processing operation.

It will also be understood that, in some embodiments, at least one of the signals ρ and q may be a four-dimensional signal comprising two spatial dimensions and, for each spatial dimension, two phase dimensions. That is, at least one of the signals ρ and q may comprise a vertical component ("V-component") and may further comprise a horizontal component ("H-component") that are substantially in spatial quadrature therebetween (at least at the point of being launched); wherein the V-component comprises an in-phase ("I") component and a quadrature ("Q") component that are in substantial phase quadrature therebetween (at least at the point of being launched); and wherein the H-component also comprises an I component and a Q component that are in substantial phase quadrature therebetween (at least at the point of being launched). In some embodiments, each one of the signals ρ and q may be a four-dimensional signal. Accordingly, in embodiments relating to four-dimensional signal transmission/reception, antennas associated therewith may each be of a two-dimensional nature, comprising, for example, a vertically polarized element and a horizontally-polarized element. Referring to FIG. 16, if, for example, the signal ρ comprises a four-dimensional signal, an antenna of device 1601 that is launching the signal ρ comprises a two-dimensional nature that may comprise a vertically polarized element and a horizontally polarized element. Also, antennas 1611 and 1612 of the BTS each may comprise a two-dimensional nature that may comprise a first element that is polarized in a first aspect/dimension (e.g., a vertically polarized element) and a second element that is polarized in a second aspect/dimension (e.g., a horizontally polarized element).

It will be understood that according to some embodiments of inventive concepts described herein, each one of first and second signals that may be radiated/transmitted by respective first and second devices, may be a multi-dimensional signal; wherein, in some embodiments, the multi-dimensional signal comprises four dimensions; and wherein said first and second signals may be statistically independent therebetween. Further, it will be understood that a first dimension of each multi-dimensional signal may comprise a signal that is statistically independent from a signal that is included in a second dimension of said multi-dimensional signal.

According to embodiments wherein each one of two signals, such as, for example, the two signals ρ and q of FIG. 16, is a four-dimensional signal and, as described earlier and is illustrated in FIG. 16, the two signals ρ and q are transmitted concurrently in time therebetween and co-frequency therebetween, in order to increase a channel capacity or throughput, a BTS receiver may be configured to perform operations comprising: jointly processing first and second signals received by respective first and second antennas of the BTS to reduce an interdependence (or interference) therebetween caused by a propagation medium; and thus derive processed first and second signals that are substantially statistically independent and/or unrelated/decoupled therebetween; for example, jointly processing the two signals P and Q of FIG. 16 to reduce an interdependence/interference/coupling therebetween caused by propagation, such that resulting signals P' and Q' of FIG. 16, following said jointly processing, are substantially statistically independent and/or unrelated/decoupled therebetween; and then, processing said processed first and second signals that are substantially statistically independent and/or unrelated/decoupled therebetween to reduce an interference from a first polarization thereof into a second polarization thereof. In some embodiments, the order of said operations, as described above, may be reversed in that interference from said first polarization into said second polarization may be reduced first followed by a reduction of interference caused by the propagation medium within a given polarization.

It will be understood that even though FIG. 16 illustrates transmission of signals ρ and q to a BTS by respective first "1601" and second "1602" devices, at least one of which (or each one of which) may be a mobile device such as, for example, a smartphone, the BTS may also transmit first and second signals, $S_{BTS1}$ and $S_{BTS2}$ (FIG. 17), respectively, in order to convey signals ρ' and q' to the first and second devices, respectively. In accordance with a first mode of operation of the BTS, "mode 1" of the BTS, the BTS may transmit the first and second signals, $S_{BTS1}$ and $S_{BTS2}$, respectively, concurrently in time with the transmissions of the first and second devices 1601, 1602 and non-co-frequency with the transmissions of the first and second devices 1601, 1602; or the BTS may transmit the first and second signals, $S_{BTS1}$ and $S_{BTS2}$, respectively, non-concurrently in time with the transmissions of the first and second devices 1601, 1602 and further, non-co-frequency with the transmissions of the first and second devices 1601, 1602 (wherein the term "non-co-frequency" means using frequencies other than those used by the first and second devices 1601, 1602). In accordance with a second mode of operation of the BTS, "mode 2" of the BTS, the BTS may radiate and/or wirelessly transmit the first and second signals, $S_{BTS1}$ and $S_{BTS2}$, respectively, non-concurrently in time with the transmissions of the first and second devices 1601, 1602 and the BTS may do so co-frequency therewith. In mode 2, the BTS may be said to operate in accordance with a TDD mode and in accord with a channel reciprocity principle wherein an invariance in channel coefficient values is provided/assumed between forward- and return-link transmissions using the same frequency (or frequencies). In the TDD mode, the BTS may transmit the first and second signals, $S_{BTS1}$ and $S_{BTS2}$, in order to convey the signals ρ' and q' to the first and second devices 1601, 1602, respectively, using the same frequencies that are also used by the first and second devices 1601, 1602 to transmit the signals ρ and q to the BTS. It will be understood, however, that in some embodiments wherein a bandwidth of ρ' and/or q' exceeds that of ρ and/or q, the BTS operating in the TDD mode may also use frequencies other than those used by the first and second devices 1601, 1602 to transmit the signals ρ and q to the BTS. In such embodiments, channel reciprocity may hold over a first frequency interval while over a second frequency interval channel reciprocity may not hold requiring processing by the devices 1601 and 1602 in order to estimate channel coefficient values over said second frequency interval.

Figure 17:
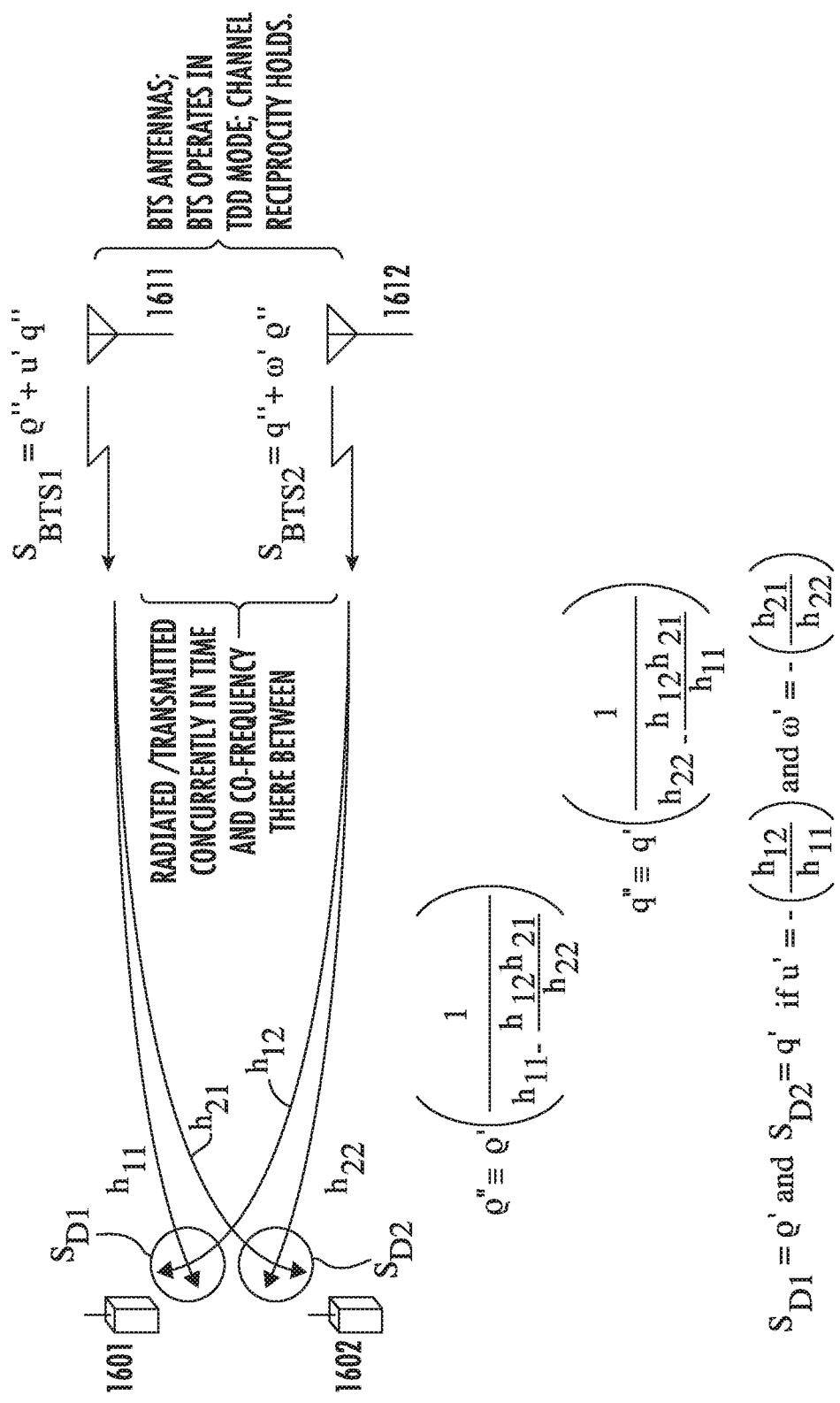

FIG. 17 illustrates the BTS in the TDD mode, wherein the BTS is transmitting the first and second signals, $S_{BTS1}$ and $S_{BTS2}$, respectively, using respective first and second antennas 1611, 1612 thereof, in order to convey signals ρ ' and q' to the first and second devices 1601, 1602, respectively; wherein the BTS is doing so using the same frequencies as used by the first and second devices 1601, 1602 to transmit the signals ρ and q to the BTS. Furthermore, still referring to FIG. 17, the channel is assumed to be, and is illustrated as being, reciprocal and quasi-static. That is, a channel gain (or channel coefficient), such as, for example, the channel gain "$h_{11}$" of FIG. 16, that is associated with propagation from device 1601 to BTS antenna 1611 at a given frequency is also used in FIG. 17 to characterize the channel gain associated with propagation by a signal from BTS antenna 1611 to device 1601 at the frequency, as is illustrated in FIG. 17; this relates to the reciprocity aspect of the channel. Similarly, a channel gain, such as the channel gain "$h_{12}$" of FIG. 16, that is associated with propagation from device 1601 to BTS antenna 1612 at a given frequency is also used in FIG. 17 to characterize the channel gain associated with propagation by a signal from BTS antenna 1612 to device 1601 at the frequency, as is illustrated in FIG. 17; this also relates to the reciprocity aspect of the channel. Channel reciprocity may also be seen illustrated in FIG. 17, relative to the FIG. 16 channel gains of $h_{22}$ and $h_{21}$. Further, if the channel coefficients change slowly relative to the transmit-receive TDD cycle, then this relates to the quasi-static aspect of the channel and allows the same coefficient values to be substantially valid and useable for both receive and transmit processing operations.

Still referring to FIG. 17, the BTS is to relay a signal ρ' to device 1601 and a signal q' to device 1602. To accomplish this, the BTS, using a processor (e.g., a processor 1451 (FIG. 14)) thereof, may form (i.e., generate) and transmit signals $S_{BTS1}$ and $S_{BTS2}$ using respective first "1611" and second "1612" antennas thereof, as is illustrated in FIG. 17; wherein $$S_{BTS1}=\rho'\{1/[h_{11}-(h_{12}h_{21}/h_{22})]\}+u'q'\{1/[h_{22}-(h_{12}h_{21}/h_{11})]\}; \text{ and}$$

$$S_{BTS2}=q'\{1/[h_{22}-(h_{12}h_{21}/h_{11})]\}+\omega'\rho'\{1/[h_{11}-(h_{12}h_{21}/h_{22})]\}.$$

Accordingly, it may be shown that, by setting $u'=-h_{12}/h_{11}$ and $\omega'=-h_{21}/h_{22}$, aggregate signals received at devices 1601 and 1602, denoted as "$S_{D1}$" and "$S_{D2}$", respectively, comprise the signals ρ' and q', respectively, as intended by the BTS. In some embodiments, the antennas 1611 and 1612 of the BTS may be "flipped," in that BTS antenna 1611 may be used to transmit/radiate $S_{BTS2}$ and BTS antenna 1612 may be used to transmit/radiate $S_{BTS1}$. Doing so, while using the reciprocal values of the above values of u' and ω', i.e., setting $u'=-h_{11}/h_{12}$ (instead of $u'=-h_{12}/h_{11}$) and setting $\omega'=-h_{22}/h_{21}$ (instead of $\omega'=-h_{21}/h_{22}$), continues to yield the aggregate signals $S_{D1}$ and $S_{D2}$, at devices 1601 and 1602, respectively, comprising, respectively, the signals ρ' and q' as intended by the BTS.

Figure 18:
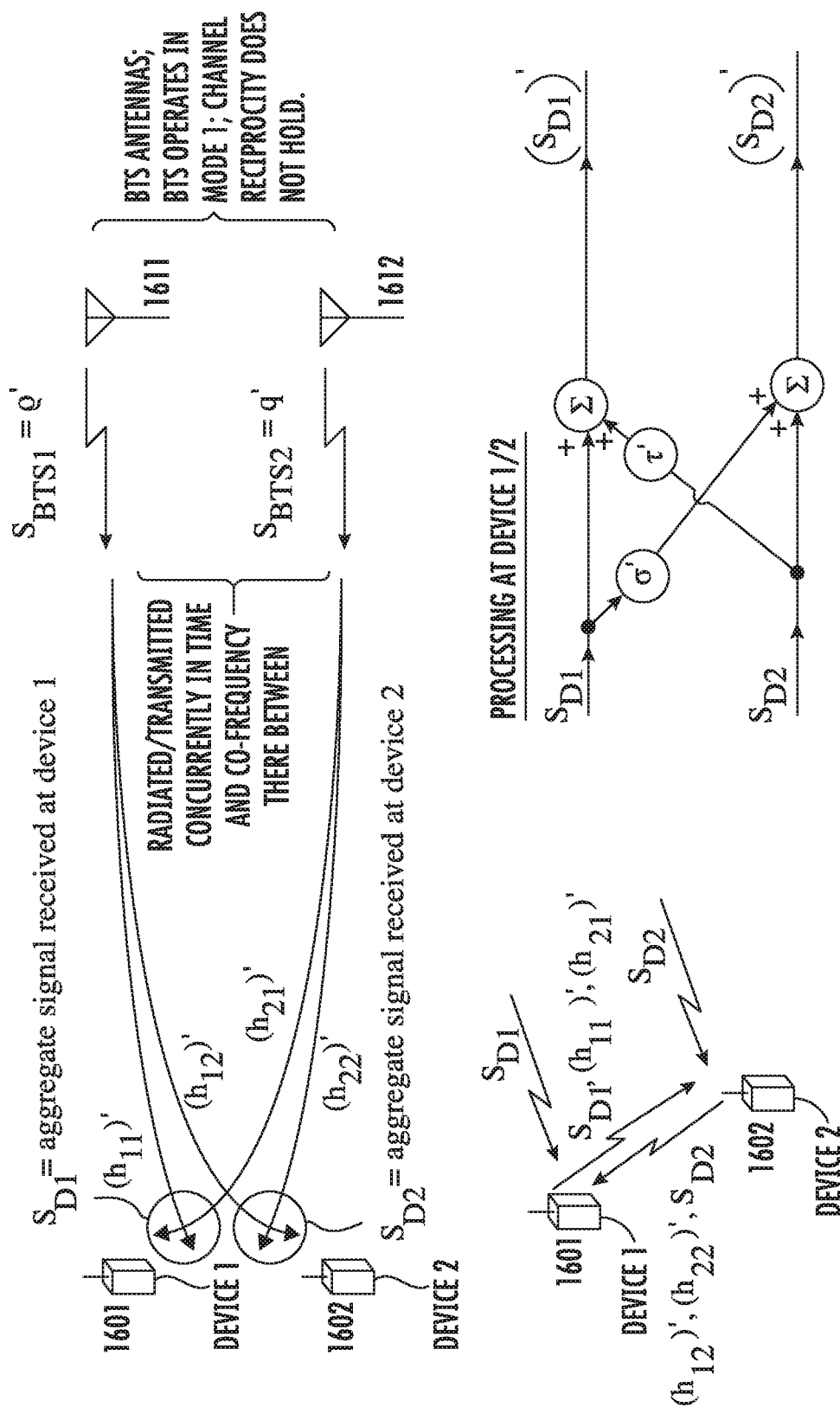

Next, we consider the case wherein the BTS is operating in mode 1; that is, in a mode wherein frequencies used by the BTS to radiate/transmit the signals $S_{BTS1}$ and $S_{BTS2}$ differ from frequencies used by devices 1601 and 1602 to radiate/transmit the signals ρ and q. Accordingly, channel reciprocity may not be assumed to hold. Referring to FIG. 18, the BTS is to relay a signal ρ' to device 1601 and a signal q' to device 1602 concurrently in time therebetween and co-frequency therebetween. However, the BTS is to relay the signal ρ' to device 1601 and the signal q' to device 1602 using frequencies that differ from those used by device 1601 and device 1602 to relay the signals ρ and q, respectively, to the BTS (i.e., the BTS is to relay the signal ρ' to device 1601 and the signal q' to device 1602 not co-frequency with either one of radiated/transmitted signals ρ and q that are radiated/transmitted to the BTS by devices 1601 and 1602, respectively). Referring to FIG. 18, it is seen that (ignoring noise and/or interference effects) an aggregate signal at device 1601, $S_{D1}$, comprises a linear combination of signals ρ' and q':

$$S_{D1}=(h_{11})'\rho'+(h_{21})'q'.$$

Similarly, (ignoring noise and/or interference effects) an aggregate signal at device 1602, $S_{D2}$, comprises a linear combination of signals ρ' and q':

$$S_{D2}=(h_{12})'\rho'+(h_{22})'q';$$

wherein the channel coefficients $(h_{11})'$, $(h_{12})'$, $(h_{21})'$ and $(h_{22})'$ define various forward-link transmission gains/attenuations associated with propagation from the first and second BTS antennas 1611, 1612, to the first and second devices 1601, 1602, as illustrated in FIG. 18; and wherein such coefficients may, in general, be frequency-dependent, time-varying and/or complex-valued. It will be understood by those skilled in the art that a BTS may radiate/transmit to more than two devices concurrently in time therebetween and co-frequency therebetween. For example, a BTS may use three antennas, any two of which may be spaced apart therebetween, to radiate/transmit signals ρ', q' and r' to respective first, second and third devices, at least one of which (or each one of which) may be a mobile device such as, for example, a smartphone.

Still referring to FIG. 18, the two devices, device 1601 and device 1602, that receive signals $S_{D1}$ and $S_{D2}$, respectively, may, responsive for example to one or more commands received thereat (at device 1601 and/or at device 1602) from the BTS, be configured to perform operations comprising: exchanging information therebetween, comprising device 1601 relaying $S_{D1}$, $(h_{11})'$ and/or $(h_{21})'$ to device 1602 and/or device 1602 relaying $S_{D2}$, $(h_{22})'$ and/or $(h_{12})'$ to device 1601. In some embodiments, unlicensed frequencies may be used by device 1601 to relay $S_{D1}$, $(h_{11})'$ and/or $(h_{21})'$ to device 1602 and/or by device 1602 to relay $S_{D2}$, $(h_{22})'$ and/or $(h_{12})'$ to device 1601. In other embodiments, licensed frequencies may be used by device 1601 to relay $S_{D1}$, $(h_{11})'$ and/or $(h_{21})'$ to device 1602 and/or by device 1602 to relay $S_{D2}$, $(h_{22})'$ and/or $(h_{12})'$ to device 1601. In some embodiments, wherein device 1601 and device 1602 are proximate therebetween (e.g., are proximate to one another and are, for example, within 100 feet or less of one another) said device 1601 relaying $S_{D1}$, $(h_{11})'$ and/or $(h_{21})'$ to device 1602 and/or device 1602 relaying $S_{D2}$, $(h_{22})'$ and/or $(h_{12})'$ to device 1601 may comprise direct relaying that is devoid of intervening elements being present and being used between device 1601 and device 1602 as relay stations to perform the relaying. In other embodiments, that may comprise a distance between device 1601 and device 1602 exceeding a proximity criterion (such as, for example, the two devices being at a distance that exceeds 100 feet from one another and/or a blockage and/or signal attenuation therebetween exceeding a threshold) intervening elements may be used as relay stations in performing the relaying. It will be understood that a relay station (which may comprise a device identical to, or similar to, device 1601 or device 1602) may be configured to perform operations comprising: coordinating signal transmission strengths with device 1601, device 1602 and/or with another relay station, receiving data, demodulating the data, regenerating the data and/or reformatting the data and retransmitting the data.

Still referring to FIG. 18, at least one of device 1601 and device 1602 may include a processor (e.g., a processor 1451 (FIG. 14)) that may be configured to perform operations, as illustrated at the bottom of FIG. 18, comprising: processing first and second signals, respectively comprising aggregate signals received at device 1601 and at device 1602, $S_{D1}$ and $S_{D2}$, to form (i.e., generate) processed signals $(S_{D1})'$ and/or $(S_{D2})'$; wherein said processing first and second signals may comprise jointly processing the first and second signals; and wherein:

$$(S_{D1})'=S_{D1}+\tau'S_{D2}; \text{ and } (S_{D2})'=S_{D2}+\sigma'S_{D1};$$

as illustrated at the bottom of FIG. 18; wherein τ may be set to $\tau=-(h_{21})'/(h_{22})'$ to yield:

$$(S_{D1})'=\rho'[(h_{11})'-(h_{12})'(h_{21})'/(h_{22})'];$$

wherein the above value of $(S_{D1})'$ may be divided by $[(h_{11})'-(h_{12})'(h_{21})'/(h_{22})']$ to yield ρ'; and wherein σ may be set to $\sigma'=-(h_{12})'/(h_{11})'$ to yield:

$$(S_{D2})'=q'[(h_{22})'-(h_{12})'(h_{21})'/(h_{11})'];$$

wherein the above value of $(S_{D2})'$ may be divided by $[(h_{22})'-(h_{12})'(h_{21})'/(h_{11})']$ to yield q'.

It will be understood that, in some embodiments each one of device 1601 and device 1602 may perform the processing described above and may exchange information in order to compare results therebetween. It will also be understood that device 1601 and/or device 1602 may, in some embodiments, communicate the values of the various channel coefficients to the BTS so that, subject to a quasi-static channel condition/assumption, the BTS may perform the divisions discussed above by dividing $\rho'$ by $[(h_{11})'-(h_{12})'(h_{21})'/(h_{22})']$ and transmitting $S_{BTS1}=\rho'/[(h_{11})'-(h_{12})'(h_{21})'/(h_{22})']$ instead of transmitting $S_{BTS1}=\rho'$; and also dividing q' by $[(h_{22})'-(h_{12})'(h_{21})'/(h_{11})']$ and transmitting a quantity in accordance with said dividing, $S_{BTS2}=q'/[(h_{22})'-(h_{12})'(h_{21})'/(h_{11})']$, instead of transmitting $S_{BTS2}=q'$.

Figure 19:
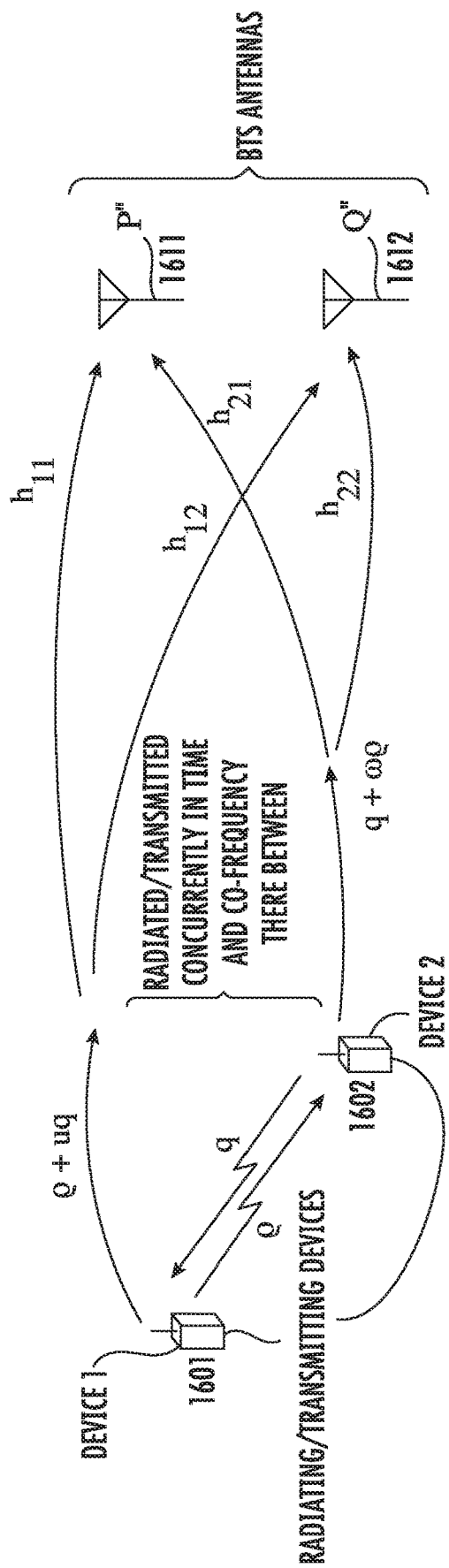

FIG. 19 is analogous/similar to FIG. 17 in signal processing methodology but instead of the BTS radiating/transmitting signals (as is the case in FIG. 17), in FIG. 19 it is device 1601 and device 1602 radiating/transmitting signals to the BTS. The two devices that are illustrated in FIG. 19 exchange information therebetween comprising signals that each is to convey to the BTS. Device 1601 is to convey a signal $\rho$ to the BTS and relays signal $\rho$ (or a measure/function thereof) to device 1602, whereas device 1602 is to convey signal q to the BTS and relays signal q (or a measure/function thereof) to device 1601. Then, in some embodiments, device 1601 may perform operations comprising: radiating/transmitting to the BTS a first composite signal $\rho+uq$ and, further, device 1602 may perform operations comprising: radiating/transmitting to the BTS a second composite signal $q+\omega\rho$. Given the channel coefficients/gains that are illustrated/specified in FIG. 19, and letting $u=-h_{21}/h_{11}$ and $\omega=-h_{12}/h_{22}$ it may be shown that, in some embodiments, BTS antenna 1611 receives an aggregate signal $P''=\rho[h_{11}-(h_{12}h_{21}/h_{22})]$ which may be divided by $[h_{11}-(h_{12}h_{21}/h_{22})]$ to yield the signal $\rho$; and, in some embodiments, BTS antenna 1612 receives an aggregate signal $Q''=q[h_{22}-(h_{12}h_{21}/h_{11})]$ which may be divided by $[h_{22}-(h_{12}h_{21}/h_{11})]$ to yield the signal q.

Still referring to FIG. 19, it will be understood that devices 1601 and 1602 may have knowledge of the channel coefficients/gains by, for example, having the BTS estimate values associated therewith and relay such values to devices 1601 and 1602. Alternatively, in a TDD mode (i.e., according to a TDD embodiment) wherein the BTS and the devices 1601 and 1602 communicate bi-directionally therebetween using the same frequencies on forward and return links thereof, and wherein a quasi-static channel condition may be assumed, the devices 1601 and 1602 may respectively form/generate the signals $\rho'=\rho/[h_{11}-(h_{12}h_{21}/h_{22})]$ and $q'=q/[h_2-(h_{12}h_{21}/h_{11})]$, and convey the signals $\rho'$ and q' therebetween (instead of conveying signals $\rho$ and q therebetween) and then, radiate/transmit $\rho'+uq'$ and $q'+\omega\rho'$, respectively, instead of radiating/transmitting $\rho+uq$ and $q+\omega\rho$, respectively. The devices 1601 and 1602 may also estimate values of the various channel coefficients/gains and exchange such information with one another in order to be able to form values of u and $\omega$ and form the signals $\rho'$ and q' as described above.

Still referring to FIG. 19, values other than $u=-h_{21}/h_{11}$ and $\omega=-h_{12}/h_{22}$ are possible. For example, u and $\omega$ may be set as follows: $u=-h_{22}/h_{12}$ and $\omega=-h_{11}/h_{21}$ to yield at the BTS $P'''=q[h_{21}-(h_{11}h_{22}/h_{12})]$ and $Q'''=\rho[h_{12}-(h_{11}h_{22}/h_{21})]$; wherein device 1601 radiates/transmits to the BTS the first composite signal $\rho+uq$ and device 1602 radiates/transmits to the BTS the second composite signal $q+\omega\rho$. It will be understood that $P'''=q$ and $Q'''=\rho$ provided that the composite signals $\rho'+uq'$ and $q'+\omega\rho'$ are transmitted instead of $\rho+uq$ and $q+\omega\rho$. In some embodiments, devices 1601 and 1602 may radiate/transmit using $u=-h_{21}/h_{11}$ and $\omega=-h_{12}/h_{22}$ over a first interval of time and may then radiate transmit using $u=-h_{22}/h_{12}$ and $\omega=-h_{11}/h_{21}$ over a second interval of time. In some embodiments, a choice of values for u and $\omega$ is made responsive to a channel state.

It will be understood that any of the inventive concepts and/or embodiments disclosed herein and applicable to the BTS and/or to a forward-link(s) thereof may also be applicable to devices 1601 and 1602 and/or a return-link(s) thereof. Also, any of the inventive concepts and/or embodiments disclosed herein in reference to devices 1601 and 1602 and/or to return-link(s) thereof may also be applicable to the BTS and/or to forward-link(s) thereof.

It would indeed be unduly repetitious/tedious and obfuscating to describe in detail and illustrate every combination, sub-combination and/or variation of embodiments described herein that is/are possible using aspects, alternatives, variations, elements, architectures and/or parameters of embodiments already described. For example, inventive concepts and embodiments relating to radiating/transmitting signals by a BTS (as illustrated, for example, in FIG. 17 and/or in FIG. 18), may also be applied to radiating/transmitting signals by, for example, device 1601 and/or device 1602 of FIG. 17 and/or FIG. 18. Accordingly, the present description shall be construed to constitute a complete written description that supports each and every possible combination, sub-combination and/or variation of embodiments described herein and of any combination, sub-combination and/or variation of aspects, architectures, elements and/or parameters associated therewith, and of the manner and process of making and using them, and shall support Claims to any such combination, sub-combination and/or variation.

Given the proliferation of electronic devices, such as, for example, smartphones, a first electronic device, such as, for example, a source device 2001, as illustrated in FIG. 20, that may comprise a smartphone (and, in some embodiments, a plurality of smartphones), may convey information to a second electronic device that may be connected to one or more other electronic devices, at least one of which is connected to a BTS Destination. The term "connected" as used herein includes wirelessly connected or coupled. More specifically, FIG. 20 illustrates a source device 2001 conveying (i.e., transmitting) information to a first electronic device ED11 that is on a path (labeled as "path 1") leading to a Proximity of the BTS Destination region. The electronic device ED11 is illustrated as being connected to another electronic device ED12 and conveying information to the electronic device ED12 that is also on path 1 leading to the Proximity of the BTS Destination region. The electronic device ED12 is illustrated as being connected to a further electronic device ED13 and conveying information to the electronic device ED13, which is also on path 1 leading to the Proximity of the BTS Destination region. Further, FIG. 20 illustrates the electronic device ED12 being connected to the electronic device ED21 and conveying information to the electronic device ED21, which is on a path 2 that also leads to the Proximity of the BTS Destination region. Thus, information may be relayed from a first electronic device to a second electronic device on path 1 and/or on path 2 until the information reaches a region labelled as Proximity of the BTS Destination in FIG. 20. As is further illustrated in FIG. 20, the electronic device labeled as ED1N in FIG. 20, that is on path 1 and within the Proximity of the BTS Destination region, may be configured to perform operations comprising: relaying information to a BTS Destination 2011 (i.e., a BTS) that is inside the Proximity of the BTS Destination region and/or refraining from relaying information to a subsequent electronic device that is outside of said Proximity of the BTS Destination region, such as, for example, the electronic device labeled as ED1(N+1) in FIG. 20. In addition to the above, or in lieu of the above, as is further illustrated for example in FIG. 20, the electronic device labeled as ED25 in FIG. 20, that is on path 2 and within the Proximity of the BTS Destination region, may be configured to perform operations comprising: relaying information to the BTS Destination 2011 and/or refraining from relaying information to a subsequent electronic device that is outside of said Proximity of the BTS Destination.

At least some of the electronic devices that are illustrated in FIG. 20 comprise electronic devices installed in/on motor vehicles and may, accordingly, be in-motion relative to one another, relative to the source device 2001 and/or relative to the BTS Destination 2011. It will be understood that at least some of the electronic devices that are illustrated on FIG. 20 may be positioned at fixed locations (relative to Earth's ground) along/near a path, such as, for example, path 1 and/or path 2 of FIG. 20; wherein the path (e.g., path 1 and/or path 2) may represent a road and/or highway. Thus, for example, in accordance with FIG. 20 and the description associated therewith, any two electronic devices, of a plurality of electronic devices, such as, for example, the electronic devices illustrated in FIG. 20, may be connected therebetween, directly and/or via one or more intervening electronic device(s), may be connected to a source device 2001 and may be connected to a BTS Destination 2011 using a set of frequencies that may comprise frequencies licensed for cellular communications, unlicensed frequencies and/or frequencies that exceed (in cycles per second or in "Hz") those frequencies licensed for cellular communications. In some embodiments, said set of frequencies includes frequencies that exceed 5 GHz and, in other embodiments, said set of frequencies includes frequencies that exceed 10 GHz or even 20 GHz.

Still referring to FIG. 20, a relatively small distance may exist between a first device (e.g., ED11) and a second device (e.g., ED12) that may be communicating therebetween, as is illustrated in FIG. 20. Accordingly, responsive to said relatively small distance, a power level radiated by ED11 and/or ED12 may be relatively small, allowing for a reuse of frequencies by ED11 and/or ED12 that may comprise frequencies authorized for cellular communications, frequencies authorized for communications other than cellular, licensed frequencies and/or unlicensed frequencies. In some embodiments, said reuse of frequencies may be an immediate reuse of frequencies whereby frequencies radiated by ED11 may comprise frequencies radiated by ED12, ED13 and/or ED21. A technology and/or air interface used by ED11, ED12, ED13 and/or ED21 to communicate therebetween may be based upon a Code Division Multiple Access ("CDMA"), Time Division Multiple Access ("TDMA"), OFDMA and/or any other technology and/or air interface that may be a variant of one or more of the technologies and/or air interfaces identified above. It will be understood that the inventive concepts and/or embodiments disclosed in this present paragraph may also apply to communications between any other first and second devices of FIG. 20, such as, for example, communications between the source device 2001 and ED11, ED1N and BTS destination 2011, ED25 and BTS destination 2011, etc. Further, it will be understood that the inventive concepts and/or embodiments disclosed in this present paragraph may also apply to communications between any other first and second devices of FIG. 21, such as, for example, communications between ED1 and ED2/ ED3, ED3 and AuBTS1, AuBTS1 and AuBTS2, AuBTS2 and AuBTS3, AuBTS3 and AuBTS4, AuBTS4 and BTS destination 2011, ED5 and AuBTS5, AuBTS5 and BTS destination 2011, etc.

A bandwidth (e.g., a range of frequencies or a span of frequencies) utilized for communications between a first device and a second device as described in the preceding paragraph may, according to some embodiments, be 100 MHz and, in some embodiments, may exceed 100 MHz. Given such a relatively large bandwidth, an interval of time needed to perform the communications between said first and second devices may be relatively small, allowing for a time staggering to take place between the communications between said first and second devices and communications between another, nearby, pair of first and second devices. For example, a first interval of time defined by $t_1 \le t \le t_2$ may be used to perform the communications between the first and second devices and a second interval of time, defined by $t_3 \le t \le t_4$, may be used to perform the communications between said another, nearby, pair of first and second devices; wherein according to some embodiments, $t_2 \le t_3$. According to other embodiments, however, an overlap between the two intervals of time may be allowed; i.e., $t_1 \le t_3$.

In some embodiments, a first electronic device of a plurality of electronic devices is configured to perform operations comprising: (1) being cognizant of a level of connectivity between itself and any second (i.e., any other) electronic device of the plurality of electronic devices; wherein said being cognizant of a level of connectivity comprises being cognizant of whether or not a quality-of-service threshold is being exceeded (or may be exceeded); and wherein said being cognizant of whether or not a quality-of-service threshold is being exceeded (or may be exceeded) is enabled via signaling between said first electronic device and said second (i.e., said any other) electronic device; (2) being cognizant of a location thereof relative to the BTS Destination 2011 and/or whether or not it is within the Proximity of the BTS Destination region; this may be enabled by knowing by the first electronic device its own location (which may be derived by the first electronic device, for example, from processing of GPS signals), being cognizant of the location of the BTS Destination 2011 and/or being cognizant of the geographic region spanned by the Proximity of the BTS Destination; and (3) being cognizant of a second electronic device that is proximate thereto (i.e., that is proximate to the first electronic device), which (second electronic device) comprises connectivity with the BTS Destination 2011, so that the first electronic device may relay information to the second electronic device while refraining from doing so to another electronic device that may be devoid of said connectivity with the BTS Destination 2011, is on a path trajectory that would not, at a later time, take it closer to the BTS Destination 2011 and/or is associated with an unfavorable geographic position relative to the Proximity of the BTS Destination region. For example, in FIG. 20, the electronic device labeled as ED1N refrains from transmitting information to the electronic device labeled as ED1(N+1); electronic device labeled ED25 refrains from transmitting information to electronic device ED26 and electronic device labeled ED11 refrains from transmitting information to electronic device labeled ED10. Moreover, other electronic devices illustrated in FIG. 20 that may transmit and/or receive information include ED22, ED23, ED24, ED1L, ED1(L+1), and ED1(L+2).

FIG. 21 illustrates a plurality of auxiliary base stations labeled as AuBTS1 through AuBTS5. As previously discussed relative to such auxiliary base stations being in/on houses, buildings, utility poles, water towers and/or other structures, such auxiliary base stations may, relative to a position of a BTS Destination 2011, be placed closer to radiating/electronic devices so as to intercept signals intended for the BTS Destination 2011 and relay such signals to the BTS Destination 2011. In some embodiments, an auxiliary base station is configured to perform operations comprising: (1) receiving a signal that is intended for the BTS Destination 2011; (2) amplifying the signal that is intended for the BTS Destination 2011; (3) demodulating the signal that is intended for the BTS Destination 2011; (4) regenerating the signal that is intended for the BTS Destination 2011; (5) reformatting the signal that is intended for the BTS Destination 2011; (6) modulating the signal that is intended for the BTS Destination 2011; and/or (7) retransmitting the signal that is intended for the BTS Destination 2011; wherein, in some embodiments, said retransmitting the signal that is intended for the BTS Destination 2011 comprises communicating with another auxiliary base station and coordinating said retransmitting the signal that is intended for the BTS Destination 2011 with a transmission of said another auxiliary base station so that said retransmitting the signal that is intended for the BTS Destination 2011 and the transmission of said another auxiliary base station arrive at the BTS Destination 2011 substantially coherently therebetween at an antenna of the BTS Destination 2011.

Referring to FIG. 21, an electronic device ED1 is illustrated as communicating with a source device (e.g., the source device 2001 of FIG. 20) and receiving information therefrom; relaying information (comprising said information received from the source device) to an electronic device ED3 via an electronic device ED2, and then, relaying by the electronic device ED3 information (comprising said information received from the source device) to (a) an electronic device ED5 via an electronic device ED4 and/or to (b) auxiliary base station AuBTS1. Then, auxiliary base station AuBTS1 may relay information (comprising said information received from the source device) to auxiliary base station AuBTS4 via auxiliary base stations AuBTS2 and AuBTS3, as illustrated in FIG. 21, and the electronic device ED5 may relay information (comprising said information received from the source device) to auxiliary base station AuBTS5.

It will be understood that the phrase "relay information (comprising said information received from the source device)" is intentionally used herein as such so as to not exclude relaying information other than that "received from the source device". Such information other than that "received from the source device" may, for example, include values associated with one or more channel coefficients, geographic coordinates, direction of travel, velocity, audio/visual information, path on which travel is taking place, a request to communicate with another electronic device via the BTS Destination 2011 and/or via other electronic devices, etc.

Continuing to refer to FIG. 21, the auxiliary base stations AuBTS4 and AuBTS5 may communicate therebetween and may coordinate respective transmissions thereof so as to have said respective transmissions thereof arrive at an antenna of the BTS Destination 2011 coherently therebetween. It will be understood that, in some embodiments, said information received from the source device may be relayed to the BTS Destination 2011 by either auxiliary base station AuBTS4 or auxiliary base station AuBTS5 responsive to a coordination/communication between auxiliary base stations AuBTS4 and AuBTS5. It will also be understood that, in some embodiments, said information received from the source device may be relayed to the BTS Destination 2011 by auxiliary base stations AuBTS4 and AuBTS5 responsive to a coordination/communication between auxiliary base stations AuBTS4 and AuBTS5. Further, it will be understood that electronic device ED5 may relay said information received from the source device to electronic device ED6, which may relay to a subsequent electronic device, and so-on, until a next auxiliary base station and/or a next BTS Destination can receive said information received from the source device. This may offer a diversity protection in accordance with some embodiments. Also, it will be understood that electronic device ED6 (and/or any other electronic device) may relay to a subsequent electronic device, and so-on, until a proximity region of a next source device is reached, at which point the information of the source device is relayed to said next source device. In this manner, a first source device (e.g., a first smartphone) may relay information to a second source device (e.g., a second smartphone) absent the use of any BTS.

In light of the preceding discussion, referring again to FIG. 20, it will be understood that the electronic devices ED25 and ED1N may communicate therebetween and may coordinate respective transmissions thereof so as to have said respective transmissions thereof arrive at an antenna of the BTS Destination 2011 coherently therebetween. It will be understood that, in some embodiments, said information received from the source device may be relayed to the BTS Destination 2011 by either electronic device ED25 or electronic device ED1N responsive to a coordination/communication between electronic devices ED25 and ED1N. It will also be understood that, in some embodiments, said information received from the source device may be relayed to the BTS Destination 2011 by electronic devices ED25 and ED1N responsive to a coordination/communication between electronic devices ED25 and ED1N. Further, it will be understood that electronic device ED25 may relay said information received from the source device to electronic device ED26, which may relay to a subsequent electronic device, and so-on, until a next auxiliary base station and/or a next BTS Destination can receive said information received from the source device. This may offer a diversity protection in accordance with some embodiments. Further, it will be understood that electronic device ED1N (FIG. 20) may relay said information received from the source device to ED1(N+1) (FIG. 20), which may relay to a subsequent electronic device, and so-on, until a next auxiliary base station and/or a next BTS Destination can receive said information received from the source device. This may offer a diversity protection in accordance with some embodiments. Further, it will be understood that electronic device ED26 may relay to a subsequent electronic device, and so-on, until a proximity region of a next source device is reached at which point the information of the source device is relayed to said next source device. In this manner, a first source device (e.g., a first smartphone) may relay information to a second source device (e.g., a second smartphone) absent the use of any BTS. Similarly, it will also be understood that ED1(N+1) may relay to a subsequent electronic device, and so-on, until a proximity region of a distant source device is reached at which point the information of the source device is relayed to said distant source device. In this manner, a first source device (e.g., a first smartphone) may relay information to a second source device (e.g., a second smartphone) absent the use of any BTS.

Figure 22A:
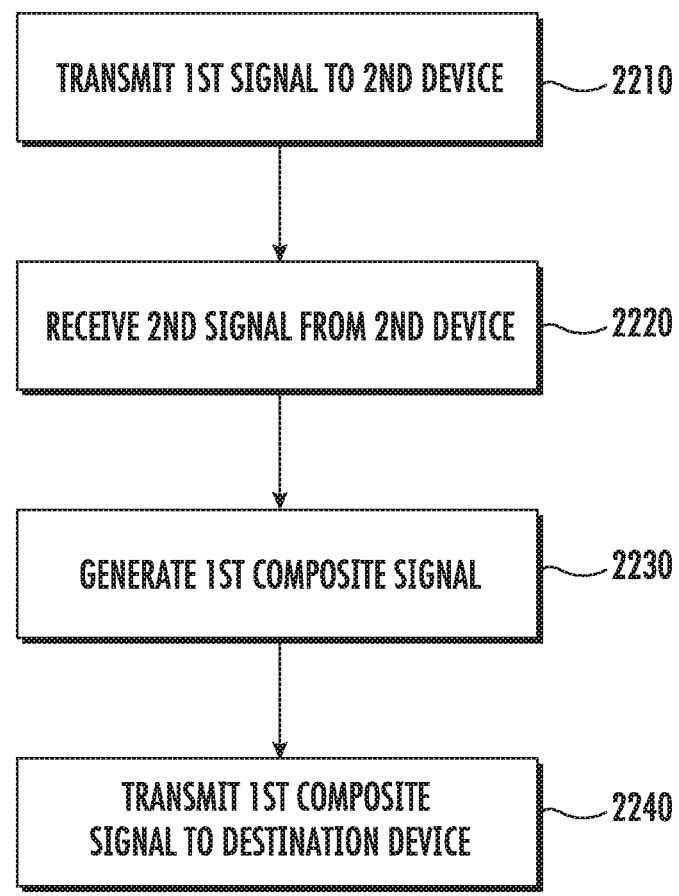
FIGS. 22A and 22B are flowcharts illustrating communications operations of devices, according to some embodiments of the present inventive concepts.

FIG. 22A is a flowchart of communications operations performed by a first device 1601 (FIGS. 16-19) according to some embodiments. The operations may involve exchanging information with a second device 1602 (FIGS. 16-19) to convey first and second information to a destination device, such as a BTS. Moreover, the first device 1601 may, in some embodiments, include any of the components shown in FIG. 14 with respect to an electronic device/node 1401. For example, the operations shown in FIG. 22A may be performed by a processor 1451, a transceiver 1442, and/or an antenna system 1446 of the first device 1601.

Operations performed by the first device 1601 may include transmitting (Block 2210), by the first device 1601 to the second device 1602, a first signal comprising first information. The operations may include receiving (Block 2220), by the first device 1601 from the second device 1602, a second signal comprising second information. Though the receiving (Block 2220) is illustrated in FIG. 22A as being performed after the transmitting (Block 2210), the receiving (Block 2220) may, in some embodiments, be performed before the transmitting (Block 2210).

The operations may also include generating (Block 2230), by the first device 1601, a first composite signal comprising a first function of the first information and the second information. The first and second information may have a statistical independence therebetween. Moreover, the operations may include transmitting (Block 2240), by the first device 1601, the first composite signal to the destination device. The transmitting (Block 2240) of the first composite signal may occur concurrently in time and co-frequency with a transmission (Block 2245 of FIG. 22B) by the second device 1602 of a second composite signal comprising a second function of the first and second information. The second function may be different from the first function.

Figure 22B:
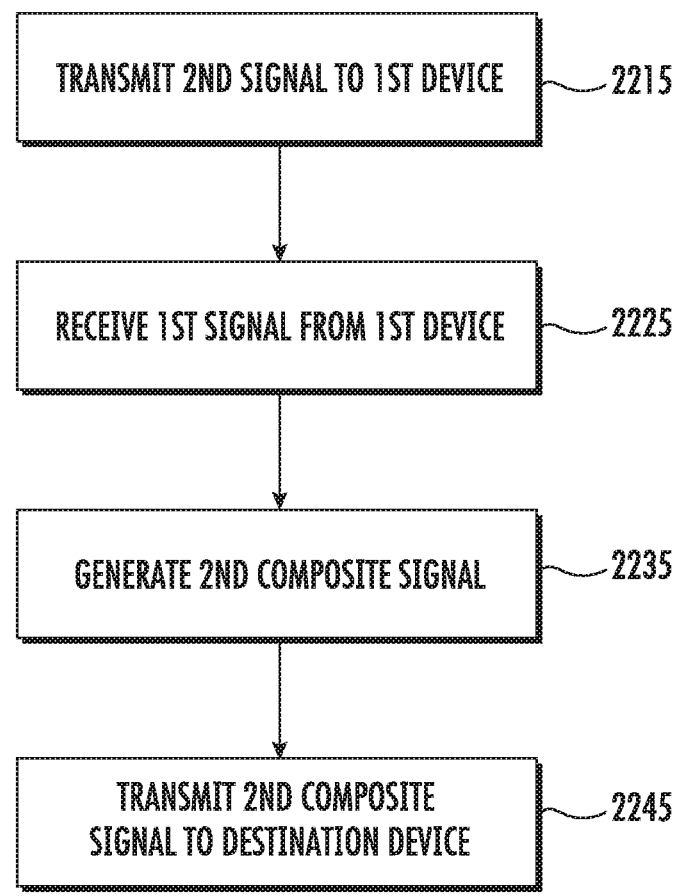

FIG. 22B is a flowchart of communications operations performed by the second device 1602 according to some embodiments. The second device 1602 may, in some embodiments, include any of the components shown in FIG. 14 with respect to an electronic device/node 1401. For example, the operations shown in FIG. 22B may be performed by a processor 1451, a transceiver 1442, and/or an antenna system 1446 of the second device 1602.

Operations performed by the second device 1602 may include transmitting (Block 2215) the second signal from the second device 1602 to the first device 1601. The operations may include receiving (Block 2225) the first signal at the second device 1602 from the first device 1601. Though the receiving (Block 2225) is illustrated in FIG. 22B as being performed after the transmitting (Block 2215), the receiving (Block 2225) may, in some embodiments, be performed before the transmitting (Block 2215).

Moreover, the operations may include generating (Block 2235), by the second device 1602, the second composite signal comprising the second function of the first information and the second information. The operations may also include transmitting (Block 2245) the second composite signal from the second device 1602 to the destination device.

The operations shown in FIGS. 22A and 22B may, in some embodiments, correspond to the schematic illustration shown in FIG. 19. Moreover, any of the signals shown in FIGS. 19, 22A, and 22B may be wirelessly communicated using licensed or unlicensed frequencies. For example, the operations shown in Blocks 2210, 2215, 2220, and/or 2225 may be performed wirelessly using unlicensed frequencies, and the operations shown in Blocks 2240 and/or 2245 may be performed wirelessly using licensed frequencies.

Black Box Recorder Device

A black box recorder device ("BBRD") may be installed in, for example, a motor vehicle ("MV") to gather data that may be useful in resolving/understanding a sequence of events leading up to an accident and/or other occurrence. Accordingly, in some embodiments relating to inventive concepts that will now be described, a BBRD may be installed in a MV to record/store video, audio and/or other data such as, for example, data provided by one or more instruments/sensors of the MV, by one or more instruments/sensors of motor vehicle(s) other than said MV that may, according to some embodiments, be proximate to said MV and/or connected/communicating therewith, by one or more instruments/sensors of one or more smartphones that may, according to some embodiments, be proximate to said MV or proximate to other structure(s) of interest and/or by one or more instruments/sensors of other entities/structures (or entity/structure), such as, for example, a building and/or a light post. The BBRD may be an electronic device/node such as, for example, electronic device/node 1401 (FIG. 14) and thus may include any of the components shown in FIG. 14, though one or more of the components (e.g., a transceiver 1442, a display 1454, a user interface 1452, and/or an antenna system 1446) shown therein may be partially or totally omitted in some embodiments.

It will be understood that such data as may be provided to the BBRD of the MV by instruments/sensors of motor vehicle(s) other than said MV, by instruments/sensors of one or more smartphones and/or by instruments/sensors of other entities/structures, such as, for example, a building and/or a light post, may be provided to the BBRD of the MV wirelessly and, in some embodiments, while the MV and said motor vehicle(s) other than the MV is/are in motion relative to the ground and/or to one another. According to some embodiments, said video, audio and/or other data may be stored/accumulated by the BBRD of the MV so that a history/record of said video, audio and/or other data, relating to a time interval/span, that may be predetermined or adaptively arrived at, may be maintained/stored/recorded for/over an interval of time prior to an event, an interval of time following an event and/or continuously. Said "adaptively arrived at" may be responsive to a time-of-day ("ToD"), a level of sound, an electromagnetic radiation energy level, a light intensity level (or lack thereof), a velocity, an acceleration, a temperature within the MV and/or outside thereof, an unauthorized usage of the MV and/or a path traversed by the MV that, in some embodiments, may be determined by an artificial intelligence agent/algorithm to be an out-of-the ordinary path and/or an unusual path for said MV given a prior history of the MV. An electronic device/node 1401 (FIG. 14) comprising a transceiver 1442 (FIG. 14) and a processor 1451 (FIG. 14) may be provided in each MV to facilitate communications and vehicular control as discussed herein with respect to FIGS. 23 and 24.

The video, audio and/or other data may, according to some embodiments, include a plurality of components wherein, for example, a first component of the plurality of components may relate to video, audio and/or other data with a focus on a back/rear of a MV; a second component of the plurality of components may relate, for example, to video, audio and/or other data with a focus on a front of a MV; a third component of the plurality of components may relate, for example, to video, audio and/or other data with a focus on a side (left and/or right) of a MV, etc. It will be understood that other components of the plurality of components may relate to video, audio and/or other data with a focus on, for example, a top, bottom and/or interior of a MV. It will further be understood that said video, audio and/or other data may, according to some embodiments, comprise infrared data, ultrasonic/subsonic data, ultraviolet data and/ or electromagnetic data that may include spectrum outside of a visible spectrum. In some embodiments, other components of the plurality of components may include data transmitted by another MV such as, for example, video/audio and/or other data that is transmitted by a first MV and is received by a second MV for entertainment purposes and/or for communications other than entertainment purposes. Further, it will be understood that said video, audio and/or other data may, according to some embodiments, comprise an artificial intelligence ("AI") component that may be provided by a processor of a MV and/or a smartphone that may be communicating therewith.

According to some embodiments, the BBRD may be configured to record each one of the components of the plurality of components separately and/or independently of one another. Accordingly, in some embodiments, video and/or audio of each component of the plurality of components (and/or data/parameters other than video and/or audio that may be associated therewith) may be recorded, accumulated and/or maintained over a limited/finite time interval/span, whose duration may be predetermined and/or adaptively arrived at responsive to a velocity, acceleration a biological/physiological parameter of an occupant of a MV, a weather condition, an AI-based input (that may, according to some embodiments, be a predictive input) and/or a time-of-day. According to some embodiments, said time interval/span may be updated/modified, in duration, start-point and/or end-point (by, for example, writing over or recording over data associated with a previous time interval/span, at least partially), in order to provide a most recent time interval/span and recording of data associated therewith just prior to an event, during the event and/or following the event. Said event may be an accident, a deployment of an air bag, an acceleration/deceleration, a velocity, a position, an electromagnetic radiation level, a sound (humanly audible and/or otherwise), an AI-based prediction and/or a sequence of occurrences leading up to said event including but not limited to a biological/physiological state and/or a biometric identifier of an occupant of a MV.

In some embodiments, a parameter that is associated with said time interval/span and/or said data associated therewith, may depend upon and/or be responsive to a velocity of a MV, an acceleration/deceleration of a MV, a position of a MV, an electromagnetic radiation sensed at a MV, a sound sensed at a MV, a biological state of an occupant of a MV, a physiological state of an occupant of a MV, a psychological state of an occupant of a MV, a biometric identifier of an occupant of a MV, an AI-based input and/or a predetermined sequence of events that may require further detail. Said parameter may include, but is not limited to, data to be recorded (e.g., visual, audio, electromagnetic spectrum related, etc. and/or various components thereof such as, left-side of a MV, right-side of a MV, front of a MV, rear of a MV, internal to a MV, etc.), said span/duration, start-point, and/or end-point of said time interval/span, a bandwidth used to acquire/record data and/or a sampling rate used to acquire/record data. It will be understood that the term "a MV" as used herein may be used instead of the term "the MV" in order to include (and underscore) embodiments of inventive concepts wherein a plurality of MVs may be present in relative proximity therebetween (i.e., in relative proximity with one another). In such embodiments a BBRD of a first MV of the plurality of MVs may, responsive to an event, be recording data associated with the first MV (i.e., data provided by instruments of the first MV) and/or may, responsive to the event, be recording (and/or be triggered to initiate recording) data that is associated with a second MV of said plurality of MVs (i.e., data that is provided by instruments of the second MV and is wirelessly transmitted to the first MV by the second MV); wherein the event may be as previously stated.

It will be understood that a first interval/span of time that may be associated with a first component of the plurality of components may differ from a second interval/span of time associated with a second component of the plurality of components and that even within a given component of the plurality of components, first and second parameters thereof may comprise differing time intervals/spans associated therewith. It will also be understood that a given time span may be predetermined, according to some embodiments; whereas according to other embodiments, the given time span may be adaptively determined, variable and/or remotely set/established. Further, it will be understood that a nature/characteristic of first and second data that is acquired and/or recorded from respective first and second components of the plurality of components may differ therebetween in that, for example, the first data may be video data whereas the second data may audio data.

In some embodiments, a BBRD (or a component thereof) may be included in a MV, whereas according to other embodiments, the BBRD (or a component thereof) may be situated at a distance from the MV, at least partially. For example, the MV and/or various components/sensors thereof may be wirelessly connected (using, for example, a 4G/5G LTE standard/protocol and/or any other wireless standard/protocol) to a facility that is distant from the MV and information may thus be relayed from/to the MV and the facility. In some embodiments, the facility may comprise memory that may be used to store data associated with one or more of said components of said plurality of components associated with one or more MVs. Thus, in some embodiments, a data base may be established remotely from the MV; wherein the data base may be wirelessly connected to the MV and may be used to store data associated with the MV. In some embodiments, storing of data may occur at the MV and/or at a data base remote to the MV and, in further embodiments, data associated with one or more other MVs, that may have spent time in proximity to the MV, may also be stored with, and/or appended to, the data associated with the MV.

According to further embodiments, storing data associated with said one or more components of the MV (at the facility and/or at the MV) may be triggered by (e.g., may be responsive to) receiving at the MV an interrogation, a confirmation, and/or a notification that causes a subsystem of the motor vehicle (such as, for example, a transponder of the motor vehicle) to transmit a signal. It will be understood that, according to some embodiments, such a trigger/cause (e.g., such responsiveness) may further depend upon an accident, a deployment of an air bag, an acceleration/deceleration, a velocity, a position, an electromagnetic radiation and/or an intensity associated therewith, a sound and/or an intensity associated therewith, a level of light (or absence thereof), a biological, physiological and/or psychological state of an occupant of a MV, a biometric identifier of an occupant of a MV, an AI-based input/prediction and/or a predetermined (or any other) sequence of events that requires further detail (as may be determined, in some embodiments, by a smartphone of an occupant of a MV; said smartphone, in some embodiments, being connected to and/or communicating with a MV). Said storing data associated with said one or more components of a MV (at the facility and/or at a MV) may be a permanent storing of data that may be erasable only by an authority such as, for example, an insurance company, a police unit, a legal unit, a government unit, etc.

It will be understood that even though the inventive concepts disclosed herein and the various embodiments associated therewith are applied to, and/or are illustrated via, systems/methods involving MVs, the inventive concepts disclosed herein and the various embodiments associated therewith may also be applied to any other entity other than MVs such as, for example, homes, businesses, remote sites, sites/areas within a city, airports, government/municipal facilities, at or around a base station and/or at or around any other entity that may benefit from monitoring and recording of data relating to events that may be associated therewith and/or related thereto.

Disabling Smartphone Functions

Traveling in a MV while using a mobile device ("MD"), such as, for example, a smartphone ("SP"), to receive/transmit data (e.g., to receive/transmit a text, an e-mail, etc.) has proven dangerous and often lethal owing to the driver's distraction by such an activity. Accordingly, in additional embodiments of inventive concepts that will now be described, following ignition of a MV (i.e., following turning on the engine of the MV) the MV may be configured to radiate a specific predetermined signal ("SPS"), that may be radiated at a relatively low power level, in accordance with some embodiments. Further, the MD, such as the SP, may be configured to periodically look for the SPS. Responsive to the SPS having been detected by the MD, the MD may be configured, according to some embodiments, to disable one or more functions thereof such as, for example, receiving/transmitting a text message and/or receiving/transmitting an e-mail; wherein, according to some embodiments, at least one function of the MD remains enabled (e.g., a voice communications function may remain enabled and/or a voice recognition function may remain enabled) even though the MD has detected the SPS. In other embodiments, responsive to the detection of the SPS by the MD, all functions of the MD may be disabled including sensory notifications such as, for example, vibrational, visual and/or audio, as well as communications via voice, texting and/or e-mail, etc. The MD may be an electronic device/node 1401 (FIG. 14) and thus may include any of the components shown in FIG. 14.

In some embodiments the SPS associated with, and emitted by, a specific MV comprises a specific identification code ("SIC") that may be known only by an owner of the MV and/or by other entities/persons, as may be approved/authorized by the owner. Accordingly, for example, the SIC associated with the SPS of an owner/driver of the MV would be known by the owner/driver (and the owner's/driver's MD) and, per the owner's/driver's wishes, by the owner's/driver's spouse (and the spouse's MD), by the owner's/driver's daughter (and the daughter's MD) and by the owner's/driver's son (and the son's MD). Thus, if the owner/driver were to enter the owner's/driver's MV, following ignition thereof the owner's/driver's MD (assuming it is present with the owner/driver) can detect/recognize the SPS of the owner's/driver's MV and, responsive to such a detection/recognition, the owner's/driver's MD can disable certain function(s) thereof such as, for example, receiving/sending a text message and/or an e-mail; whereas, according to some embodiments, at least one function thereof (e.g., a voice communications/recognition function) remains enabled even though the owner's/driver's MD has detected the SPS. In other embodiments, all functions of the owner's/driver's MD may be disabled responsive to the detection by the owner's/driver's MD of the SPS. Similar conclusions may be drawn relative to the MD of the owner's/driver's spouse or that of the owner's/driver's daughter or that of the owner's/driver's son entering the owner's/driver's MV.

If the owner/driver were to enter the owner's/driver's MV together with the owner's/driver's spouse, daughter and son, and each one of them were carrying their respective MD, then all four MDs would detect the SPS of the owner's/driver's MV. At that point, according to some embodiments, each one of the MDs may request a response from its user by providing a question such as, for example: Are you driving? Only upon receiving a negative response to such question (e.g., No, I'm not driving) may the associated MD continue to function in that one or more functions, or all functions, thereof remain enabled. If a MD (of the four MDs in this example) does not receive a response to said question within a predetermined time interval following presentation of said question (or the MD receives an affirmative response within said predetermined time interval; e.g., Yes, I'm driving) then that MD disables one or more functions thereof such as, for example, receiving/sending a text message and/or an e-mail; whereas other functions thereof, such as, for example, voice communications and/or a voice recognition function, may continue to be enabled. Upon disabling one or more of its functions, the MD involved in the disabling may transfer/delegate/handover at least one, and according to some embodiments all, of the disabled function(s) to another MD that may be proximate thereto and may have responded negatively to the question "are you driving?"

In some embodiments, said another MD to which said one or more disabled functions are transferred, delegated and/or handed-over to, by a MD that has disabled one or more of its functions, may be distant from the MD having performed the disabling and may not have been presented with the question "are you driving?" This distant MD may, for example, belong to the owner's/driver's spouse who may not be in a MV driving but may, for example, be at home while the owner/driver is in the owner's/driver's MV driving and, because of that, the owner's/driver's MD has disabled one or more of its functions. In some embodiments, knowing/recognizing the SIC by a MV may not be required for an MD to disable one or more of its functions as long as that MD detects a SPS and provides an affirmative response (or no response) to the question "are you driving?" It will be understood that, driving or not, a first MD may choose to disable one or more of its functions and choose to transfer/delegate/handover said one or more of its functions to a second device, that may be a second MD, which may be predetermined as associated with the first MD.

In some embodiments, a plurality of MDs (e.g., the owner's/driver's MD, the owner's/driver's spouse's MD, the owner's/driver's daughter's MD, and the owner's/driver's son's MD, in the above example) may be configured to communicate therebetween (i.e., with one another) responsive to detecting a SPS and/or responsive to detecting one or more other parameter(s), such as, for example, a velocity, acceleration, a velocity in one direction and a lack thereof in another direction, an acceleration in one direction and a lack thereof in another direction, and/or responsive to at least one of the MDs having disabled at least one function thereof. Such communications between MDs may, in some embodiments, be enabled via short-range link(s) such as, for example, BLUETOOTH® link(s), via a base station tower and/or via an access point. Responsive to such communications, a MD involved in said disabling of one or more of its functions may automatically transfer, delegate and/or handover at least one of said disabled one or more functions to at least one other MD that may be proximate thereto. Furthermore, responsive to such communications, at least one MD of a plurality of MDs that may all be within a MV (as determined by sensing a SPS of the MV and/or a SIC associated therewith) must be designated as a MD associated with a driver of a MV. Otherwise, some corrective action may be necessary, according to further embodiments. Such corrective action may be an audible/vibrational/visual signal (that may be intentionally loud/annoying) being provided by at least one MD of said MDs and, in some embodiments, by each one of the MDs of said MDs. Other corrective actions, in lieu of the above or in combination with the above, may be imposing a limit on a speed and/or acceleration that the MV may achieve and/or imposing an audible/visual indication on the MV that is indicative of danger. Such an audible/visual indication may be the horn of the MV sounding, another MD (belonging to, for example, a parent/guardian being notified) and/or the lights of the MV flashing, for example. Said other corrective actions may be based upon an ability of at least one MD of said MDs to connect and communicate with a system of the MV; wherein said connect and communicate comprises wirelessly connect and communicate.

It will be understood that the example discussed above regarding the owner/driver, the owner's/driver's spouse, the owner's/driver's daughter, and/or the owner's/driver's son, entering the owner's/driver's MV (alone/separately or otherwise), is presented for illustrative purposes only in order to convey inventive concepts associated therewith, and not for any limiting purpose(s). It will be understood that said example may be applicable/relevant to any four persons and their MDs, besides (or including) the owner/driver, the owner's/driver's spouse, the owner's/driver's daughter, and/or the owner's/driver's son, and that the example may be extended to more than four persons (or may be limited to less than four persons). Further, it will be understood that, according to some embodiments, the SPS may be devoid of a SIC that may be unique to a MV such as, for example, the owner's/driver's MV as discussed earlier. In accordance with some embodiments, a MV may be configured to radiate a SPS that is devoid of a SIC that is unique to any particular MV. Such a SPS may include a predetermined signature which may be used by any MD to recognize/detect the SPS; wherein the signature may, for example, be a code/pattern, a modulation format, a sequence of bits/symbols, etc. associated with the SPS. In other embodiments, the SPS may comprise said signature as well as a SIC.

In the event a MD detects a SPS that is known/determined/predetermined (by the MD and/or a system with which the MD communicates) to be associated with a public transportation vehicle (e.g., a bus, train, airplane, sea vessel, etc.), the MD that detects such a SPS may be configured, according to some embodiments, to function normally whereby all functions of the MD, such as, notifications, voice, texting, e-mail, etc., remain active/enabled. In other embodiments, some (but not all) of said functions may become inactive/disabled responsive to detection by the MD of such SPS that is known/determined/predetermined to be associated with a public transportation vehicle. For example, a voice function of the MD may become inactive/disabled while texting, e-mail and/or other functions remain active/enabled.

Environmental Cognition

According to yet additional embodiments of inventive concepts that will now be described, a MV may include an electronic device/node such as, for example, the electronic device/node 1401 (FIG. 14) comprising a transceiver 1442 and other components, as illustrated in FIG. 14, that may be configured to perform operations including communicating with a base station using, for example, a 4G/5G LTE protocol and/or any other protocol. Accordingly, a plurality of MVs that are within a service area of the base station may be capable of receiving and/or transmitting information from/to said base station; wherein said receiving and/or transmitting information includes, according to some embodiments, position information and/or control information that may comprise velocity control information. In some embodiments, said receiving and/or transmitting may be responsive to an occurrence of an event such as, for example, an accident. In some embodiments, a MV of said plurality of MVs that is involved in an accident transmits information to the base station relating to the accident. Such information that is transmitted to the base station by the MV involved in the accident may, according to some embodiments, include position information associated with the MV involved in the accident and/or other data/information associated therewith. The MV involved in the accident may also transmit to the base station information associated with and/or stored in its BBRD. Other MVs of said plurality of MVs may, responsive to the base station having received information from the MV involved in the accident, be requested by the base station to provide to the base station their respective locations, information associated with, and/or stored in, their respective BBRDs and/or other identifying information. Responsive to such data having been provided to the base station by said other MVs, the base station may request from said other MVs an acknowledgement, approval, concurrence and/or agreement to begin to control a velocity thereof. Accordingly, responsive to an acknowledgement, approval, concurrence and/or agreement received by the base station from said other MVs, a velocity of at least one MV of said other MVs may be controlled (increased or decreased) remotely by the base station as further described herein. It will be understood that a MV whose velocity is controlled by the base station maintains control in deciding when to disengage such remote control of its velocity by the base station.

Accordingly, the base station (and/or another system/device connected thereto) may include an electronic device/node comprising at least some of the components of the electronic device/node 1401 (FIG. 14) and a processor such as processor 1451 (FIG. 14) that is configured to perform operations including comparing a location of the MV involved in the accident with locations associated with other MVs of the plurality of MVs, identifying a subset of MVs of the plurality of MVs that is within a predetermined distance of the MV involved in the accident and transmitting to said subset of MVs information associated with the accident including location information, data associated with a severity of the accident, alternate routing data, velocity controlling information and/or any other information that is associated with the accident and is deemed necessary by police and/or other first responder authority such as, for example, medical, fire and/or other entity. It will be understood that the base station and/or said other system connected thereto, in lieu of sending information to said subset of MVs or in conjunction therewith, may be further configured to send information associated with the accident to police and/or other first responder authority such as, for example, medical, fire and/or other entity/person(s) such as, for example, a spouse of an owner of the MV involved in the accident and/or a child of the owner of the MV involved in the accident that is/are authorized and predetermined by the owner of the MV involved in the accident to receive information associated with the accident.

It will be understood that even though the inventive concepts disclosed herein and the various embodiments associated therewith are applied to, and/or are illustrated via, systems/methods involving MVs, the inventive concepts disclosed herein and the various embodiments associated therewith may also be applied to any other entity other than MVs such as, for example, homes, offices, businesses and/or geographic locations.

Reducing Accidents and/or Traffic Congestion

An accident may result in "rubber necking" associated therewith, causing traffic congestion. According to inventive concepts now to be described, such traffic congestion may be avoided or reduced. Each one of a plurality of MVs may be equipped with a transceiver 1442 (FIG. 14) that may be used to receive and/or transmit information from/to a base station, access point and/or other MVs that are within a geographic area 230 (FIG. 23) that may be predetermined or may depend on a location of an accident and/or a severity of the accident. Accordingly, one or more MVs that may be involved in an accident may transmit information to said base station, access point and/or other MVs that are within the geographic area 230. The information may include, for example, a location associated with the accident and/or information stored in one or more BBRDs respectively associated with the one or more MVs that may be associated with the accident. Accordingly, each MV that is within a predetermined distance/radius of the accident may, according to some embodiments, be commanded to engage an "autopilot" mode in order to navigate past said accident devoid of, and/or unfettered by, said rubber necking. The engagement of the autopilot mode may be automatic (i.e., devoid of human intervention) or may require human intervention in some embodiments. Accordingly, in some embodiments, responsive to an event such as, for example, an accident, a request for autopilot mode engagement may be received by each MV that is within the predetermined distance/radius of the accident. Then, responsive to an acceptance of said request, the autopilot mode may be engaged. In some embodiments, a vehicle that is within the predetermined distance/radius of the accident and has previously issued an acceptance/agreement associated with autopilot engagement may have its autopilot mode engaged without a further request and/or acceptance. However, once the autopilot mode is engaged and/or prior to being engaged a message may be presented to the associated MV so as to inform a human therein (e.g., a driver of the MV) of the impending action for the MV to be placed in autopilot mode. Accordingly, an action of a first MV (e.g., a first MV being involved in an accident) may cause an action of a second MV (e.g., a second MV being placed in autopilot mode).

More specifically, responsive to having been placed in an autopilot mode, a first MV may communicate with a second MV that is in front of the first MV, at a distance from the first MV and is traveling substantially in the same direction as the first MV and further, the first MV may communicate with a third MV that is behind the first MV, at a distance from the first MV and is traveling substantially in the same direction as the first MV. Each of the second and third MVs may also be in communications with other MVs along the lines described above for the first MV (i.e., with a MV in front thereof and traveling substantially in the same direction therewith and with a MV behind thereof and traveling substantially in the same direction therewith). Accordingly, in some embodiments, a processor such as, for example, the processor 1451 (FIG. 14) may be configured to control a first MV to perform operations comprising: communicating with a second MV that is in front of the first MV, at a distance from the first MV and is traveling substantially in the same direction as the first MV and communicating with a third MV that is behind the first MV, at a distance from the first MV and is traveling substantially in the same direction as the first MV. It will be understood that said second MV may comprise a plurality of spaced apart MVs that are travelling in substantially the same direction as the first MV; and that said third MV may comprise a plurality of spaced apart MVs that are travelling in substantially the same direction as the first MV.

The communications between the first and second MVs and between the first and third MVs may include a distance from one another, position, velocity and/or acceleration information. For example, the first MV may communicate to the second MV a distance therefrom. The second MV may communicate to the first MV a velocity and/or acceleration associated therewith. Accordingly, for example, a velocity and/or acceleration of the second MV, that is in front of the first MV, may dictate a velocity and/or acceleration of the first MV and a velocity/acceleration of the first MV that is in front of the third MV may dictate a velocity and/or acceleration of the third MV. Accordingly, the processor operations stated earlier may further include: changing a velocity of the first MV responsive to a change of velocity of at least one other MV and/or a change of distance between the first MV and at least one other MV.

Figure 23:
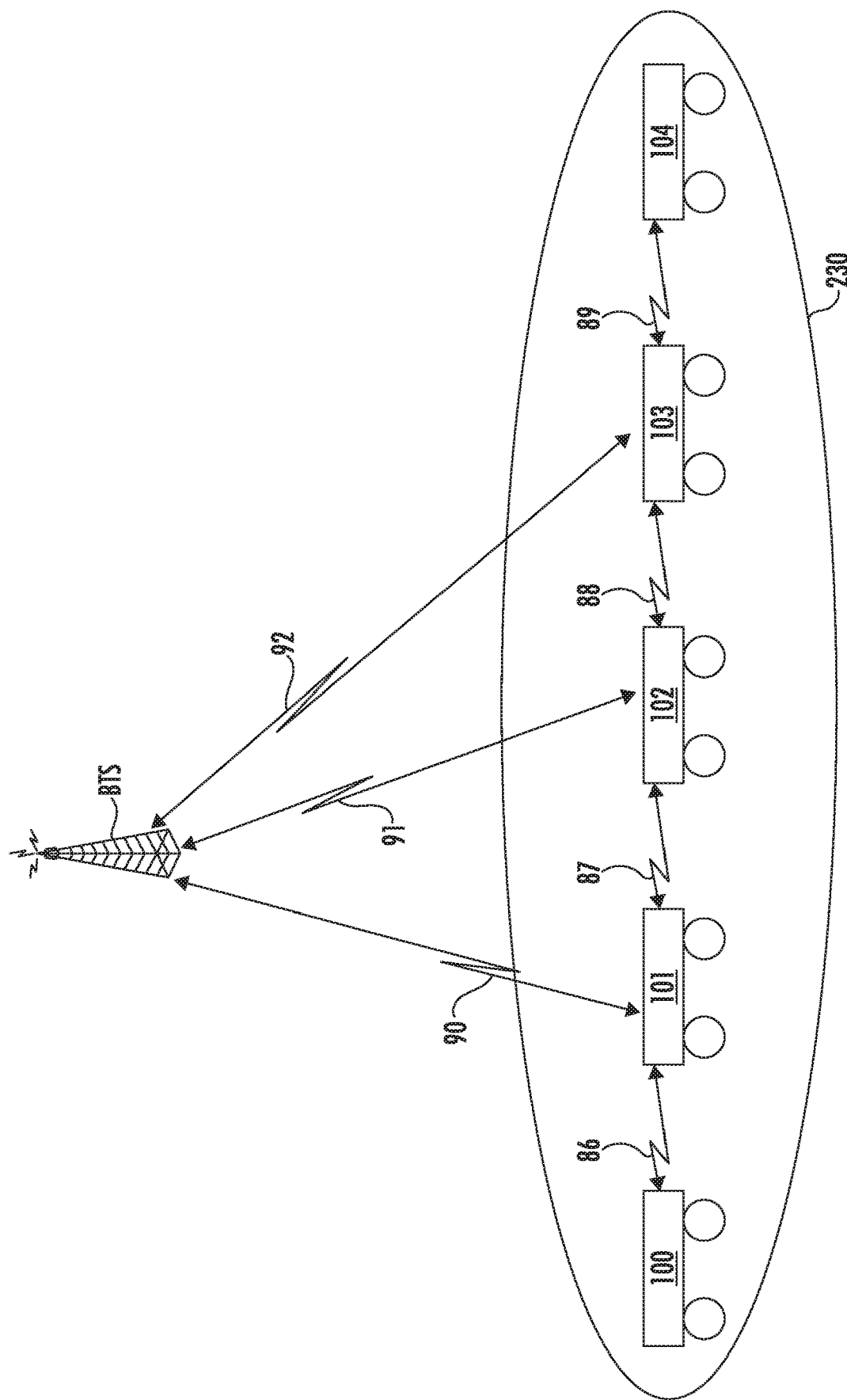
FIG. 23 is a schematic illustration of systems/methods according to embodiments of the present invention.

In situations wherein, for example, fog (and/or one or more other condition(s)) causes an accident, communications between MVs, as described above, may prevent a pile-up of additional MVs (i.e., may prevent additional MVs from being involved in the accident). Furthermore, it will be appreciated that said communications between MVs, may even prevent the accident from occurring. FIG. 23 illustrates direct vehicle-to-vehicle communications and/or indirect vehicle-to-vehicle communications using a base station BTS or access point and/or other intervening MVs. As used herein, in some embodiments, the term "access point" may refer to a short-range wireless communications access point, such as a Wi-Fi access point or an access point that is based upon a short-range microwave link that uses frequencies above 10 GHz and, in some embodiments, frequencies above 20 GHz. In some embodiments, an access point may be mounted in an outdoor/public space, such as on a light pole or other structure. As used herein, in some embodiments, the term "short-range" refers to a distance of less than 300 feet. In further embodiments, the term "short-range" refers to a distance of less than 150 feet.

In reference to FIG. 23, each one of the MVs labeled as MV 101, MV 102 and MV 103, may include a transmitter and a receiver that may be used to receive and/or transmit information wirelessly to/from a base station BTS or access point and/or to/from at least one other MV, as illustrated in FIG. 23. Accordingly, in some embodiments, a first MV may wirelessly be connected directly to a second MV of a plurality of MVs and may further wirelessly be connected indirectly to a third MV of the plurality of MVs. FIG. 23 illustrates, for example, MV 101 being connected wirelessly directly to MV 102 via wireless link 87 and also being connected indirectly to MV 102 via wireless links 90 and 91. Further, FIG. 23 illustrates MV 101 being connected indirectly to MV 103 via wireless links 87 and 88 (i.e., via the intervening MV 102) and also being connected indirectly to MV 103 via wireless links 90 and 92. It will be understood that MV 101 may be connected indirectly to MV 104 via wireless links 89, 92 and 90; and may also be connected indirectly to MV 104 via wireless links 89, 88 and 87.

In some embodiments, the wireless links 90-92 may comprise frequencies that have been authorized for use in providing cellular communications. In some embodiments, the wireless links 90-92 may comprise licensed and/or unlicensed frequencies. In further embodiments, the wireless links 90-92 may comprise frequencies that exceed 10 GHz or even 20 GHz. The wireless links 86-89 may be, in some embodiments, short-range wireless links (e.g., Wi-Fi or BLUETOOTH®). In other embodiments, the wireless links 86-89 may be based, at least partially, on frequencies authorized for the provision of cellular communications, while in further embodiments, the wireless links 86-89 may be based on frequencies that are licensed and authorized for the provision of cellular communications and on frequencies that are unlicensed or licensed and used for the provision of non-cellular or cellular communications. Moreover, the wireless links 86-89 may be direct links between transceivers 1442 (FIG. 14) that are installed in the MVs, and/or may include (i) links between MDs that are carried by occupants of different MVs and/or (ii) links between the MDs and transceivers of MVs. Similarly, the wireless links 90-92 may be direct links between a base station BTS and transceivers 1442 that are installed in the MVs, or may include (a) links between the base station BTS and MDs that are carried by occupants of the MVs and (b) links between the MDs and the MVs. Accordingly, MV communications may, in some embodiments, be provided via MDs.

In some embodiments, information exchanged between two MVs that are proximate to one another may be greater than information exchanged between two MVs that are farther apart from one another. Still referring to FIG. 23, information exchanged between two adjacent MVs (e.g., MV 101 and MV 100 via wireless link 86), may be greater than information exchanged between two MVs that are farther apart from one another (e.g., MV 101 and MV 104 via wireless links 87, 88 and 89). It will be understood that information exchanged between MV 101 and MV 100 may be greater or less than information exchanged between MV 101 and MV 102. Furthermore, it will be understood that information exchanged between MV 102 and MV 103 may be greater or less than information exchanged between MV 102 and MV 101 (even though the MV pairs referred to are adjacent to one another in both cases). The statement "may be greater or less" according to some embodiments may refer to a bandwidth and/or a time span used to transfer the information being greater or less. In some embodiments, as a distance between two MVs increases a measure of information that is exchanged between them decreases; wherein, in some embodiments, said "measure of information" represents a bandwidth used and/or a time span used to exchange the information. To facilitate vehicular communications and control, one or more of the MVs 100-104 may have an onboard electronic device/node 1401 (FIG. 14) including but not limited to the transceiver 1442 (FIG. 14), the processor 1451 (FIG. 14), the antenna system 1446 (FIG. 14), and a connection to other MV electronics (or subsystems) that may need to be communicated with in order to facilitate said vehicular communications and control.

Figure 24:
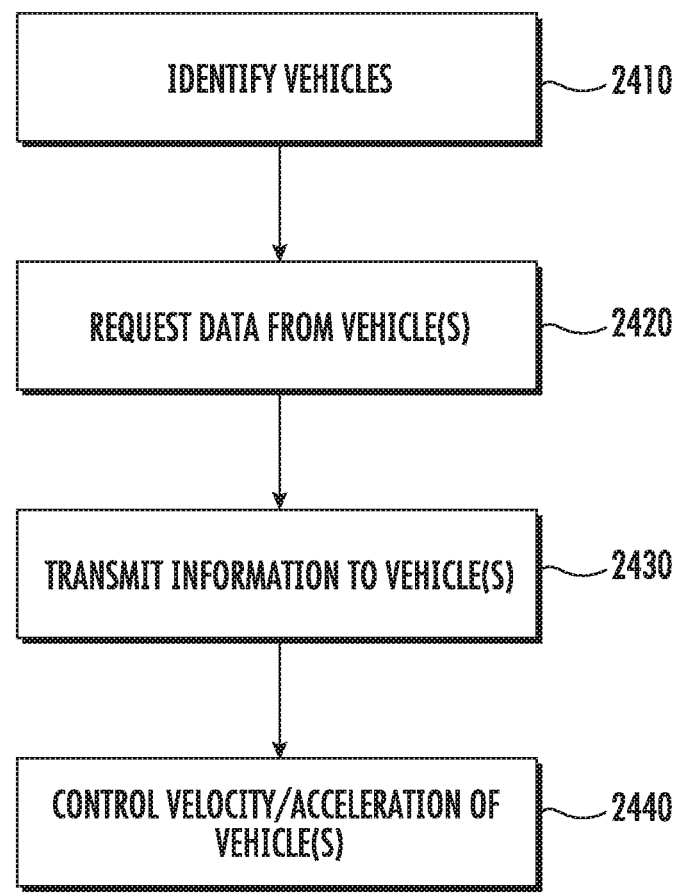
FIG. 24 is a flowchart of systems/methods according to some embodiments of the present inventive concepts.

FIG. 24 is a flowchart of systems/methods according to some embodiments of the present inventive concepts. The operations include identifying (Block 2410) a plurality of MVs that are within a geographic area 230 (FIG. 23). In some embodiments, identifying the MVs may include specifying the geographic area 230, such as by (i) a user selection via a user interface such as, for example, the user interface 1452 (FIG. 14) (e.g., on a police officer's MD or on a computer console) of the geographic area 230, or by (ii) an automatic selection by a processor such as, for example, the processor 1451 (FIG. 14) without, or in addition to, using a user interface 1452. Identifying the MVs that are within the geographic area 230 may also include causing (e.g., triggering) at least one signal to be transmitted identifying a position of each MV that is within the geographic area 230. For example, in response to specifying the geographic area 230, a base station BTS (FIG. 23) may "ping" MVs in the geographic area 230 to cause signals (or to cause at least one signal) to be transmitted by the MVs (or by at least one MV) to identify position(s) associated therewith and, in some embodiments, to specify identities (or an identity) associated therewith to the base station BTS. The term "ping" as used herein refers to requesting, interrogating and/or soliciting MVs in the geographic area 230 to cause said signals to be transmitted by the MVs and/or by respective MDs associated therewith. It will be understood that each MV of said MVs may itself comprise, and/or via an MD associated therewith, electronics that provides position coordinates via, for example, processing of GPS signals. Such processing may, for example, reside at least partially in a processor such as in processor 1451 (FIG. 14).

In some embodiments, a processor such as processor 1451 (FIG. 14) may automatically identify (e.g., specify) the geographic area 230 based on (e.g., in response to receiving information regarding) a weather condition, a time-of-day, real-time images of MVs, a service area (or a portion thereof) of a base station BTS, and/or an event (e.g., a motor-vehicle accident). Moreover, the processor 1451 may be in an electronic device/node 1401 (FIG. 14), which may be at the base station BTS, a server or other facility associated therewith, or part of an MD.

The operations shown in FIG. 24 also include requesting (Block 2420) data from at least one of the identified MVs. In particular, the request for data may be transmitted wirelessly (e.g., via at least one of wireless links 86-89 (FIG. 23) and/or at least one of wireless links 90-92 (FIG. 23)). The data can include any data that is measurable by the MVs, such as vehicle velocity, direction of travel, number of passengers present therein, and/or position thereof. Additionally, or alternatively, the data can include identification information and/or authorization for autopilot engagement. For example, as MVs travel on a road/highway and are served (or include occupants carrying MDs that are served) by a base station BTS, the base station BTS can periodically transmit a signal requesting identification information and/or position data (e.g., coordinates) from the MVs (and/or from the MDs therein). Moreover, in response to receiving a request from the base station BTS for information, the MVs (and/or the MDs therein) may each periodically transmit identification information and/or position data to the base station BTS, independently of whether the base station BTS repeats the request, responsive to the MVs being within the area 230 (FIG. 23).

The operations shown in FIG. 24 further include transmitting (Block 2430) information to at least one of the identified MVs. In particular, the information may be wirelessly transmitted (e.g., via at least one of wireless links 86-89 and/or at least one of wireless links 90-92). The information may include, for example, a reply/command that is responsive to data provided by the MVs. For example, in response to identification information, position data, and/or authorization for autopilot engagement provided by the MVs to a base station BTS, the base station BTS may transmit a command to at least one MV of the MVs to engage an autopilot mode. The terms "data" and "information" may be used herein to differentiate between operations in Blocks 2420 and 2430, though these terms may also be used interchangeably.

Moreover, the operations shown in FIG. 24 include controlling (Block 2440) velocity and/or acceleration of at least one of the identified MVs, based on the information that is transmitted. For example, a distance between two MVs may be controlled by controlling the velocity and/or acceleration of at least one of the MVs. The distance may be a particular number of feet and can vary based on vehicle type and/or other conditions, such as weather and/or traffic congestion. In some embodiments, different distances may be concurrently controlled between different pairs of MVs.

In some embodiments, each of the operations of Blocks 2410-2430 may be performed by a base station BTS and/or other facility connected thereto. Alternatively, each of the operations of Blocks 2410-2430 may be performed by an access point or MV (e.g., a police or other government-services vehicle or an MD therein). In some embodiments, operation(s) of Block 2410 may be cloud-based (e.g., performed using a server). Moreover, operation(s) of Blocks 2410 and/or 2420 may be performed by a base station BTS, and operation(s) of Block 2430 may be performed by an access point or MV in response to a communication thereto from the base station BTS. For example, the base station BTS may transmit information to one MV 104 (FIG. 23) via another MV 103 (FIG. 23). Operation(s) of Block 2440 may be performed by processor(s) 1451 in the MV(s) that can control acceleration and/or deceleration thereof. Accordingly, the operations of Blocks 2410-2440 may, in some embodiments, provide remote control of acceleration and/or deceleration of the MVs. It would indeed be unduly repetitious/tedious and obfuscating to describe in detail and illustrate every combination, sub-combination and/or variation of embodiments described herein that is/are possible using aspects, alternatives, variations, elements, architectures and/or parameters of embodiments already described above. The present description shall be construed to constitute a complete written description that supports each and every possible combination, sub-combination and/or variation of embodiments described herein and of any combination, sub-combination and/or variation of aspects, architectures, elements and/or parameters associated therewith, and of the manner and process of making and using them, and shall support Claims to any such combination, sub-combination and/or variation.

Specific exemplary embodiments of inventive concepts have been described with reference to the accompanying drawings. These inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. It will be understood that any two or more embodiments of the present inventive concepts as presented herein may be combined in whole or in part to form one or more additional embodiments.

The term(s) "transmitter," "receiver," "transceiver," "mobile device" and/or "smartphone," as may be used herein, include(s) cellular/terrestrial/satellite terminals, laptop computers, palmtop computers, pads/tablets and/or any device/system with or without a multi-line display that comprises a wireless communications capability and may be configured to provide functions including, but not limited to, voice/data communications, voice recognition, touch screen processing, data processing, paging, Internet/Intranet access, Web browsing, position determination and/or Global Positioning System (GPS) signal processing. The term(s) "transmitter," "receiver," "transceiver," "mobile device" and/or "smartphone," as used herein, also include(s) any wireless communications device comprising time-varying and/or fixed geographic coordinates and may be portable, transportable and/or installed in a vehicle (aeronautical/space-based, maritime, and/or land-based) and may be configured to operate locally and/or in a distributed fashion on a planet and/or space.

The present inventive concepts have been described/specified with reference to figure(s), block diagram(s), Claim(s) and/or flowchart illustration(s) of methods, apparatus (systems) and/or computer program products according to various embodiments. It is understood that a block of the block diagram(s) and/or flowchart illustration(s), and combinations of blocks in the block diagram(s) and/or flowchart illustration(s), may be implemented by computer program instructions. These computer program instructions may be provided to a processor of a general-purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the figure(s), block diagram(s) and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the figure(s), block diagram(s) and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the figure(s), block diagram(s) and/or flowchart block or blocks.

Accordingly, the present inventive concepts may be embodied in hardware and/or in software (including firmware, resident software, micro-code, etc.). Furthermore, the present inventive concepts may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

It should also be noted that in some alternate implementations, the functions/acts noted in the blocks of the block diagram(s)/flowchart(s) and/or figure(s) may occur out of the order noted in the block diagram(s)/flowchart(s) and/or figure(s). For example, two blocks shown in succession may in fact be executed substantially concurrently or the blocks may sometimes be executed in the reverse order, depending upon the functionality/acts involved. Moreover, the functionality of a given block of the flowchart(s)/block diagram(s) and/or figure(s) may be separated into multiple blocks and/or the functionality of two or more blocks of the flowchart(s)/block diagram(s) and/or figure(s) may be at least partially integrated with one another.

Many different embodiments, besides those described herein, are possible in connection with the above description, drawing(s) and document(s) that have been incorporated herein, by reference, as will be appreciated by those skilled in the art. It would be unduly repetitious and obfuscating to describe/illustrate every combination and sub-combination of these embodiments. Accordingly, the present specification, including the drawings, claims and any cited Application(s) that are assigned to the present Assignee, ENK Wireless, Inc., and are incorporated herein by reference, shall be construed to constitute a complete written description of all combinations and sub-combinations of embodiments and of the manner and process of making and using them, and shall support claims to any such combination and/or sub-combination.

It will be understood that any of the embodiments described herein (or any element/portion of any embodiment described herein) may be combined with any other embodiment (or element/portion thereof) to provide yet another embodiment. The number of different embodiments that are provided by the present inventive concepts are too numerous to list and describe individually and in whole. Those skilled in the art will appreciate that any of the embodiments described herein (or any element/portion of any embodiment that is described herein) may be combined with any other embodiment (or element/portion thereof) to provide yet another embodiment.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method comprising:
    transmitting, by a wireless device to a second wireless device, a first signal comprising first information;
    receiving, by the wireless device from the second wireless device, second information that differs from the first information; and
    receiving by the second wireless device the first signal, forming a second signal comprising the first information and transmitting the second signal to a destination device.

2. The method according to claim 1, further comprising:
    prior to said transmitting, by the wireless device to the second wireless device, the first signal comprising the first information, requesting by the wireless device from the second wireless device an acknowledgement regarding a processing capability thereof; and
    receiving at the wireless device from the second wireless device the acknowledgement.

3. The method according to claim 1, further comprising:
    transmitting, by the wireless device to the destination device, a third signal comprising the second information.

4. The method according to claim 3, further comprising:
    causing the destination device to aggregate the first information with the second information,
    wherein the destination device comprises a base station.

5. The method according to claim 1, wherein at least one of the wireless device and the second wireless device comprises a smartphone.

6. The method according to claim 3, wherein said transmitting, by the wireless device to the second wireless device, the first signal comprising the first information; and/or said transmitting, by the wireless device to the destination device, the third signal comprising the second information comprises:
    transmitting using a wireless link that is based upon a Bluetooth technology, a WiFi technology, an Orthogonal Frequency Division Multiplexing (OFDM) technology, an Orthogonal Frequency Division Multiple Access (OFDMA) technology and/or a Single Carrier Frequency Division Multiple Access (SC-FDMA) technology.

7. The method according to claim 1, wherein said transmitting the second signal to the destination device comprises:
    transmitting the second signal using at least one carrier that is based upon Orthogonal Frequency Division Multiplexing (OFDM), Orthogonal Frequency Division Multiple Access (OFDMA) and/or a Single Carrier Frequency Division Multiple Access (SC-FDMA) technology.

8. The method according to claim 1, wherein said forming the second signal comprising the first information comprises:
    performing a Fourier Transform on the first signal.

9. The method according to claim 8, wherein said performing the Fourier Transform on the first signal comprises:
    generating a plurality of samples of the first signal and processing the plurality of samples of the first signal by performing a Discrete Fourier Transform (DFT), an Inverse Discrete Fourier Transform (IDFT), a Fast Fourier Transform (FFT) and/or an Inverse Fast Fourier Transform (IFFT).

10. The method according to claim 3, wherein said transmitting, by the wireless device to the second wireless device, the first signal comprising the first information comprises using a first protocol; and wherein said transmitting, by the wireless device to the destination device, the third signal comprising the second information comprises using a second protocol that differs from the first protocol.

11. The method according to claim 3, wherein said transmitting, by the wireless device to the second wireless device, the first signal comprising the first information is based upon a protocol; and wherein said transmitting, by the wireless device to the destination device, the third signal comprising the second information is also based on the protocol.

12. The method according to claim 3, wherein said transmitting the second signal to the destination device comprises:
    transmitting by the second wireless device to the destination device the second signal substantially concurrently in time with said transmitting, by the wireless device to the destination device, the third signal.

13. A system comprising a wireless device and a second wireless device that are configured to perform operations comprising:
    transmitting, by the wireless device to the second wireless device, a first signal comprising first information;
    receiving, by the wireless device from the second wireless device, second information that differs from the first information; and receiving by the second wireless device the first signal, forming a second signal comprising the first information and transmitting the second signal to a destination device.

14. The system according to claim 13, wherein the operations further comprise:
prior to said transmitting, by the wireless device to the second wireless device, the first signal comprising the first information, requesting by the wireless device from the second wireless device an acknowledgement regarding a processing capability thereof; and
receiving at the wireless device from the second wireless device the acknowledgement.

15. The system according to claim 13, wherein the operations further comprise:
transmitting, by the wireless device to the destination device, a third signal comprising the second information.

16. The system according to claim 15, wherein the destination device comprises a base station, and wherein the operations further comprise:
causing the destination device to aggregate the first information with the second information.

17. The system according to claim 13, wherein at least one of the wireless device and the second wireless device comprises a smartphone.

18. The system according to claim 14, wherein at least one of said transmitting, by the wireless device to the second wireless device, the first signal comprising the first information; and said transmitting, by the first wireless device to the destination device, the third signal comprising the second information comprises:
transmitting using a Bluetooth protocol, a WiFi protocol, an Orthogonal Frequency Division Multiplexing (OFDM) protocol, an Orthogonal Frequency Division Multiple Access (OFDMA) protocol and/or a Single Carrier Frequency Division Multiple Access (SC-FDMA) protocol.

19. The system according to claim 13, wherein said transmitting the second signal to the destination device comprises:
transmitting the second signal using an Orthogonal Frequency Division Multiplexing (OFDM) protocol, an Orthogonal Frequency Division Multiple Access (OFDMA) protocol and/or a Single Carrier Frequency Division Multiple Access (SC-FDMA) protocol.

20. The system according to claim 13, wherein said forming the second signal comprising the first information comprises:
performing a Fourier Transform on the first signal.

21. The system according to claim 20, wherein said performing the Fourier Transform on the first signal comprises:
generating a plurality of samples of the first signal and processing the plurality of samples of the first signal by performing a Discrete Fourier Transform (DFT), an Inverse Discrete Fourier Transform (IDFT), a Fast Fourier Transform (FFT) and/or an Inverse Fast Fourier Transform (IFFT).

22. The system according to claim 15, wherein said transmitting, by the wireless device to the second wireless device, the first signal comprising the first information comprises using a first protocol; and wherein said transmitting, by the wireless device to the destination device, the third signal comprising the second information comprises using a second protocol that differs from the first protocol.

23. The system according to claim 15, wherein said transmitting, by the wireless device to the second wireless device, the first signal comprising the first information is based upon a protocol; and wherein said transmitting, by the first wireless device to the destination device, the third signal comprising the second information is also based upon the protocol.

24. The system according to claim 22, wherein said transmitting the second signal to the destination device comprises:
transmitting the second signal by the second wireless device to the destination device using the second protocol that differs from the first protocol.

25. The system according to claim 15, wherein said transmitting the second signal to the destination device comprises:
transmitting by the second wireless device to the destination device the second signal substantially concurrently in time with said transmitting, by the wireless device to the destination device, the third signal.

26. A system comprising a processor that is configured to control the system to perform operations comprising:
transmitting, by a first wireless device to a second wireless device, a first signal comprising first information;
receiving, by the first wireless device from the second wireless device, second information that differs from the first information; and
receiving by the second wireless device the first signal, forming a second signal comprising the first information and transmitting the second signal to a destination device.

27. The system according to claim 26, wherein the operations further comprise:
transmitting, by the first wireless device to the destination device, a third signal comprising the second information.

28. The system according to claim 26, wherein said transmitting, by the first wireless device, and said receiving, by the first wireless device, occur substantially concurrently in time.

29. The system according to claim 26, wherein at least one of the first wireless device and the second wireless device comprises a smartphone.

30. The system according to claim 26, wherein said transmitting, by the first wireless device, and said receiving, by the first wireless device, are performed using a Bluetooth technology.

31. The system according to claim 26, wherein said transmitting the second signal to the destination device comprises using a cellular link.

32. The system according to claim 27, wherein said transmitting the third signal to the destination device comprises using a cellular link.

33. The system according to claim 27, wherein said transmitting the second signal to the destination device and said transmitting the third signal to the destination device occur substantially concurrently in time.

* * * * *

UNITED STATES PATENT AND TRADEMARK OFFICE
CERTIFICATE OF CORRECTION

PATENT NO. : 11,075,740 B2
APPLICATION NO. : 16/847113
DATED : July 27, 2021
INVENTOR(S) : Peter D. Karabinis Page 1 of 3

It is certified that error appears in the above-identified patent and that said Letters Patent is hereby corrected as shown below:

On the Title Page

(56) References Cited, OTHER PUBLICATIONS, Page 2, Column 2, Zacarias et al. cite: Please correct "5-72.333" to read -- S-72.333 --

In the Specification

Column 2, Line 44: Please correct "$\xi=-\beta_{HV}/\alpha C_{VV}$" to read -- $\xi=-\beta_{HV}/\alpha_{VV}$ --

Column 5, Lines 11-12: Please correct "$[a_{VV}-(a_{VH}/v_{VH})\cdot b_{VV}]$" to read -- $[a_{VV}-(a_{VH}/b_{VH})\bullet b_{VV}]$ --

Column 5, Line 13: Please correct "$[a_{HH}-(a_{HV}/b_{HV})\cdot b_{HH}]$" to read -- $[a_{HH}-(a_{HV}/b_{HV})\bullet b_{HH}]$ --

Column 5, Lines 66-67: Please correct "$[a_{VV}-(a_{VH}/b_{VH})\cdot b_{VV}]$" to read -- $[a_{VV}-(a_{VH}/b_{VH})\bullet b_{VV}]$ --

Column 6, Line 1: Please correct "$[a_{HH}-(a_{HV}/b_{HV})\cdot b_{HH}]$" to read -- $[a_{HH}-(a_{HV}/b_{HV})\bullet b_{HH}]$ --

Column 6, Line 52: Please correct "$[a_{VV}-(a_{VH}/b_{VH})\cdot b_{VV}]$" to read -- $[a_{VV}-(a_{VH}/b_{VH})\bullet b_{VV}]$ --

Column 6, Line 54: Please correct "$[a_{HH}-(a_{HV}/b_{HV})\cdot b_{HH}]$" to read -- $[a_{HH}-(a_{HV}/b_{HV})\bullet b_{HH}]$ --

Column 9, Lines 28-29: Please correct "$[a_{VV}-(a_{VH}/b_{VH})\cdot b_{VV}]$" to read -- $[a_{VV}-(a_{VH}/b_{VH})\bullet b_{VV}]$ --

Column 9, Line 30: Please correct "$[a_{HH}-(a_{HV}/b_{HV})\cdot b_{HH}]$" to read -- $[a_{HH}-(a_{HV}/b_{HV})\bullet b_{HH}]$ --

Column 10, Lines 27-28: Please correct "$\xi=-\beta_H/\alpha_{VH}$" to read -- $\xi=-\beta_{HH}/\alpha_{VH}$ --

Column 10, Line 59: Please correct "parameter may" to read -- parameter $\xi$ may --

Column 12, Line 43: Please correct "$[a_{VV}-(a_{VH}/b_{VH})\cdot vv]$" to read -- $[a_{VV}-(a_{VH}/b_{VH})\bullet b_{VV}]$ --

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,075,740 B2

Column 12, Line 45: Please correct "[$a_{HH}$-($a_{HV}$/$b_{HV}$)·$b_{HH}$]" to read -- [$a_{HH}$-($a_{HV}$/$b_{HV}$)●$b_{HH}$] --

Column 13, Line 31: Please correct "[$a_{VV}$-($a_{VH}$/$b_{VH}$)·$b_{VV}$]" to read -- [$a_{VV}$-($a_{VH}$/$b_{VH}$)●$b_{VV}$] --

Column 13, Line 33: Please correct "[$a_{HH}$-($a_{HV}$/$b_{HV}$)·$b_{HH}$]" to read -- [$a_{HH}$-($a_{HV}$/$b_{HV}$)●$b_{HH}$] --

Column 14, Line 19: Please correct "[$a_{VV}$-($a_{VH}$/$b_{VH}$)·$b_{VV}$]" to read -- [$a_{VV}$-($a_{VH}$/$b_{VH}$)●$b_{VV}$] --

Column 14, Line 20: Please correct "[$a_{HH}$-($a_{HV}$/$b_{HV}$)·$b_{HH}$]" to read -- [$a_{HH}$-($a_{HV}$/$b_{HV}$)●$b_{HH}$] --

Column 16, Line 37: Please correct "$\beta_{HV}/(\alpha_{VH}-\alpha_{VV}\beta_{HH})$" to read -- $\beta_{HV}/(\alpha_{VH}\beta_{HV}-\alpha_{VV}\beta_{HH})$ --

Column 17, Lines 7-8: Please correct "[$a_{VV}$-($a_{VH}$/$b_{VH}$)·$b_{VV}$]" to read -- [$a_{VV}$-($a_{VH}$/$b_{VH}$)●$b_{VV}$] --

Column 17, Line 9: Please correct "[$a_{HH}$-($a_{HV}$/$b_{HV}$)·$b_{HH}$]" to read -- [$a_{HH}$-($a_{HV}$/$b_{HV}$)●$b_{HH}$] --

Column 37, Line 60: Please correct "$\xi=-\beta_{HV}/\alpha C_{VV}$" to read -- $\xi=-\beta_{HV}/\alpha_{VV}$ --

Column 40, Line 11: Please correct "Y=$\beta_{HH}$Y" to read -- Y=$\beta_{HH}$y --

Column 40, Line 26: Please correct "$\xi=-\alpha_{VV}/\beta_{HH}$" to read -- $\xi=-\alpha_{VV}/\beta_{HV}$ --

Column 40, Line 44: Please correct "(other than that" to read -- (other than $\xi$) that --

Column 41, Line 1: Please correct "is 10 msec" to read -- is $\leq$ 10 msec --

Column 49, Line 41: Please correct "$\chi$[$a_{VV}$-($a_{VH}$/$b_{VH}$)·$b_{VV}$]" to read -- $\chi$[$a_{VV}$-($a_{VH}$/$b_{VH}$)●$b_{VV}$] --

Column 49, Line 43: Please correct "y[$a_{HH}$-($a_{HV}$/$b_{HV}$)·$b_{HH}$]" to read -- y[$a_{HH}$-($a_{HV}$/$b_{HV}$)●$b_{HH}$] --

Column 70, Line 50: Please correct "M N" to read -- M $\leq$ N --

Column 79, Line 49: Please correct "substantially p" to read -- substantially $\rho$ --

Column 80, Line 14: Please correct "$\beta=-h_{11}/h_{12}$" to read -- $\tau=-h_{11}/h_{12}$ --

Column 80, Line 44: Please correct "if 1/[$h_{21}$−($h_{11}h_{22}/h_{12}$)] | >>1" to read
-- if | 1/[$h_{21}$−($h_{11}h_{22}/h_{12}$)] | >>1 --

Column 86, Line 58: Please correct "wherein $\tau$" to read -- wherein $\tau'$ --

Column 86, Line 59: Please correct "$\tau=-(h_{21})'/(h_{22})'$" to read -- $\tau'=-(h_{21})'/(h_{22})'$ --

Column 86, Line 62: Please correct "wherein $\sigma$" to read -- wherein $\sigma'$ --

In the Claims

Column 109, Line 27, Claim 18: Please correct "claim 14" to read -- claim 15 --